US008461952B1

(12) United States Patent
Fullerton et al.

(10) Patent No.: US 8,461,952 B1
(45) Date of Patent: Jun. 11, 2013

(54) FIELD EMISSION SYSTEM AND METHOD

(75) Inventors: Larry W. Fullerton, New Hope, AL (US); Mark D. Roberts, Huntsville, AL (US); James L. Richards, Fayetteville, TN (US)

(73) Assignee: Correlated Magnetics Research, LLC, New Hope, AL (US)

( * ) Notice: Subject to any disclaimer, the term of this patent is extended or adjusted under 35 U.S.C. 154(b) by 0 days.

(21) Appl. No.: 13/471,189

(22) Filed: May 14, 2012

Related U.S. Application Data

(63) Continuation of application No. 12/476,952, filed on Jun. 2, 2009, now Pat. No. 8,179,219, which is a continuation-in-part of application No. 12/322,561, filed on Feb. 4, 2009, now Pat. No. 8,115,581, which is a continuation-in-part of application No. 12/358,423, filed on Jan. 23, 2009, now Pat. No. 7,868,721, which is a continuation-in-part of application No. 12/123,718, filed on May 20, 2008, now Pat. No. 7,800,471.

(60) Provisional application No. 61/123,019, filed on Apr. 4, 2008.

(51) Int. Cl.
*H01F 7/02* (2006.01)
*H01F 7/20* (2006.01)

(52) U.S. Cl.
USPC .......... 335/285

(58) Field of Classification Search
USPC .......... 335/285, 302–306; 24/303
See application file for complete search history.

(56) References Cited

U.S. PATENT DOCUMENTS

| | | | |
|---|---|---|---|
| 381,968 | A | 5/1888 | Tesla |
| 493,858 | A | 3/1893 | Edison |
| 996,933 | A | 7/1911 | Lindquist |
| 1,236,234 | A | 8/1917 | Troje |
| 2,389,298 | A | 11/1945 | Ellis |
| 2,438,231 | A | 3/1948 | Schultz |
| 2,471,634 | A | 5/1949 | Vennice |
| 2,570,625 | A | 10/1951 | Zimmerman et al. |
| 2,722,617 | A | 11/1955 | Cluwen et al. |
| 3,102,314 | A | 9/1963 | Alderfer |
| 3,208,296 | A | 9/1965 | Baermann |
| 3,238,399 | A | 3/1966 | Johanees et al. |

(Continued)

FOREIGN PATENT DOCUMENTS

| | | | |
|---|---|---|---|
| DE | 2938782 | A1 | 4/1981 |
| EP | 0 345 554 | A1 | 12/1989 |

(Continued)

OTHER PUBLICATIONS

Series BNS, Compatible Series AES Safety Controllers, http://www.schmersalusa.com/safety_controllers/drawings/aes.pdf, pp. 159-175, date unknown.

(Continued)

*Primary Examiner* — Ramon Barrera
(74) *Attorney, Agent, or Firm* — Venable LLP; Robert S. Babayi

(57) ABSTRACT

An improved field emission system and method is provided that involves field emission structures having electric or magnetic field sources. The magnitudes, polarities, and positions of the magnetic or electric field sources are configured to have desirable correlation properties, which may be in accordance with a code. The correlation properties correspond to a desired spatial force function where spatial forces between field emission structures correspond to relative alignment, separation distance, and the spatial force function.

20 Claims, 76 Drawing Sheets

(Side View)

U.S. PATENT DOCUMENTS

| | | | |
|---|---|---|---|
| 3,288,511 | A | 11/1966 | Tavano |
| 3,408,104 | A | 10/1968 | Raynes |
| 2,932,545 | A | 4/1969 | Foley |
| 3,468,576 | A | 9/1969 | Beyer et al. |
| 3,474,366 | A | 10/1969 | Barney |
| 3,684,992 | A | 8/1972 | Huguet et al. |
| 3,696,258 | A | 10/1972 | Anderson et al. |
| 3,790,197 | A | 2/1974 | Parker |
| 3,791,309 | A | 2/1974 | Baermann |
| 3,802,034 | A | 4/1974 | Bookless |
| 3,845,430 | A | 10/1974 | Petkewicz et al. |
| 3,893,059 | A | 7/1975 | Nowak |
| 4,079,558 | A | 3/1978 | Forham |
| 4,129,846 | A | 12/1978 | Yablochnikov |
| 4,222,489 | A | 9/1980 | Hutter |
| 4,416,127 | A | 11/1983 | Gomez-Olea Naveda |
| 4,453,294 | A | 6/1984 | Morita |
| 4,535,278 | A | 8/1985 | Asakawa |
| 4,547,756 | A | 10/1985 | Miller et al. |
| 4,629,131 | A | 12/1986 | Podell |
| 4,849,749 | A | 7/1989 | Fukamachi et al. |
| 4,912,727 | A | 3/1990 | Schubert |
| 4,941,236 | A | 7/1990 | Sherman et al. |
| 5,020,625 | A | 6/1991 | Yamauchi et al. |
| 5,050,276 | A | 9/1991 | Pemberton |
| 5,345,207 | A | 9/1994 | Gebele |
| 5,367,891 | A | 11/1994 | Furuyama |
| 5,383,049 | A | 1/1995 | Carr |
| 5,838,304 | A | 1/1995 | Car |
| 5,440,997 | A | 8/1995 | Crowley |
| 5,461,386 | A | 10/1995 | Knebelkamp |
| 5,492,572 | A | 2/1996 | Schroeder et al. |
| 5,495,221 | A | 2/1996 | Post |
| 5,512,732 | A | 4/1996 | Yagnik et al. |
| 5,570,084 | A | 10/1996 | Ritter et al. |
| 5,604,960 | A | 2/1997 | Good |
| 5,631,093 | A | 5/1997 | Perry et al. |
| 5,631,618 | A | 5/1997 | Trumper et al. |
| 5,637,972 | A | 6/1997 | Randall et al. |
| 5,852,393 | A | 12/1998 | Reznik et al. |
| 5,956,778 | A | 9/1999 | Godoy |
| 5,983,406 | A | 11/1999 | Meyerrose |
| 6,072,251 | A | 6/2000 | Markle |
| 6,115,849 | A | 9/2000 | Meyerrose |
| 6,118,271 | A | 9/2000 | Ely et al. |
| 6,170,131 | B1 | 1/2001 | Shin |
| 6,205,012 | B1 | 3/2001 | Lear |
| 6,275,778 | B1 | 8/2001 | Shimada et al. |
| 6,285,097 | B1 | 9/2001 | Hazelton et al. |
| 6,387,096 | B1 | 5/2002 | Hyde, Jr. |
| 6,457,179 | B1 | 10/2002 | Prendergast |
| 6,467,326 | B1 | 10/2002 | Garrigus |
| 6,607,304 | B1 | 8/2003 | Lake et al. |
| 6,653,919 | B2 | 11/2003 | Shih-Chung et al. |
| 6,720,698 | B2 | 4/2004 | Galbraith |
| 6,842,332 | B1 | 1/2005 | Rubenson et al. |
| 6,847,134 | B2 | 1/2005 | Frissen et al. |
| 6,850,139 | B1 | 2/2005 | Dettmann et al. |
| 6,862,748 | B2 | 3/2005 | Prendergast |
| 6,927,657 | B1 | 8/2005 | Wu |
| 6,971,147 | B2 | 12/2005 | Halstead |
| 7,016,492 | B2 | 3/2006 | Pan et al. |
| 7,031,160 | B2 | 4/2006 | Tillotson |
| 7,065,860 | B2 | 6/2006 | Aoki et al. |
| 7,066,778 | B2 | 6/2006 | Kretzschmar |
| 7,362,018 | B1 | 4/2008 | Kulogo et al. |
| 7,444,683 | B2 | 11/2008 | Prendergast et al. |
| 7,583,500 | B2 | 9/2009 | Ligtenberg et al. |
| 7,775,567 | B2 | 8/2010 | Ligtenberg et al. |
| 7,808,349 | B2 | 10/2010 | Fullerton et al. |
| 7,812,697 | B2 | 10/2010 | Fullerton et al. |
| 7,839,246 | B2 | 11/2010 | Fullerton et al. |
| 7,868,721 | B2 | 1/2011 | Fullerton et al. |
| 2004/0003487 | A1 | 1/2004 | Reiter |
| 2004/0155748 | A1 | 8/2004 | Steingroever |
| 2004/0244636 | A1 | 12/2004 | Meadow et al. |
| 2004/0251759 | A1 | 12/2004 | Hirzel |
| 2005/0102802 | A1 | 5/2005 | Sitbon et al. |
| 2005/0231046 | A1 | 10/2005 | Aoshima |
| 2006/0066428 | A1 | 3/2006 | McCarthy et al. |
| 2006/0189259 | A1 | 8/2006 | Park et al. |
| 2006/0214756 | A1 | 9/2006 | Elliott et al. |
| 2006/0290451 | A1 | 12/2006 | Prendergast et al. |
| 2007/0075594 | A1 | 4/2007 | Sadler |
| 2007/0138806 | A1 | 6/2007 | Ligtenberg et al. |
| 2008/0139261 | A1 | 6/2008 | Cho et al. |
| 2008/0181804 | A1 | 7/2008 | Tanigawa et al. |
| 2008/0186683 | A1 | 8/2008 | Ligtenberg et al. |
| 2008/0272868 | A1 | 11/2008 | Prendergast et al. |
| 2008/0278668 | A1 | 11/2008 | Prendergast et al. |
| 2008/0282517 | A1 | 11/2008 | Claro |
| 2009/0021333 | A1 | 1/2009 | Fiedler |
| 2010/0033280 | A1 | 2/2010 | Bird et al. |
| 2011/0210636 | A1 | 9/2011 | Kuhlmann-Wilsdorf |

FOREIGN PATENT DOCUMENTS

| | | | |
|---|---|---|---|
| EP | 0 545 737 | A1 | 6/1993 |
| FR | 823395 | | 1/1938 |
| GB | 1 495 677 | A | 12/1977 |
| JP | 60-091011 | U | 5/1985 |
| WO | WO-02/31945 | A2 | 4/2002 |
| WO | WO-2007/081830 | A2 | 7/2007 |
| WO | WO-2009/124030 | A1 | 10/2009 |

OTHER PUBLICATIONS

BNS 33 Range, Magnetic safety sensors, Rectangular design, http://www.farnell.com/datasheets/36449.pdf, 3 pages, date unknown.

Series BNS-B20, Coded-Magnet Sensor Safety Door Handle, http://www.schmersalusa.com/catalog_pdfs/BNS_B20.pdf, 2 pages, date unknown.

Series BNS333, Coded-Magnet Sensors with Integral Safety Control Module, http://www.schmersalusa.com/machine_guarding/coded_magnet/drawings/bns333.pdf, 2 pages, date unknown.

International Search Report and Written Opinion, dated Apr. 8, 2011 issued in related International Application No. PCT/US2010/049410.

International Search Report and Written Opinion, dated Aug. 18, 2010, issued in related International Application No. PCT/US2010/036443.

International Search Report and Written Opinion, dated Jul. 13, 2010, issued in related International Application No. PCT/US2010/021612.

International Search Report and Written Opinion, dated May 14, 2009, issued in related International Application No. PCT/US2009/038925.

International Search Report and Written Opinion dated Jun. 1, 2009, issued in related International Application No. PCT/US2009/002027.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

United States Office Action, dated Feb. 2, 2011, issued in counterpart U.S. Appl. No. 12/476,952.

United States Office Action, dated Mar. 12, 2012, issued in counterpart U.S. Appl. No. 12/206,270.

United States Office Action, dated Mar. 9, 2012, issued in counterpart U.S. Appl. No. 13/371,280.

United States Office Action, dated Oct. 12, 2011, issued in counterpart U.S. Appl. No. 12/476,952.

Wikipedia, "Barker Code", Web article, last modified Aug. 2, 2008, 2 pages.

Wikipedia, "Bitter Electromagnet", Web article, last modified Aug. 2011, 1 page.

Wikipedia, "Costas Array", Web article, last modified Oct. 7, 2008, 4 pages.

Wikipedia, "Gold Code", Web article, last modified Jul. 27, 2008, 1 page.

Wikipedia, "Golomb Ruler", Web article, last modified Nov. 4, 2008, 3 pages.

Wikipedia, "Kasami Code", Web article, last modified Jun. 11, 2008, 1 page.

Wikipedia, "Linear feedback shift register", Web article, last modified Nov. 11, 2008, 6 pages.

Wikipedia, "Walsh Code", Web article, last modified Sep. 17, 2008, 2 pages.

Barker - 7 code = +1 +1 +1 −1 −1 +1 −1
500
702

1R = -1

1.5A +1R = 0.5

1.5A + 2R = -0.5

3A + 2.5R = 0.5

2A + 4.5R = -2.5

3.5A + 4.5R = -1

9A = 9

9A = 9

3.5A + 4.5R = -1

2A + 4.5R = -2.5

3A + 2.5R = 0.5

1.5A + 2R = -0.5

1.5A +1R = 0.5

1R = -1
702a
702b

Barker - 7 code = +1 +1 +1 −1 −1 +1 −1
500
502
902

3A + 4R = -1

3A + 4R = -1

3A + 4R = -1

3A + 4R = -1

3A + 4R = -1

3A + 4R = -1

7A = 7

7A = 7

3A + 4R = -1

3A + 4R = -1

3A + 4R = -1

3A + 4R = -1

3A + 4R = -1

3A + 4R = -1

FIG. 11A Barker - 7 code = +1 +1 +1 −1 −1 +1 −1

1402a
1402b
1600
12x7 hover code:
+1 +1 -1 -1 +1 -1 +1 +1 +1 -1 -1 +1
+1 -1 -1 +1 -1 +1 +1 +1 -1 -1 +1 -1
-1 -1 +1 -1 +1 +1 +1 -1 -1 +1 -1 +1
-1 +1 -1 +1 +1 +1 -1 -1 +1 -1 +1 +1
+1 -1 +1 +1 +1 -1 -1 +1 -1 +1 +1 +1
-1 +1 +1 +1 -1 -1 +1 -1 +1 +1 +1 -1
+1 +1 +1 -1 -1 +1 -1 +1 +1 +1 -1 -1
1602a
-1 -1 -1 -1 -1 -1 -1 = -7
1602b
-1 -1 -1 -1 -1 -1 -1 = -7
1602c
-1 -1 -1 -1 -1 -1 -1 = -7
1602d
-1 -1 -1 -1 -1 -1 -1 = -7
1602e
-1 -1 -1 -1 -1 -1 -1 = -7
1602f
-1 -1 -1 -1 -1 -1 -1 = -7
1604
1606
-7 -7 -7 -7 -7 -7 -7
-7 -7 -7 -7 -7 -7 -7
-7 -7 -7 -7 -7 -7 -7

3600

3602

3604

3606

3608

3610

3612

3614

4026
4028
4002a
4004
4008
4002b
4006
4002c
4005
4010
4012
4002d 4014
4016
4002a
4004
4008
4010
4017

4020a
4020b
4018

4022
4024a
4016a
4016b
4024b

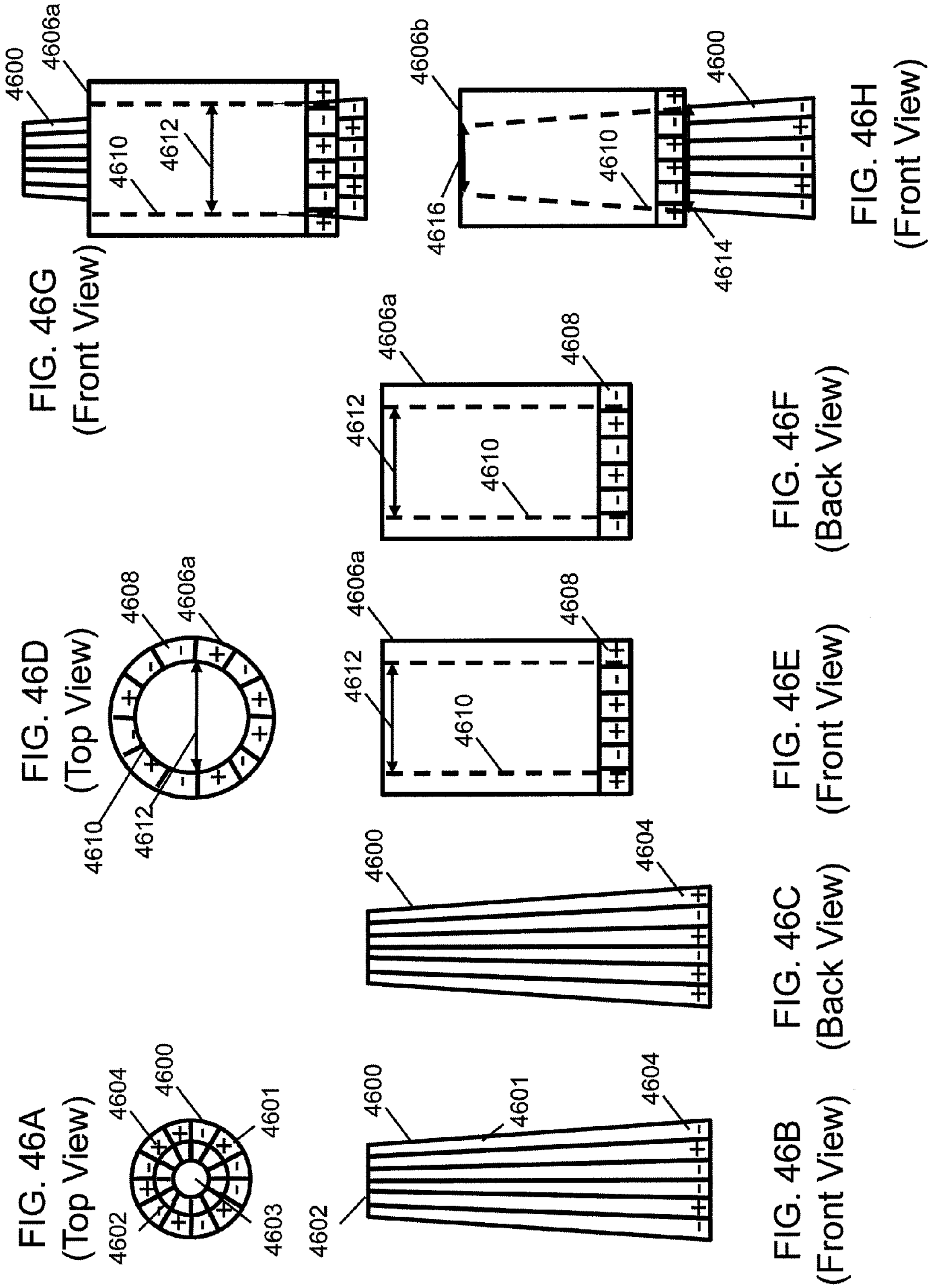
FIG. 46A (Top View)
FIG. 46B (Front View)
FIG. 46C (Back View)
FIG. 46D (Top View)
FIG. 46E (Front View)
FIG. 46F (Back View)
FIG. 46G (Front View)
FIG. 46H (Front View)

(Side View)

(Top View)

FIG. 53C (Front View)

(Side View)

(Top View)

FIG. 56A (Top View)
FIG. 56B (Bottom View)
FIG. 56C (Bottom View)
FIG. 56D (Top View)
FIG. 56E (Bottom View)
FIG. 56F (Bottom View)
FIG. 56G (Bottom View)
FIG. 56H (Side View)
FIG. 56I (Top View)

FIG. 56M (Side View)
FIG. 56N (Bottom View)
FIG. 56O (Top View)
FIG. 56P (Top View)
FIG. 56Q (Top View)

FIG. 57A (Top View)
5702
5704
5718
5714
5710
5716
5712
5706
5708
5712
5718
5716
5718
FIG. 57B (Bottom View)
5720
5728
5726
5722
5724
5714
5728
5728
5728
FIG. 57C (Top View)
5720
FIG. 57D (Top View)
5700
FIG. 57E (Top View)
5700
FIG. 57F (Top View)
5700
FIG. 58A (Top View)
5800
5604
5804
5802
FIG. 58B (Top View)
5806
5604
5804
5810
5812
5808
5604

5814
5604
5604
FIG. 59A (Side View)
5900
5908
5904
5906
5902
FIG. 59B (Side View)
5900
5904
5906/5908
5902
FIG. 59C (Top View)
5902
5906

FIG. 59D (Top View)

6300
6302
6304

6306
6308
6310
6312

6306
6308
6310
6312

6310
6312
6314
6316
6318
6320
6322

6100
6306
6308
6312
6314

FIG. 65A (Top View)

FIG. 65B (Side View)

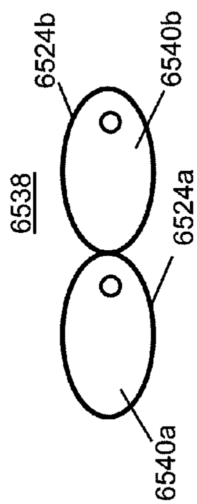
FIG. 65I
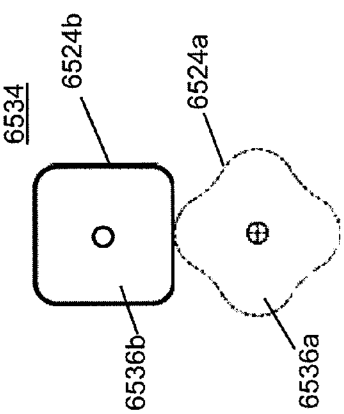
FIG. 65H
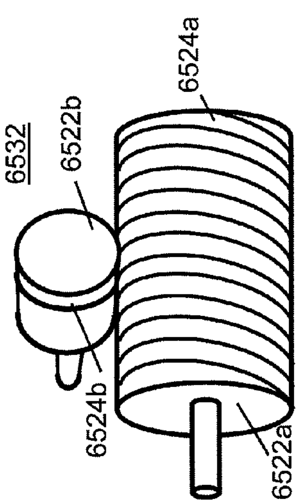
FIG. 65G
FIG. 66B
(Side View)
6310b
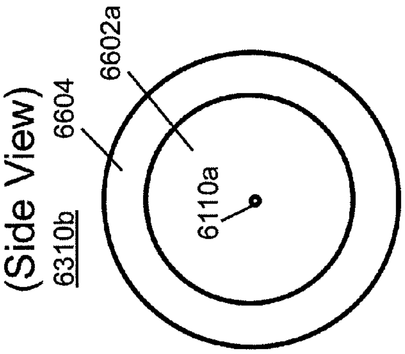
FIG. 66A
(Top View)
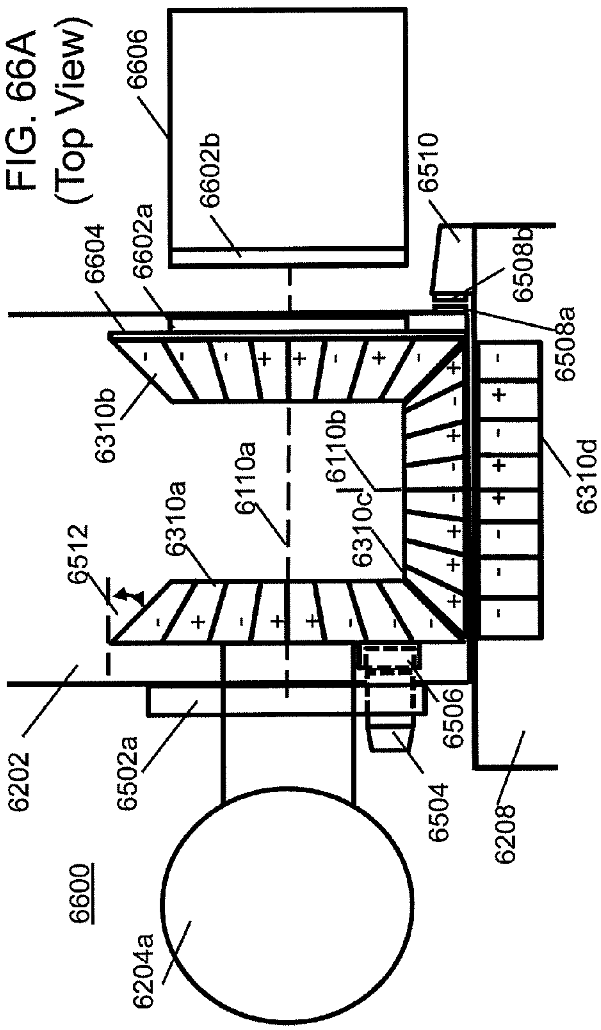

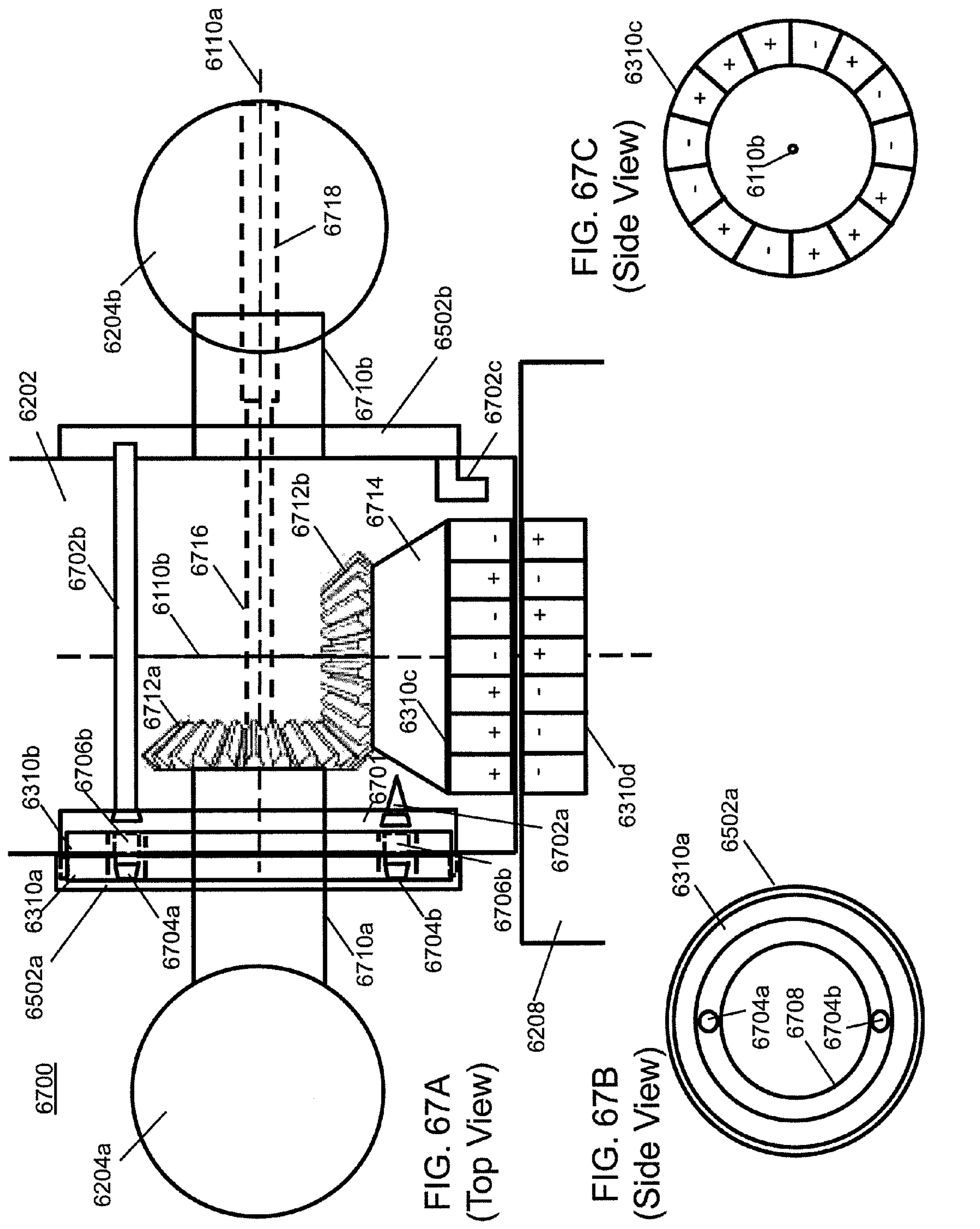
FIG. 67A (Top View)
FIG. 67B (Side View)
FIG. 67C (Side View)

FIG. 68A (Side View)

FIG. 68B (Front View)

FIG. 70C (Top View)

FIG. 70D (Top View)

7200

7100

7100

7400

7410

FIELD EMISSION SYSTEM AND METHOD

CROSS-REFERENCE TO RELATED APPLICATIONS

This Non-provisional application is a continuation of Non-provisional Application Ser. No. 12/476,952, filed Jun. 2, 2009, titled "A Field Emission System and Method", which is a continuation-in-part of Non-provisional application Ser. No. 12/322,561, filed Feb. 4, 2009, titled "System and Method for Producing an Electric Pulse", which is a continuation-in-part application of Non-provisional application Ser. No. 12/358,423, filed Jan. 23, 2009, titled "A Field Emission System and Method", which is a continuation-in-part application of Non-provisional application Ser. No. 12/123,718, filed May 20, 2008, titled "A Field Emission System and Method", which claims the benefit of U.S. Provisional Application Ser. No. 61/123,019, filed Apr. 4, 2008, titled "A Field Emission System and Method". The applications listed above are incorporated by reference herein in their entireties.

FIELD OF THE INVENTION

The present invention relates generally to a field emission system and method. More particularly, the present invention relates to a system and method where correlated magnetic and/or electric field structures create spatial forces in accordance with the relative alignment of the field emission structures and a spatial force function.

BACKGROUND OF THE INVENTION

Alignment characteristics of magnetic fields have been used to achieve precision movement and positioning of objects. A key principle of operation of an alternating-current (AC) motor is that a permanent magnet will rotate so as to maintain its alignment within an external rotating magnetic field. This effect is the basis for the early AC motors including the "Electro Magnetic Motor" for which Nikola Tesla received U.S. Pat. No. 381,968 on May 1, 1888. On Jan. 19, 1938, Marius Lavet received French Patent 823,395 for the stepper motor which he first used in quartz watches. Stepper motors divide a motor's full rotation into a discrete number of steps. By controlling the times during which electromagnets around the motor are activated and deactivated, a motor's position can be controlled precisely. Computer-controlled stepper motors are one of the most versatile forms of positioning systems. They are typically digitally controlled as part of an open loop system, and are simpler and more rugged than closed loop servo systems. They are used in industrial high speed pick and place equipment and multi-axis computer numerical control (CNC) machines. In the field of lasers and optics they are frequently used in precision positioning equipment such as linear actuators, linear stages, rotation stages, goniometers, and mirror mounts. They are used in packaging machinery, and positioning of valve pilot stages for fluid control systems. They are also used in many commercial products including floppy disk drives, flatbed scanners, printers, plotters and the like.

Although alignment characteristics of magnetic fields are used in certain specialized industrial environments and in a relatively limited number of commercial products, their use for precision alignment purposes is generally limited in scope. For the majority of processes where alignment of objects is important, e.g., residential construction, comparatively primitive alignment techniques and tools such as a carpenter's square and a level are more commonly employed. Moreover, long trusted tools and mechanisms for attaching objects together such as hammers and nails; screw drivers and screws; wrenches and nuts and bolts; and the like, when used with primitive alignment techniques result in far less than precise residential construction, which commonly leads to death and injury when homes collapse, roofs are blown off in storms, etc. Generally, there is considerable amount of waste of time and energy in most of the processes to which the average person has grown accustomed that are a direct result of imprecision of alignment of assembled objects. Machined parts wear out sooner, engines are less efficient resulting in higher pollution, buildings and bridges collapse due to improper construction, and so on.

It has been discovered that various field emission properties can be put in use in a wide range of applications.

SUMMARY OF THE INVENTION

Briefly, the present invention is an improved field emission system and method. The invention pertains to field emission structures comprising electric or magnetic field sources having magnitudes, polarities, and positions corresponding to a desired spatial force function where a spatial force is created based upon the relative alignment of the field emission structures and the spatial force function. The invention herein is sometimes referred to as correlated magnetism, correlated field emissions, correlated magnets, coded magnets, coded magnetism, or coded field emissions. Structures of magnets arranged in accordance with the invention are sometimes referred to as coded magnet structures, coded structures, field emission structures, magnetic field emission structures, and coded magnetic structures. Structures of magnets arranged conventionally (or 'naturally') where their interacting poles alternate are referred to herein as non-correlated magnetism, non-correlated magnets, non-coded magnetism, non-coded magnets, non-coded structures, or non-coded field emissions.

In accordance with one embodiment of the invention, a field emission system comprises a first field emission structure and a second field emission structure. The first and second field emission structures each comprise an array of field emission sources each having positions and polarities relating to a desired spatial force function that corresponds to the relative alignment of the first and second field emission structures within a field domain. The positions and polarities of each field emission source of each array of field emission sources can be determined in accordance with at least one correlation function. The at least one correlation function can be in accordance with at least one code. The at least one code can be at least one of a pseudorandom code, a deterministic code, or a designed code. The at least one code can be a one dimensional code, a two dimensional code, a three dimensional code, or a four dimensional code.

Each field emission source of each array of field emission sources has a corresponding field emission amplitude and vector direction determined in accordance with the desired spatial force function, where a separation distance between the first and second field emission structures and the relative alignment of the first and second field emission structures creates a spatial force in accordance with the desired spatial force function. The spatial force comprises at least one of an attractive spatial force or a repellant spatial force. The spatial force corresponds to a peak spatial force of said desired spatial force function when said first and second field emission structures are substantially aligned such that each field emission source of said first field emission structure substantially aligns with a corresponding field emission source of said second field emission structure. The spatial force can be used to produce energy, transfer energy, move an object, affix an object, automate a function, control a tool, make a sound, heat an environment, cool an environment, affect pressure of an environment, control flow of a fluid, control flow of a gas, and control centrifugal forces.

Under one arrangement, the spatial force is typically about an order of magnitude less than the peak spatial force when the first and second field emission structures are not substantially aligned such that field emission source of the first field emission structure substantially aligns with a corresponding field emission source of said second field emission structure.

A field domain corresponds to field emissions from the array of first field emission sources of the first field emission structure interacting with field emissions from the array of second field emission sources of the second field emission structure.

The relative alignment of the first and second field emission structures can result from a respective movement path function of at least one of the first and second field emission structures where the respective movement path function is one of a one-dimensional movement path function, a two-dimensional movement path function or a three-dimensional movement path function. A respective movement path function can be at least one of a linear movement path function, a non-linear movement path function, a rotational movement path function, a cylindrical movement path function, or a spherical movement path function. A respective movement path function defines movement versus time for at least one of the first and second field emission structures, where the movement can be at least one of forward movement, backward movement, upward movement, downward movement, left movement, right movement, yaw, pitch, and or roll. Under one arrangement, a movement path function would define a movement vector having a direction and amplitude that varies over time.

Each array of field emission sources can be one of a one-dimensional array, a two-dimensional array, or a three-dimensional array. The polarities of the field emission sources can be at least one of North-South polarities or positive-negative polarities. At least one of the field emission sources comprises a magnetic field emission source or an electric field emission source. At least one of the field emission sources can be a permanent magnet, an electromagnet, an electro-permanent magnet, an electret, a magnetized ferromagnetic material, a portion of a magnetized ferromagnetic material, a soft magnetic material, or a superconductive magnetic material. At least one of the first and second field emission structures can be at least one of a back keeper layer, a front saturable layer, an active intermediate element, a passive intermediate element, a lever, a latch, a swivel, a heat source, a heat sink, an inductive loop, a plating nichrome wire, an embedded wire, or a kill mechanism. At least one of the first and second field emission structures can be a planer structure, a conical structure, a cylindrical structure, a curve surface, or a stepped surface.

In accordance with another embodiment of the invention, a method of controlling field emissions comprises defining a desired spatial force function corresponding to the relative alignment of a first field emission structure and a second field emission structure within a field domain and establishing, in accordance with the desired spatial force function, a position and polarity of each field emission source of a first array of field emission sources corresponding to the first field emission structure and of each field emission source of a second array of field emission sources corresponding to the second field emission structure.

In accordance with a further embodiment of the invention, a field emission system comprises a first field emission structure comprising a plurality of first field emission sources having positions and polarities in accordance with a first correlation function and a second field emission structure comprising a plurality of second field emission source having positions and polarities in accordance with a second correlation function, the first and second correlation functions corresponding to a desired spatial force function, the first correlation function complementing the second correlation function such that each field emission source of said plurality of first field emission sources has a corresponding counterpart field emission source of the plurality of second field emission sources and the first and second field emission structures will substantially correlate when each of the field emission source counterparts are substantially aligned.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 11B through 11AB depict 27 different alignments of two magnetic field emission structures like that of FIG. 11A;

FIG. 11AC provides an alternative method of depicting exemplary alignments of the complementary magnetic field structures of FIGS. 11B-11AB;

FIGS. 46A-46H depict exemplary male and female connector components;

FIGS. 53A and 53B depict an exemplary configurable device comprising exemplary configurable magnetic field structures;

FIGS. 53C and 53D depict front and isometric views of another exemplary configurable magnetic field structure;

FIG. 53E depicts an isometric view of still another exemplary configurable magnetic field structure;

FIGS. 54A-54D depict an exemplary correlated magnetic zipper;

FIGS. 57A-57F depict an exemplary torque-radial force conversion device;

FIGS. 58A-58C depict exemplary swivel mechanisms and a corresponding exemplary handle;

FIGS. 59A-59D depict cross-sections and top views of exemplary snap mechanisms;

FIG. 65A depicts an exemplary doorknob assembly;

FIG. 65B depicts a side view of an exemplary magnetic field emission structure used as part of the exemplary doorknob assembly of FIG. 65A;

FIGS. 65C-65I depict alternative gear-like mechanisms;

FIGS. 66A and 66B depict an exemplary doorknob assembly having a removable key-like doorknob and the key-like doorknob, respectively;

FIGS. 67A-67C depict another alternative exemplary doorknob assembly;

FIGS. 68A-68G depict various keys and keylock mechanisms;

FIGS. 69A-69F depict exemplary door latch mechanisms;

FIG. 70A depicts an exemplary monopolar magnetizing circuit;

FIG. 70B depicts an exemplary bipolar magnetizing circuit;

FIGS. 70C and 70D depict top views of exemplary circular conductors used to produce a high voltage inductor coil;

FIGS. 70E and 70F depict three dimensional views of the circular conductors of FIGS. 70C and 70D;

FIG. 70G depicts a high voltage inductor coil;

FIG. 70H depicts two exemplary round wire inductor coils;

FIG. 70I depicts an exemplary flat metal inductor coil;

FIG. 71A depicts an exemplary coded magnetic structure manufacturing apparatus;

FIG. 71B depicts an alternative exemplary coded magnetic structure manufacturing apparatus;

FIG. 72 depicts an exemplary coded magnetic structure manufacturing method;

FIG. 73A depicts an exemplary system for manufacturing magnetic field emission structures from magnetized particles;

Figure 73B:
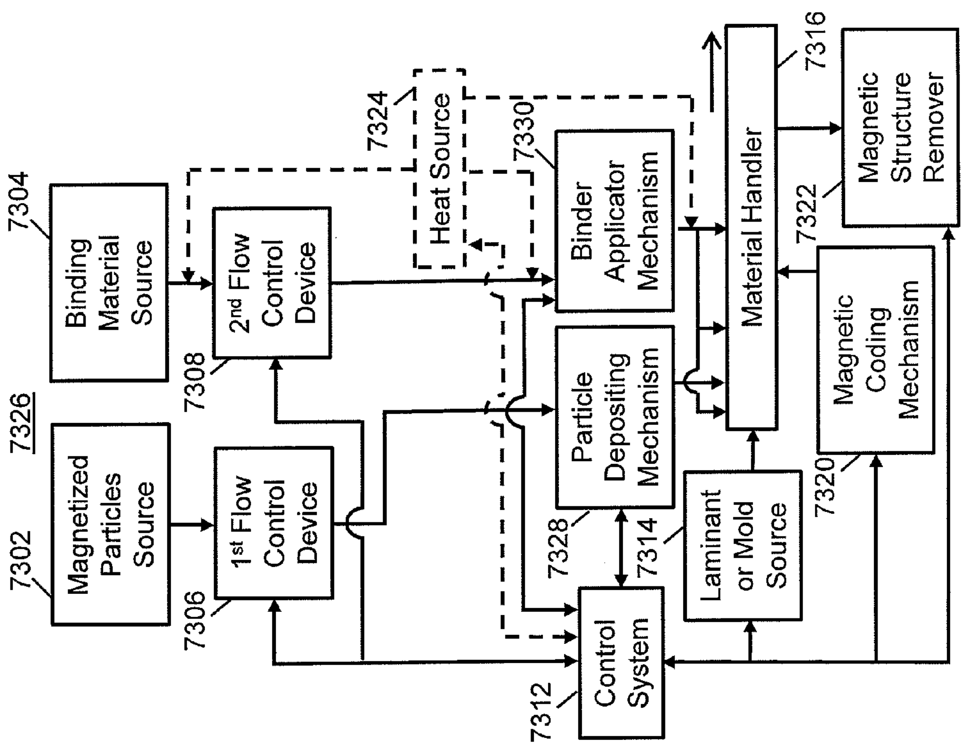
Figure 74A:
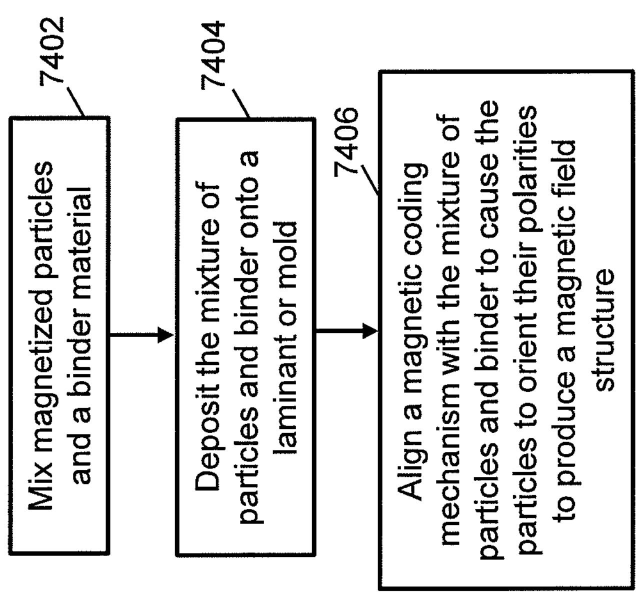
Figure 74B:
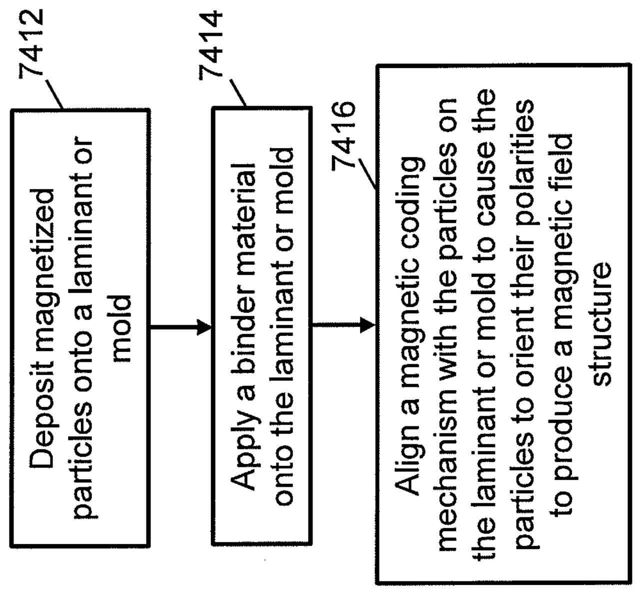

FIG. 73B depicts another exemplary system for manufacturing magnetic field emission structures from magnetized particles;

FIG. 74A depicts an exemplary method for manufacturing magnetic field emission structures from magnetized particles; and FIG. 74B depicts another exemplary method for manufacturing magnetic field emission structures from magnetized particles.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

Figure 1:
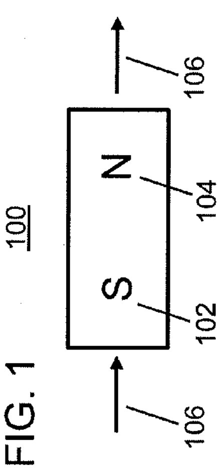
FIG. 1 depicts South and North poles and magnetic field vectors of an exemplary magnet.

FIG. 1 depicts South and North poles and magnetic field vectors of an exemplary magnet. Referring to FIG. 1, a magnet 100 has a South pole 102 and a North pole 104. Also depicted are magnetic field vectors 106 that represent the direction and magnitude of the magnet's moment. North and South poles are also referred to herein as positive (+) and negative (−) poles, respectively. In accordance with the invention, magnets can be permanent magnets, impermanent magnets, electromagnets, electro-permanent magnets, involve hard or soft material, and can be superconductive. In some applications, magnets can be replaced by electrets. Magnets can be most any size from very large to very small to include nanometer scale. In the case of non-superconducting materials there is a smallest size limit of one domain. When a material is made superconductive, however, the magnetic field that is within it can be as complex as desired and there is no practical lower size limit until you get to atomic scale. Magnets may also be created at atomic scale as electric and magnetic fields produced by molecular size structures may be tailored to have correlated properties, e.g. nanomaterials and macromolecules.

At the nanometer scale, one or more single domains can be used for coding where each single domain has a code and the quantization of the magnetic field would be the domain.

Figure 2:
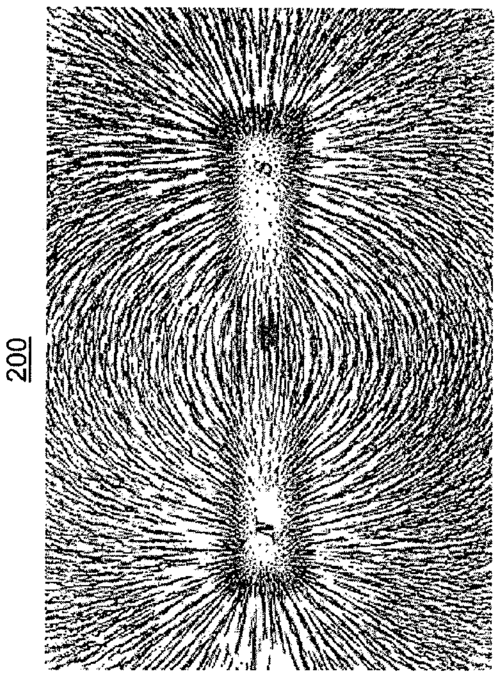
FIG. 2 depicts iron filings oriented in the magnetic field produced by a bar magnet.

FIG. 2 depicts iron filings oriented in the magnetic field 200 (i.e., field domain) produced by a single bar magnet.

Figure 3A:
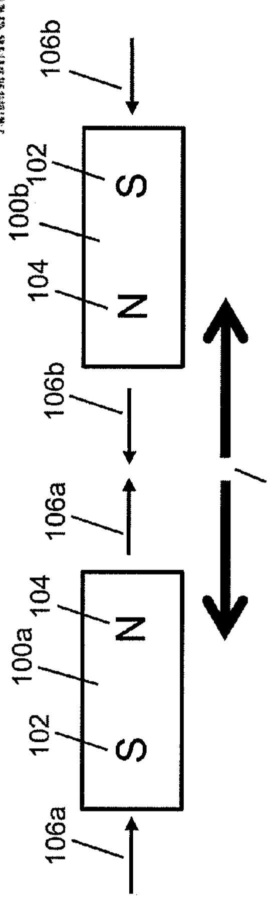
FIG. 3A depicts two magnets aligned such that their polarities are opposite in direction resulting in a repelling spatial force.

FIG. 3A depicts two magnets aligned such that their polarities are opposite in direction resulting in a repelling spatial force. Referring to FIG. 3A, two magnets 100*a* and 100*b* are aligned such that their polarities are opposite in direction. Specifically, a first magnet 100*a* has a South pole 102 on the left and a North pole 104 on the right, whereas a second magnet 100*b* has a North pole 104 on the left and a South pole 102 on the right such that when aligned the magnetic field vectors 106*a* of the first magnet 100*a* are directed against the magnetic field vectors 106*b* of the second magnet 100*b* resulting in a repelling spatial force 300 that causes the two magnets to repel each other.

Figure 3B:
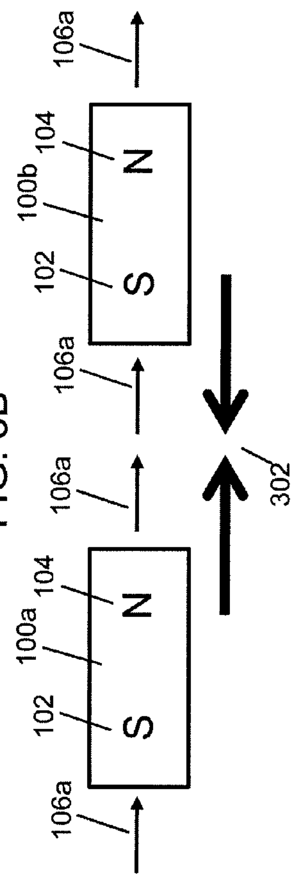
FIG. 3B depicts two magnets aligned such that their polarities are the same in direction resulting in an attracting spatial force.

FIG. 3B depicts two magnets aligned such that their polarities are the same in direction resulting in an attracting spatial force. Referring to FIG. 3B, two magnets 100*a* and 100*b* are aligned such that their polarities are in the same direction. Specifically, a first magnet 100*a* has a South pole 102 on the left and a North pole 104 on the right, and a second magnet 100*b* also has South pole 102 on the left and a North pole 104 on the right such that when aligned the magnetic field vectors 106*a* of the first magnet 100*a* are directed the same as the magnetic field vectors 106*a* of the second magnet 100*b* resulting in an attracting spatial force 302 that causes the two magnets to attract each other.

Figures 4A, 4B, 4C:
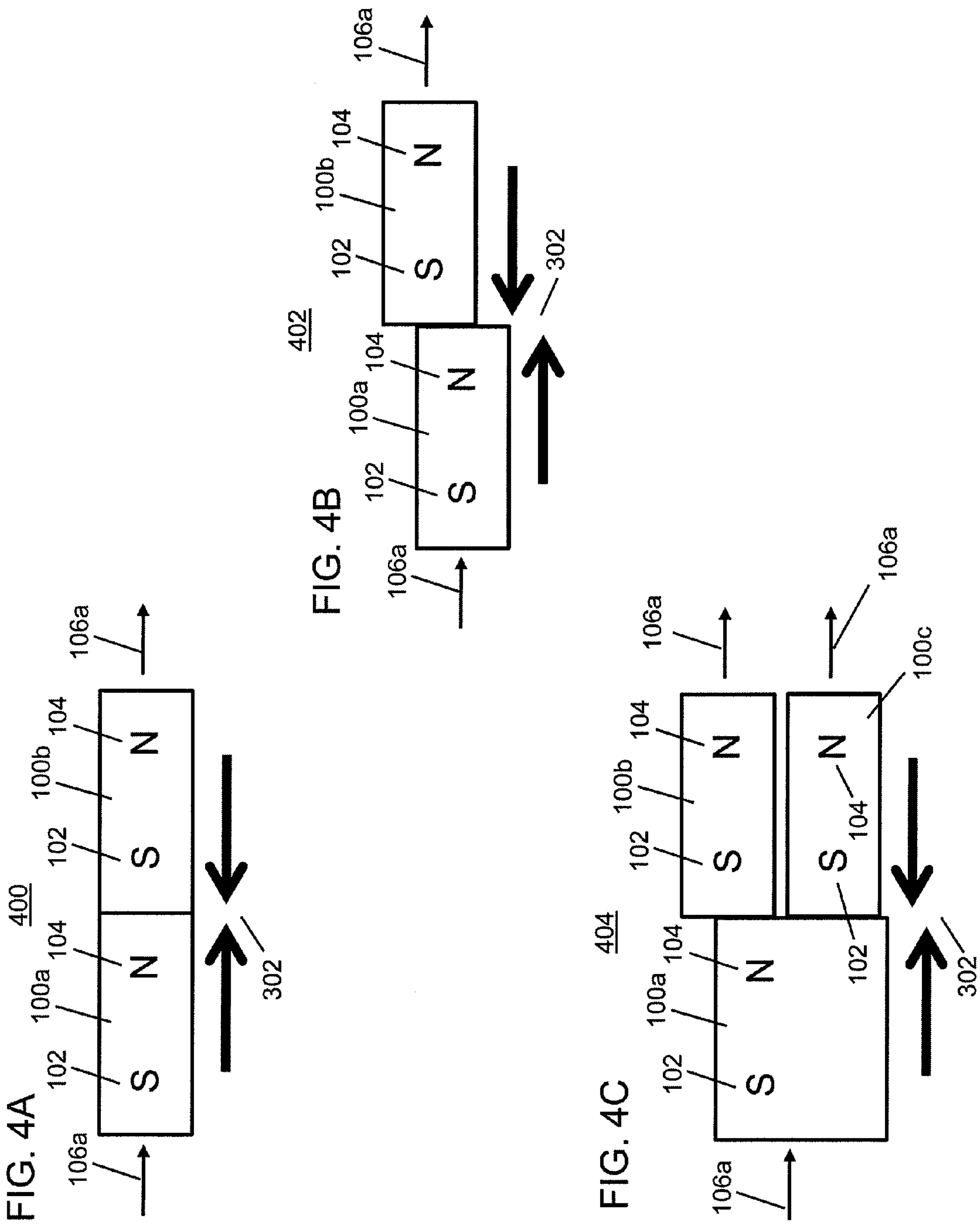
FIG. 4A depicts two magnets having substantial alignment.
FIG. 4B depicts two magnets having partial alignment.
FIG. 4C depicts different sized magnets having partial alignment.

FIG. 4A depicts two magnets 100*a* 100*b* having substantial alignment 400 such that the North pole 104 of the first magnet 100*a* has substantially full contact across its surface with the surface of the South pole 102 of the second magnet 100*b*.

FIG. 4B depicts two magnets 100*a*, 100*b* having partial alignment 402 such that the North pole 104 of the first magnet 100*a* is in contact across its surface with approximately two-thirds of the surface of the South pole 102 of the second magnet 100*b*.

FIG. 4C depicts a first sized magnet 100*a* and smaller different sized magnets 100*b* 100*c* having partial alignment 404. As seen in FIG. 4C, the two smaller magnets 100*b* and 100*c* are aligned differently with the larger magnet 100*a*.

Generally, one skilled in the art will recognize in relation to FIGS. 4A through 4C that the direction of the vectors 106*a* of the attracting magnets will cause them to align in the same direction as the vectors 106*a*. However, the magnets can be moved relative to each other such that they have partial alignment yet they will still 'stick' to each other and maintain their positions relative to each other.

In accordance with the present invention, combinations of magnet (or electric) field emission sources, referred to herein as magnetic field emission structures, can be created in accordance with codes having desirable correlation properties. When a magnetic field emission structure is brought into alignment with a complementary, or mirror image, magnetic field emission structure the various magnetic field emission sources all align causing a peak spatial attraction force to be produced whereby misalignment of the magnetic field emission structures causes the various magnetic field emission sources to substantially cancel each other out as function of the code used to design the structures. Similarly, when a magnetic field emission structure is brought into alignment with a duplicate magnetic field emission structure the various magnetic field emission sources all align causing a peak spatial repelling force to be produced whereby misalignment of the magnetic field emission structures causes the various magnetic field emission sources to substantially cancel each other out. As such, spatial forces are produced in accordance with the relative alignment of the field emission structures and a spatial force function. As described herein, these spatial force functions can be used to achieve precision alignment and precision positioning. Moreover, these spatial force functions enable the precise control of magnetic fields and associated spatial forces thereby enabling new forms of attachment devices for attaching objects with precise alignment and new systems and methods for controlling precision movement of objects. Generally, a spatial force has a magnitude that is a function of the relative alignment of two magnetic field emission structures and their corresponding spatial force (or correlation) function, the spacing (or distance) between the two magnetic field emission structures, and the magnetic field strengths and polarities of the sources making up the two magnetic field emission structures.

The characteristic of the present invention whereby the various magnetic field sources making up two magnetic field emission structures can effectively cancel out each other when they are brought out of alignment can be described as a release force (or a release mechanism). This release force or release mechanism is a direct result of the correlation coding used to produce the magnetic field emission structures and, depending on the code employed, can be present regardless of whether the alignment of the magnetic field emission structures corresponds to a repelling force or an attraction force.

One skilled in the art of coding theory will recognize that there are many different types of codes having different correlation properties that have been used in communications for channelization purposes, energy spreading, modulation, and other purposes. Many of the basic characteristics of such codes make them applicable for use in producing the magnetic field emission structures described herein. For example, Barker codes are known for their autocorrelation properties. Although, Barker codes are used herein for exemplary purposes, other forms of codes well known in the art because of their autocorrelation, cross-correlation, or other properties are also applicable to the present invention including, for example, Gold codes, Kasami sequences, hyperbolic congruential codes, quadratic congruential codes, linear congruential codes, Welch-Costas array codes, Golomb-Costas array codes, pseudorandom codes, chaotic codes, and Optimal Golomb Ruler codes. Generally, any code can be employed.

The correlation principles of the present invention may or may not require overcoming normal 'magnet orientation' behavior using a holding mechanism. For example, magnets of the same magnetic field emission structure can be sparsely separated from other magnets (e.g., in a sparse array) such that the magnetic forces of the individual magnets do not substantially interact, in which case the polarity of individual magnets can be varied in accordance with a code without requiring a substantial holding force to prevent magnetic forces from 'flipping' a magnet. Magnets that are close enough such that their magnetic forces substantially interact such that their magnetic forces would normally cause one of them to 'flip' so that their moment vectors align can be made to remain in a desired orientation by use of a holding mechanism such as an adhesive, a screw, a bolt & nut, etc.

Figures 5A, 5B, 5C, 5D, 5E, 5F, 5G, 5H, 5I, 5J, 5K, 5L, 5M, 5N, 5O:
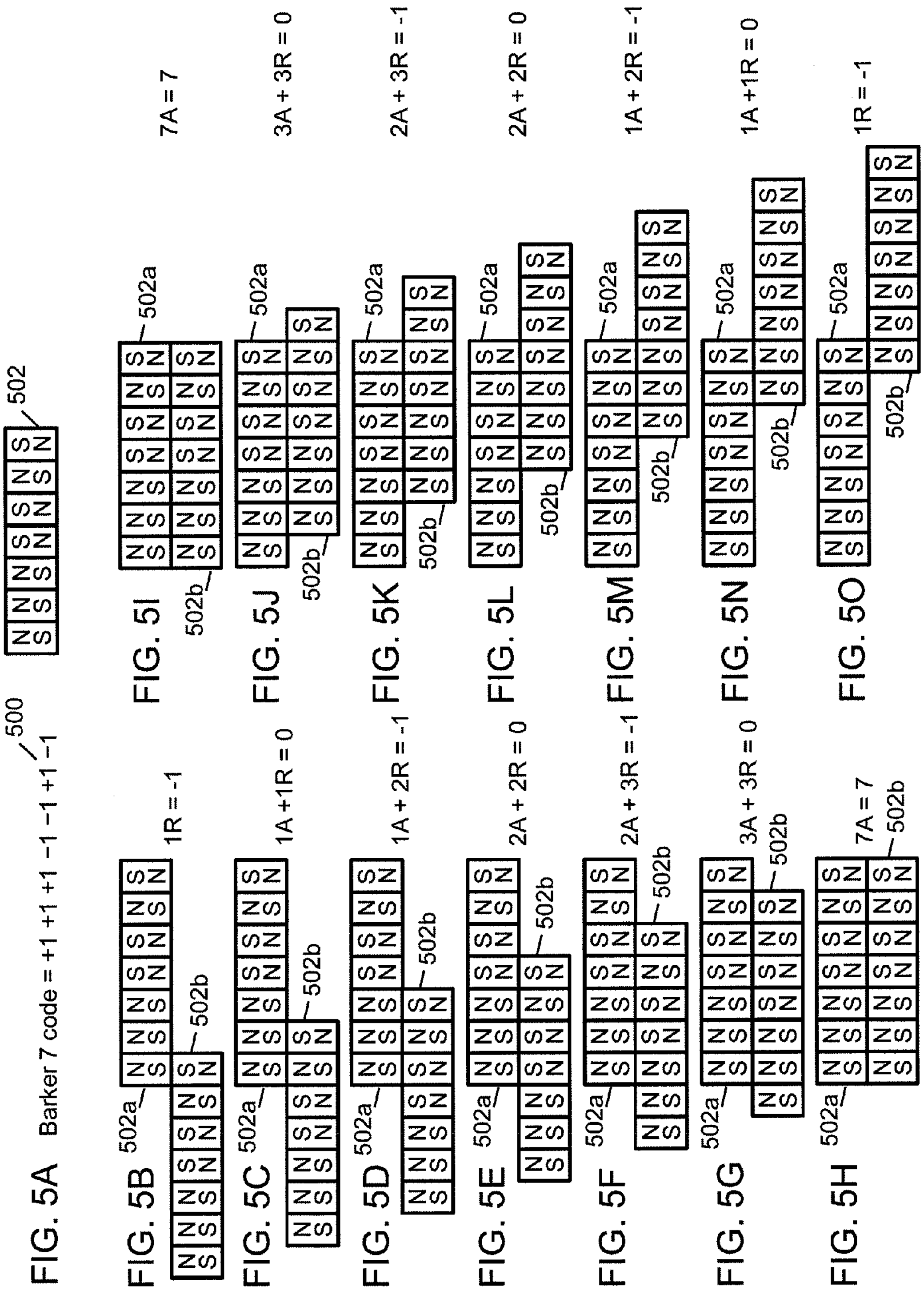
FIG. 5A depicts a Barker length 7 code used to determine polarities and positions of magnets making up a magnetic field emission structure where all of the magnets have the same field strength.
FIGS. 5B-5O depict exemplary alignments of complementary magnetic field structures.

FIG. 5A depicts a Barker length 7 code used to determine polarities and positions of magnets making up a magnetic field emission structure. Referring to FIG. 5A, a Barker length 7 code 500 is used to determine the polarities and the positions of magnets making up a magnetic field emission structure 502. Each magnet has the same or substantially the same magnetic field strength (or amplitude), which for the sake of this example is provided a unit of 1 (where A=Attract, R=Repel, A=−R, A=1, R=−1).

FIGS. 5B through 5O depict different alignments of two complementary magnetic field structures like that of FIG. 5A. Referring to FIGS. 5B through 5O, a first magnetic field structure 502*a* is held stationary. A second magnetic field emission structure 502*b* that is identical to the first magnetic field emission structure 502*a* is shown sliding from left to right in 13 different alignments relative to the first magnetic field emission structure 502*a* in FIGS. 5B through 5O. The boundary where individual magnets of the two structures interact is referred to herein as an interface boundary. (Note that although the first magnetic field emission structure 502*a* is identical to the second magnetic field structure in terms of magnet field directions, the interfacing poles are of opposite or complementary polarity).

The total magnetic force between the first and second magnetic field emission structures 502*a* 502*b* is determined as the sum from left to right along the structure of the individual forces, at each magnet position, of each magnet or magnet pair interacting with its directly opposite corresponding magnet in the opposite magnetic field emission structure. Where only one magnet exists, the corresponding magnet is 0, and the force is 0. Where two magnets exist, the force is R for equal poles or A for opposite poles. Thus, for FIG. 5*b*, the first six positions to the left have no interaction. The one position in the center shows two "S" poles in contact for a repelling force of 1. The next six positions to the right have no interaction, for a total force of 1R=−1, a repelling force of magnitude 1. The spatial correlation of the magnets for the various alignments is similar to radio frequency (RF) signal correlation in time, since the force is the sum of the products of the magnet strengths of the opposing magnet pairs over the lateral width of the structure. Thus, $$f = \sum_{n=1,N} p_n q_n$$

where, f is the total magnetic force between the two structures, n is the position along the structure up to maximum position N, and $p_n$ are the strengths and polarities of the lower magnets at each position n.

$q_n$ are the strengths and polarities of the upper magnets at each position n.

An alternative equation separates strength and polarity variables, as follows:

$$f = \sum_{n=1,N} l_n p_n u_n q_n$$

where, f is the total magnetic force between the two structures, n is the position along the structure up to maximum position N, $l_n$ are the strengths of the lower magnets at each position n, $p_n$ are the polarities (1 or −1) of the lower magnets at each position n, $u_n$ are the strengths of the upper magnets at each position n, and $q_n$ are the polarities (1 or −1) of the upper magnets at each position n.

The above force calculations can be performed for each shift of the two structures to plot a force vs. position function for the two structures. A force vs. position function may alternatively be called a spatial force function. In other words, for each relative alignment, the number of magnet pairs that repel plus the number of magnet pairs that attract is calculated, where each alignment has a spatial force in accordance with a spatial force function based upon the correlation function and magnetic field strengths of the magnets. With the specific Barker code used, it can be observed from the figures that the spatial force varies from −1 to 7, where the peak occurs when the two magnetic field emission structures are aligned such that their respective codes are aligned as shown in FIG. 5H and FIG. 5I. (FIG. 5H and FIG. 5I show the same alignment, which is repeated for continuity between the two columns of figures). The off peak spatial force, referred to as a side lobe force, varies from 0 to −1. As such, the spatial force function causes the magnetic field emission structures to generally repel each other unless they are aligned such that each of their magnets is correlated with a complementary magnet (i.e., a magnet's South pole aligns with another magnet's North pole, or vice versa). In other words, the two magnetic field emission structures substantially correlate when they are aligned such that they substantially mirror each other.

Figure 5P:
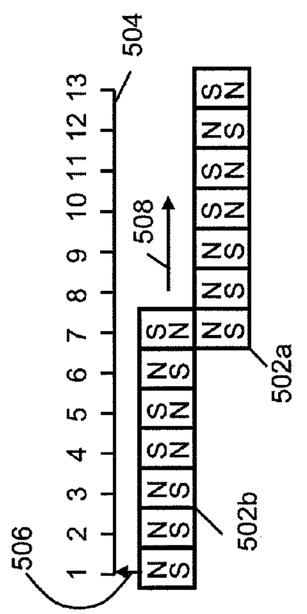
FIG. 5P provides an alternative method of depicting exemplary alignments of the complementary magnetic field structures of FIGS. 5B-5O.

FIG. 5P depicts the sliding action shown in FIGS. 5B through 5O in a single diagram. In FIG. 5P, a first magnet structure 502*a* is stationary while a second magnet structure 502*b* is moved across the top of the first magnet structure 502*a* in one direction 508 according to a scale 504. The second magnet structure 502*b* is shown at position 1 according to an indicating pointer 506, which moves with the left magnet of the second structure 502*b*. As the second magnet structure 502*b* is moved from left to right, the total attraction and repelling forces are determined and plotted in the graph of FIG. 6.

Figure 6:
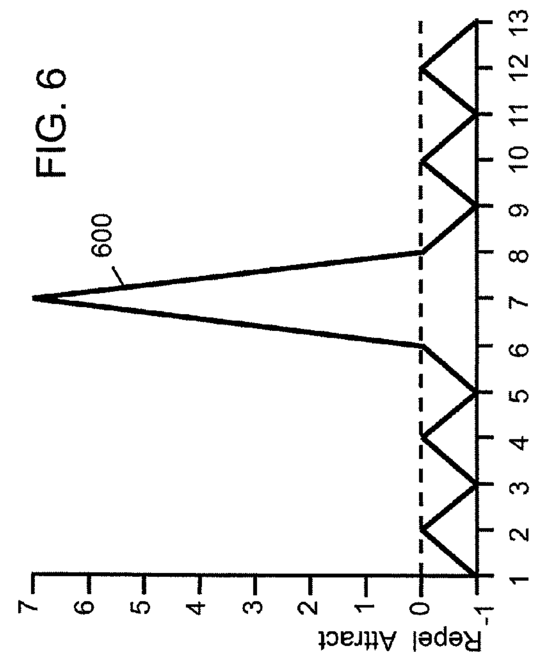
FIG. 6 depicts the binary autocorrelation function of a Barker length 7 code.

FIG. 6 depicts the binary autocorrelation function 600 of the Barker length 7 code, where the values at each alignment position 1 through 13 correspond to the spatial force values calculated for the thirteen alignment positions shown in FIGS. 5B through 5O (and in FIG. 5P). As such, since the magnets making up the magnetic field emission structures 502*a*, 502*b* have the same magnetic field strengths, FIG. 6 also depicts the spatial force function of the two magnetic field emission structures of FIGS. 5B-5O and 5P. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures will be complementary to (i.e., mirror images of) each other. This complementary autocorrelation relationship can be seen in FIG. 5*b* where the bottom face of the first magnetic field emission structure 502*b* having the pattern 'S S S N N S N' is shown interacting with the top face of the second magnetic field emission structure 502*a* having the pattern 'N N N S S N S', which is the mirror image (pattern) of the bottom face of the first magnetic field emission structure 502*b*.

The attraction functions of FIG. 6 and others in this disclosure are idealized, but illustrate the main principle and primary performance. The curves show the performance assuming equal magnet size, shape, and strength and equal distance between corresponding magnets. For simplicity, the plots only show discrete integer positions and interpolate linearly. Actual force values may vary from the graph due to various factors such as diagonal coupling of adjacent magnets, magnet shape, spacing between magnets, properties of magnetic materials, etc. The curves also assume equal attract and repel forces for equal distances. Such forces may vary considerably and may not be equal depending on magnet material and field strengths. High coercive force materials typically perform well in this regard.

Figure 7P:
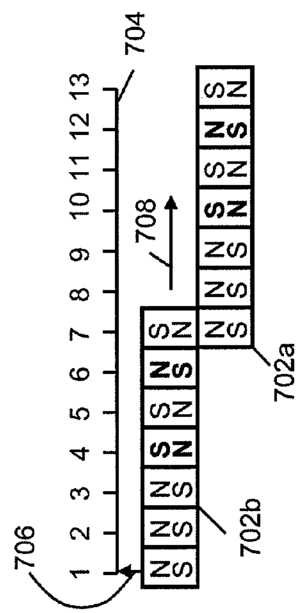
FIG. 7P provides an alternative method of depicting exemplary alignments of the complementary magnetic field structures of FIGS. 7B-7O.
Figures 7A, 7B, 7C, 7D, 7E, 7F, 7G, 7H, 7I, 7J, 7K, 7L, 7M, 7N, 7O:
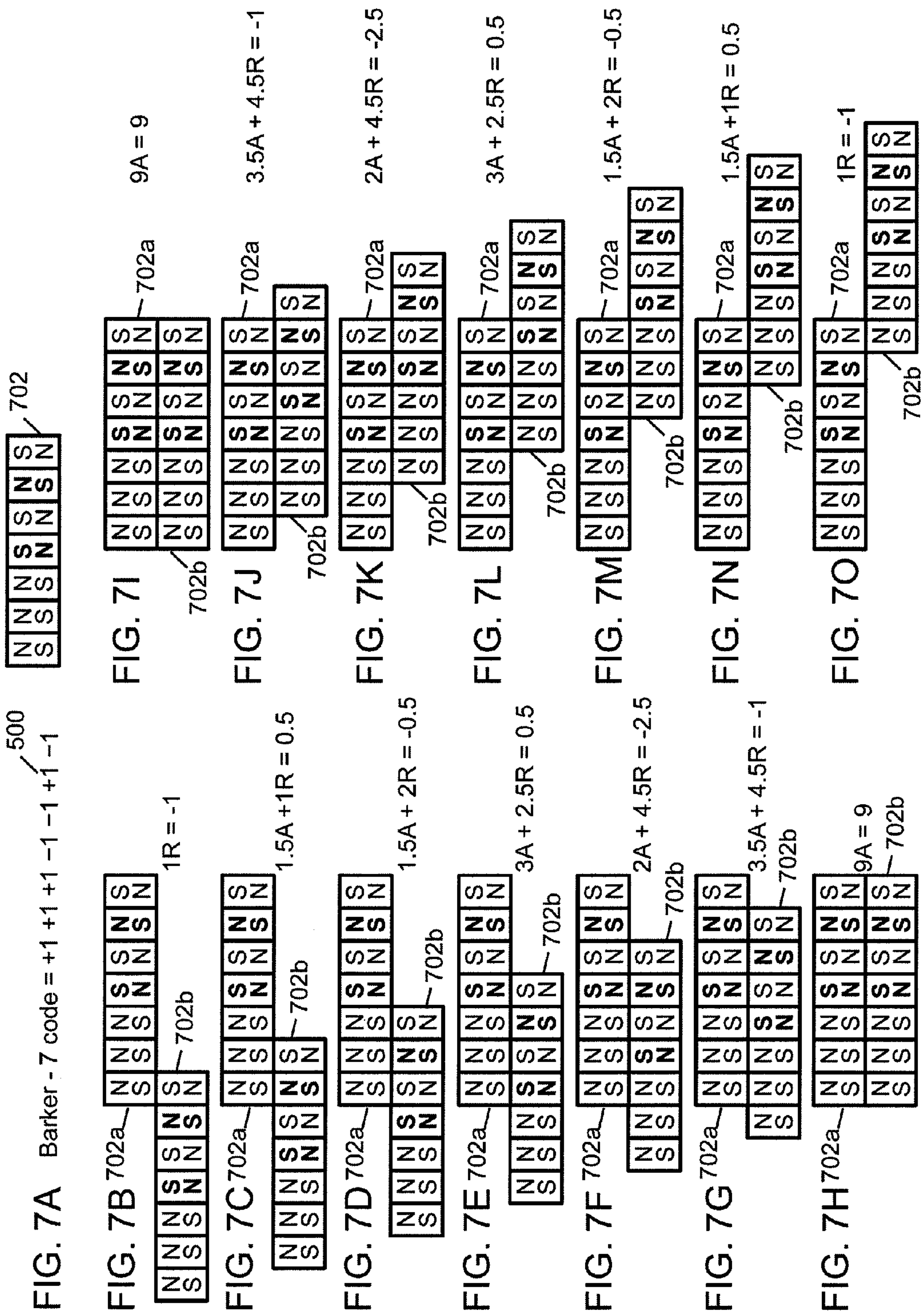
FIG. 7A depicts a Barker length 7 code used to determine polarities and positions of magnets making up a first magnetic field emission structure where two of the magnets have different field strengths.
FIGS. 7B-7O depict exemplary alignments of complementary magnetic field structures.

FIG. 7A depicts a Barker length 7 code 500 used to determine polarities and positions of magnets making up a magnetic field emission structure 702. Each magnet has the same or substantially the same magnetic field strength (or amplitude), which for the sake of this example is provided a unit of 1 (A=−R, A=1, R=−1), with the exception of two magnets indicated with bolded N and S that have twice the magnetic strength as the other magnets. As such, a bolded magnet and non-bolded magnet represent 1.5 times the strength as two non-bolded magnets and two bolded magnets represent twice the strength of two non-bolded magnets.

FIGS. 7B through 7O depict different alignments of two complementary magnetic field structures like that of FIG. 7A. Referring to FIGS. 7B through 7O, a first magnetic field structure 702*a* is held stationary. A second magnetic field emission structure 702*b* that is identical to the first magnetic field emission structure 702*a* is shown in 13 different alignments relative to the first magnetic field emission structure 702*a* in FIGS. 7B through 7O. For each relative alignment, the number of magnet pairs that repel plus the number of magnet pairs that attract is calculated, where each alignment has a spatial force in accordance with a spatial force function based upon the correlation function and the magnetic field strengths of the magnets. With the specific Barker code used, the spatial force varies from −2.5 to 9, where the peak occurs when the two magnetic field emission structures are aligned such that their respective codes are aligned. The off peak spatial force, referred to as the side lobe force, varies from 0.5 to −2.5. As such, the spatial force function causes the structures to have minor repel and attract forces until about two-thirds aligned when there is a fairly strong repel force that weakens just before they are aligned. When the structures are substantially aligned their codes align and they strongly attract as if the magnets in the structures were not coded.

FIG. 7P depicts the sliding action shown in FIGS. 7B through 7O in a single diagram. In FIG. 7P, a first magnet structure 702*a* is stationary while a second magnet structure 702*b* is moved across the top of the first magnet structure 702*a* in a direction 708 according to a scale 704. The second magnet structure 702*b* is shown at position 1 according to an indicating pointer 706, which moves with the left magnet of the second structure 702*b*. As the second magnet structure 702*b* is moved from left to right, the total attraction and repelling forces are determined and plotted in the graph of FIG. 8.

Figure 8:
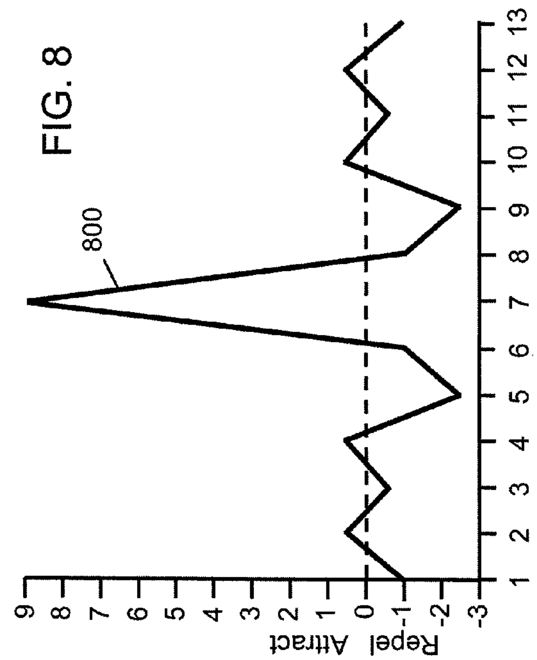
FIG. 8 depicts an exemplary spatial force function of the two magnetic field emission structures of FIGS. 7B-7O and FIG. 7P.

FIG. 8 depicts an exemplary spatial force function 800 of the two magnetic field emission structures of FIGS. 7B through 7O (and FIG. 7P).

The examples provided thus far have used the Barker 7 code to illustrate the principles of the invention. Barker codes have been found to exist in lengths up to 13. Table 1 shows Barker codes up to length 13. Additional Barker codes may be generated by cyclic shifts (register rotations) or negative polarity (multiply by −1) transformations of the codes of Table 1. The technical literature includes Barker-like codes of even greater length. Barker codes offer a peak force equal to the length and a maximum misaligned force of 1 or −1. Thus, the ratio of peak to maximum misaligned force is length/1 or −length/1.

TABLE 1

| Barker Codes | | |
|---|---|---|
| Length | Codes | |
| 2 | +1 −1 | +1 +1 |
| 3 | +1 +1 −1 | |
| 4 | +1 −1 +1 +1 | +1 −1 −1 −1 |
| 5 | +1 +1 +1 −1 +1 | |
| 7 | +1 +1 +1 −1 −1 +1 −1 | |
| 11 | +1 +1 +1 −1 −1 −1 +1 −1 −1 +1 −1 | |
| 13 | +1 +1 +1 +1 +1 −1 −1 +1 +1 −1 +1 −1 +1 | |

Numerous other codes are known in the literature for low autocorrelation when misaligned and may be used for magnet structure definition as illustrated with the Barker 7 code. Such codes include, but are not limited to maximal length PN sequences, Kasami codes, Golomb ruler codes and others. Codes with low non-aligned autocorrelation offer the precision lock at the alignment point as shown in FIG. 6.

Figures 9A, 9B, 9C, 9D, 9E, 9F, 9G, 9H, 9I, 9J, 9K, 9L, 9M, 9N, 9O:
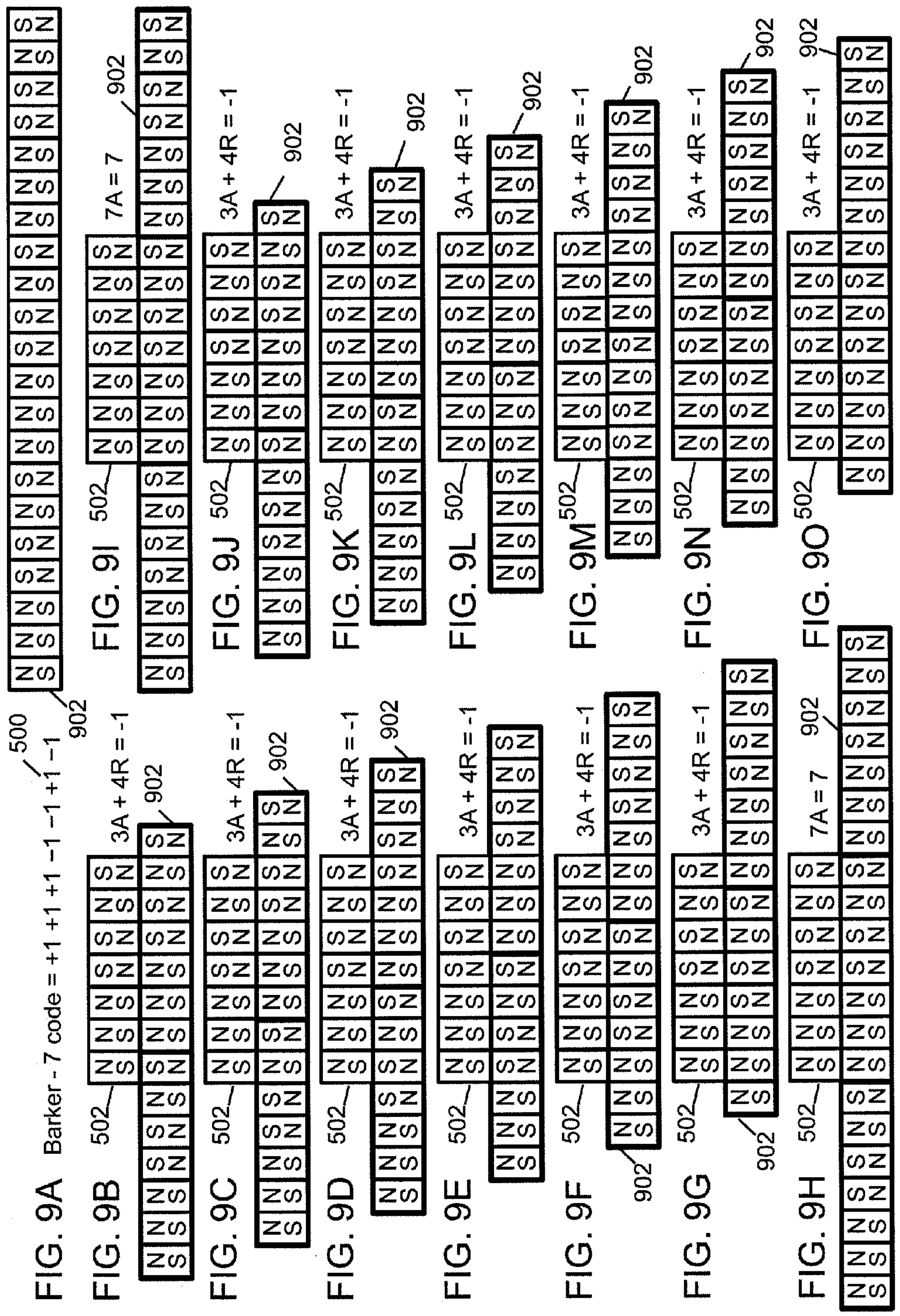
FIG. 9A depicts exemplary code wrapping of a Barker length 7 code that is used to determine polarities and positions of magnets making up a first magnetic field emission structure.
FIGS. 9B-9O depict exemplary alignments of complementary magnetic field structures.

Pseudo Noise (PN) and noise sequences also offer codes with low non-aligned autocorrelation. Most generally a noise sequence or pseudo-noise sequence is a sequence of 1 and −1 values that is generated by a true random process, such as a noise diode or other natural source, or is numerically generated in a deterministic (non random) process that has statistical properties much like natural random processes. Thus, many true random and pseudo random processes may generate suitable codes for use with the present invention. Random processes however will likely have random variations in the sidelobe amplitude, i.e., non-aligned force as a function of distance from alignment; whereas, Barker codes and others may have a constant amplitude when used as cyclic codes (FIG. 9A). One such family is maximal length PN codes generated by linear feedback shift registers (LFSR). LFSR codes offer a family of very long codes with a constant low level non-aligned cyclic autocorrelation. The codes come in lengths of powers of two minus one and several different codes of the same length are generally available for the longer lengths. LFSR codes offer codes in much longer lengths than are available with Barker codes. Table 2 summarizes the properties for a few of the shorter lengths. Extensive data on LFSR codes is available in the literature.

TABLE 2

| LFSR Sequences | | | |
|---|---|---|---|
| Number of Stages | Length of sequences | Number of Sequences | Example feedback |
| 2 | 3 | 1 | 1, 2 |
| 3 | 7 | 2 | 2, 3 |
| 4 | 15 | 2 | 3, 4 |
| 5 | 31 | 6 | 3, 5 |
| 6 | 63 | 6 | 5, 6 |
| 7 | 127 | 18 | 6, 7 |
| 8 | 255 | 16 | 4, 5, 6, 8 |
| 9 | 511 | 48 | 5, 9 |
| 10 | 1023 | 60 | 7, 10 |

The literature for LFSR sequences and related sequences such as Gold and Kasami often uses a 0, 1 notation and related mathematics. The two states 0, 1 may be mapped to the two states −1, +1 for use with magnet polarities. An exemplary LFSR sequence for a length 4 shift register starting at 1,1,1,1 results in the feedback sequence: 000100110101111, which may be mapped to: −1, −1, −1, +1, −1, −1, +1, +1, −1, +1, −1, +1, +1, +1, +1. Alternatively, the opposite polarities may be used or a cyclic shift may be used.

Code families also exist that offer a set of codes that may act as a unique identifier or key, requiring a matching part to operate the device. Kasami codes and other codes can achieve keyed operation by offering a set of codes with low cross correlation in addition to low autocorrelation. Low cross correlation for any non-aligned offset means that one code of the set will not match and thus not lock with a structure built according to the another code in the set. For example, two structures A and A*, based on code A and the complementary code A*, will slide and lock at the precision lock point. Two structures B and B* from the set of low cross correlation codes will also slide and lock together at the precision alignment point. However, code A will slide with low attraction at any point but will not lock with code B* because of the low cross correlation properties of the code. Thus, the code can act like a key that will only achieve lock when matched with a like (complementary) pattern.

Kasami sequences are binary sequences of length $2^N$ where N is an even integer. Kasami sequences have low cross-correlation values approaching the Welch lower bound for all time shifts and may be used as cyclic codes. There are two classes of Kasami sequences—the small set and the large set.

The process of generating a Kasami sequence starts by generating a maximum length sequence $a_n$, where n=1 . . . $2^N-1$. Maximum length sequences are cyclic sequences so $a_n$ is repeated periodically for n larger than $2^N-1$. Next, we generate another sequence $b_n$ by generating a decimated sequence of $a_n$ at a period of $q=2^{N/2}+1$, i.e., by taking every $q^{th}$ bit of $a_n$. We generate $b_n$ by repeating the decimated sequence q times to form a sequence of length $2^N-1$. We then cyclically shift $b_n$ and add to $a_n$ for the remaining $2^N-2$ non repeatable shifts. The Kasami set of codes comprises $a_n$, $a_n+b_n$, and the cyclically shifted $a_n$+(shift $b_n$) sequences. This set has $2^{N/2}$ different sequences. A first coded structure may be based on any one of the different sequences and a complementary structure may be the equal polarity or negative polarity of the first coded structure, depending on whether repelling or attracting force is desired. Neither the first coded structure nor the complementary structure will find strong attraction with any of the other codes in the $2^{N/2}$ different sequences. An exemplary 15 length Kasami small set of four sequences is given in Table 3 below. The 0, 1 notation may be transformed to −1, +1 as described above. Cyclic shifts and opposite polarity codes may be used as well.

TABLE 3

| Exemplary Kasami small set sequences. Sequence | | | | | | | | | | | | | | | |
|---|---|---|---|---|---|---|---|---|---|---|---|---|---|---|---|
| K1 | 0 | 0 | 0 | 1 | 0 | 0 | 1 | 1 | 0 | 1 | 0 | 1 | 1 | 1 | 1 |
| K2 | 0 | 1 | 1 | 1 | 1 | 1 | 1 | 0 | 1 | 1 | 1 | 0 | 1 | 0 | 0 |
| K3 | 1 | 1 | 0 | 0 | 1 | 0 | 0 | 0 | 0 | 0 | 1 | 1 | 0 | 0 | 1 |
| K4 | 1 | 0 | 1 | 0 | 0 | 1 | 0 | 1 | 1 | 0 | 0 | 0 | 0 | 0 | 0 |

Other codes, such as Walsh codes and Hadamard codes, offer sets of codes with perfectly zero cross correlation across the set of codes when aligned, but possibly high correlation performance when misaligned. Such codes can provide the unique key function when combined with mechanical constraints that insure alignment. Exemplary Walsh codes are as follows:

Denote W(k, n) as Walsh code k in n-length Walsh matrix. It means the k-th row of Hadamard matrix H(m), where n=2m, m an integer. Here k could be 0, 1, . . . , n−1. A few Walsh codes are shown in Table 4.

TABLE 4

| Walsh Codes | |
|---|---|
| Walsh Code | Code |
| W(0,1) | 1 |
| W(0,2) | 1, 1 |
| W(1,2) | 1, −1 |
| W(0,4) | 1, 1, 1, 1 |
| W(1,4) | 1, −1, 1, −1 |
| W(2,4) | 1, 1, −1, −1 |
| W(3,4) | 1, −1, −1, 1 |
| W(0,8) | 1, 1, 1, 1, 1, 1, 1, 1 |
| W(1,8) | 1, −1, 1, −1, 1, −1, 1, −1 |
| W(2,8) | 1, 1, −1, −1, 1, 1, −1, −1 |
| W(3,8) | 1, −1, −1, 1, 1, −1, −1, 1 |
| W(4,8) | 1, 1, 1, 1, −1, −1, −1, −1 |
| W(5,8) | 1, −1, 1, −1, −1, 1, −1, 1 |
| W(6,8) | 1, 1, −1, −1, −1, −1, 1, 1 |
| W(7,8) | 1, −1, −1, 1, −1, 1, 1, −1 |

In use, Walsh codes of the same length would be used as a set of codes that have zero interaction with one another, i.e., Walsh code W(0,8) will not attract or repel any of the other codes of length 8 when aligned. Alignment should be assured by mechanical constraints because off alignment attraction can be great.

Codes may be employed as cyclic codes or non-cyclic codes. Cyclic codes are codes that may repetitively follow another code, typically immediately following with the next step after the end of the last code. Such codes may also be referred to as wrapping or wraparound codes. Non-cyclic codes are typically used singly or possibly used repetitively but in isolation from adjacent codes. The Barker 7 code example of FIG. 5A is a non-cyclic use of the code; whereas the example of FIG. 9A is a cyclic use of the same code.

FIG. 9A depicts an exemplary cyclic code comprising three modulos of a Barker length 7 code. Referring to FIG. 9A, a Barker length 7 code 500 is repeated three times to produce a magnetic field emission structure 902.

FIGS. 9B through 9O depict relative alignments of a first magnetic field emission structure 502 having polarities and magnet positions defined by a Barker length 7 code 500 and a second magnetic field emission structure 902 that corresponds to three repeating code modulos of the code 500 used to define the first magnetic field emission structure 500. Each magnet has the same or substantially the same magnetic field strength (or amplitude), which for the sake of this example will be provided a unit of 1 (A=−R, A=1, R=−1). Shown in FIGS. 9A through 9O are 13 different alignments of the first magnetic field emission structure 502 to the second magnetic field emission structure 902 where all the magnets of the first magnetic structure 502 are always in contact with the repeating second magnetic field emission structure 902. For each relative alignment, the number of magnet pairs that repel plus the number of magnet pairs that attract is calculated, where each alignment has a spatial force in accordance with a spatial force function based upon the correlation function and the magnetic field strengths of the magnets. With the specific Barker code used, the spatial force varies from −1 to 7, where the peak occurs when the two magnetic field emission structures are aligned such that their respective codes are aligned. The off peak spatial force, referred to as side lobe force, is −1. As such, the spatial force function causes the structures to generally repel each other unless they are substantially aligned when they will attract as if the magnets in the structures were not coded.

Figure 9P:
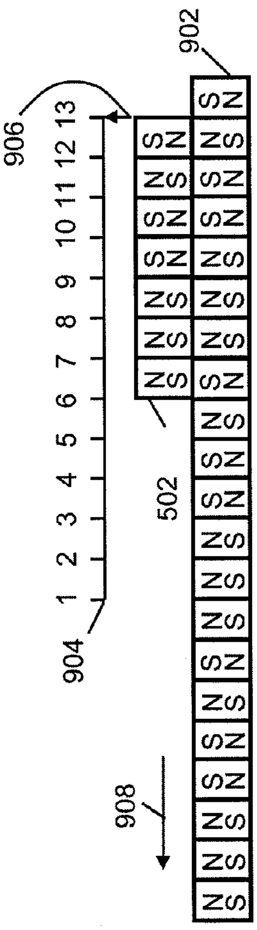
FIG. 9P provides an alternative method of depicting exemplary alignments of the complementary magnetic field structures of FIGS. 9B-9O.

FIG. 9P depicts the sliding action shown in FIGS. 9B through 9O in a single diagram. In FIG. 9P, a first magnet structure 902 is stationary while a second magnet structure 502 is moved across the top of the first magnet structure 902 in a direction 908 according to a scale 904. The second magnet structure 502 is shown at a position 13 according to an indicating pointer 906, which moves with the right magnet of the second structure 502. As the second magnet structure 502 is moved from right to left, the total attraction and repelling forces are determined and plotted in the graph of FIG. 10.

Figure 10:
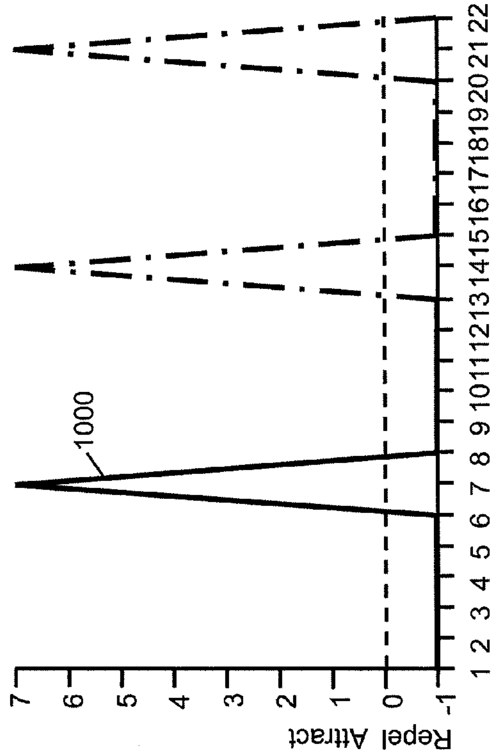
FIG. 10 depicts an exemplary spatial force function of the two magnetic field emission structures of FIGS. 9B-9O and FIG. 9P.

FIG. 10 depicts an exemplary spatial force function 1000 of the two magnetic field emission structures of FIGS. 9B through 9O (and FIG. 9P) where the code that defines the second magnetic field emission structure 902 repeats. As such, as the code modulo repeats there is a peak spatial force that repeats every seven alignment shifts. The dash-dot lines of FIG. 10 depict additional peak spatial forces that occur when the first magnetic field structure 502 is moved relative to additional code modulos, for example, two additional code modulos. Note that the total force shows a peak of 7 each time the sliding magnet structure 502 aligns with the underlying Barker 7 pattern in a similar manner as previously described for FIG. 6 except the misaligned positions (positions 1-6 for example) show a constant −1 indicating a repelling force of one magnet pair. In contrast, the force in FIG. 6 alternates between 0 and −1 in the misaligned region, where the alternating values are the result of their being relative positions of non-cyclic structures where magnets do not have a corresponding magnet with which to pair up. In magnet structures, cyclic codes may be placed in repeating patterns to form longer patterns or may cycle back to the beginning of the code as in a circle or racetrack pattern. As such, cyclic codes are useful on cylindrically or spherically shaped objects.

Figures 11B, 11C, 11D, 11E, 11F, 11G, 11H:
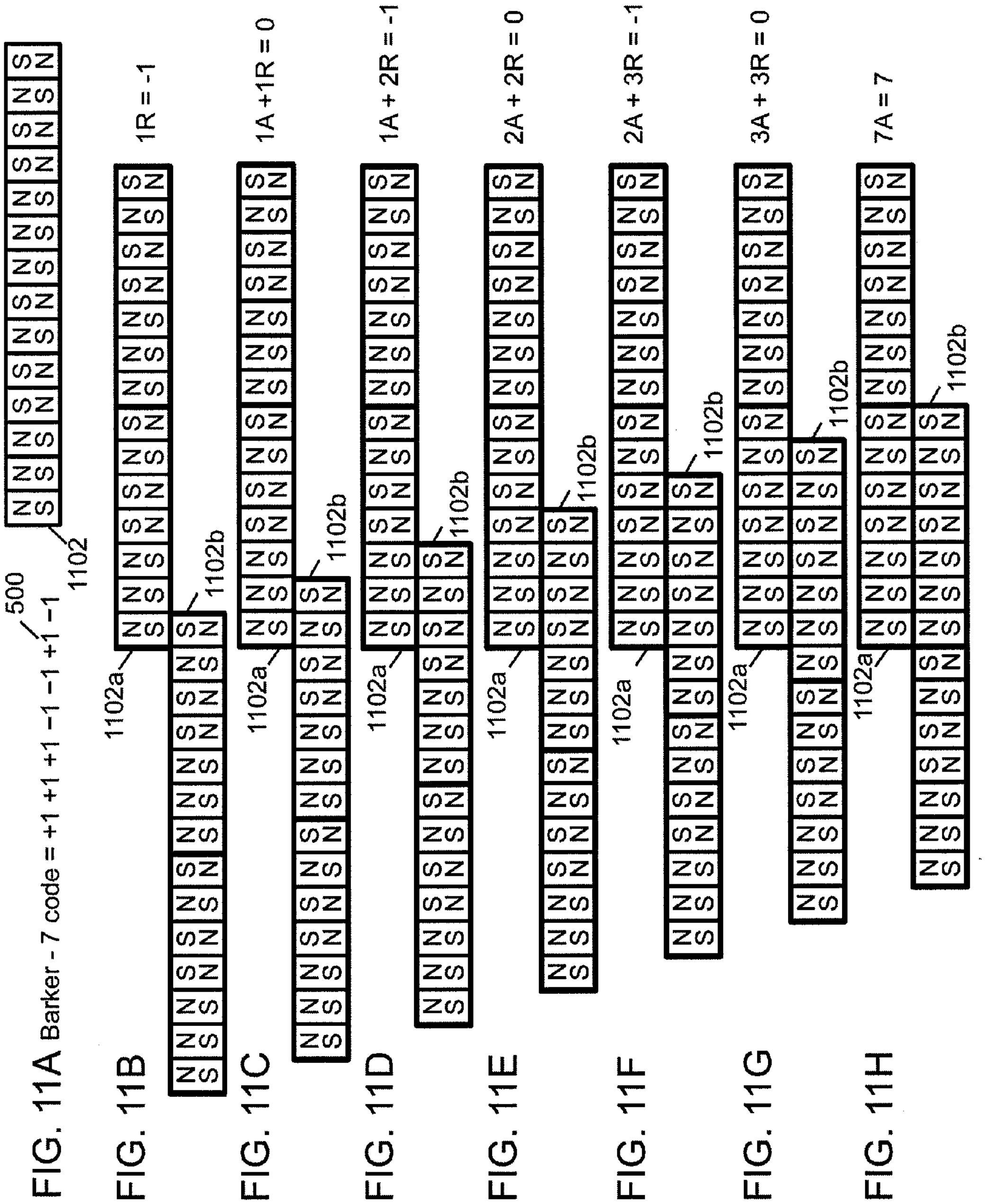
Figure 11I:
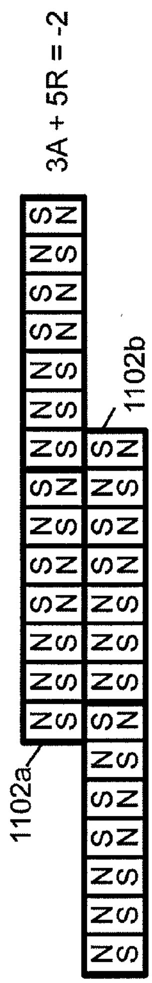
Figure 11J:
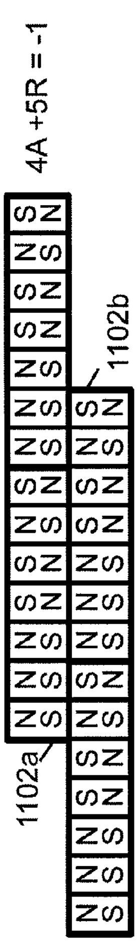
Figure 11K:
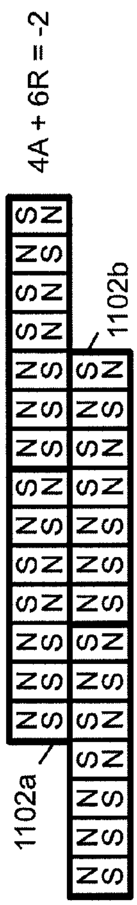
Figure 11L:
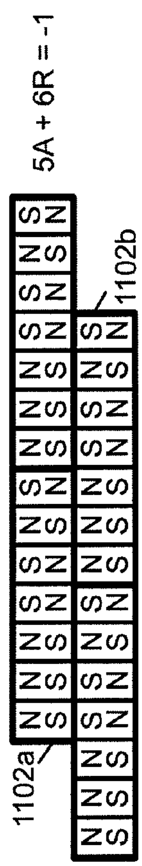
Figure 11M:
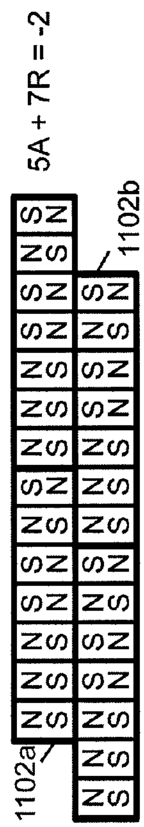
Figure 11N:
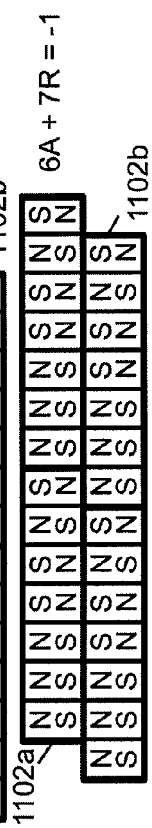
Figure 11O:
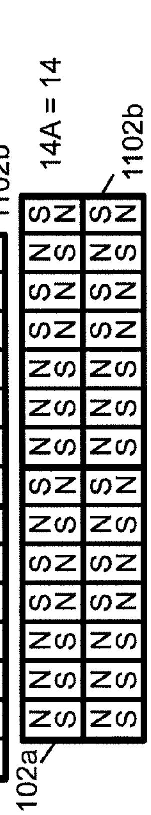
Figures 11P, 11Q, 11R, 11S, 11T, 11U, 11V:
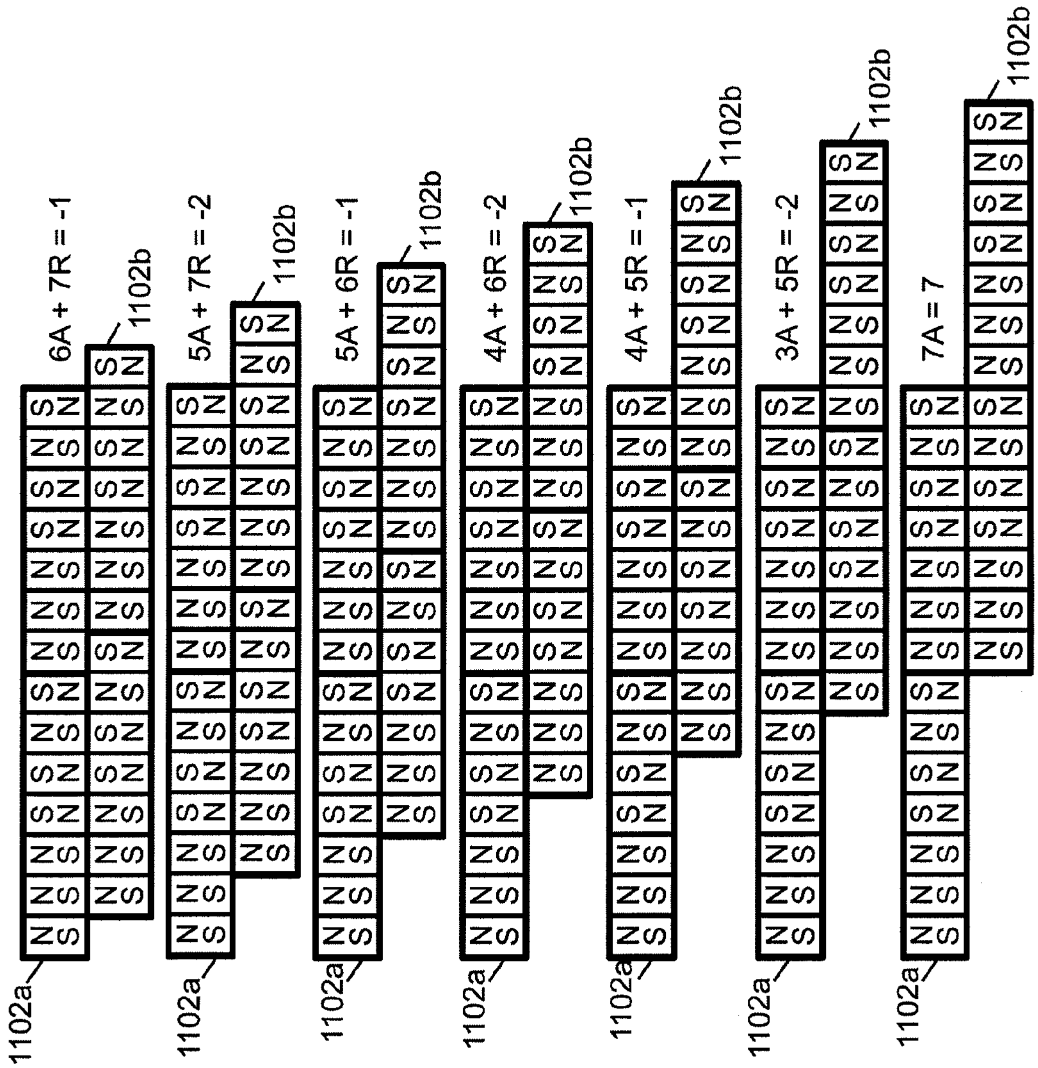
Figures 11A, 11W, 11X, 11Y, 11Z:
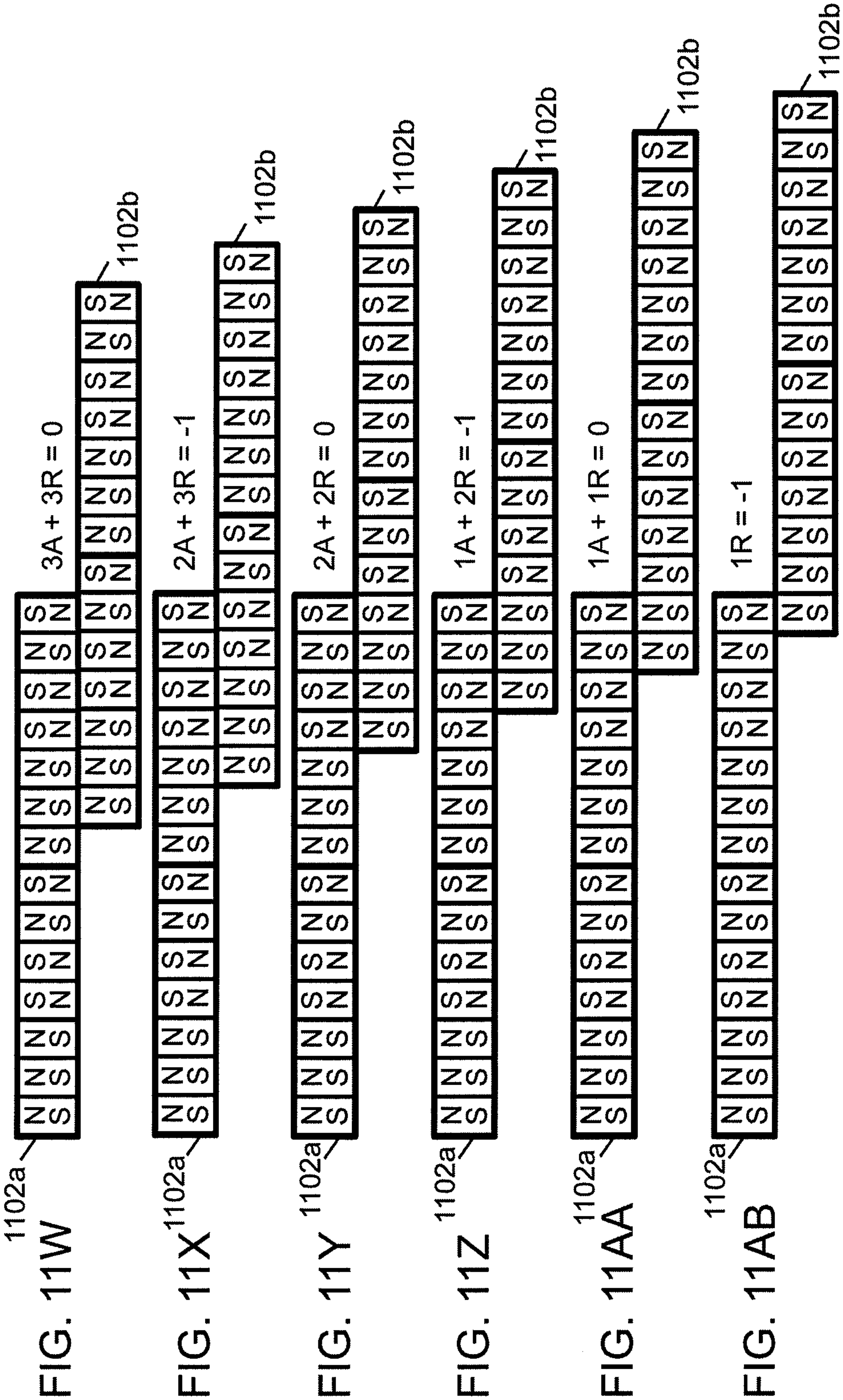
FIG. 11A depict a magnetic field structure that corresponds to two modulos of the Barker length 7 code end-to-end.
Figure 11A:
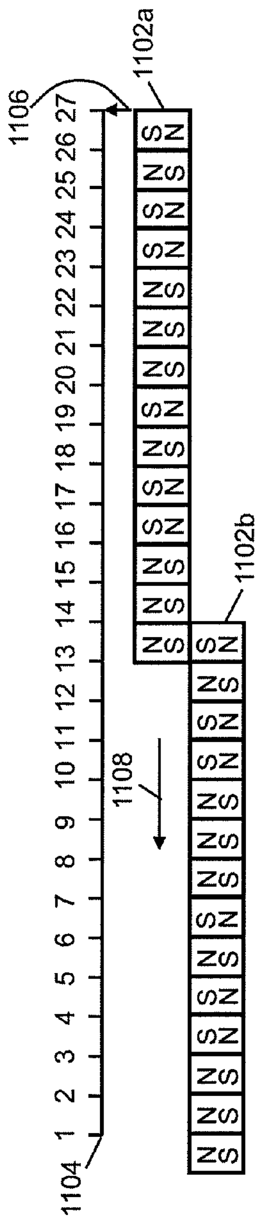

FIG. 11A depicts an exemplary cyclic code comprising two repeating code modulos of a Barker length 7 code. Referring to FIG. 11A, a Barker length 7 code is repeated two times to produce a magnetic field emission structure 1102.

FIGS. 11B through 11AB depict 27 different alignments of two magnetic field emission structures where a Barker code of length 7 is used to determine the polarities and the positions of magnets making up a first magnetic field emission structure 1102*a*, which corresponds to two modulos of the Barker length 7 code 500 end-to-end. Each magnet has the same or substantially the same magnetic field strength (or amplitude), which for the sake of this example is provided a unit of 1 (A=−R, A=1, R=−1). A second magnetic field emission structure 1102*b* that is identical to the first magnetic field emission structure 1102*a* is shown in 27 different alignments relative to the first magnetic field emission structure 1102*a*. For each relative alignment, the number of magnet pairs that repel plus the number of magnet pairs that attract is calculated, where each alignment has a spatial force in accordance with a spatial force function based upon the correlation function and magnetic field strengths of the magnets. With the specific Barker code used, the spatial force varies from −2 to 14, where the peak occurs when the two magnetic field emission structures are aligned such that their respective codes are aligned. Two secondary peaks occur when the structures are half aligned such that one of the successive codes of one structure aligns with one of the codes of the second structure. The off peak spatial force, referred to as the side lobe force, varies from −1 to −2 between the peak and secondary peaks and between 0 and −1 outside the secondary peaks.

FIG. 11AC depicts the sliding action shown in FIGS. 11B through 11AB in a single diagram. In FIG. 11AC, a first magnet structure 1102*a* is moved across the top of a second magnet structure 1102*b* in a direction 1108 according to a scale 1104. The first magnet structure 1102*a* is shown at position 27 according to an indicating pointer 1106, which moves with the right magnet of the first magnet structure 1102*a*. As the first magnet structure 1102*a* is moved from right to left, the total attraction and repelling forces are determined and plotted in the graph of FIG. 12.

Figure 12:
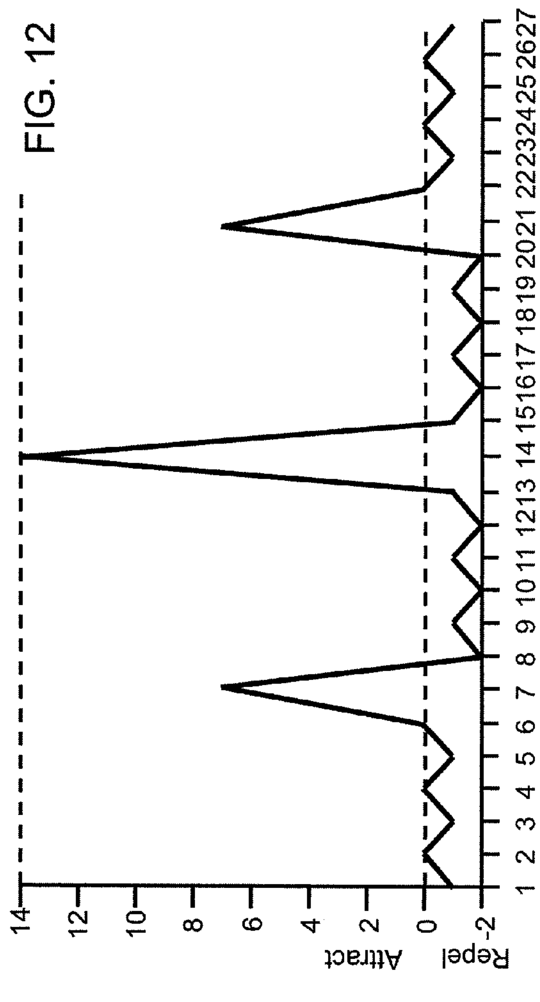
FIG. 12 depicts an exemplary spatial force function of the two magnetic field emission structures of FIGS. 11B-11AB and FIG. 11AC.

FIG. 12 depicts an exemplary spatial force function of the two magnetic field emission structures of FIGS. 11B through 11AB. Based on FIG. 6 and FIG. 10, FIG. 12 corresponds to the spatial functions in FIG. 6 and FIG. 10 added together.

The magnetic field emission structures disclosed so far are shown and described with respect to relative movement in a single dimension, i.e., along the interface boundary in the direction of the code. Some applications utilize such magnet structures by mechanically constraining the relative motion to the single degree of freedom being along the interface boundary in the direction of the code. Other applications allow movement perpendicular to the direction of the code along the interface boundary, or both along and perpendicular to the direction of the code, offering two degrees of freedom. Still other applications may allow rotation and may be mechanically constrained to only rotate around a specified axis, thus having a single degree of freedom (with respect to movement along the interface boundary.) Other applications may allow two lateral degrees of freedom with rotation adding a third degree of freedom. Most applications also operate in the spacing dimension to attract or repel, hold or release. The spacing dimension is usually not a dimension of interest with respect to the code; however, some applications may pay particular attention to the spacing dimension as another degree of freedom, potentially adding tilt rotations for six degrees of freedom. For applications allowing two lateral degrees of freedom, special codes may be used that place multiple magnets in two dimensions along the interface boundary.

Figure 13A:
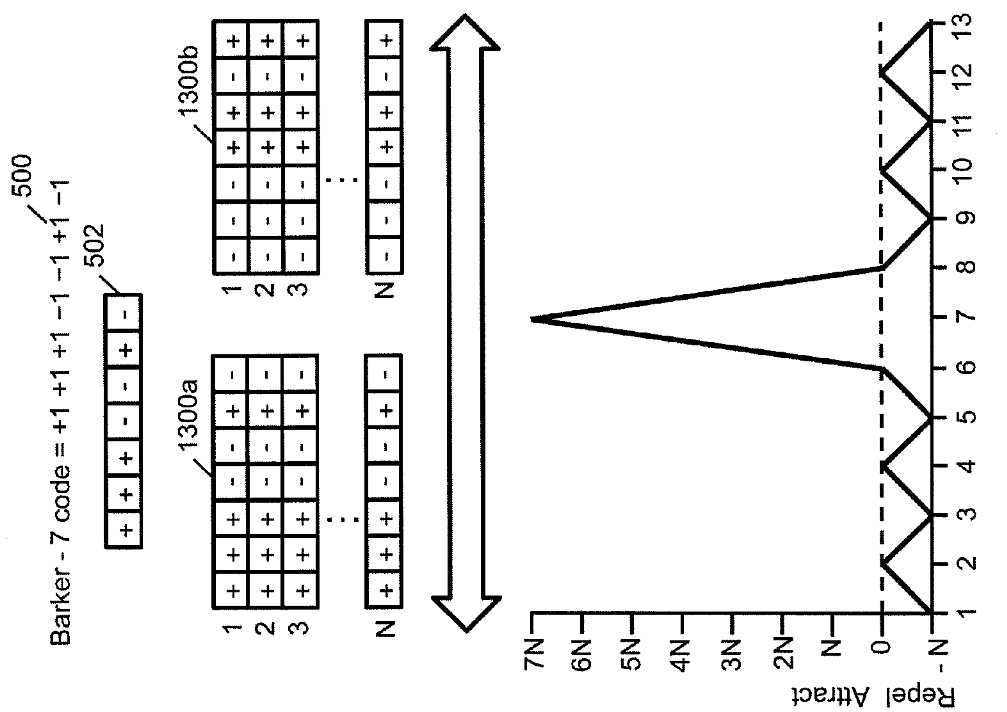
FIG. 13A depicts an exemplary spatial force function of magnetic field emission structures produced by repeating a one-dimensional code across a second dimension N times where movement is across the code.
Figure 13B:
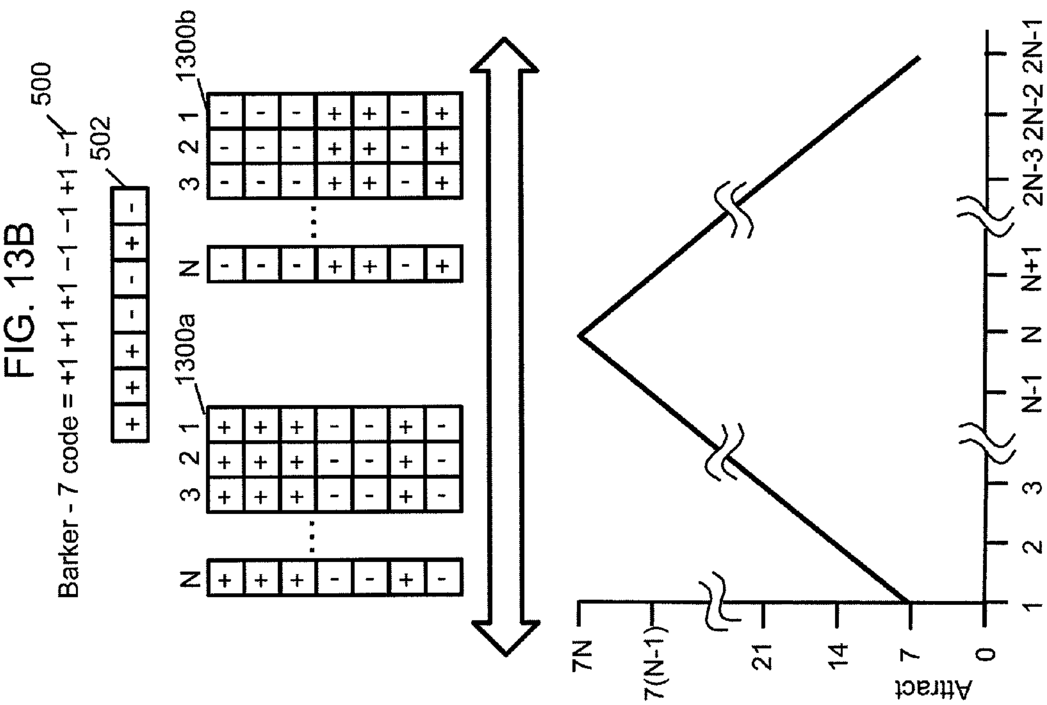
FIG. 13B depicts an exemplary spatial force function of magnetic field emission structures produced by repeating a one-dimensional code across a second dimension N times where movement maintains alignment with up to all N coded rows of the structure and down to one.

FIG. 13A and FIG. 13B illustrate the spatial force functions of magnetic field emission structures produced by repeating a one-dimensional code across a second dimension N times (i.e., in rows each having same coding) where in FIG. 13A the movement is across the code (i.e., as in FIGS. 5B through 5O) or in FIG. 13B the movement maintains alignment with up to all N coded rows of the structure and down to one.

Figure 14A:
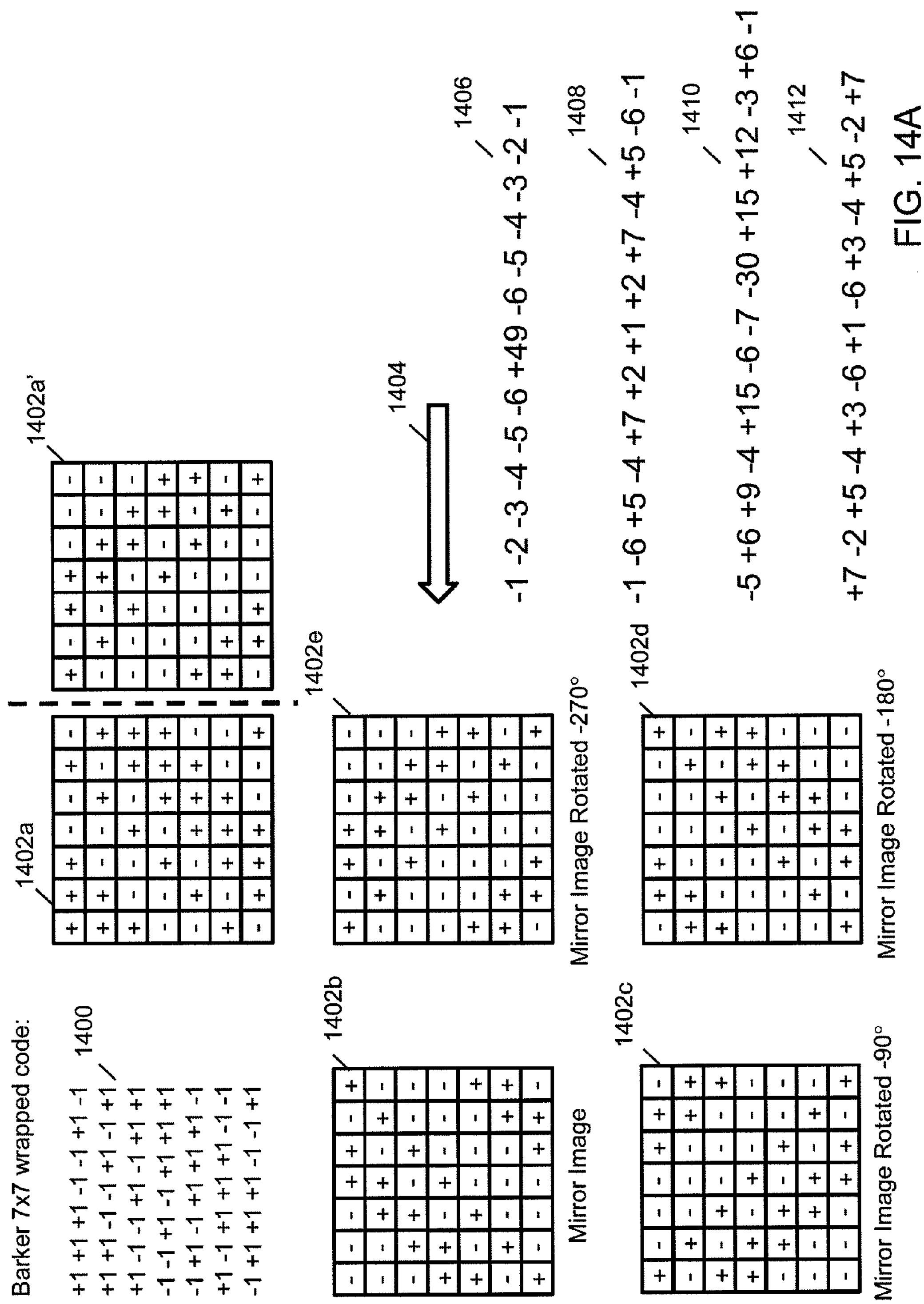
FIG. 14A depicts a two dimensional Barker-like code and a corresponding two-dimensional magnetic field emission structure.

FIG. 14A depicts a two dimensional Barker-like code 1400 and a corresponding two-dimensional magnetic field emission structure 1402*a*. Referring to FIG. 14A, a two dimensional Barker-like code 1400 is created by copying each row to a new row below, shifting the code in the new row to the left by one, and then wrapping the remainder to the right side. When applied to a two-dimensional field emission structure 1402*a* interesting rotation-dependent correlation characteristics are produced. Shown in FIG. 14A is a two-dimensional mirror image field emission structure 1402*b*, which is also shown rotated −90°, −180°, and −270° as 1402*c*-1402*e*, respectively. Note that with the two-dimensional field emission structure 1402*a*, a top down view of the top of the structure is depicted such that the poles of each magnet facing up are shown, whereas with the two-dimensional mirror image field emission structure 1402*b*, 1402*c*, 1402*d*, 1402*e* a top down view of the bottom of the structure is depicted such that the poles of each magnet facing down are shown. As such, each magnet of the two-dimensional structure 1402*a* would be opposite a corresponding magnet of the mirror image structure 1402*b*, 1402*c*, 1402*d*, 1402*e* having opposite polarity. Also shown is a bottom view of the two-dimensional magnetic field structure 1402*a*'. One skilled in the art will recognize that the bottom view of the first structure 1402*a*' is also the mirror image of the top view of the first structure 1402*a*, where 1402*a* and 1402*a*' could be interpreted much like opposing pages of a book such that when the book closes the all the magnetic field source pairs would align to produce a peak attraction force.

Autocorrelation cross-sections were calculated for the four rotations of the mirror image field emission structure 1402*b*-1402*e* moving across the magnetic field emission structure 1402*a* in the same direction 1404. Four corresponding numeric autocorrelation cross-sections 1406, 1408, 1410, and 1412, respectively, are shown. As indicated, when the mirror image is passed across the magnetic field emission structure 1402*a* each column has a net 1R (or −1) spatial force and as additional columns overlap, the net spatial forces add up until the entire structure aligns (+49) and then the repel force decreases as less and less columns overlap. With −90° and −270° degree rotations, there is symmetry but erratic correlation behavior. With −180° degrees rotation, symmetry is lost and correlation fluctuations are dramatic. The fluctuations can be attributed to directionality characteristics of the shift left and wrap approach used to generate the structure 1402*a*, which caused upper right to lower left diagonals to be produced which when the mirror image was rotated −180°, these diagonals lined up with the rotated mirror image diagonals.

Figure 14B:
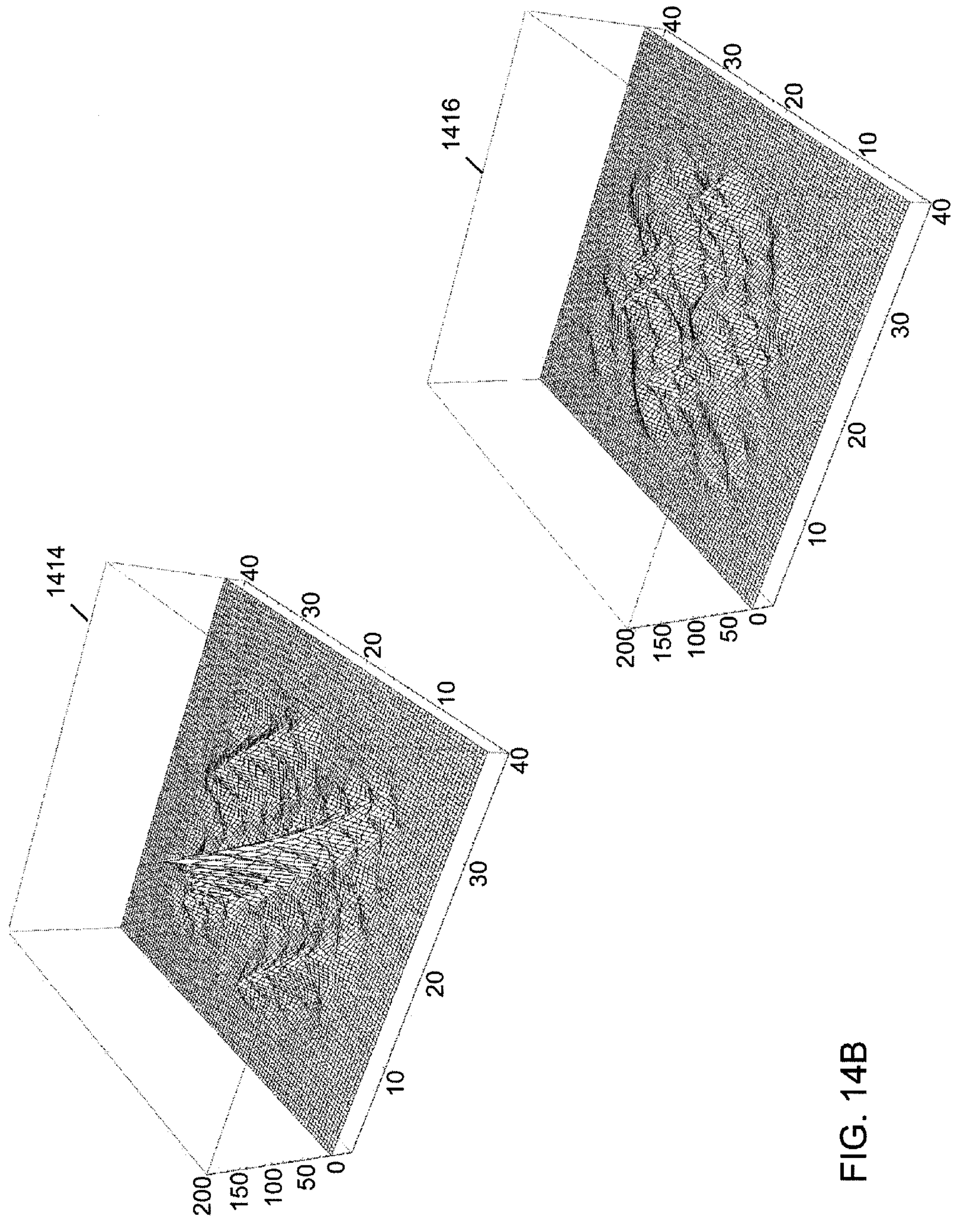
FIG. 14B depicts exemplary spatial force functions resulting from mirror image magnetic field emission structure and −90° rotated mirror image magnetic field emission structure moving across a magnetic field emission structure.

FIG. 14B depicts exemplary spatial force functions resulting from a mirror image magnetic field emission structure and a mirror image magnetic field emission structure rotated −90° moving across the magnetic field emission structure. Referring to FIG. 14B, spatial force function 1414 results from the mirror image magnetic field emission structure 1402B moving across the magnetic field emission structure 1402*a* in a direction 1404 and spatial force function 1416 results from the mirror image magnetic field emission structure rotated −90° 1402C moving across magnetic field emission structure 1402*a* in the same direction 1404. Characteristics of the spatial force function depicted in FIG. 12 may be consistent with a diagonal cross-section from 0,0 to 40,40 of spatial force function 1414 and at offsets parallel to that diagonal. Additionally, characteristics of the spatial force function depicted in FIG. 13B may be consistent with a diagonal from 40,0 to 0,40 of spatial force function 1414.

Figure 14C:
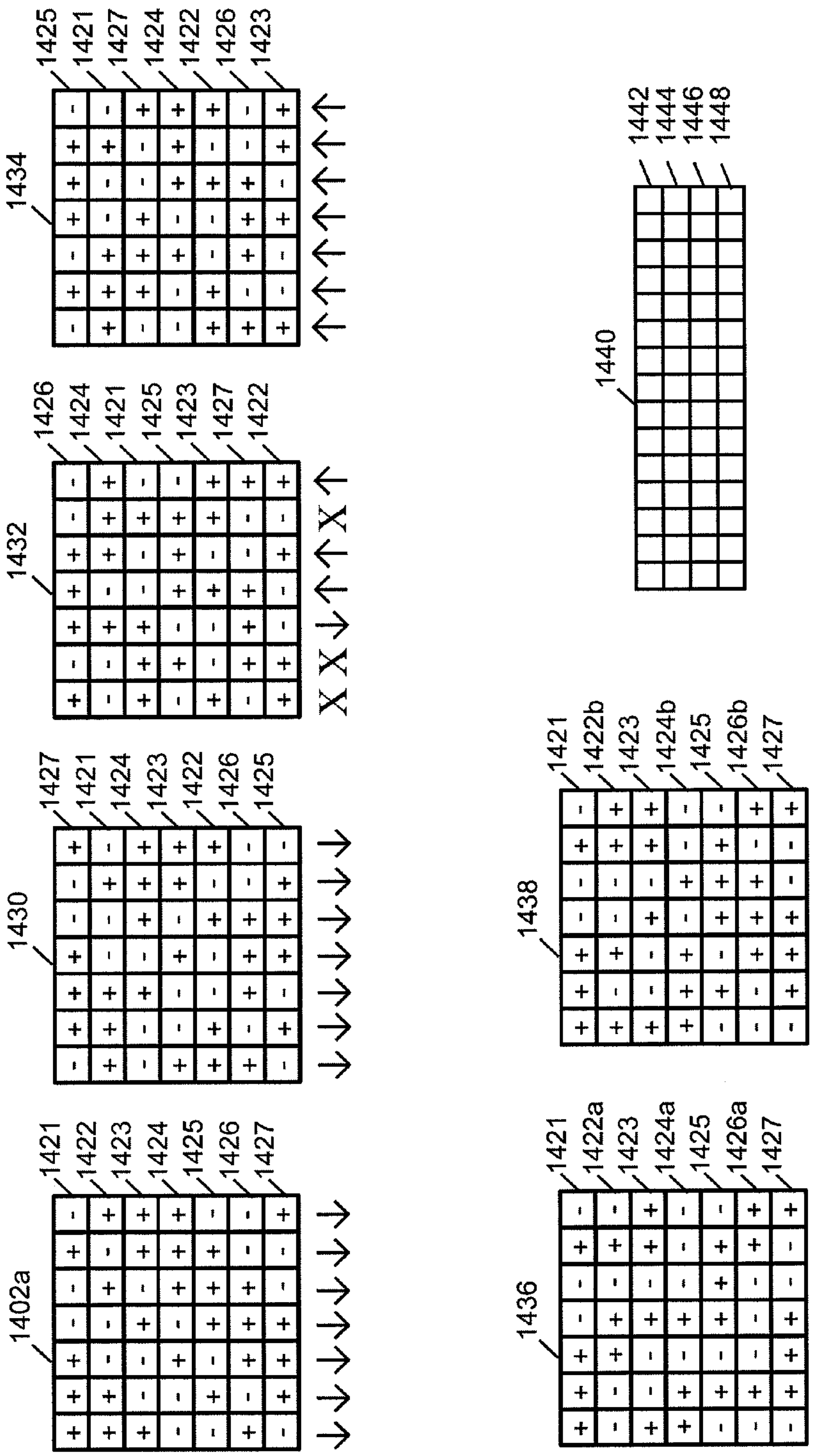
FIG. 14C depicts variations of a magnetic field emission structure where rows are reordered randomly in an attempt to affect its directionality characteristics.

FIG. 14C depicts variations of magnetic field emission structure 1402*a* where rows are reordered randomly in an attempt to affect its directionality characteristics. As shown, the rows of 1402*a* are numbered from top to bottom 1421 through 1427. A second magnetic field emission structure 1430 is produced by reordering the rows to 1427, 1421, 1424, 1423, 1422, 1426, and 1425. When viewing the seven columns produced, each follows the Barker 7 code pattern wrapping downward. A third magnetic field emission structure 1432 is produced by reordering the rows to 1426, 1424, 1421, 1425, 1423, 1427, and 1422. When viewing the seven columns produced, the first, second, and sixth columns do not follow the Barker 7 code pattern while the third column follows the Barker 7 code pattern wrapping downward while the fourth, fifth and seven columns follow the Barker 7 code pattern wrapping upward. A fourth magnetic field emission structure 1434 is produced by reordering the rows 1425, 1421, 1427, 1424, 1422, 1426, and 1423. When viewing the seven columns produced, each follows the Barker 7 code pattern wrapping upward. A fifth magnetic field emission structure 1436 is produced by reversing the polarity of three of the rows of the first magnetic field emission structure 1402*a*. Specifically, the magnets of rows 1422*a*, 1424*a* and 1426*a* are reversed in polarity from the magnets of rows 1422, 1424, and 1426, respectively. Note that the code of 1402*a* has 28 "+" magnets and 21 "−" magnets; whereas, alternative fifth magnetic field emission structure 1436 has 25 "+" magnets and 24 "–" magnets—a nearly equal number. Thus, the far field of fifth magnetic field from structure 1436 will nearly cancel to zero, which can be valuable in some applications. A sixth magnetic field emission structure 1438 is produced by reversing the direction of three of the rows. Specifically, the direction of rows 1422*b*, 1424*b* and 1426*b* are reversed from 1422, 1424, and 1426, respectively. A seventh magnetic field emission structure 1440 is produced using four codes of low mutual cross correlation, for example four rows 1442, 1444, 1446, and 1448 each having a different 15 length Kasami code. Because the rows have low cross correlation and low autocorrelation, shifts either laterally or up and down (as viewed on the page) or both will result in low magnetic force. Generally, two dimensional codes may be generated by combining multiple single dimensional codes. In particular, the single dimensional codes may be selected from sets of codes with known low mutual cross correlation. Gold codes and Kasami codes are two examples of such codes, however other code sets may also be used.

More generally, FIG. 14C illustrates that two dimensional codes may be generated from one dimensional codes by assembling successive rows of one dimensional codes and that different two dimensional codes may be generated by varying each successive row by operations including but not limited to changing the order, shifting the position, reversing the direction, and/or reversing the polarity.

Additional magnet structures having low magnetic force with a first magnet structure generated from a set of low cross correlation codes may be generated by reversing the polarity of the magnets or by using different subsets of the set of available codes. For example, rows 1442 and 1444 may form a first magnet structure and rows 1446 and 1448 may form a second magnet structure. The complementary magnet structure of the first magnet structure will have low force reaction to the second magnet structure, and conversely, the complementary magnet structure of the second magnet structure will have a low force reaction to the first magnet structure. Alternatively, if lateral or up and down movement is restricted, an additional low interaction magnet structure may be generated by shifting (rotating) the codes or changing the order of the rows. Movement may be restricted by such mechanical features as alignment pins, channels, stops, container walls or other mechanical limits.

Figure 14D:
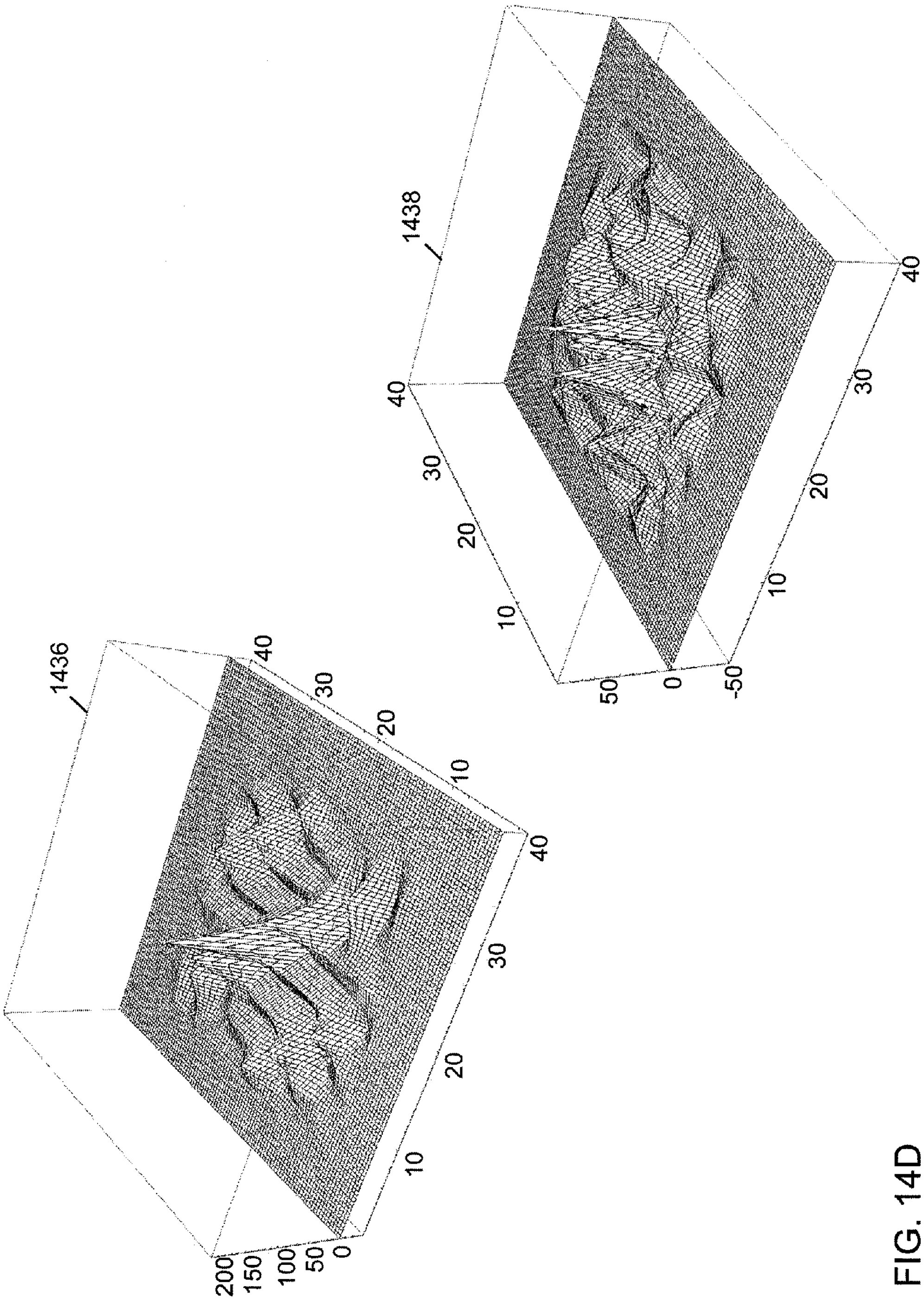
FIGS. 14D and 14E depict exemplary spatial force functions of selected magnetic field emission structures having randomly reordered rows moving across mirror image magnetic field emission structures both without rotation and as rotated −90, respectively.

FIG. 14D depicts a spatial force function 1450 resulting from the second magnetic field emission structure 1430 moving across its mirror image structure in one direction 1404 and a spatial force function 1452 resulting from the second magnetic field emission structure 1430 after being rotated −90° moving in the same direction 1404 across the mirror image of the second magnetic field emission structure 1430.

Figure 14E:
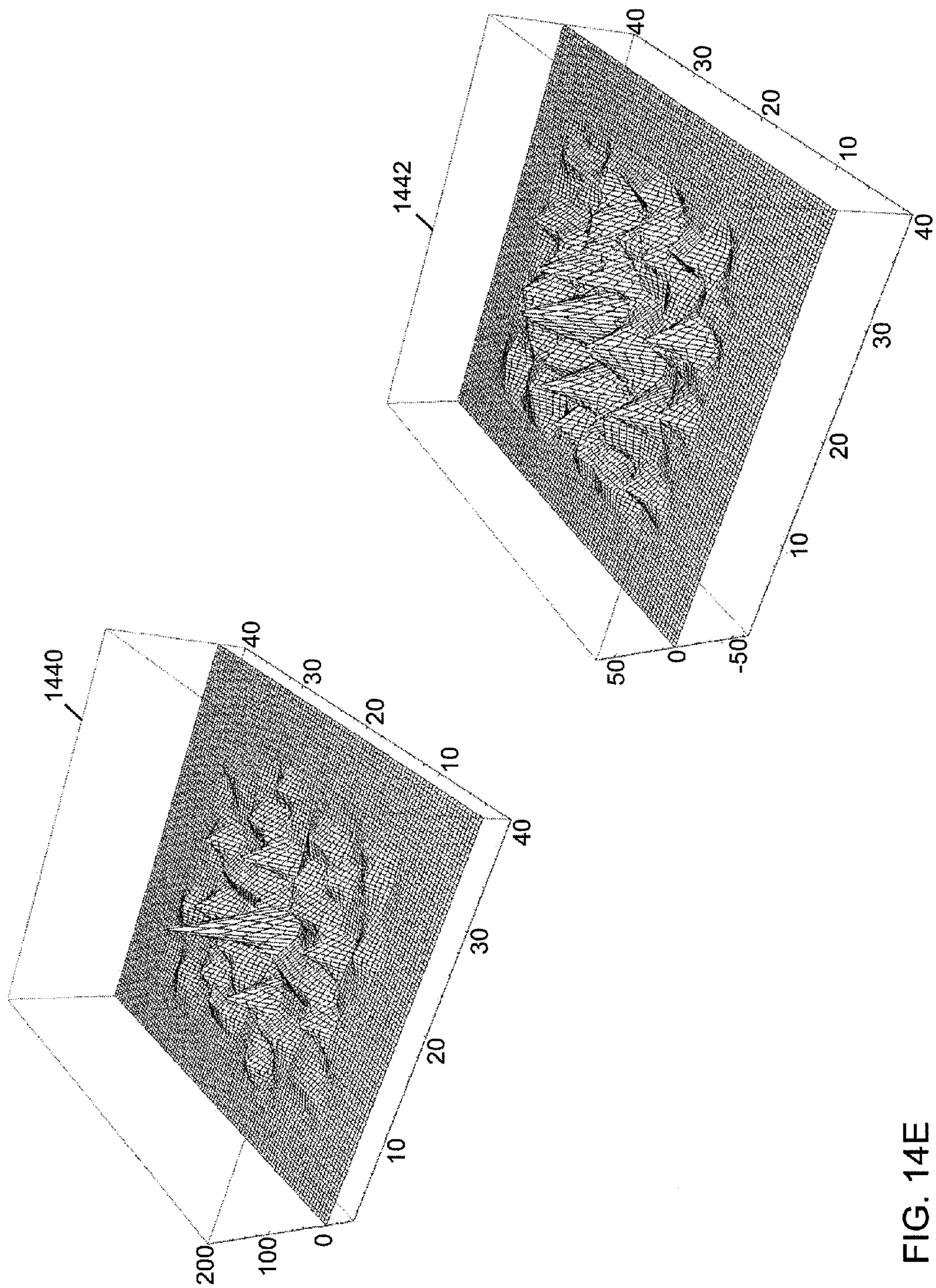

FIG. 14E depicts a spatial force function 1454 resulting from fourth magnetic field emission structure 1434 moving across its mirror image magnetic field emission structure in a direction 1404 and a spatial force function 1456 resulting from the fourth magnetic field emission structure 1434 being rotated −90° and moving in the same direction 1404 across its mirror image magnetic field emission structure.

Figure 15:
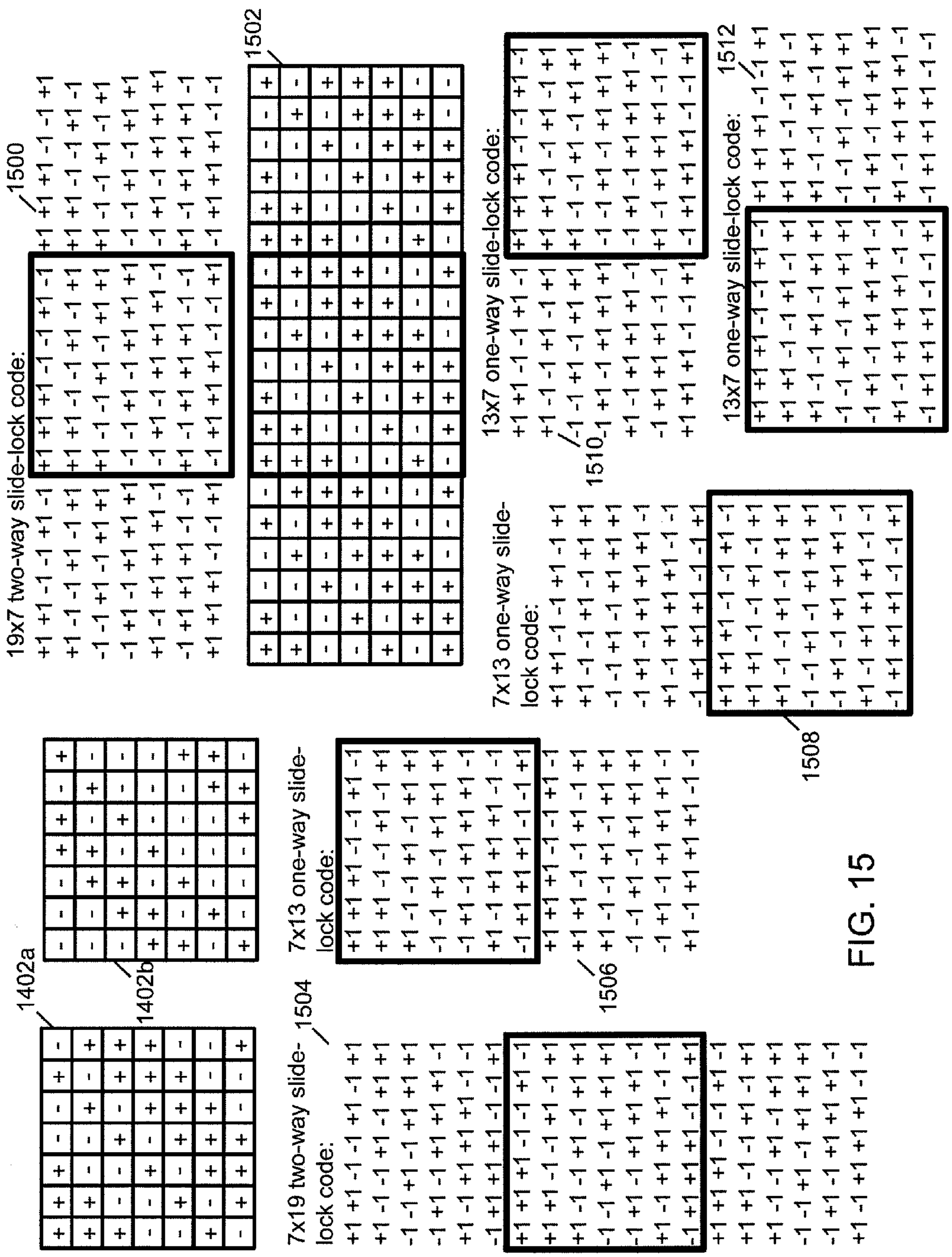
FIG. 15 depicts exemplary one-way slide lock codes and two-way slide lock codes.

FIG. 15 depicts exemplary one-way slide lock codes and two-way slide lock codes. Referring to FIG. 15, a 19*x*7 two-way slide lock code 1500 is produced by starting with a copy of the 7×7 code 1402 and then by adding the leftmost 6 columns of the 7×7 code 1402*a* to the right of the code 1500 and the rightmost 6 columns of the 7×7 code to the left of the code 1550. As such, as the mirror image 1402*b* slides from side-to-side, all 49 magnets are in contact with the structure producing the autocorrelation curve of FIG. 10 from positions 1 to 13. Similarly, a 7×19 two-way slide lock code 1504 is produced by adding the bottommost 6 rows of the 7×7 code 1402*a* to the top of the code 1504 and the topmost 6 rows of the 7×7 code 1402*a* to the bottom of the code 1504. The two structures 1500 and 1504 behave the same where as a magnetic field emission structure 1402*a* is slid from side to side it will lock in the center with +49 while at any other point off center it will be repelled with a force of −7. Similarly, one-way slide lock codes 1506, 1508, 1510, and 1512 are produced by adding six of seven rows or columns such that the code only partially repeats. Generally, various configurations (i.e., plus shapes, L shapes, Z shapes, donuts, crazy eight, etc.) can be created by continuing to add partial code modulos onto the structures provided in FIG. 15. As such, various types of locking mechanisms can be designed. Note that with the two-dimensional field emission structure 1402*a* a top down view of the top of the structure is depicted such that the poles of each magnet facing up are shown, whereas with the two-dimensional mirror image field emission structure 1402*b*, a top down view of the bottom of the structure is depicted such that the poles of each magnet facing down are shown.

Figure 16A:
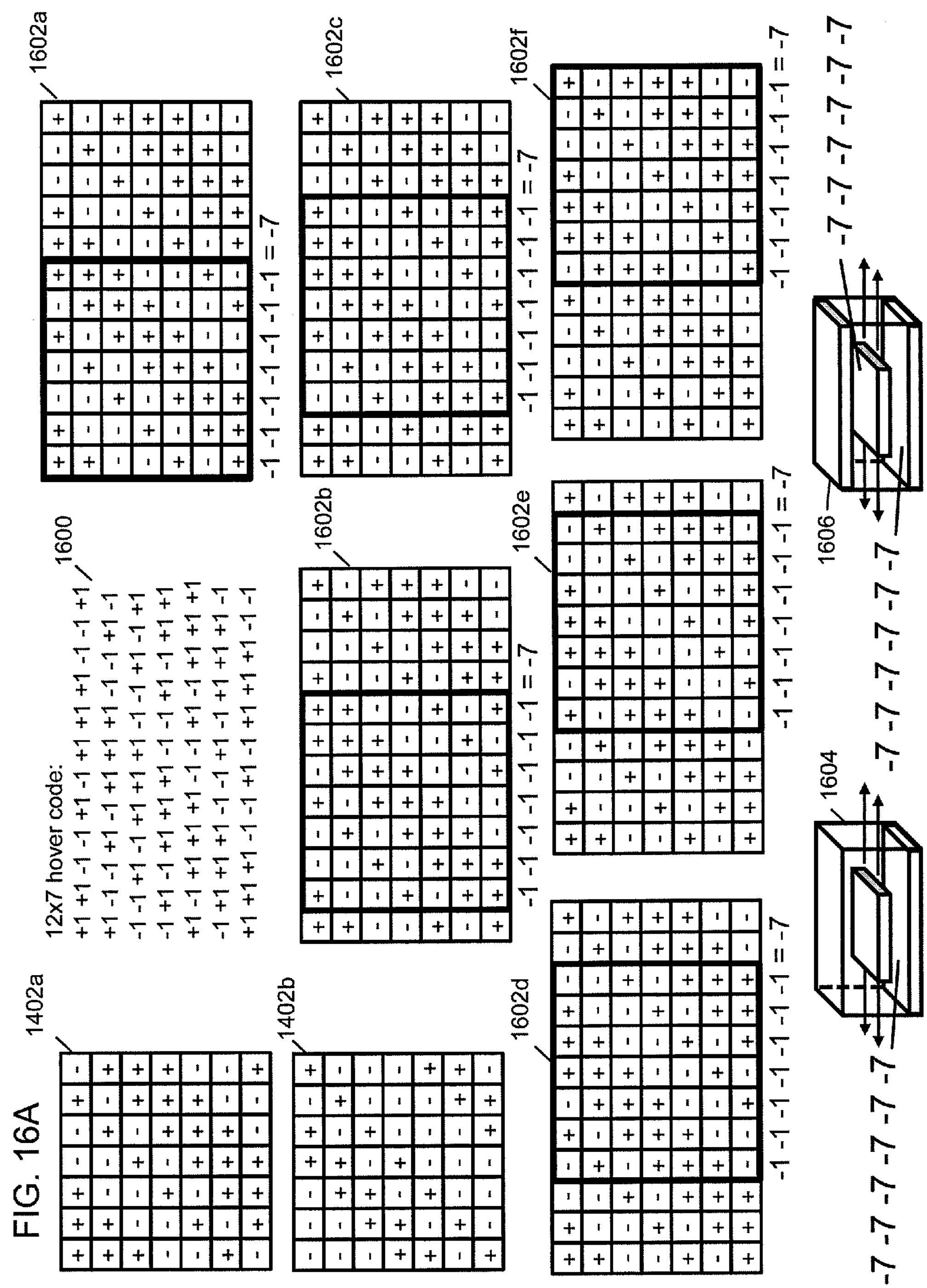
FIG. 16A depicts an exemplary hover code and corresponding magnetic field emission structures that never achieve substantial alignment.

FIG. 16A depicts a hover code 1600 produced by placing two code modulos 1402*a* side-by-side and then removing the first and last columns of the resulting structure. As such, a mirror image 1402*b* can be moved across a resulting magnetic field emission structure from one side 1602*a* to the other side 1602*f* and at all times achieve a spatial force function of −7. Hover channel (or box) 1604 is shown where mirror image 1402*b* is hovering over a magnetic field emission structure produced in accordance with hover code 1600. With this approach, a mirror image 1402*b* can be raised or lowered by increasing or decreasing the magnetic field strength of the magnetic field emission structure below. Similarly, a hover channel 1606 is shown where a mirror image 1402 is hovering between two magnetic field emission structures produced in accordance with the hover code 1600. With this approach, the mirror image 1402*b* can be raised or lowered by increasing and decreasing the magnetic field strengths of the magnetic field emission structure below and the magnetic field emission structure above. As with the slide lock codes, various configurations can be created where partial code modulos are added to the structure shown to produce various movement areas above which the movement of a hovering object employing magnetic field emission structure 1402*b* can be controlled via control of the strength of the magnetic in the structure and/or using other forces.

Figure 16B:
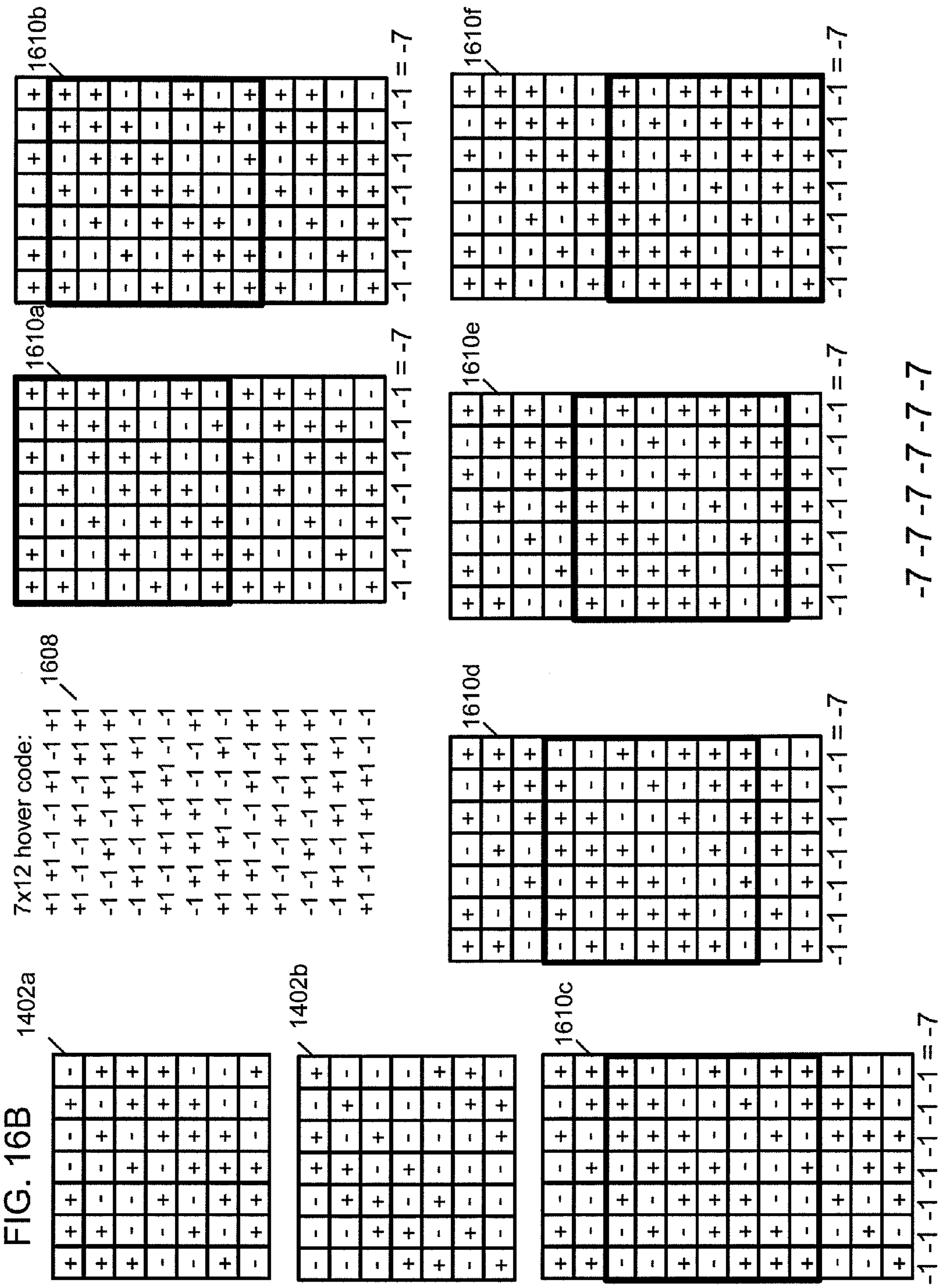
FIG. 16B depicts another exemplary hover code and corresponding magnetic field emission structures that never achieve substantial alignment.

FIG. 16B depicts a hover code 1608 produced by placing two code modulos 1402*a* one on top of the other and then removing the first and last rows. As such, mirror image 1402*b* can be moved across a resulting magnetic field emission structure from upper side 1610*a* to the bottom side 1610*f* and at all time achieve a spatial force function of −7.

Figure 16C:
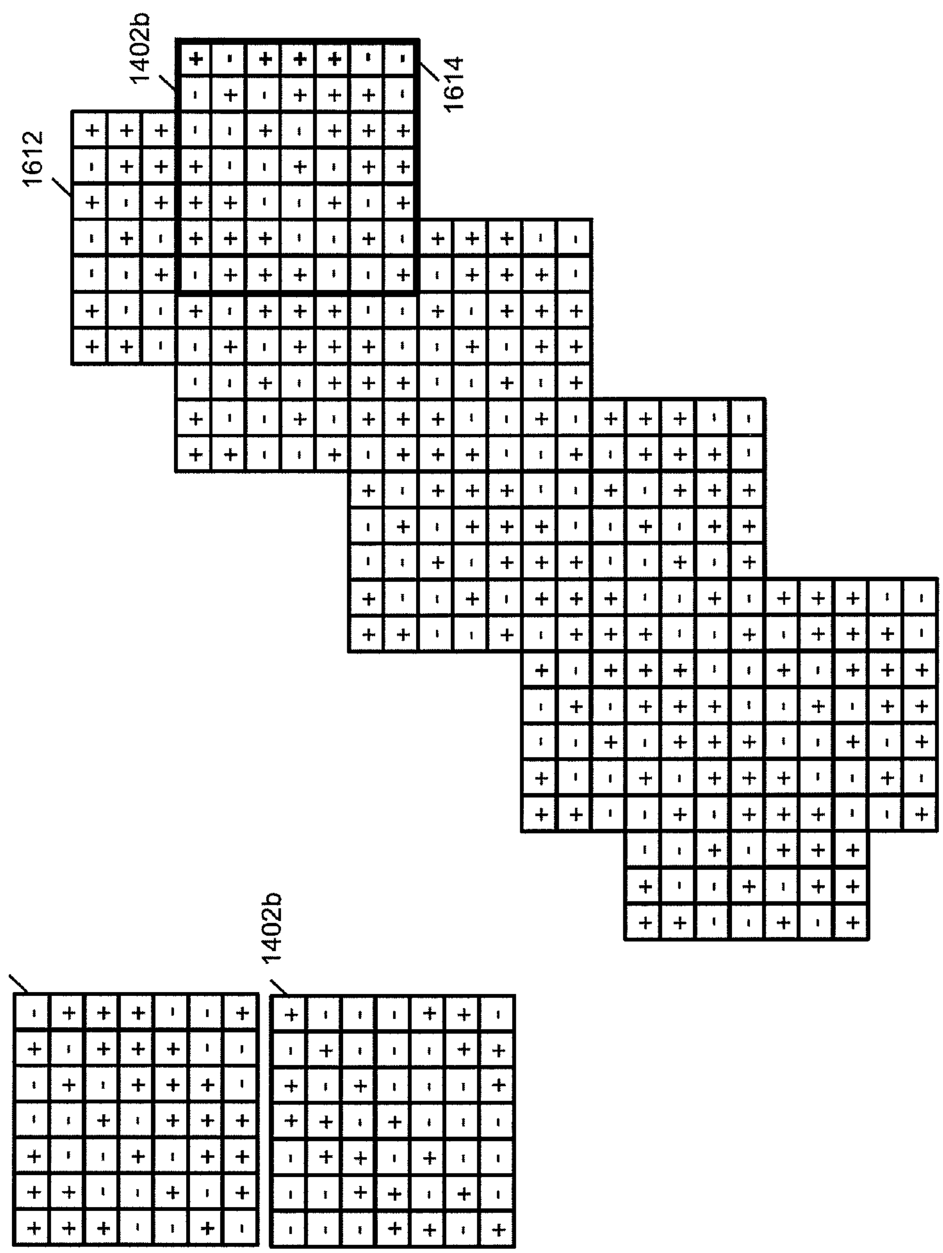
FIG. 16C depicts an exemplary magnetic field emission structure where a mirror image magnetic field emission structure corresponding to a 7×7 barker-like code will hover anywhere above the structure provided it does not rotate.

FIG. 16C depicts an exemplary magnetic field emission structure 1612 where a mirror image magnetic field emission structure 1402*b* of a 7×7 barker-like code will hover with a −7 (repel) force anywhere above the structure 1612 provided it is properly oriented (i.e., no rotation). Various sorts of such structures can be created using partial code modulos. Should one or more rows or columns of magnets have its magnetic strength increased (or decreased) then the magnetic field emission structure 1402*b* can be caused to move in a desired direction and at a desired velocity. For example, should the bolded column of magnets 1614 have magnetic strengths that are increased over the strengths of the rest of the magnets of the structure 1612, the magnetic field emission structure 1402*b* will be propelled to the left. As the magnetic field emission structure moves to the left, successive columns to the right might be provided the same magnetic strengths as column 1614 such that the magnetic field emission structure is repeatedly moved leftward. When the structure 1402*b* reaches the left side of the structure 1612 the magnets along the portion of the row beneath the top of structure 1402*b* could then have their magnetic strengths increased causing structure 1402*b* to be moved downward. As such, various modifications to the strength of magnets in the structure can be varied to effect movement of structure 1402*b*. Referring again to FIGS. 16A and 16B, one skilled in the art would recognize that the slide-lock codes could be similarly implemented so that when structure 1402*b* is slid further and further away from the alignment location (shown by the dark square), the magnetic strength of each row (or column) would become more and more increased. As such, structure 1402*b* could be slowly or quickly repelled back into its lock location. For example, a drawer using the slide-lock code with varied magnetic field strengths for rows (or columns) outside the alignment location could cause the drawer to slowly close until it locked in place. Variations of magnetic field strengths can also be implemented per magnet and do not require all magnets in a row (or column) to have the same strength.

Figure 17A:
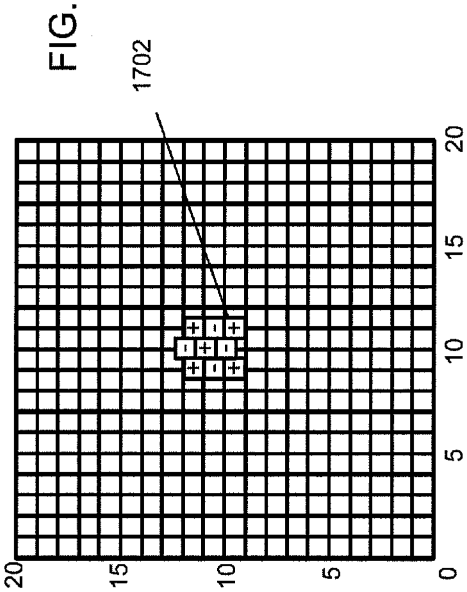
FIG. 17A depicts an exemplary magnetic field emission structure comprising nine magnets positioned such that they half overlap in one direction.

FIG. 17A depicts a magnetic field emission structure 1702 comprising nine magnets positioned such that they half overlap in one direction. The structure is designed to have a peak spatial force when (substantially) aligned and have relatively minor side lobe strength at any rotation off alignment. The positions of the magnets are shown against a coordinate grid 1704. The center column of magnets forms a linear sequence of three magnets each centered on integer grid positions. Two additional columns of magnets are placed on each side of the center column and on adjacent integer column positions, but the row coordinates are offset by one half of a grid position. More particularly, the structure comprises nine magnets at relative coordinates of +1(0,0), −1(0,1), +1(0,2), −1(1,0.5), +1(1,1.5), −1(1,2.5), +1(2,0), −1(2,1), +1(2,2), where within the notation s(x,y), "s" indicates the magnet strength and polarity and "(x,y)" indicates x and y coordinates of the center of the magnet relative to a reference position (0,0). The magnet structure, according to the above definition is then placed such that magnet +1(0,0) is placed at location (9,9.5) in the coordinate frame 1704 of FIG. 17A.

Figure 17B:
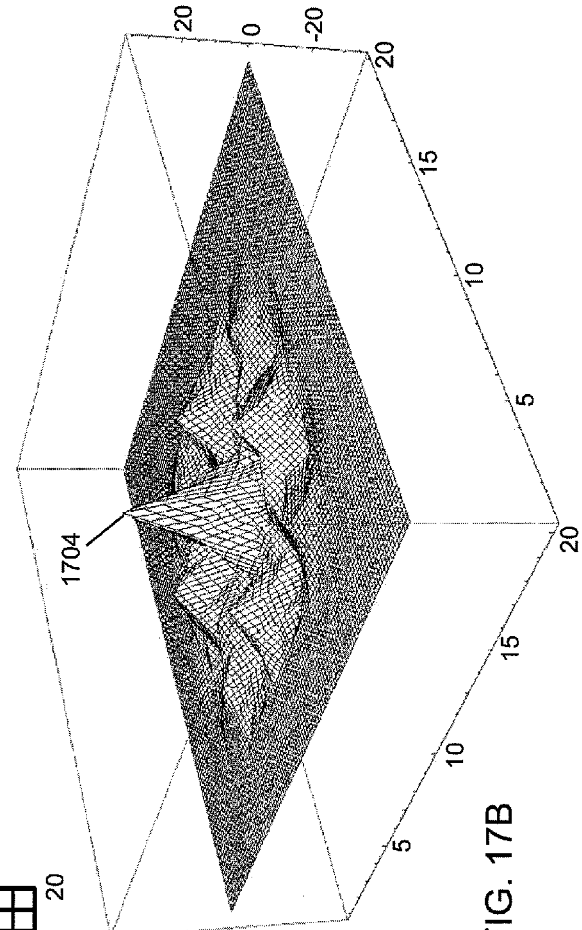
FIG. 17B depicts the spatial force function of the magnetic field emission structure of FIG. 17A interacting with its mirror image magnetic field emission structure.

When paired with a complementary structure, and the force is observed for various rotations of the two structures around the center coordinate at (10, 11), the structure 1702 has a peak spatial force when (substantially) aligned and has relatively minor side lobe strength at any rotation off alignment FIG. 17B depicts the spatial force function 1706 of a magnetic field emission structure 1702 interacting with its mirror image magnetic field emission structure. The peak 1708 occurs when substantially aligned.

Figure 18C:
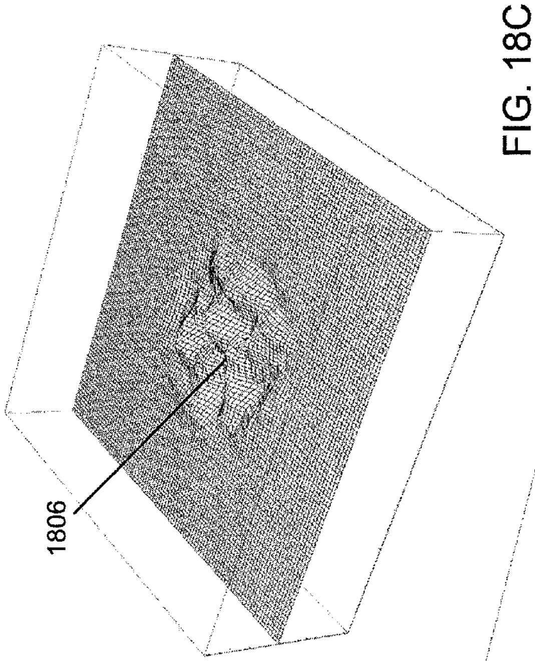
FIG. 18C depicts an exemplary spatial force function of the exemplary magnetic field emission structure of FIG. 18*a* interacting with its mirror magnetic field emission structure after being rotated 90°.
Figure 18B:
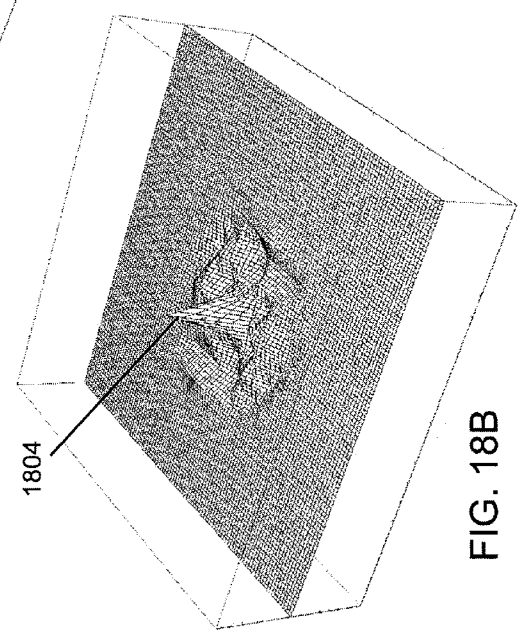
FIG. 18B depicts an exemplary spatial force function of the exemplary magnetic field emission structure of FIG. 18A interacting with its mirror magnetic field emission structure.
Figure 18A:
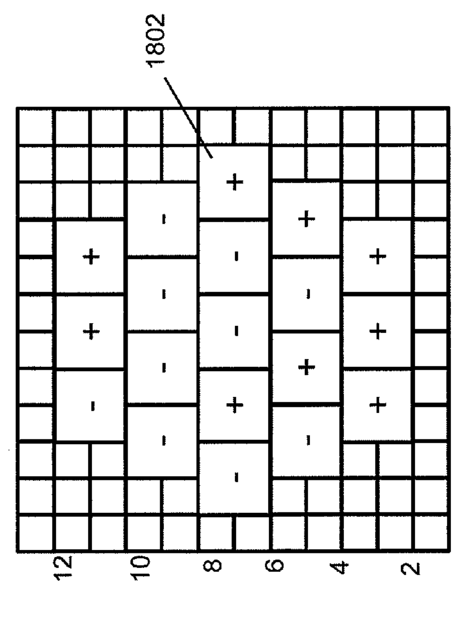
FIG. 18A depicts an exemplary code intended to produce a magnetic field emission structure having a first stronger lock when aligned with its mirror image magnetic field emission structure and a second weaker lock when rotated 90° relative to its mirror image magnetic field emission structure.

FIG. 18A depicts an exemplary code 1802 intended to produce a magnetic field emission structure having a first stronger lock when aligned with its mirror image magnetic field emission structure and a second weaker lock when rotated 90° relative to its mirror image magnetic field emission structure. FIG. 18*a* shows magnet structure 1802 is against a coordinate grid 1804. The magnet structure 1802 of FIG. 18A comprises magnets at positions: −1(3,7), −1(4,5), −1(4,7), +1(5,3), +1(5,7), −1(5,11), +1(6,5), −1(6,9), +1(7,3), −1(7,7), +1(7,11), −1(8,5), −1(8,9), +1(9,3), −1(9,7), +1(9, 11), +1(10,5), −1(10,9)+1(11,7). Additional field emission structures may be derived by reversing the direction of the x coordinate or by reversing the direction of the y coordinate or by transposing the x and y coordinates.

FIG. 18B depicts spatial force function 1806 of a magnetic field emission structure 1802 interacting with its mirror image magnetic field emission structure. The peak occurs when substantially aligned.

FIG. 18C depicts the spatial force function 1808 of magnetic field emission structure 1802 interacting with its mirror magnetic field emission structure after being rotated 90°. The peak occurs when substantially aligned but one structure rotated 90°.

Figures 19A, 19B, 19C, 19D, 19E, 19F, 19G, 19H, 19I:
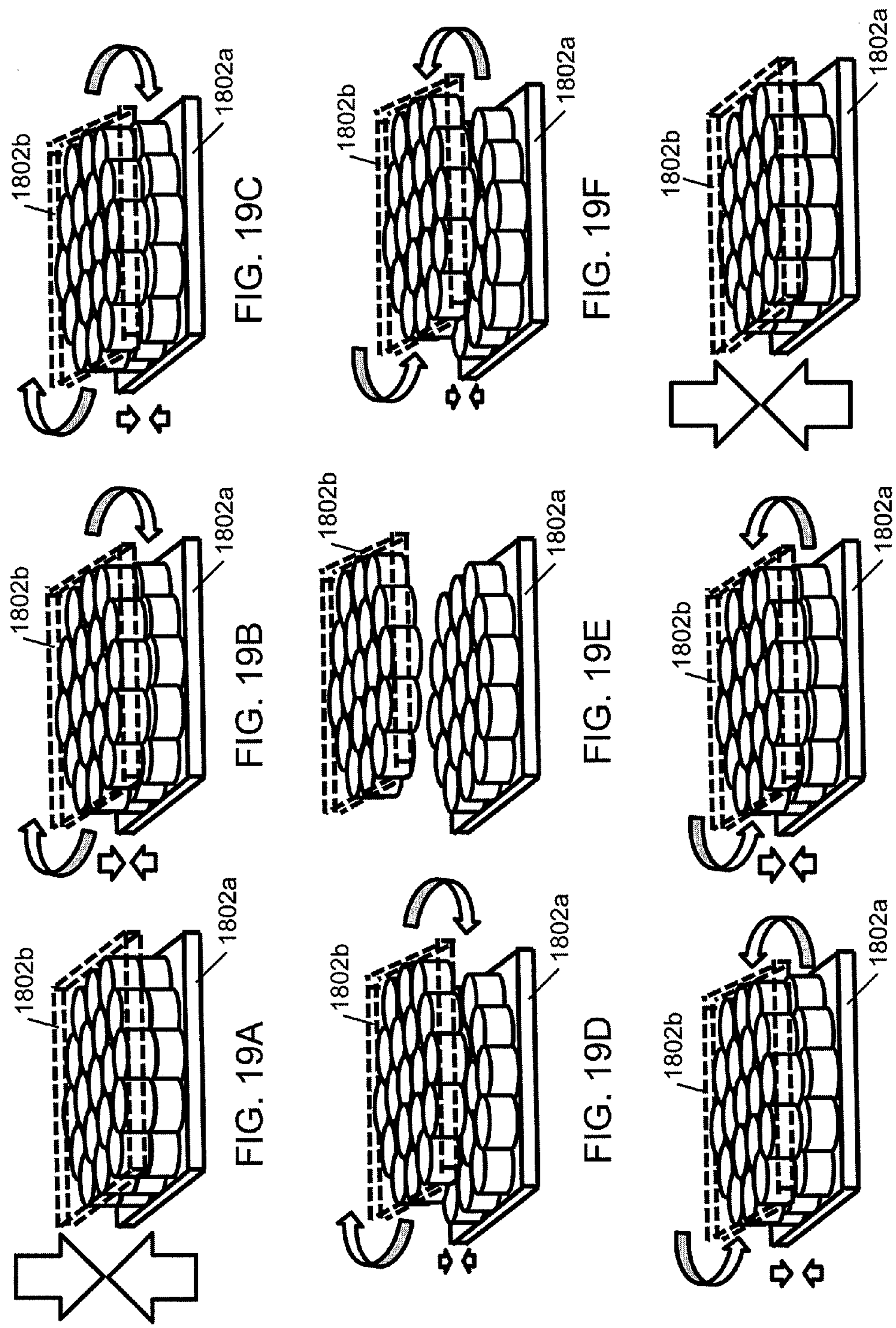
FIGS. 19A-19I depict the exemplary magnetic field emission structure of FIG. 18A and its mirror image magnetic field emission structure and the resulting spatial forces produced in accordance with their various alignments as they are twisted relative to each other.

FIGS. 19A-19I depict the exemplary magnetic field emission structure 1802*a* and its mirror image magnetic field emission structure 1802*b* and the resulting spatial forces produced in accordance with their various alignments as they are twisted relative to each other. In FIG. 19A, the magnetic field emission structure 1802*a* and the mirror image magnetic field emission structure 1802*b* are aligned producing a peak spatial force. In FIG. 19B, the mirror image magnetic field emission structure 1802*b* is rotated clockwise slightly relative to the magnetic field emission structure 1802*a* and the attractive force reduces significantly. In FIG. 19C, the mirror image magnetic field emission structure 1802*b* is further rotated and the attractive force continues to decrease. In FIG. 19D, the mirror image magnetic field emission structure 1802*b* is still further rotated until the attractive force becomes very small, such that the two magnetic field emission structures are easily separated as shown in FIG. 19E. Given the two magnetic field emission structures held somewhat apart as in FIG. 19E, the structures can be moved closer and rotated towards alignment producing a small spatial force as in FIG. 19F. The spatial force increases as the two structures become more and more aligned in FIGS. 19G and 19H and a peak spatial force is achieved when aligned as in FIG. 19I. It should be noted that the direction of rotation was arbitrarily chosen and may be varied depending on the code employed. Additionally, the mirror image magnetic field emission structure 1802*b* is the mirror of magnetic field emission structure 1802*a* resulting in an attractive peak spatial force. The mirror image magnetic field emission structure 1802*b* could alternatively be coded such that when aligned with the magnetic field emission structure 1802*a* the peak spatial force would be a repelling force in which case the directions of the arrows used to indicate amplitude of the spatial force corresponding to the different alignments would be reversed such that the arrows faced away from each other.

Figure 20B:
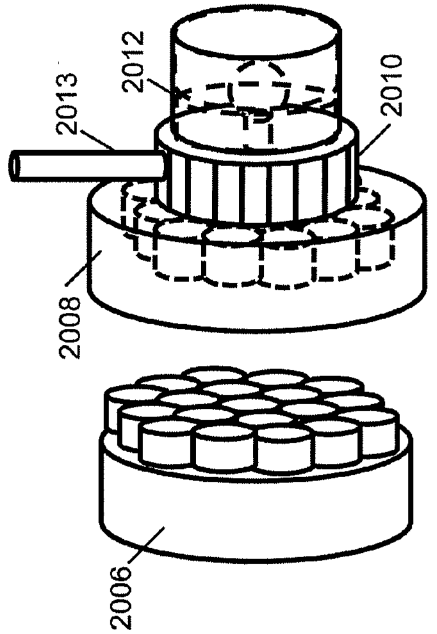
FIG. 20B depicts exemplary magnetic field emission structures having exemplary housings configured such that one housing can be inserted inside the other housing, exemplary alternative turning mechanism, exemplary swivel mechanism, an exemplary lever.
Figure 20A:
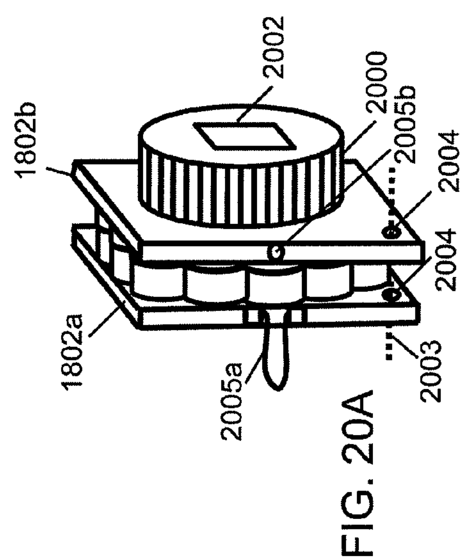
FIG. 20A depicts exemplary magnetic field emission structures, an exemplary turning mechanism, an exemplary tool insertion slot, exemplary alignment marks, an exemplary latch mechanism, and an exemplary axis for an exemplary pivot mechanism.

FIG. 20A depicts two magnetic field emission structures 1802*a* and 1802*b*. One of the magnetic field emission structures 1802*b* includes a turning mechanism 2000 that includes a tool insertion slot 2002. Both magnetic field emission structures include alignment marks 2004 along an axis 2003. A latch mechanism such as the hinged latch clip 2005*a* and latch knob 2005*b* may also be included preventing movement (particularly turning) of the magnetic field emission structures once aligned. Under one arrangement, a pivot mechanism (not shown) could be used to connect the two structures 1802*a*, 1802*b* at a pivot point such as at pivot location marks 2004 thereby allowing the two structures to be moved into or out of alignment via a circular motion about the pivot point (e.g., about the axis 2003).

FIG. 20B depicts a first circular magnetic field emission structure housing 2006 and a second circular magnetic field emission structure housing 2008 configured such that the first housing 2006 can be inserted into the second housing 2008. The second housing 2008 is attached to an alternative turning mechanism 2010 that is connected to a swivel mechanism 2012 that would normally be attached to some other object. Also shown is a lever 2013 that can be used to provide turning leverage.

Figure 20C:
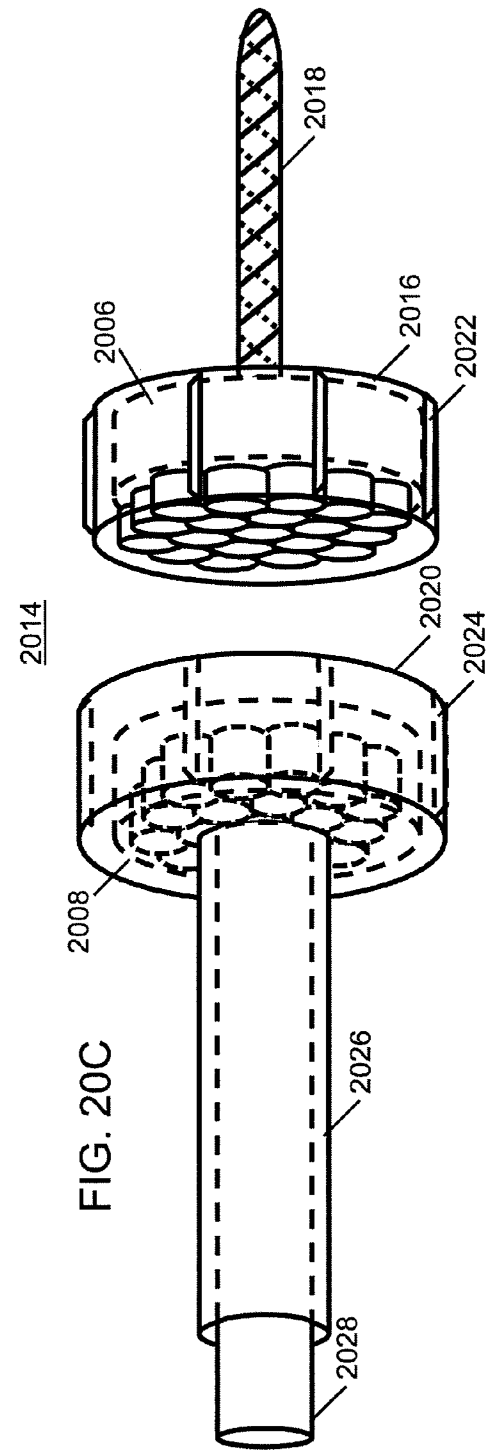
FIG. 20C depicts an exemplary tool assembly including an exemplary drill head assembly.

FIG. 20C depicts an exemplary tool assembly 2014 including a drill head assembly 2016. The drill head assembly 2016 comprises a first housing 2006 and a drill bit 2018. The tool assembly 2014 also includes a drill head turning assembly 2020 comprising a second housing 2008. The first housing 2006 includes raised guides 2022 that are configured to slide into guide slots 2024 of the second housing 2008. The second housing 2008 includes a first rotating shaft 2026 used to turn the drill head assembly 2016. The second housing 2008 also includes a second rotating shaft 2028 used to align the first housing 2006 and the second housing 2008.

Figures 20D, 20E, 20F:
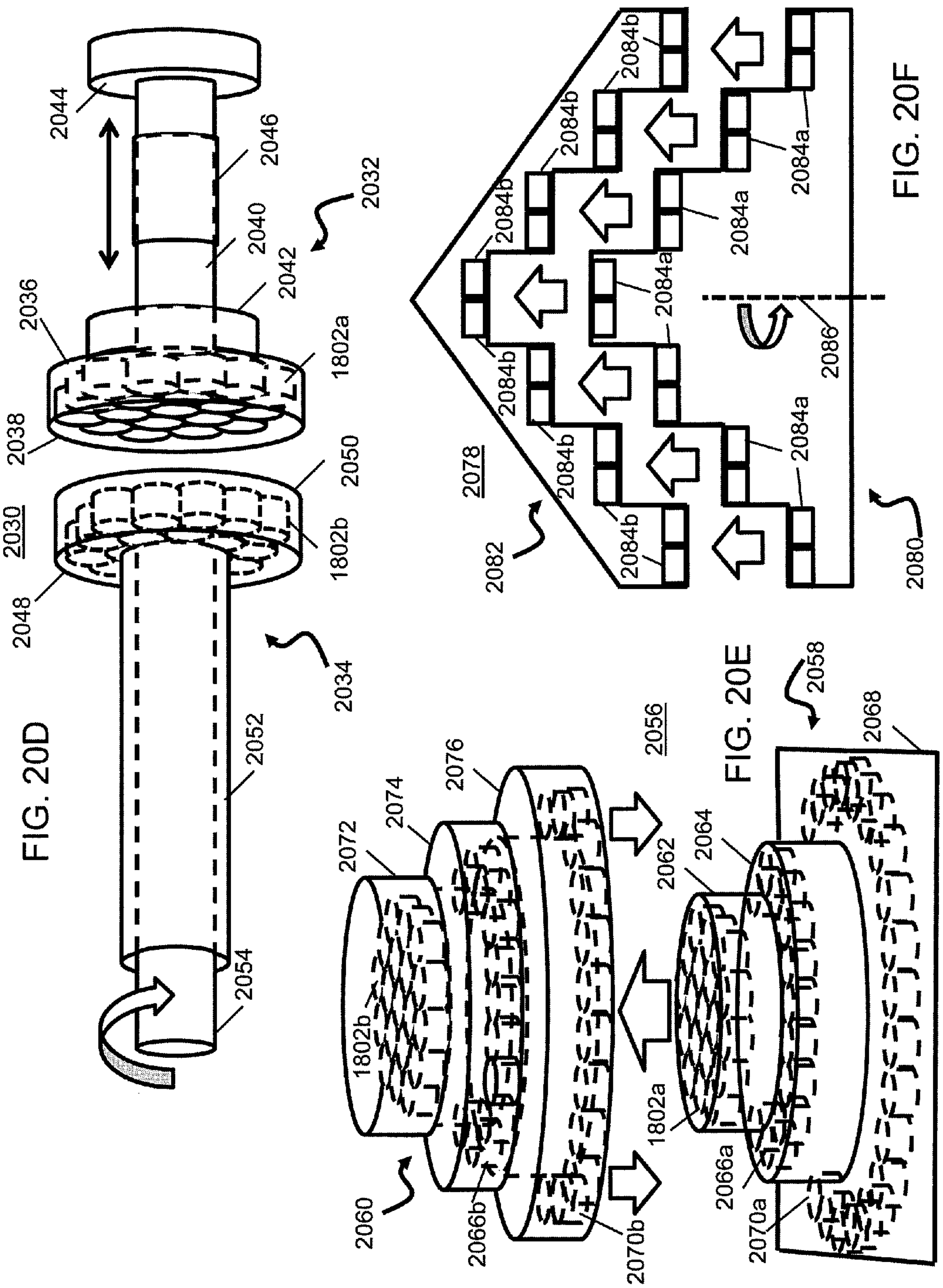
FIG. 20D depicts an exemplary hole cutting tool assembly having an outer cutting portion including a magnetic field emission structure and inner cutting portion including a magnetic field emission structure.
FIG. 20E depicts an exemplary machine press tool employing multiple levels of magnetic field emission structures.
FIG. 20F depicts a cross section of an exemplary gripping apparatus employing a magnetic field emission structure involving multiple levels of magnets.

FIG. 20D depicts an exemplary hole cutting tool assembly 2030 having an outer cutting portion 3032 including a first magnetic field emission structure 1802*a* and an inner cutting portion 2034 including a second magnetic field emission structure 1802*b*. The outer cutting portion 2032 comprises a first housing 2036 having a cutting edge 2038. The first housing 2036 is connected to a sliding shaft 2040 having a first bump pad 2042 and a second bump pad 2044. It is configured to slide back and forth inside a guide 2046, where movement is controlled by the spatial force function of the first and second magnetic field emission structures 1802*a* and 1802*b*. The inner cutting portion 2034 comprises a second housing 2048 having a cutting edge 2050. The second housing 2048 is maintained in a fixed position by a first shaft 2052. The second magnetic field emission structure 1802*b* is turned using a shaft 2054 so as to cause the first and second magnetic field emission structures 1802*a* and 1802*b* to align momentarily at which point the outer cutting portion 2032 is propelled towards the inner cutting portion 2034 such that cutting edges 2038 and 2050 overlap. The circumference of the first housing 2036 is slightly larger than the second housing 2048 so as to cause the two cutting edges 2038 and 2050 to precisely cut a hole in something passing between them (e.g., cloth). As the shaft 2054 continues to turn, the first and second magnetic field emission structures 1802*a* and 1802*b* quickly become misaligned whereby the outer cutting portion 2032 is propelled away from the inner cutting portion 2034. Furthermore, if the shaft 2054 continues to turn at some revolution rate (e.g., 1 revolution/second) then that rate defines the rate at which holes are cut (e.g., in the cloth). As such, the spatial force function can be controlled as a function of the movement of the two objects to which the first and second magnetic field emission structures are associated. In this instance, the outer cutting portion 3032 can move from left to right and the inner cutting portion 2032 turns at some revolution rate.

FIG. 20E depicts an exemplary machine press tool comprising a bottom portion 2058 and a top portion 2060. The bottom portion 2058 comprises a first tier 2062 including a first magnetic field emission structure 1802*a*, a second tier 2064 including a second magnetic field emission structure 2066*a*, and a flat surface 2068 having below it a third magnetic field emission structure 2070*a*. The top portion 2060 comprises a first tier 2072 including a fourth magnetic field emission structure 1802*b* having mirror coding as the first magnetic field emission structure 1802*a*, a second tier 2074 including a fifth magnetic field emission structure 2066*b* having mirror coding as the second magnetic field emission structure 2066*a*, and a third tier 2076 including a sixth magnetic field emission structure 2070*b* having mirror coding as the third magnetic field emission structure 2070*a*. The second and third tiers of the top portion 2060 are configured to receive the two tiers of the bottom portion 2058. As the bottom and top portions 2058, 2060 are brought close to each other and the top portion 2060 becomes aligned with the bottom portion 2058 the spatial force functions of the complementary pairs of magnetic field emission structures causes a pressing of any material (e.g., aluminum) that is placed between the two portions. By turning either the bottom portion 2058 or the top portion 2060, the magnetic field emission structures become misaligned such that the two portions separate.

FIG. 20F depicts an exemplary gripping apparatus 2078 including a first part 2080 and a second part 2082. The first part 2080 comprises a saw tooth or stairs like structure where each tooth (or stair) has corresponding magnets making up a first magnetic field emission structure 2084*a*. The second part 2082 also comprises a saw tooth or stairs like structure where each tooth (or stair) has corresponding magnets making up a second magnetic field emission structure 2084*b* that is a mirror image of the first magnetic field emission structure 2084*a*. Under one arrangement each of the two parts shown are cross-sections of parts that have the same cross section as rotated up to 360° about a center axis 2086. Generally, the present invention can be used to produce all sorts of holding mechanism such as pliers, jigs, clamps, etc. As such, the present invention can provide a precise gripping force and inherently maintains precision alignment.

Figure 20G:
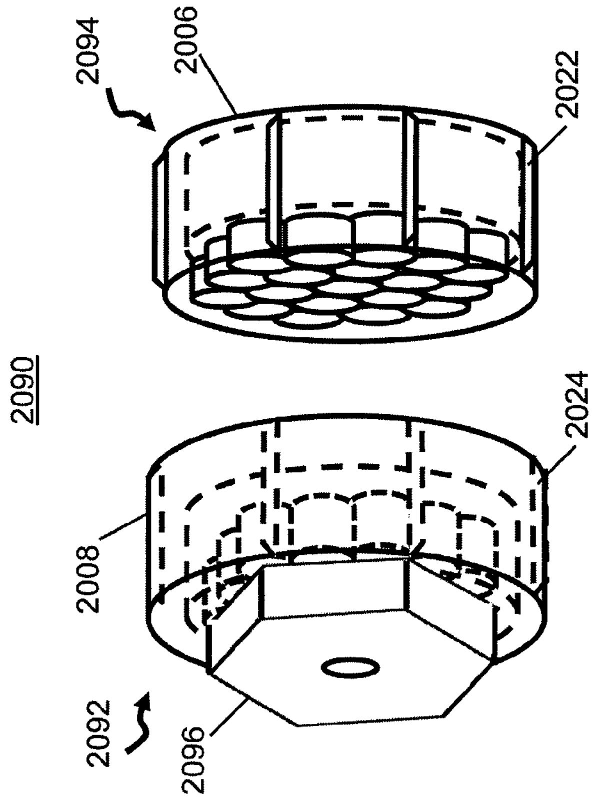
FIG. 20G depicts an exemplary clasp mechanism including a magnetic field emission structure slip ring mechanism.

FIG. 20G depicts an exemplary clasp mechanism 2090 including a first part 2092 and a second part 2094. The first part 2092 includes a first housing 2008 supporting a first magnetic field emission structure. The second part 2094 includes a second housing 2006 used to support a second magnetic field emission structure. The second housing 2006 includes raised guides 2022 that are configured to slide into guide slots 2024 of the first housing 2008. The first housing 2008 is also associated with a magnetic field emission structure slip ring mechanism 2096 that can be turned to rotate the magnetic field emission structure of the first part 2092 so as to align or misalign the two magnetic field emission structures of the clasp mechanism 2090. Generally, all sorts of clasp mechanisms can be constructed in accordance with the present invention whereby a slip ring mechanism can be turned to cause the clasp mechanism to release. Such clasp mechanisms can be used as receptacle plugs, plumbing connectors, connectors involving piping for air, water, steam, or any compressible or incompressible fluid. The technology is also applicable to Bayonette Neil-Concelman (BNC) electronic connectors, Universal Serial Bus (USB) connectors, and most any other type of connector used for any purpose.

The gripping force described above can also be described as a mating force. As such, in certain electronics applications this ability to provide a precision mating force between two electronic parts or as part of a connection may correspond to a desired characteristic, for example, a desired impedance. Furthermore, the invention is applicable to inductive power coupling where a first magnetic field emission structure that is driven with AC will achieve inductive power coupling when aligned with a second magnetic field emission structure made of a series of solenoids whose coils are connected together with polarities according to the same code used to produce the first magnetic field emission structure. When not aligned, the fields will close on themselves since they are so close to each other in the driven magnetic field emission structure and thereby conserve power. Ordinary inductively coupled systems' pole pieces are rather large and cannot conserve their fields in this way since the air gap is so large.

Figure 21:
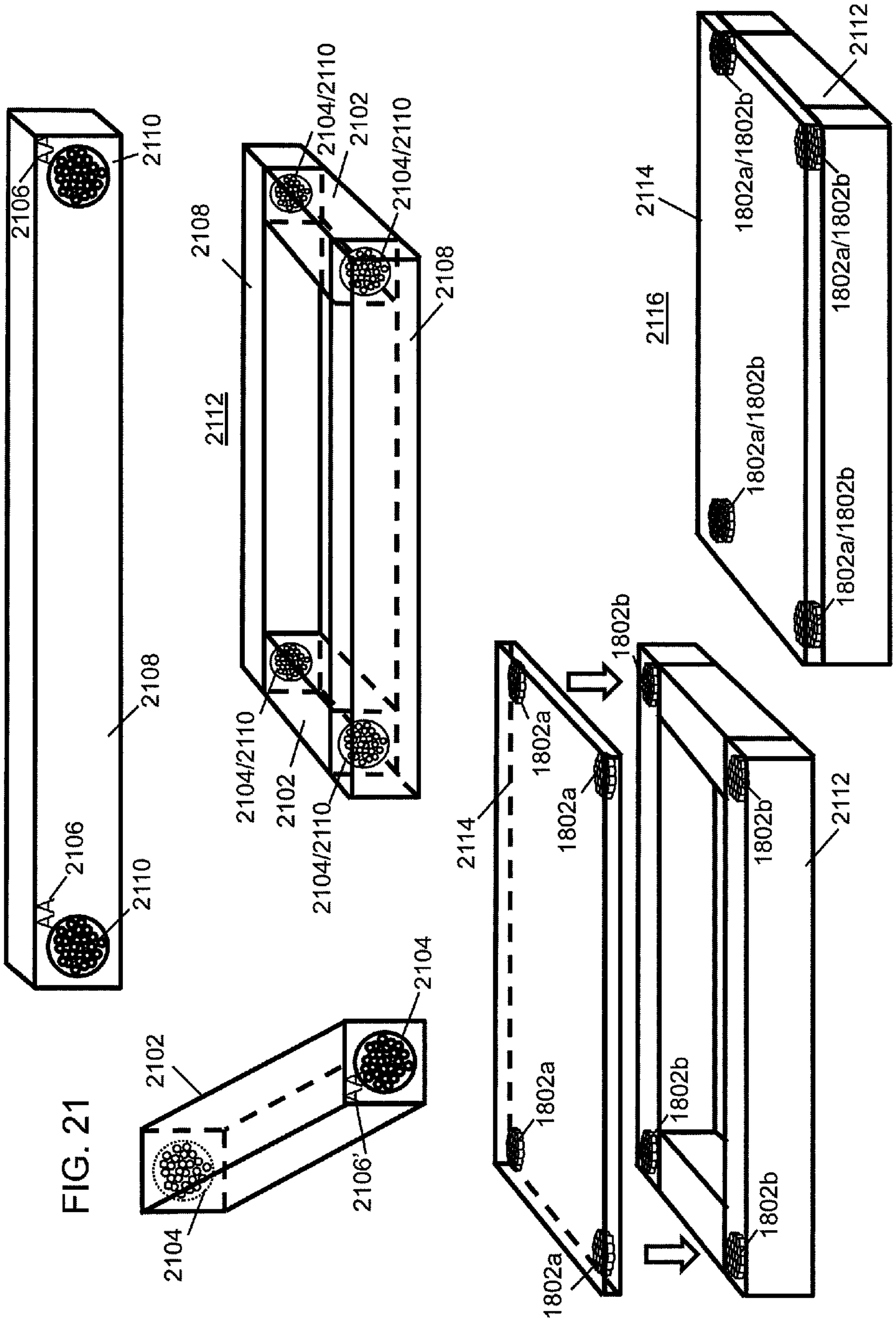
FIG. 21 depicts exemplary magnetic field emission structures used to assemble structural members and a cover panel to produce an exemplary structural assembly.

FIG. 21 depicts a first elongated structural member 2102 having magnetic field emission structures 2104 on each of two ends and also having an alignment marking 2106 ("AA"). FIG. 21 also depicts a second elongated structural member 2108 having magnetic field emission structures 2110 on both ends of one side and having alignment markings 2106 ("AA"). The magnetic field emission structures 2104 and

2110 are configured such that they can be aligned to attach the first and second structural members 2102 and 2108. FIG. 21 further depicts a structural assembly 2112 including two of the first elongated structural members 2102 attached to two of the second elongated structural members 2108 whereby four magnetic field emission structure pairs 2104/2110 are aligned. FIG. 21 includes a cover panel 2114 having four magnetic field emission structures 1802*a* that are configured to align with four magnetic field emission structures 1802*b* to attach the cover panel 2114 to the structural assembly 2112 to produce a covered structural assembly 2116. The markings shown could be altered so that structures that complement the AA structures are labeled AA'. Structures complementary to AA labeled structures could instead be labeled "aa". Additionally, various numbering or color coding schemes could be employed. For example, red AA labels could indicate structures complementary to structures having blue AA labels, etc. One skilled in the art will recognize that all sorts of approaches for labeling such structures could be used to enable one with less skill to easily understand which such structures are intended to be used together and which structures not intended to be used together.

Generally, the ability to easily turn correlated magnetic structures such that they disengage is a function of the torque easily created by a person's hand by the moment arm of the structure. The larger it is, the larger the moment arm, which acts as a lever. When two separate structures are physically connected via a structural member, as with the cover panel 2114, the ability to use torque is defeated because the moment arms are reversed. This reversal is magnified with each additional separate structure connected via structural members in an array. The force is proportional to the distance between respective structures, where torque is proportional to force times radius. As such, under one arrangement, the magnetic field emission structures of the covered structural assembly 2116 include a turning mechanism enabling them to be aligned or misaligned in order to assemble or disassemble the covered structural assembly. Under another arrangement, the magnetic field emission structures do not include a turning mechanism.

Figure 22:
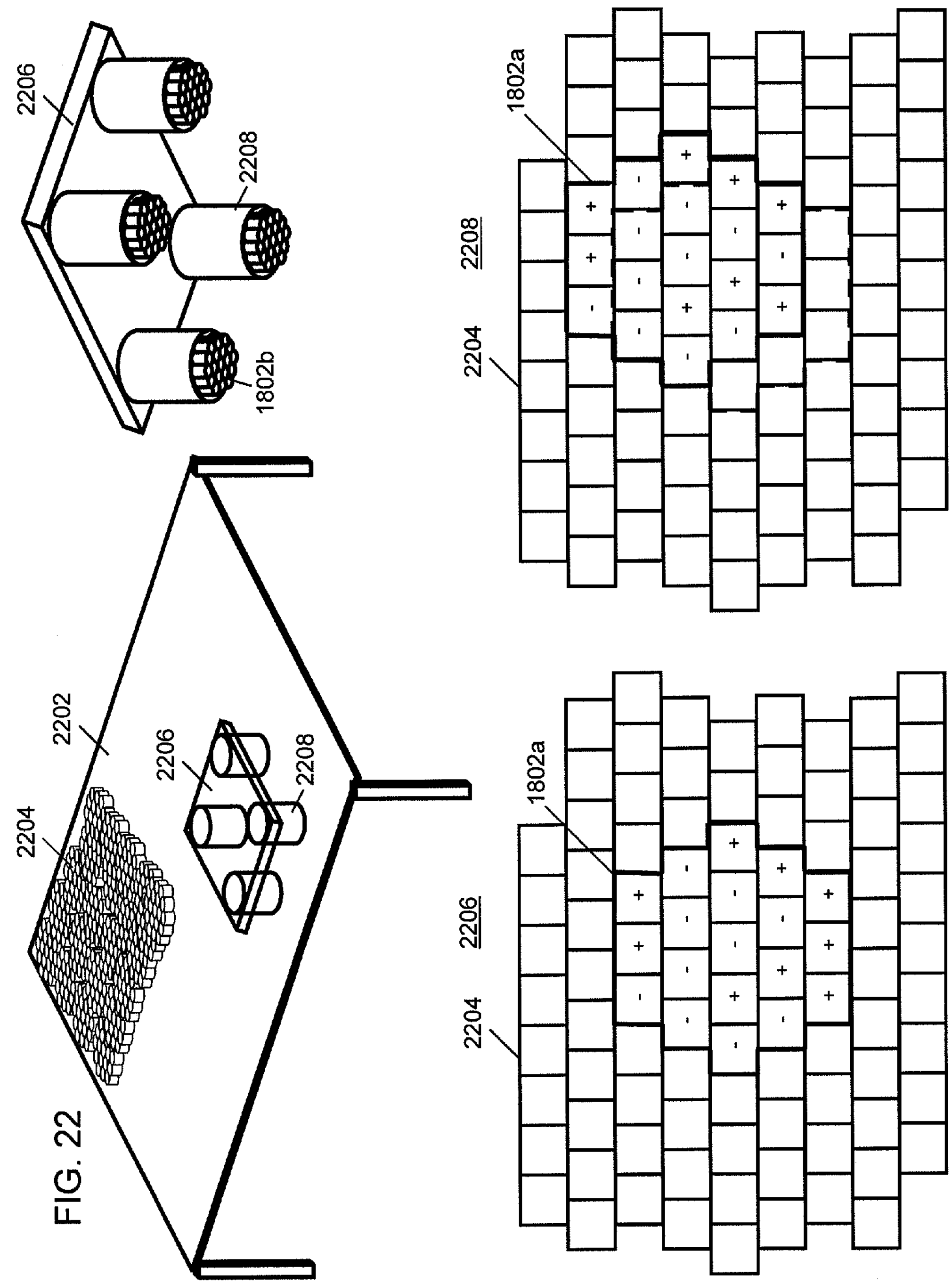
FIG. 22 depicts a table having beneath its surface a two-dimensional electromagnetic array where an exemplary movement platform having contact members with magnetic field emission structures can be moved by varying the states of the individual electromagnets of the electromagnetic array.
Figure 23:
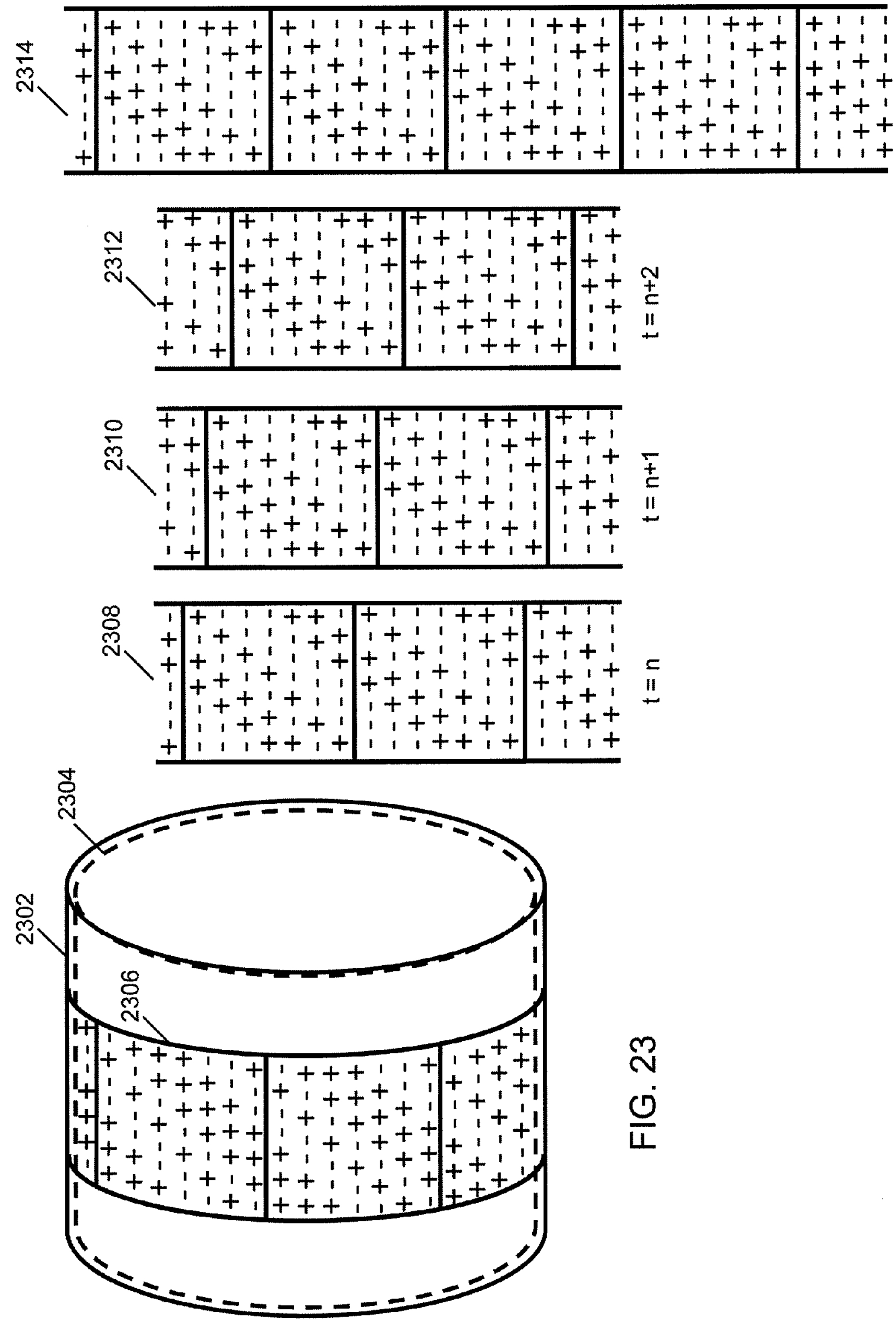
FIG. 23 depicts a cylinder inside another cylinder where either cylinder can be moved relative to the other cylinder by varying the state of individual electromagnets of an electromagnetic array associated with one cylinder relative to a magnetic field emission structure associated with the other cylinder.
Figure 24:
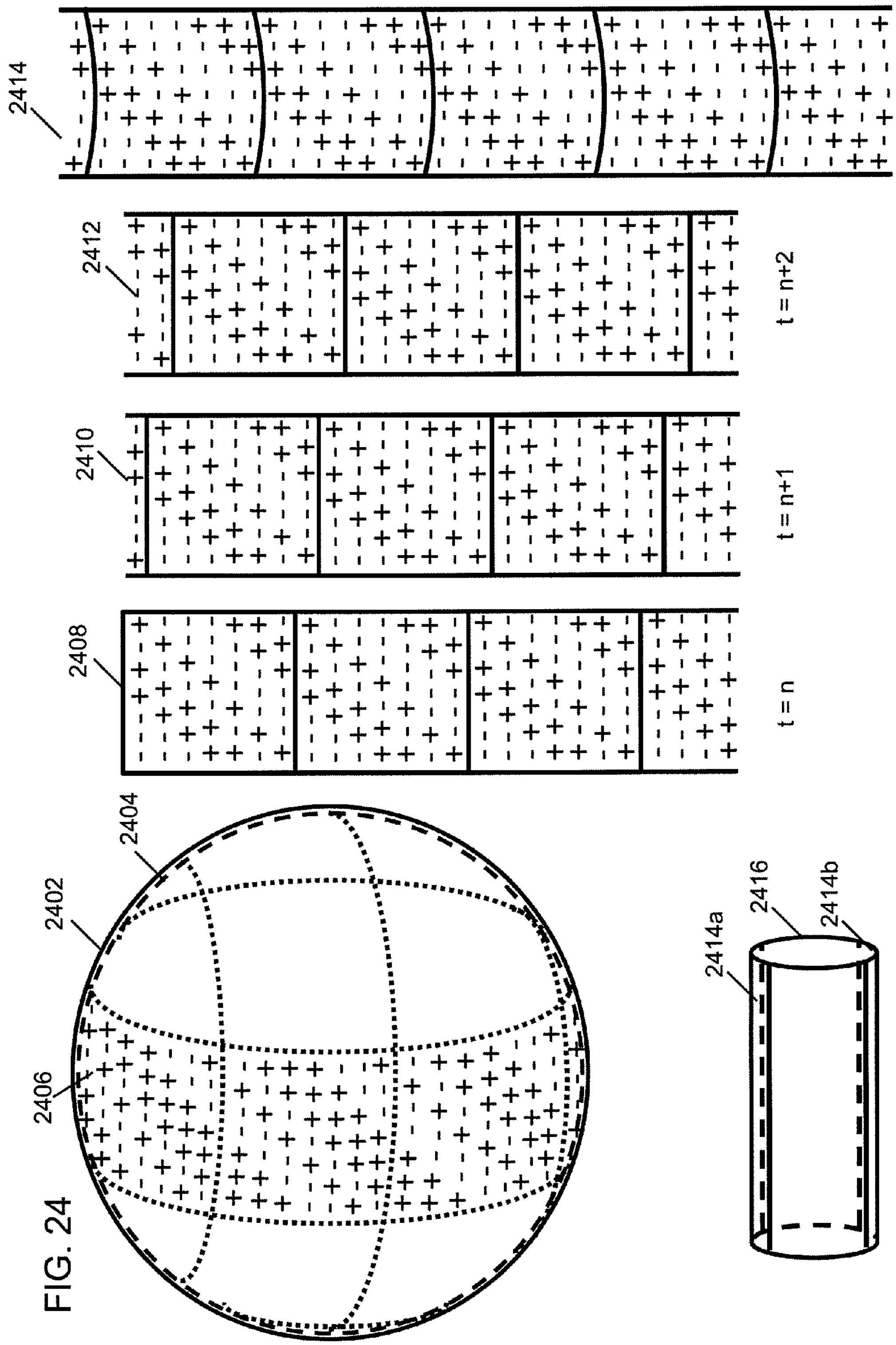
FIG. 24 depicts a sphere inside another sphere where either sphere can be moved relative to the other sphere by varying the state of individual electromagnets of an electromagnetic array associated with one sphere relative to a magnetic field emission structure associated with the other sphere.

FIGS. 22-24 depict uses of arrays of electromagnets used to produce a magnetic field emission structure that is moved in time relative to a second magnetic field emission structure associated with an object thereby causing the object to move.

FIG. 22 depicts a table 2202 having a two-dimensional electromagnetic array 2204 beneath its surface as seen via a cutout. On the table 2202 is a movement platform 2206 comprising at least one table contact member 2208. The movement platform 2206 is shown having four table contact members 2208 each having a magnetic field emission structure 1802*b* that would be attracted by the electromagnet array 2204. Computerized control of the states of individual electromagnets of the electromagnet array 2204 determines whether they are on or off and determines their polarity. A first example 2210 depicts states of the electromagnetic array 2204 configured to cause one of the table contact members 2208 to attract to a subset of the electromagnets corresponding to the magnetic field emission structure 1802*a*. A second example 2212 depicts different states of the electromagnetic array 2204 configured to cause the table contact member 2208 to be attracted (i.e., move) to a different subset of the electromagnetic corresponding to the magnetic field emission structure 1802*a*. Per the two examples, one skilled in the art can recognize that the table contact member(s) can be moved about table 2202 by varying the states of the electromagnets of the electromagnetic array 2204.

FIG. 23 depicts a first cylinder 2302 slightly larger than a second cylinder 2304 contained inside the first cylinder 2302. A magnetic field emission structure 2306 is placed around the first cylinder 2302 (or optionally around the second cylinder 2304). An array of electromagnets (not shown) is associated with the second cylinder 2304 (or optionally the first cylinder 2302) and their states are controlled to create a moving mirror image magnetic field emission structure to which the magnetic field emission structure 2306 is attracted so as to cause the first cylinder 2302 (or optionally the second cylinder 2304) to rotate relative to the second cylinder 2304 (or optionally the first cylinder 2302). The magnetic field emission structures 2308, 2310, and 2312 produced by the electromagnetic array at time t=n, t=n+1, and t=n+2, show a pattern mirroring that of the magnetic field emission structure 2306 around the first cylinder 2302. (Note: The mirror image notation employed for structures 2308, 2310, and 2310 is the same as previously used for FIG. 14*a* and in several other figures.) The pattern is shown moving downward in time so as to cause the first cylinder 2302 to rotate counterclockwise. As such, the speed and direction of movement of the first cylinder 2302 (or the second cylinder 2304) can be controlled via state changes of the electromagnets making up the electromagnetic array. Also depicted in FIG. 23 is a electromagnetic array 2314 that corresponds to a track that can be placed on a surface such that a moving mirror image magnetic field emission structure can be used to move the first cylinder 2302 backward or forward on the track using the same code shift approach shown with magnetic field emission structures 2308, 2310, and 2312.

FIG. 24 depicts a first sphere 2402 slightly larger than a second sphere 2404 contained inside the first sphere 2402. A magnetic field emission structure 2406 is placed around the first sphere 2402 (or optionally around the second sphere 2404). An array of electromagnets (not shown) is associated with the second sphere 2404 (or optionally the first sphere 2402) and their states are controlled to create a moving mirror image magnetic field emission structure to which the magnetic field emission structure 2406 is attracted so as to cause the first sphere 2402 (or optionally the second sphere 2404) to rotate relative to the second sphere 2404 (or optionally the first sphere 2402). The magnetic field emission structures 2408, 2410, and 2412 produced by the electromagnetic array at time t=n, t=n+1, and t=n+2, show a pattern mirroring that of the magnetic field emission structure 2406 around the first sphere 2402. (Note: The notation for a mirror image employed is the same as with FIG. 14*a* and other figures). The pattern is shown moving downward in time so as to cause the first sphere 2402 to rotate counterclockwise and forward. As such, the speed and direction of movement of the first sphere 2402 (or the second sphere 2404) can be controlled via state changes of the electromagnets making up the electromagnetic array. Also note that the electromagnets and/or magnetic field emission structure could extend so as to completely cover the surface(s) of the first and/or second spheres 2402, 2404 such that the movement of the first sphere 2402 (or second sphere 2404) can be controlled in multiple directions along multiple axes. Also depicted in FIG. 24 is an electromagnetic array 2414 that corresponds to a track that can be placed on a surface such that moving magnetic field emission structure can be used to move first sphere 2402 backward or forward on the track using the same code shift approach shown with magnetic field emission structures 2408, 2410, and 2412. A cylinder 2416 is shown having a first electromagnetic array 2414*a* and a second electromagnetic array 2414*b* which would control magnetic field emission structures to cause sphere 2402 to move backward or forward in the cylinder.

Figure 25:
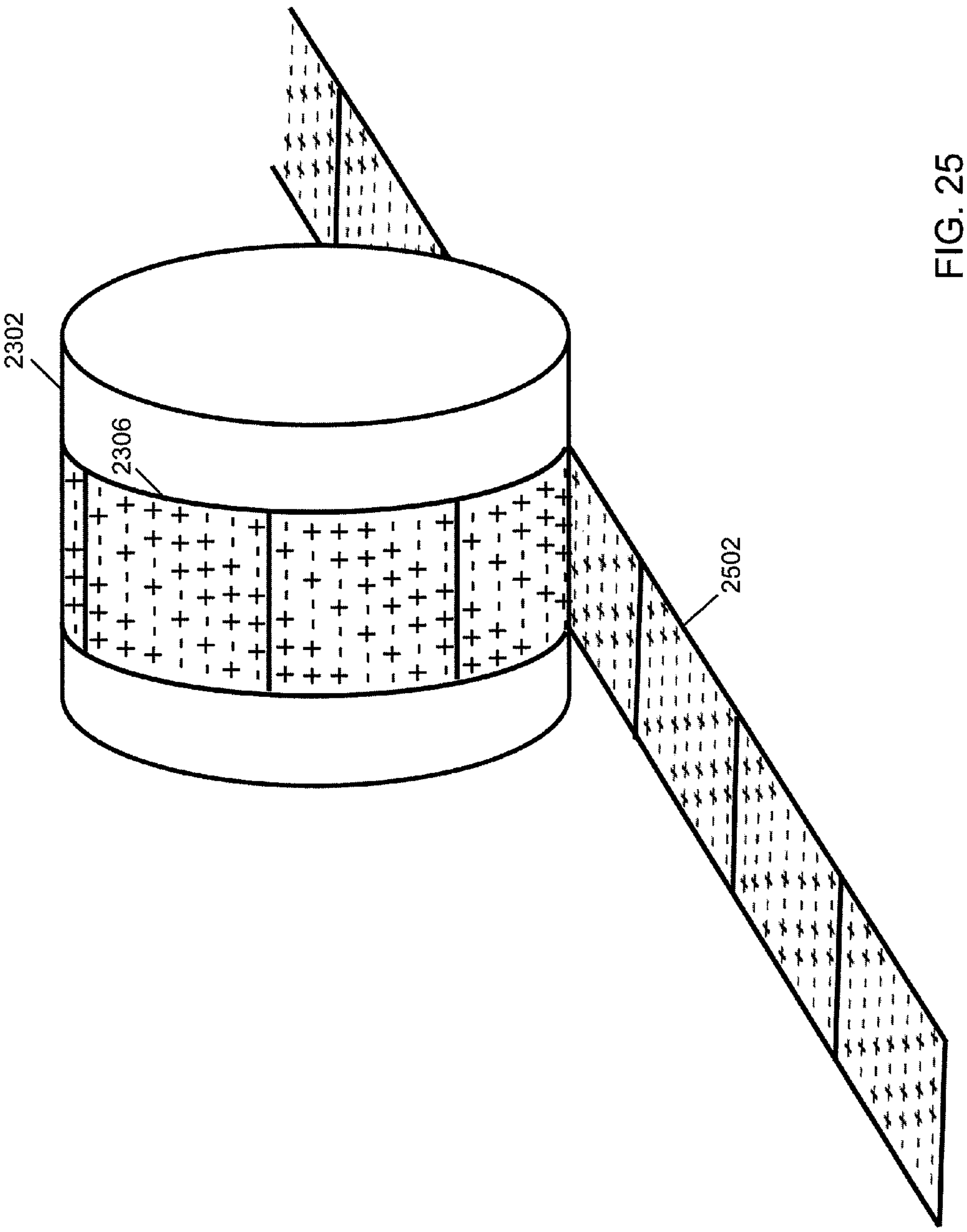
FIG. 25 depicts an exemplary cylinder having a magnetic field emission structure and a correlated surface where the magnetic field emission structure and the correlated surface provide traction and a gripping force as the cylinder is turned.
Figure 26:
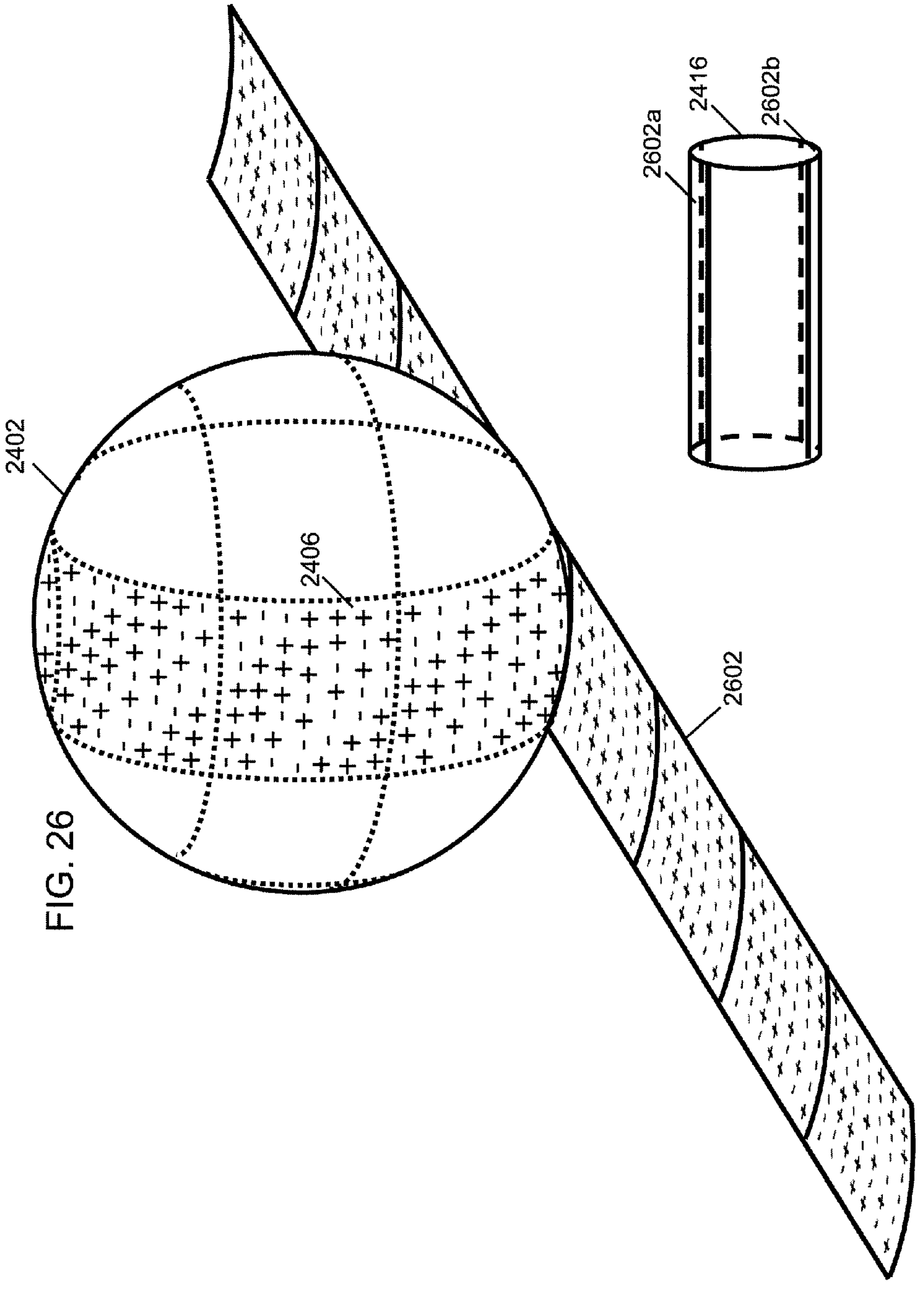
FIG. 26 depicts an exemplary sphere having a magnetic field emission structure and a correlated surface where the magnetic field emission structure and the correlated surface provide traction and a gripping force as the sphere is turned.

FIGS. 25-27 depict a correlating surface being wrapped back on itself to form either a cylinder (disc, wheel), a sphere, and a conveyor belt/tracked structure that when moved relative to a mirror image correlating surface will achieve strong traction and a holding (or gripping) force. Any of these rotary devices can also be operated against other rotary correlating surfaces to provide gear-like operation. Since the hold-down force equals the traction force, these gears can be loosely connected and still give positive, non-slipping rotational accuracy. Correlated surfaces can be perfectly smooth and still provide positive, non-slip traction. As such, they can be made of any substance including hard plastic, glass, stainless steel or tungsten carbide. In contrast to legacy friction-based wheels the traction force provided by correlated surfaces is independent of the friction forces between the traction wheel and the traction surface and can be employed with low friction surfaces. Devices moving about based on magnetic traction can be operated independently of gravity for example in weightless conditions including space, underwater, vertical surfaces and even upside down.

If the surface in contact with the cylinder is in the form of a belt, then the traction force can be made very strong and still be non-slipping and independent of belt tension. It can replace, for example, toothed, flexible belts that are used when absolutely no slippage is permitted. In a more complex application the moving belt can also be the correlating surface for self-mobile devices that employ correlating wheels. If the conveyer belt is mounted on a movable vehicle in the manner of tank treads then it can provide formidable traction to a correlating surface or to any of the other rotating surfaces described here.

FIG. 25 depicts an alternative approach to that shown in FIG. 23. In FIG. 25 a cylinder 2302 having a first magnetic field emission structure 2306 and being turned clockwise or counter-clockwise by some force will roll along a second magnetic field emission structure 2502 having mirror coding as the first magnetic field emission structure 2306. Thus, whereas in FIG. 23, an electromagnetic array was shifted in time to cause forward or backward movement, the fixed magnetic field emission structure 2502 values provide traction and a gripping (i.e., holding) force as cylinder 2302 is turned by another mechanism (e.g., a motor). The gripping force would remain substantially constant as the cylinder moved down the track independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures. The approach of FIG. 25 can also be combined with the approach of FIG. 23 whereby a first cylinder having an electromagnetic array is used to turn a second cylinder having a magnetic field emission structure that also achieves traction and a holding force with a mirror image magnetic field emission structure corresponding to a track.

FIG. 26 depicts an alternative approach to that shown in FIG. 24. In FIG. 26 a sphere 2402 having a first magnetic field emission structure 2406 and being turned clockwise or counter-clockwise by some force will roll along a second magnetic field emission structure 2602 having mirror coding as the first magnetic field emission structure 2406. Thus, whereas in FIG. 24, an electromagnetic array was shifted in time to cause forward or backward movement, the fixed second magnetic field emission structure 2602 values provide traction and a gripping (i.e., holding) force as sphere 2402 is turned by another mechanism (e.g., a motor). The gripping force would remain substantially constant as the sphere 2402 moved down the track independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures. A cylinder 2416 is shown having a first magnetic field emission structure 2602*a* and second magnetic field emission structure 2602*b* which have mirror coding as magnetic field emission structure 2406. As such they work together to provide a gripping force causing sphere 2402 to move backward or forward in the cylinder 2416 with precision alignment.

Figures 27A, 27B:
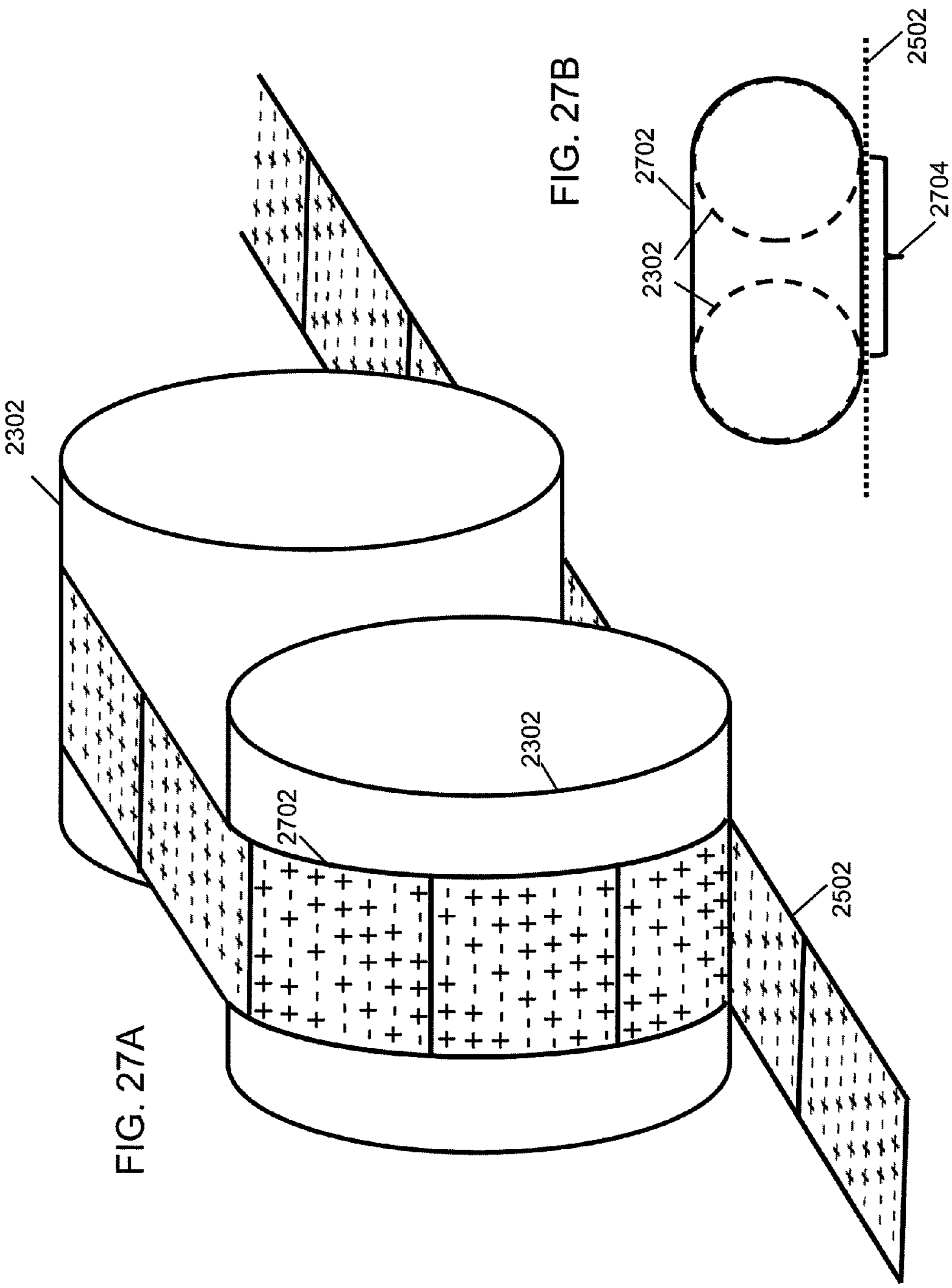
FIGS. 27A and 27B depict an arrangement where a magnetic field emission structure wraps around two cylinders such that a much larger portion of the magnetic field emission structure is in contact with a correlated surface to provide additional traction and gripping force.

FIG. 27A and FIG. 27B depict an arrangement where a first magnetic field emission structure 2702 wraps around two cylinders 2302 such that a much larger portion 2704 of the first magnetic field emission structure is in contact with a second magnetic field emission structure 2502 having mirror coding as the first magnetic field emission structure 2702. As such, the larger portion 2704 directly corresponds to a larger gripping force.

An alternative approach for using a correlating surface is to have a magnetic field emission structure on an object (e.g, an athlete's or astronaut's shoe) that is intended to partially correlate with the correlating surface regardless of how the surface and the magnetic field emission structure are aligned. Essentially, correlation areas would be randomly placed such the object (shoe) would achieve partial correlation (gripping force) as it comes randomly in contact with the surface. For example, a runner on a track wearing shoes having a magnetic field emission structure with partial correlation encoding could receive some traction from the partial correlations that would occur as the runner was running on a correlated track.

Figure 28B:
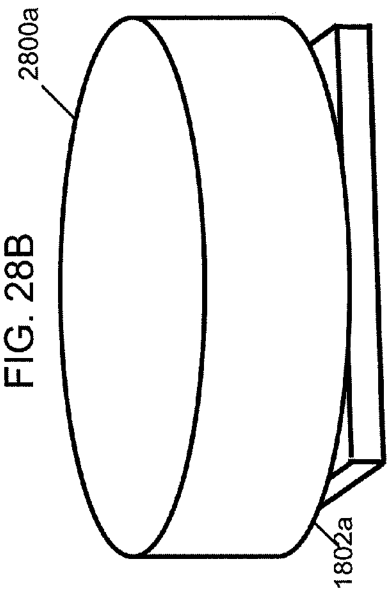
FIGS. 28A through 28D depict an exemplary method of manufacturing magnetic field emission structures using a ferromagnetic material.
Figure 28D:
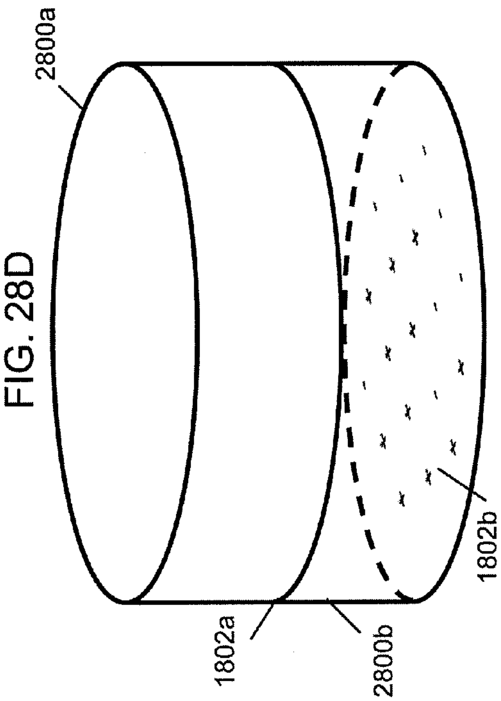
Figure 28A:
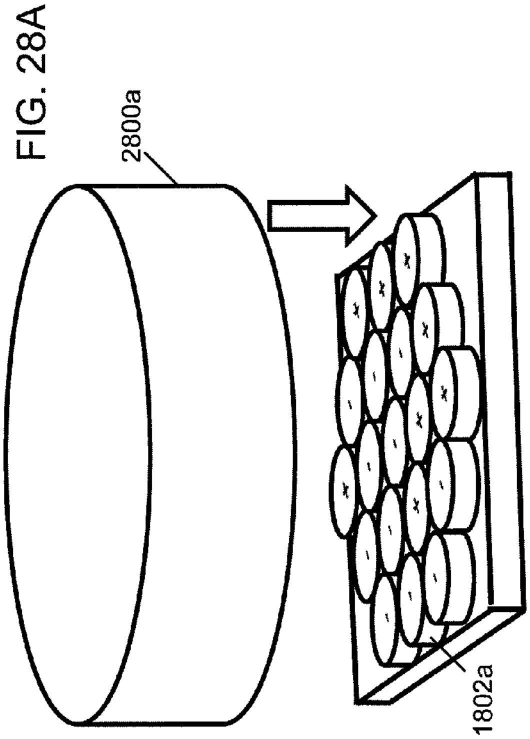
Figure 28C:
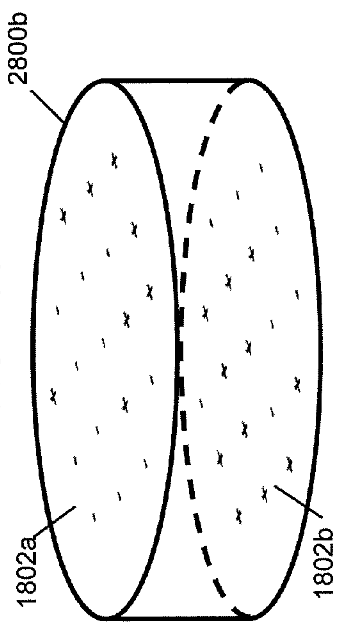

FIGS. 28A through 28D depict a manufacturing method for producing magnetic field emission structures. In FIG. 28A, a first magnetic field emission structure 1802*a* comprising an array of individual magnets is shown below a ferromagnetic material 2800*a* (e.g., iron) that is to become a second magnetic field emission structure having the same coding as the first magnetic field emission structure 1802*a*. In FIG. 28B, the ferromagnetic material 2800*a* has been heated to its Curie temperature (for antiferromagnetic materials this would instead be the Neel temperature). The ferromagnetic material 2800*a* is then brought in contact with the first magnetic field emission structure 1802*a* and allowed to cool. Thereafter, the ferromagnetic material 2800*a* takes on the same magnetic field emission structure properties of the first magnetic field emission structure 1802*a* and becomes a magnetized ferromagnetic material 2800*b*, which is itself a magnetic field emission structure, as shown in FIG. 28C. As depicted in FIG. 28D, should another ferromagnetic material 2800*a* be heated to its Curie temperature and then brought in contact with the magnetized ferromagnetic material 2800*b*, it too will take on the magnetic field emission structure properties of the magnetized ferromagnetic material 2800*b* as previously shown in FIG. 28C.

An alternative method of manufacturing a magnetic field emission structure from a ferromagnetic material would be to use one or more lasers to selectively heat up field emission source locations on the ferromagnetic material to the Curie temperature and then subject the locations to a magnetic field. With this approach, the magnetic field to which a heated field emission source location may be subjected may have a constant polarity or have a polarity varied in time so as to code the respective source locations as they are heated and cooled.

To produce superconductive magnet field structures, a correlated magnetic field emission structure would be frozen into a super conductive material without current present when it is cooled below its critical temperature.

Figure 29:
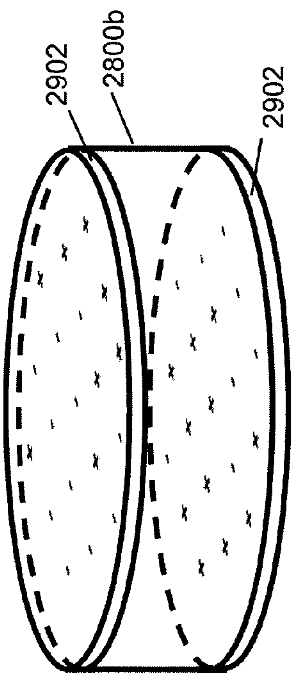
FIG. 29 depicts exemplary intermediate layers associated with a magnetic field emission structure.

FIG. 29 depicts the addition of two intermediate layers 2902 to a magnetic field emission structure 2800*b*. Each intermediate layer 2902 is intended to smooth out (or suppress) spatial forces when any two magnetic field emission structures are brought together such that sidelobe effects are substantially shielded. An intermediate layer 2902 can be active (i.e., saturable such as iron) or inactive (i.e., air or plastic).

Figure 30A:
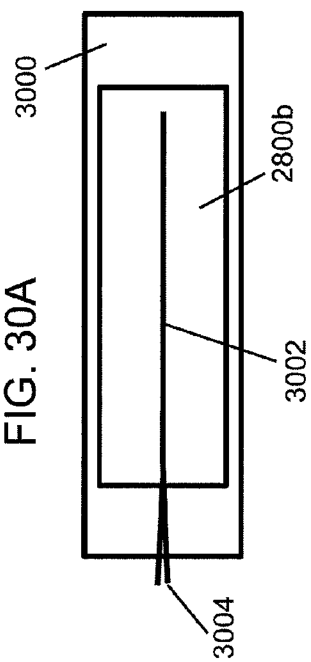
FIGS. 30A through 30C provide a side view, an oblique projection, and a top view of a magnetic field emission structure having surrounding heat sink material and an exemplary embedded kill mechanism.
Figure 30C:
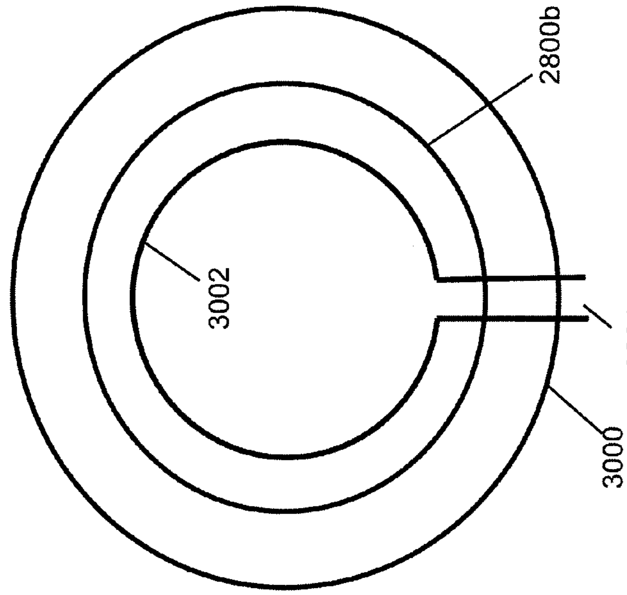
Figure 30B:
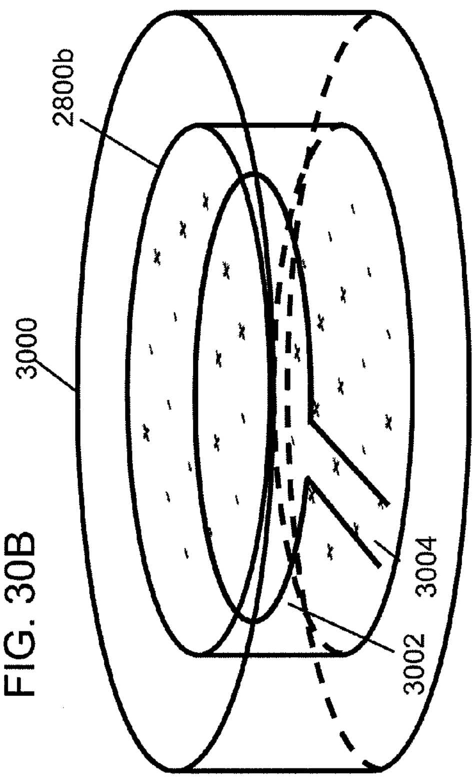

FIGS. 30A through 30C provide a side view, an oblique projection, and a top view, respectively, of a magnetic field emission structure 2800*b* having a surrounding heat sink material 3000 and an embedded kill mechanism comprising an embedded wire (e.g., nichrome) coil 3002 having connector leads 3004. As such, if heat is applied from outside the magnetic field emission structure 2800*b*, the heat sink material 3000 prevents magnets of the magnetic field emission structure from reaching their Curie temperature. However, should it be desirable to kill the magnetic field emission structure, a current can be applied to connector leads 3004 to cause the wire coil 3002 to heat up to the Curie temperature. Generally, various types of heat sink and/or kill mechanisms can be employed to enable control over whether a given magnetic field emission structure is subjected to heat at or above the Curie temperature. For example, instead of embedding a wire coil, a nichrome wire might be plated onto individual magnets.

Figure 31A:
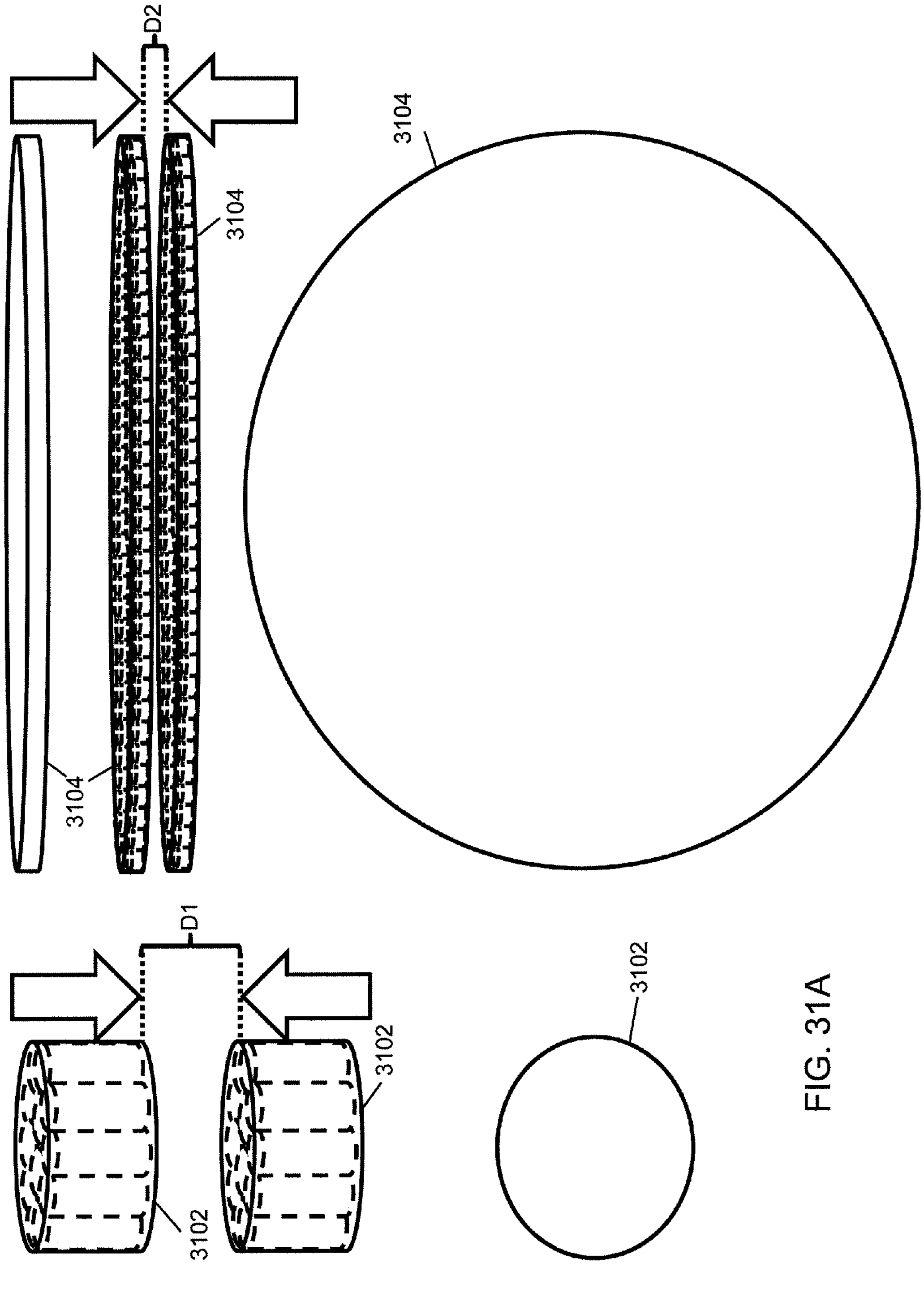
FIG. 31A depicts exemplary distribution of magnetic forces over a wider area to control the distance apart at which two magnetic field emission structures will engage when substantially aligned.

FIG. 31A depicts an oblique projection of a first pair of magnetic field emission structures 3102 and a second pair of magnetic field emission structures 3104 each having magnets indicated by dashed lines. Above the second pair of magnetic field emission structures 3104 (shown with magnets) is another magnetic field emission structure where the magnets are not shown, which is intended to provide clarity to the interpretation of the depiction of the two magnetic field emission structures 3104 below. Also shown are top views of the circumferences of the first and second pair of magnetic field emission structures 3102 and 3104. As shown, the first pair of magnetic field emission structures 3102 have a relatively small number of relatively large (and stronger) magnets when compared to the second pair of magnetic field emission structures 3104 that have a relatively large number of relatively small (and weaker) magnets. For this figure, the peak spatial force for each of the two pairs of magnetic field emission structures 3102 and 3104 are the same. However, the distances D1 and D2 at which the magnetic fields of each of the pairs of magnetic field emission structures 3102 and 3104 substantially interact (shown by up and down arrows) depends on the strength of the magnets and the area over which they are distributed. As such, the much larger surface of the second magnetic field emission structure 3104 having much smaller magnets will not substantially attract until much closer than that of first magnetic field emission structure 3102. This magnetic strength per unit area attribute as well as a magnetic spatial frequency (i.e., # magnetic reversals per unit area) can be used to design structures to meet safety requirements. For example, two magnetic field emission structures 3104 can be designed to not have significant attraction force if a finger is between them (or in other words the structures wouldn't have significant attraction force until they are substantially close together thereby reducing (if not preventing) the opportunity/likelihood for body parts or other things such as clothing getting caught in between the structures).

Figure 31B:
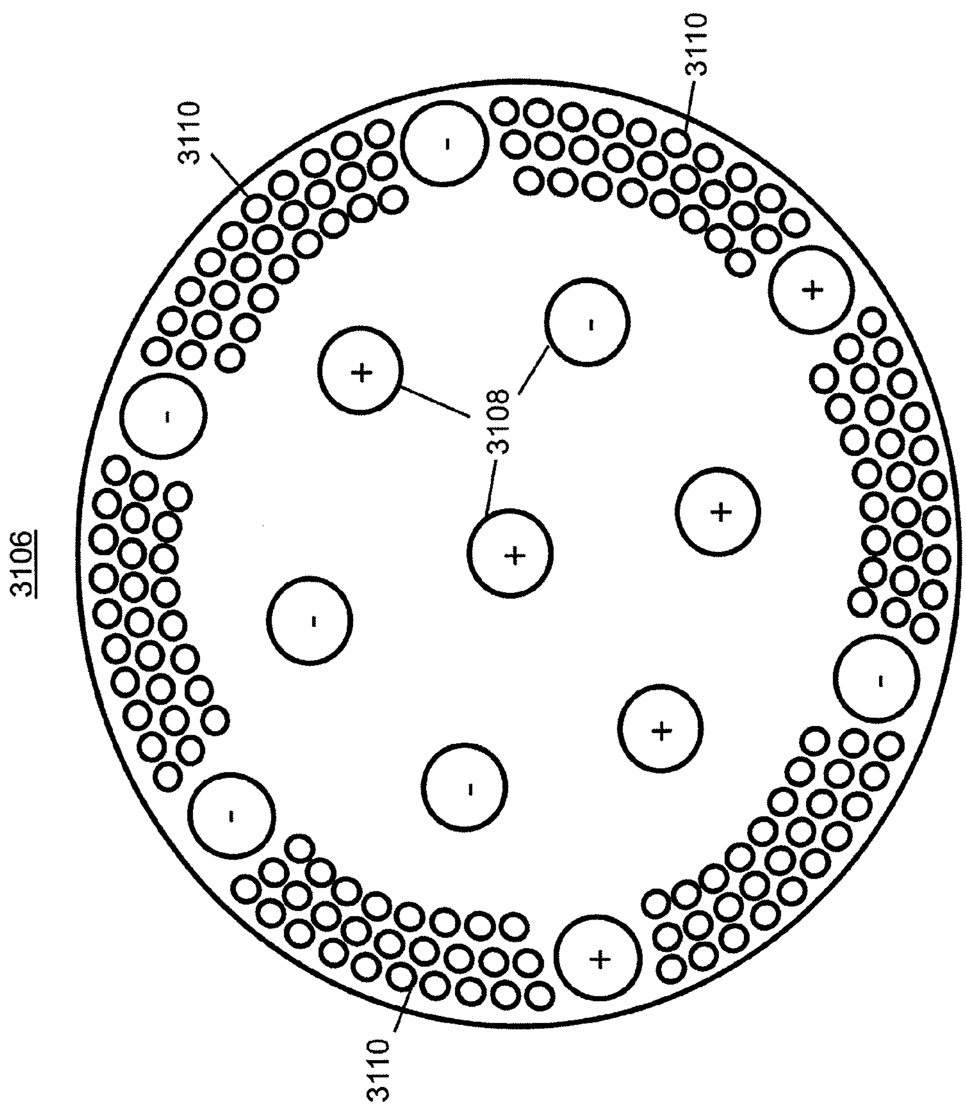
FIG. 31B depicts a magnetic field emission structure made up of a sparse array of large magnetic field sources combined with a large number of smaller magnetic field sources whereby alignment with a mirror magnetic field emission structure is provided by the large sources and a repel force is provided by the smaller sources.

FIG. 31B depicts a magnetic field emission structure 3106 made up of a sparse array of large magnetic field sources 3108 combined with a large number of smaller magnetic field sources 3110 whereby alignment with a mirror image magnetic field emission structure would be provided by the large sources and a repel force would be provided by the smaller sources. Generally, as was the case with FIG. 31*a*, the larger (i.e., stronger) magnets achieve a significant attraction force (or repelling force) at a greater separation distance than smaller magnets. Because of this characteristic, combinational structures having magnetic field sources of different strengths can be constructed that effectively have two (or more) spatial force functions corresponding to the different levels of magnetic strengths employed. As the magnetic field emission structures are brought closer together, the spatial force function of the strongest magnets is first to engage and the spatial force functions of the weaker magnets will engage when the magnetic field emission structures are moved close enough together at which the spatial force functions of the different sized magnets will combine. Referring back to FIG. 31B, the sparse array of stronger magnets 3108 is coded such that it can correlate with a mirror image sparse array of comparable magnets. However, the number and polarity of the smaller (i.e., weaker) magnets 3110 can be tailored such that when the two magnetic field emission structures are substantially close together, the magnetic force of the smaller magnets can overtake that of the larger magnets 3108 such that an equilibrium will be achieved at some distance between the two magnetic field emission structures. As such, alignment can be provided by the stronger magnets 3108 but contact of the two magnetic field emission structures can be prevented by the weaker magnets 3110. Similarly, the smaller, weaker magnets can be used to add extra attraction strength between the two magnetic field emission structures.

One skilled in the art will recognize that the all sorts of different combinations of magnets having different strengths can be oriented in various ways to achieve desired spatial forces as a function of orientation and separation distance between two magnetic field emission structures. For example, a similar aligned attract—repel equilibrium might be achieved by grouping the sparse array of larger magnets 3108 tightly together in the center of magnetic field emission structure 3106. Moreover, combinations of correlated and non-correlated magnets can be used together, for example, the weaker magnets 3110 of FIG. 31B may all be uncorrelated magnets. Furthermore, one skilled in the art will recognize that such an equilibrium enables frictionless traction (or hold) forces to be maintained and that such techniques could be employed for many of the exemplary drawings provided herein. For example, the magnetic field emission structures of the two spheres shown in FIG. 24 could be configured such that the spheres never come into direct contact, which could be used, for example, to produce frictionless ball joints.

Figure 32:
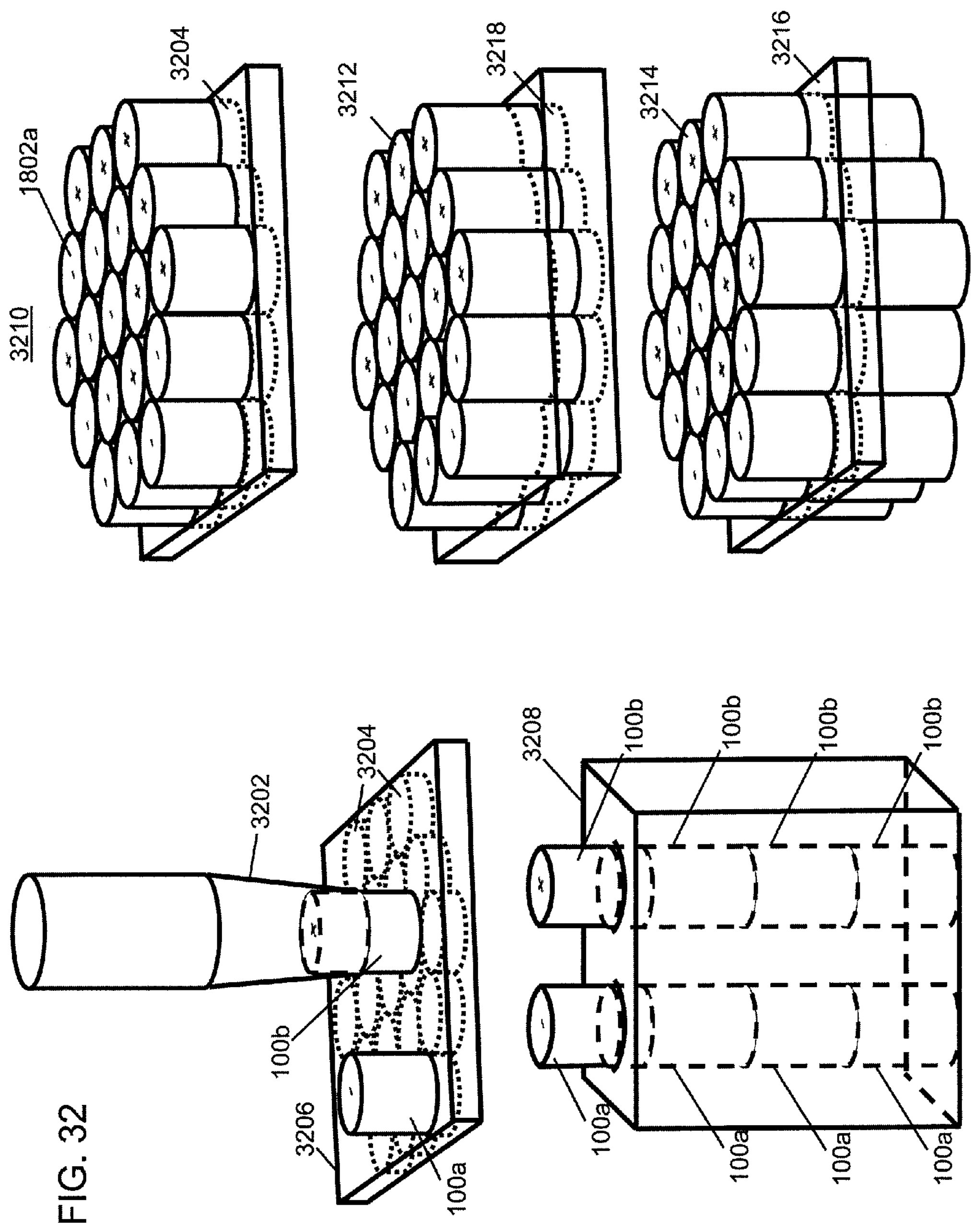
FIG. 32 depicts an exemplary magnetic field emission structure assembly apparatus.

FIG. 32 depicts an exemplary magnetic field emission structure assembly apparatus comprising one or more vacuum tweezers 3202 that are capable of placing magnets 100*a* and 100*b* having first and second polarities into machined holes 3204 in a support frame 3206. Magnets 100*a* and 100*b* are taken from at least one magnet supplying device 3208 and inserted into holes 3204 of support frame 3206 in accordance with a desired code. Under one arrangement, two magnetic tweezers are employed with each being integrated with its own magnet supply device 3208 allowing the vacuum tweezers 3202 to only move to the next hole 3204 whereby a magnet is fed into vacuum tweezers 3202 from inside the device. Magnets 100*a* and 100*b* may be held in place in a support frame 3206 using an adhesive (e.g., a glue). Alternatively, holes 3204 and magnets 100*a* and 100*b* could have threads whereby vacuum tweezers 3202 or an alternative insertion tool would screw them into place. A completed magnetic field assembly 3210 is also depicted in FIG. 32. Under an alternative arrangement the vacuum tweezers would place more than one magnet into a frame 3206 at a time to include placing all magnets at one time. Under still another arrangement, an array of coded electromagnets 3212 is used to pick up and place at one time all the magnets 3214 to be placed into the frame 3206 where the magnets are provided by a magnet supplying device 3216 that resembles the completed magnetic field assembly 3210 such that magnets are fed into each supplying hole from beneath (as shown in 3208) and where the coded electromagnets attract the entire array of loose magnets. With this approach the array of electromagnets 3212 may be recessed such that there is a guide 3218 for each loose magnet as is the case with the bottom portion of the vacuum tweezers 3202. With this approach, an entire group of loose magnets can be inserted into a frame 3206 and when a previously applied sealant has dried sufficiently the array of electromagnets 3212 can be turned so as to release the now placed magnets. Under an alternative arrangement the magnetic field emission structure assembly apparatus would be put under pressure. Vacuum can also be used to hold magnets into a support frame 3206.

As described above, vacuum tweezers can be used to handle the magnets during automatic placement manufacturing. However, the force of vacuum, i.e. 14.7 psi, on such a small surface area may not be enough to compete with the magnetic force. If necessary, the whole manufacturing unit can be put under pressure. The force of a vacuum is a function of the pressure of the medium. If the workspace is pressurize to 300 psi (about 20 atmospheres) the force on a tweezer tip 1/16" across would be about 1 pound which depending on the magnetic strength of a magnet might be sufficient to compete with its magnetic force. Generally, the psi can be increased to whatever is needed to produce the holding force necessary to manipulate the magnets.

If the substrate that the magnets are placed in have tiny holes in the back then vacuum can also be used to hold them in place until the final process affixes them permanently with, for example, ultraviolet curing glue. Alternatively, the final process by involve heating the substrate to fuse them all together, or coating the whole face with a sealant and then wiping it clean (or leaving a thin film over the magnet faces) before curing. The vacuum gives time to manipulate the assembly while waiting for whatever adhesive or fixative is used.

Figure 33:
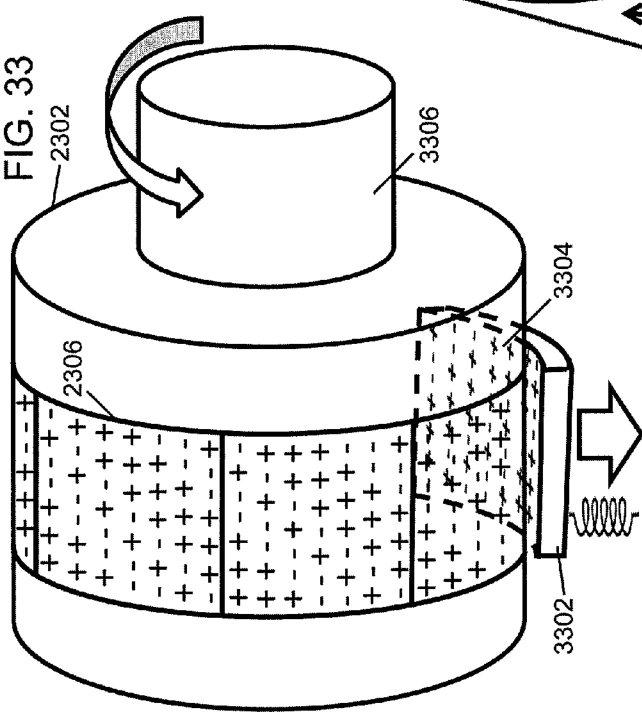
FIG. 33 depicts a turning cylinder having a repeating magnetic field emission structure used to affect movement of a curved surface having the same magnetic field emission structure coding.

FIG. 33 depicts a cylinder 2302 having a first magnetic field emission structure 2306 on the outside of the cylinder where the code pattern 1402*a* is repeated six times around the cylinder. Beneath the cylinder 2302 is an object 3302 having a curved surface with a slightly larger curvature as does the cylinder 2302 (such as the curvature of cylinder 2304) and having a second magnetic field emission structure 3304 that is also coded using the code pattern 1402*a*. The cylinder 2302 is turned at a rotational rate of 1 rotation per second by shaft 3306. Thus, as the cylinder 2302 turns, six times a second the code pattern 1402*a* of the first magnetic field emission structure 2306 of the cylinder 2302 aligns with the second magnetic field emission structure 3304 of the object 3302 causing the object 3302 to be repelled (i.e., moved downward) by the peak spatial force function of the two magnetic field emission structures 2306, 3304. Similarly, had the second magnetic field emission structure 3304 been coded using code pattern 1402*b*, then 6 times a second the code pattern 1402*a* of the first magnetic field emission structure 2306 of the cylinder 2302 aligns with the second magnetic field emission structure 3304 of the object 3302 causing the object 3302 to be attracted (i.e., moved upward) by the peak spatial force function of the two magnetic field emission structures. Thus, the movement of the cylinder 2302 and corresponding first magnetic field emission structure 2306 can be used to control the movement of the object 3302 having its corresponding second magnetic field emission structure 3304. Additional magnetic field emission structures and/or other devices capable of controlling movement (e.g., springs) can also be used to control movement of the object 3302 based upon the movement of the first magnetic field emission structure 2306 of the cylinder 2302. One skilled in the art will recognize that a shaft 3306 may be turned as a result of wind turning a windmill, a water wheel or turbine, ocean wave movement, and other methods whereby movement of the object 3302 can result from some source of energy scavenging. Another example of energy scavenging that could result in movement of object 3302 based on magnetic field emission structures is a wheel of a vehicle that would correspond to a cylinder 2302 where the shaft 3306 would correspond to the wheel axle. Generally, the present invention can be used in accordance with one or more movement path functions of one or more objects each associated with one or more magnetic field emission structures, where each movement path function defines the location and orientation over time of at least one of the one or more objects and thus the corresponding location and orientation over time of the one or more magnetic field emission structures associated with the one or more objects. Furthermore, the spatial force functions of the magnetic field emission structures can be controlled over time in accordance with such movement path functions as part of a process which may be controlled in an open-loop or closed-loop manner. For example, the location of a magnetic field emission structure produced using an electromagnetic array may be moved, the coding of such a magnetic field emission structure can be changed, the strengths of magnetic field sources can be varied, etc. As such, the present invention enables the spatial forces between objects to be precisely controlled in accordance with their movement and also enables movement of objects to be precisely controlled in accordance with such spatial forces.

Figure 34:
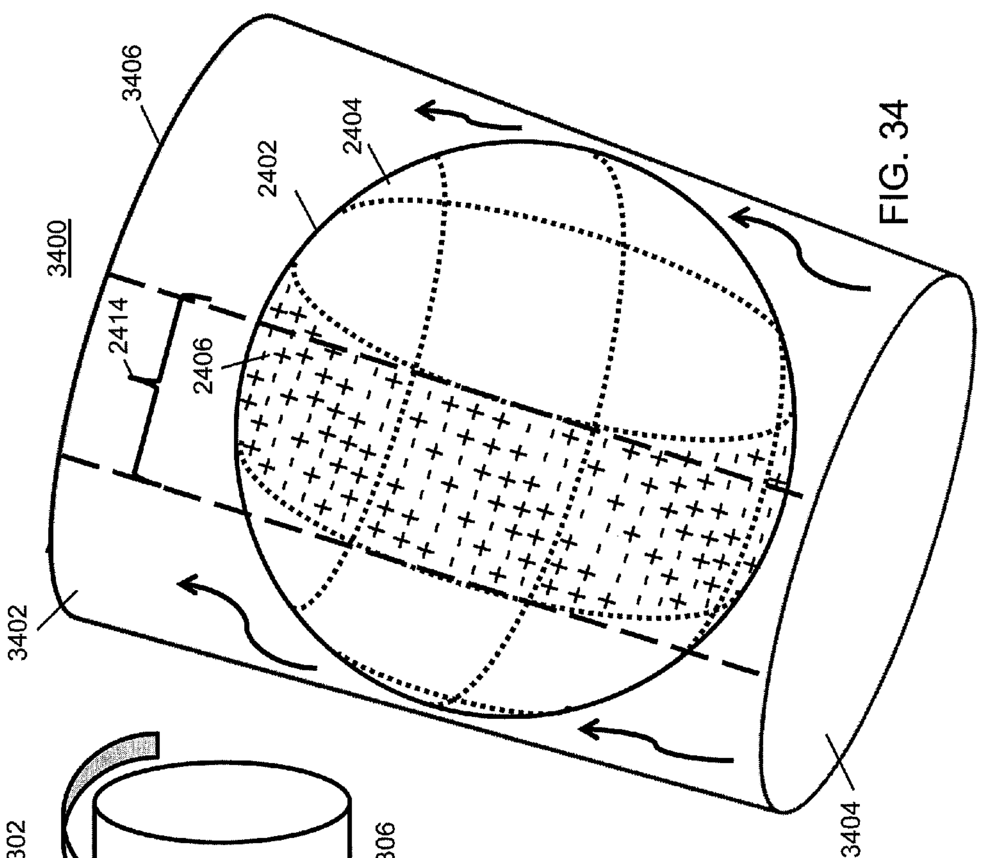
FIG. 34 depicts an exemplary valve mechanism.

FIG. 34 depicts a valve mechanism 3400 based upon the sphere of FIG. 24 where a magnetic field emission structure 2414 is varied to move the sphere 2402 upward or downward in a cylinder having a first opening 3404 having a circumference less than or equal to that of a sphere 2402 and a second opening 3406 having a circumference greater than the sphere 2402. As such, a magnetic field emission structure 2414 can be varied such as described in relation to FIG. 24 to control the movement of the sphere 2402 so as to control the flow rate of a gas or liquid through the valve 3402. Similarly, a valve mechanism 3400 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognized that many different types of seal mechanisms to include gaskets, o-rings, and the like can be employed with the present invention.

Figure 35:
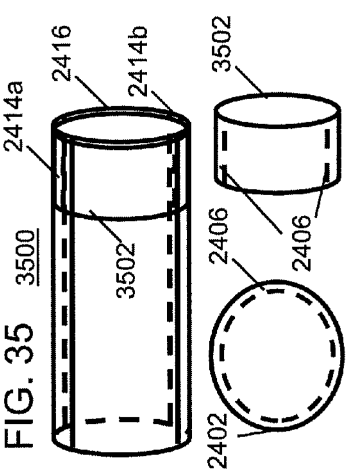
FIG. 35 depicts and exemplary cylinder apparatus.

FIG. 35 depicts a cylinder apparatus 3500 where a movable object such as sphere 2042 or closed cylinder 3502 having a first magnetic field emission structure 2406 is moved in a first direction or in second opposite direction in a cylinder 2416 having second magnetic field emission structure 2414*a* (and optionally 2414*b*). By sizing the movable object (e.g., a sphere or a closed cylinder) such that an effective seal is maintained in cylinder 2416, the cylinder apparatus 3500 can be used as a hydraulic cylinder, pneumatic cylinder, or gas cylinder. In a similar arrangement cylinder apparatus 3500 can be used as a pumping device.

As described herein, magnetic field emission structures can be produced with any desired arrangement of magnetic (or electric) field sources. Such sources may be placed against each other, placed in a sparse array, placed on top of, below, or within surfaces that may be flat or curved. Such sources may be in multiple layers (or planes), may have desired directionality characteristics, and so on. Generally, by varying polarities, positions, and field strengths of individual field sources over time, one skilled in the art can use the present invention to achieve numerous desired attributes. Such attributes include, for example:

Precision alignment, position control, and movement control

Non-wearing attachment

Repeatable and consistent behavior

Frictionless holding force/traction

Ease/speed/accuracy of assembly/disassembly

Increased architectural strength

Reduced training requirements

Increased safety

Increased reliability

Ability to control the range of force

Quantifiable, sustainable spatial forces (e.g., holding force, sealing force, etc.)

Increased maintainability/lifetime

Efficiency

Figures 36A, 36B, 36C, 36D, 36E, 36F, 36G, 36H:
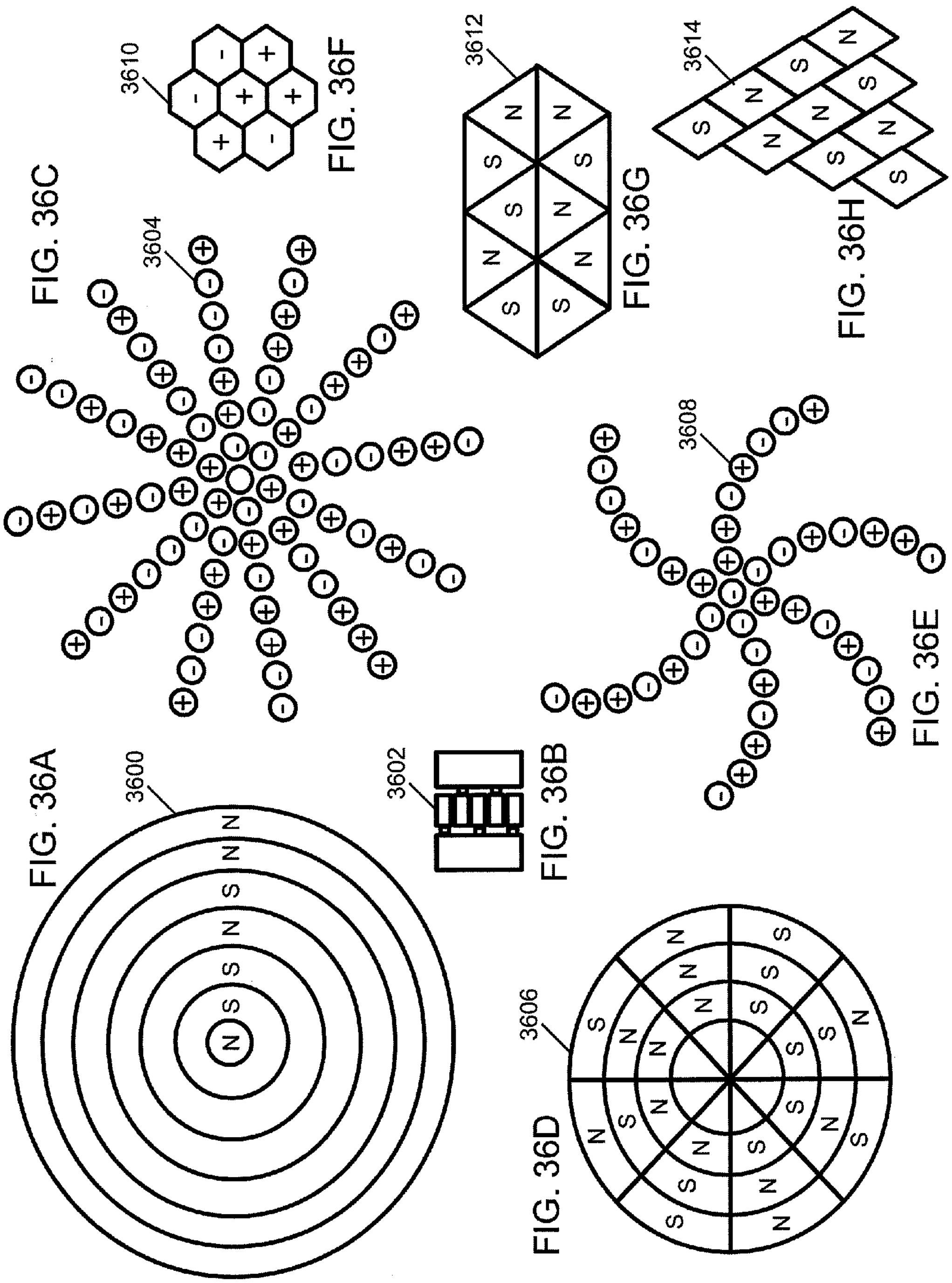
FIG. 36A depicts an exemplary magnetic field emission structure made up of rings about a circle.
FIG. 36B depicts and exemplary hinge produced using alternating magnetic field emission structures made up of rings about a circle such as depicted in FIG. 36A.
FIG. 36C depicts an exemplary magnetic field emission structure having sources resembling spokes of a wheel.
FIG. 36D depicts an exemplary magnetic field emission structure resembling a rotary encoder.
FIG. 36E depicts an exemplary magnetic field emission structure having sources arranged as curved spokes.
FIG. 36F depicts an exemplary magnetic field emission structure made up of hexagon-shaped sources.
FIG. 36G depicts an exemplary magnetic field emission structure made up of triangular sources.
FIG. 36H depicts an exemplary magnetic field emission structure made up of partially overlapped diamond-shaped sources.

FIGS. 36A through 36G provide a few more examples of how magnetic field sources can be arranged to achieve desirable spatial force function characteristics. FIG. 36A depicts an exemplary magnetic field emission structure 3600 made up of rings about a circle. As shown, each ring comprises one magnet having an identified polarity. Similar structures could be produced using multiple magnets in each ring, where each of the magnets in a given ring is the same polarity as the other magnets in the ring, or each ring could comprise correlated magnets. Generally, circular rings, whether single layer or multiple layer, and whether with or without spaces between the rings, can be used for electrical, fluid, and gas connectors, and other purposes where they could be configured to have a basic property such that the larger the ring, the harder it would be to twist the connector apart. As shown in FIG. 36B, one skilled in the art would recognize that a hinge 3602 could be constructed using alternating magnetic field emission structures attached two objects where the magnetic field emission structures would be interleaved so that they would align (i.e., effectively lock) but they would still pivot about an axes extending though their innermost circles. FIG. 36C depicts an exemplary magnetic field emission structure 3604 having sources resembling spokes of a wheel. FIG. 36D depicts an exemplary magnetic field emission structure 3606 resembling a rotary encoder where instead of on and off encoding, the sources are encoded such that their polarities vary. The use of a magnetic field emission structure in accordance with the present invention instead of on and off encoding should eliminate alignment problems of conventional rotary encoders.

FIG. 36E depicts an exemplary magnetic field emission structure having sources arranged as curved spokes. FIG. 36F depicts an exemplary magnetic field emission structure made up of hexagon-shaped sources. FIG. 36G depicts an exemplary magnetic field emission structure made up of triangular sources. FIG. 36H depicts an exemplary magnetic field emission structure made up of partially overlapped diamond-shaped sources. Generally, the sources making up a magnetic field emission structure can have any shape and multiple shapes can be used within a given magnetic field emission structure. Under one arrangement, one or more magnetic field emission structures correspond to a Fractal code.

Figure 37B:
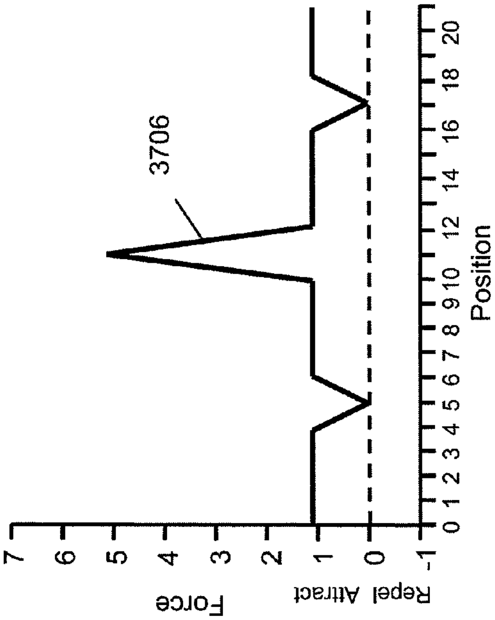
FIG. 37B depicts a spatial force function corresponding to the two magnet structures of FIG. 37A.
Figure 37A:
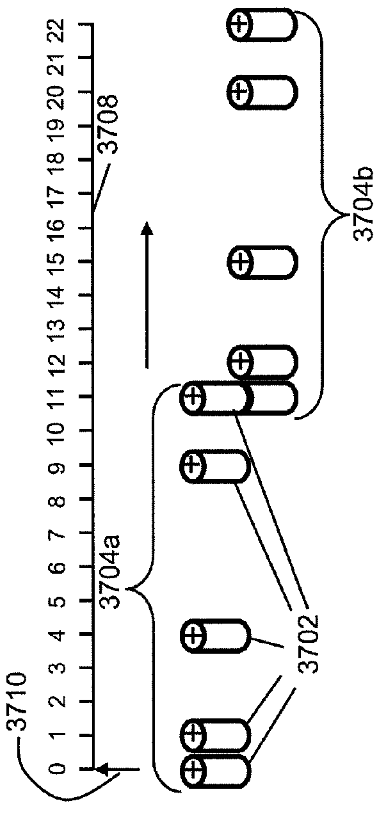
FIG. 37A depicts two magnet structures coded using a Golomb ruler code.

FIG. 37A and FIG. 37B show two magnet structures 3704*a*, 3704*b* coded using a Golomb ruler code. A Golomb ruler is a set of marks on a ruler such that no two marks are the same distance from any other two marks. Two identical Golomb rulers may be slid by one another with only one mark at a time aligning with the other ruler except at the sliding point where all marks align. Referring to FIG. 37A, magnets 3702 of structure 3704*a* are placed at positions 0, 1, 4, 9 and 11, where all magnets are oriented in the same polarity direction. Pointer 3710 indicates the position of cluster 3704*a* against scale 3708. The stationary base structure 3704*b* uses the same relative magnet positioning pattern shifted to begin at position 11.

FIG. 37B shows the normal (perpendicular) magnetic force 3706 as a function of the sliding position between the two structures 3704*a* and 3704*b* of FIG. 37A. Note that only one magnet pair lines up between the two structures for any sliding position except at position 5 and 17, where no magnet pairs line up, and at position 11, where all five magnet pairs line up. Because all magnets are in the same direction, the misaligned force value is 1, indicating attraction. Alternatively, some of the magnet polarities may be reversed according to a second code or pattern (with a complementary pattern on the complementary magnet structure) causing the misaligned force to alternate between 1 and −1, but not to exceed a magnitude of 1. The aligned force would remain at 5 if both magnet structures have the same polarity pattern. Table 5 shows a number of exemplary Golomb ruler codes. Golomb rulers of higher orders up to 24 can be found in the literature.

TABLE 5

| Golomb Ruler Codes | | |
|---|---|---|
| order | length | marks |
| 1 | 0 | 0 |
| 2 | 1 | 0 1 |
| 3 | 3 | 0 1 3 |
| 4 | 6 | 0 1 4 6 |
| 5 | 11 | 0 1 4 9 11 |
| | | 0 2 7 8 11 |
| 6 | 17 | 0 1 4 10 12 17 |
| | | 0 1 4 10 15 17 |
| | | 0 1 8 11 13 17 |
| | | 0 1 8 12 14 17 |
| 7 | 25 | 0 1 4 10 18 23 25 |
| | | 0 1 7 11 20 23 25 |
| | | 0 1 11 16 19 23 25 |
| | | 0 2 3 10 16 21 25 |
| | | 0 2 7 13 21 22 25 |

Golomb ruler codes offer a force ratio according to the order of the code, e.g., for the order 5 code of FIG. 37A, the aligned force to the highest misaligned force is 5:1. Where the magnets are of differing polarities, the ratio may be positive or negative, depending on the shift value.

Costas arrays are one example of a known two dimensional code. Costas Arrays may be considered the two dimensional analog of the one dimensional Golomb rulers. Lists of known Costas arrays are available in the literature. In addition, Welch-Costas arrays may be generated using the Welch technique. Alternatively, Costas arrays may be generated using the Lempel-Golomb technique.

Figure 37C:
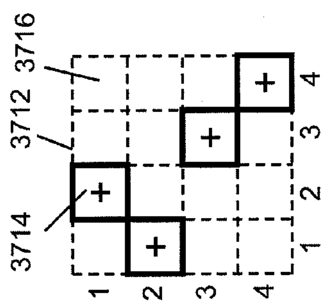
FIG. 37C depicts an exemplary Costas array.

FIG. 37C shows an exemplary Costas array. Referring to FIG. 37C, the grid 3712 shows coordinate positions. The "+" 3714 indicates a location containing a magnet, blank 3716 in a grid location indicates no magnet. Each column contains a single magnet, thus the array of FIG. 37*c* may be specified as {2,1,3,4}, specifying the row number in each successive column that contains a magnet. Additional known arrays up to order 5 (five magnets in a 5×5 grid) are as follows, where N is the order:

N=1

{1}

N=2

{1,2} {2,1}

N=3

{1,3,2} {2,1,3} {2,3,1} {3,1,2}

N=4

{1,2,4,3} {1,3,4,2} {1,4,2,3} {2,1,3,4} {2,3,1,4} {2,4,3,1} {3,1,2,4} {3,2,4,1} {3,4,2,1} {4,1,3,2} {4,2,1,3} {4,3,1,2}

N=5

{1,3,4,2,5} {1,4,2,3,5} {1,4,3,5,2} {1,4,5,3,2} {1,5,3,2,4} {1,5,4,2,3} {2,1,4,5,3} {2,1,5,3,4} {2,3,1,5,4} {2,3,5,1,4} {2,3,5,4,1} {2,4,1,5,3} {2,4,3,1,5} {2,5,1,3,4} {2,5,3,4,1} {2,5,4,1,3} {3,1,2,5,4} {3,1,4,5,2} {3,1,5,2,4} {3,2,4,5,1} {3,4,2,1,5} {3,5,1,4,2} {3,5,2,1,4} {3,5,4,1,2} {4,1,2,5,3} {4,1,3,2,5} {4,1,5,3,2} {4,2,3,5,1} {4,2,5,1,3} {4,3,1,2,5} {4,3,1,5,2} {4,3,5,1,2} {4,5,1,3,2} {4,5,2,1,3} {5,1,2,4,3} {5,1,3,4,2} {5,2,1,3,4} {5,2,3,1,4} {5,2,4,3,1} {5,3,2,4,1}

Additional Costas arrays may be formed by flipping the array (reversing the order) vertically for a first additional array and by flipping horizontally for a second additional array and by transposing (exchanging row and column numbers) for a third additional array. Costas array magnet structures may be further modified by reversing or not reversing the polarity of each successive magnet according to a second code or pattern as previously described with respect to Golomb ruler codes.

Additional codes including polarity codes, ruler or spacing codes or combinations of ruler and polarity codes of one or two dimensions may be found by computer search. The computer search may be performed by randomly or pseudorandomly or otherwise generating candidate patterns, testing the properties of the patterns, and then selecting patterns that meet desired performance criteria. Exemplary performance criteria include, but are not limited to, peak force, maximum misaligned force, width of peak force function as measured at various offset displacements from the peak and as determined as a force ratio from the peak force, polarity of misaligned force, compactness of structure, performance of codes with sets of codes, or other criteria. The criteria may be applied differently for different degrees of freedom.

Additional codes may be found by using magnets having different magnetic field strengths (e.g., as measured in gauss). Normalized measurement methods may involve multiple strengths (e.g., 2, 3, 7, 12) or fractional strengths (e.g. ½, 1.7, 3.3).

In accordance with one embodiment, a desirable coded magnet structure generally has a non-regular pattern of magnet polarities and/or spacings. The non-regular pattern may include at least one adjacent pair of magnets with reversed polarities, e.g., +, −, or −, +, and at least one adjacent pair of magnets with the same polarities, e.g., +, + or −, −. Quite often code performance can be improved by having one or more additional adjacent magnet pairs with differing polarities or one or more additional adjacent magnet pairs with the same polarities. Alternatively, or in combination, the coded magnet structure may include magnets having at least two different spacings between adjacent magnets and may include additional different spacings between adjacent magnets. In some embodiments, the magnet structure may comprise regular or non-regular repeating subsets of non-regular patterns.

Figure 38E:
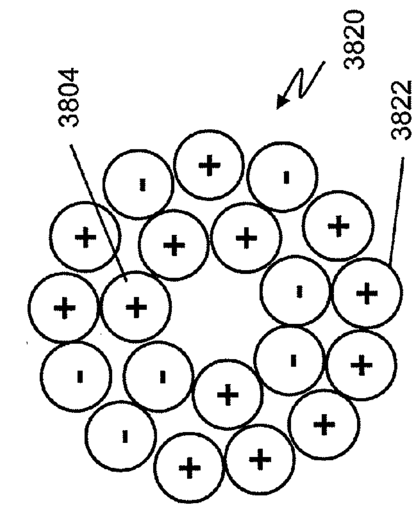
FIGS. 38A-38E illustrate exemplary ring magnet structures based on linear codes.
Figure 38D:
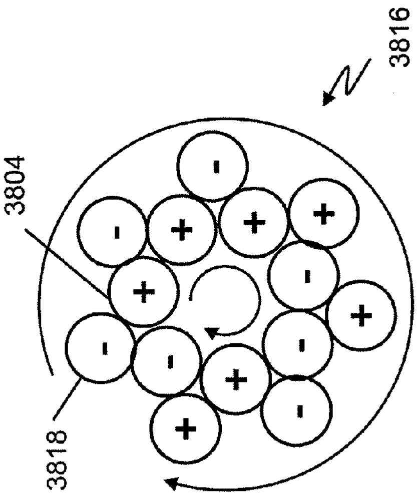
Figure 38B:
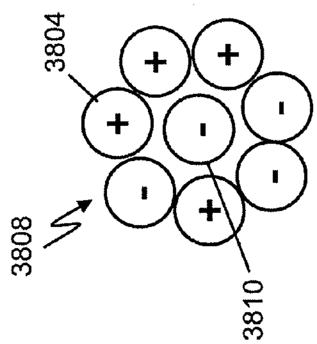
Figure 38A:
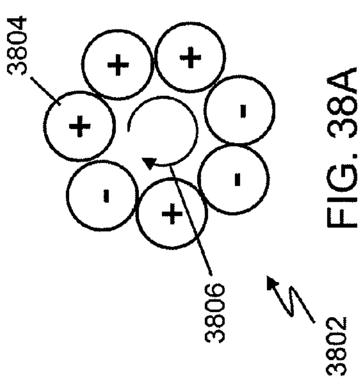

FIGS. 38A through 38E illustrate exemplary ring magnet structures based on linear codes. Referring to FIG. 38A, ring magnet structure 3802 comprises seven magnets arranged in a circular ring with the magnet axes perpendicular to the plane of the ring and the interface surface is parallel to the plane of the ring. The exemplary magnet polarity pattern or code shown in FIG. 38A is the Barker 7 code. One may observe the "+, +, +, −, −, +, −" pattern beginning with magnet 3804 and moving clockwise as indicated by arrow 3806. A further interesting feature of this configuration is that the pattern may be considered to then wrap on it and effectively repeat indefinitely as one continues around the circle multiple times. Thus, one could use cyclic linear codes arranged in a circle to achieve cyclic code performance for rotational motion around the ring axis. The Barker 7 base pattern shown would be paired with a complementary ring magnet structure placed on top of the magnet structure face shown. As the complementary ring magnet structure is rotated, the force pattern can be seen to be equivalent to that of FIG. 10 because the complementary magnet structure is always overlapping a head to tail Barker 7 cyclic code pattern.

FIG. 38B shows a magnet structure based on the ring code 3802 of FIG. 38A with an additional magnet in the center. Magnet structure 3808 has an even number of magnets. At least two features of interest are modified by the addition of the magnet 3810 in the center. For rotation about the ring axis, one may note that the center magnet pair (in the base and in the complementary structure) remains aligned for all rotations. Thus, the center magnet pair adds a constant attraction or repelling force. Such magnets are referred to herein as biasing magnet sources. When using such magnets, the graph of FIG. 10 would be shifted from a repelling force of −1 and attracting force of 7 to a repelling force of 0 and an attracting force of 8 such that the magnetic structures would yield a neutral force when not aligned. Note also that the central magnet pair may be any value, for example −3, yielding an equal magnitude repelling and attracting force of −4 and +4, respectively.

In a further alternative, a center magnet 3810 may be paired in the complementary structure with a non-magnetized, magnetic iron or steel piece. The center magnet would then provide attraction, no matter which polarity is chosen for the center magnet.

A second feature of the center magnet of FIG. 38B is that for a value of −1 as shown, the total number of magnets in the positive direction is equal to the total number of magnets in the negative direction. Thus, in the far field, the magnetic field approaches zero, minimizing disturbances to such things as magnetic compasses and the like.

Figure 38C:
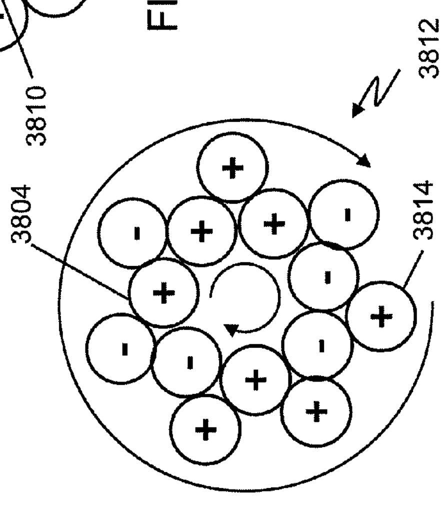

FIG. 38C illustrates two concentric rings, each based on a linear cyclic code, resulting in magnet structure 3812. An inner ring 3802 is as shown in FIG. 38A, beginning with magnet 3804. An outer ring is also a Barker 7 code beginning with magnet 3814. Beginning the outer ring on the opposite side as the inner ring keeps the plusses and minuses somewhat laterally balanced.

FIG. 38D illustrates the two concentric rings of FIG. 38C wherein the outer ring magnets are the opposite polarity of adjacent inner ring magnets resulting in magnet structure 3816. The inner ring Barker 7 begins with magnet 3804. The outer ring Barker 7 is a negative Barker 7 beginning with magnet 3818. Each outer ring magnet is the opposite of the immediate clockwise inner ring adjacent magnet. Since the far field magnetic field is cancelled in adjacent pairs, the field decays as rapidly as possible from the equal and opposite magnet configuration. More generally, linear codes may be constructed of opposite polarity pairs to minimize far field magnetic effects.

FIG. 38E illustrates a Barker 7 inner ring and Barker 13 outer ring. The Barker 7 begins with magnet 3804 and the Barker 13 begins with magnet 3822. The result is composite ring magnet structure 3820.

Although Barker codes are shown in FIGS. 38A through 38E, other codes may be uses as alternative codes or in combination with Barker codes, particularly in adjacent rings. Maximal Length PN codes or Kasami codes, for example, may form rings using a large number of magnets. One or two rings are shown, but any number of rings may be used. Although the ring structure and ring codes shown are particularly useful for rotational systems that are mechanically constrained to prevent lateral movement as may be provided by a central shaft or external sleeve, the rings may also be used where lateral position movement is permitted. It may be appreciated that a single ring, in particular, has only one or two points of intersection with another single ring when not aligned. Thus, non-aligned forces would be limited by this geometry in addition to code performance.

Figures 39A, 39B, 39C, 39D, 39E:
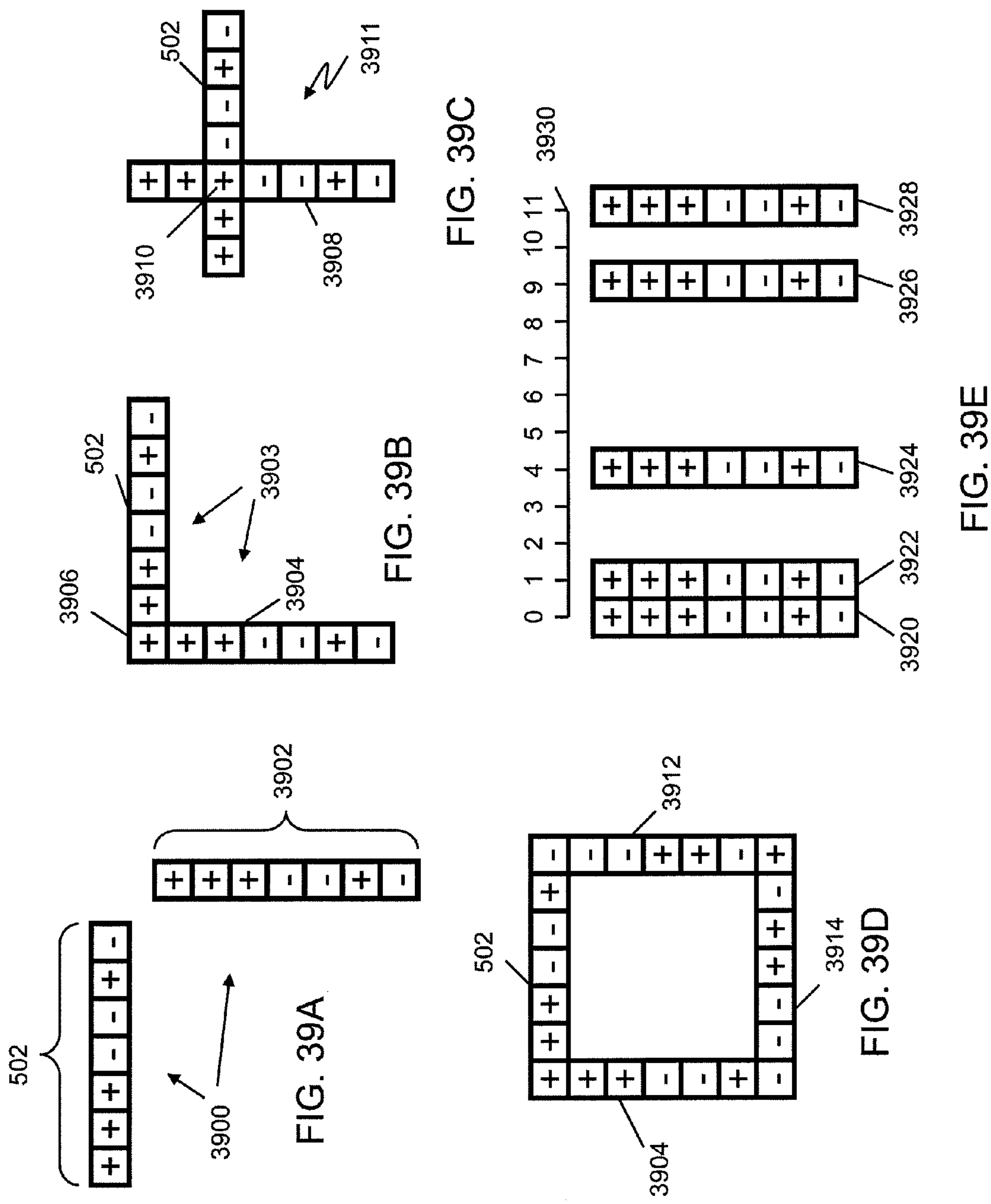
FIGS. 39A-39G depict exemplary embodiments of two dimensional coded magnet structures.

FIGS. 39A through 39G depict exemplary embodiments of two dimensional coded magnet structures. Referring to FIG. 39A, the exemplary magnet structure 3900 comprises two Barker coded magnet substructures 502 and 3902. Substructure 502 comprises magnets with polarities determined by a Barker 7 length code arranged horizontally (as viewed on the page). Substructure 3902 comprises magnets with polarities also determined by a Barker 7 length code, but arranged vertically (as viewed on the page) and separated from substructure 502. In use, structure 3900 is combined with a complementary structure of identical shape and complementary magnet polarity. It can be appreciated that the complementary structure would have an attracting (or repelling, depending on design) force of 14 magnet pairs when aligned. Upon shifting the complementary structure to the right one magnet width substructure 502 and the complementary portion would look like FIG. 5F and have a force of zero. Substructure 3902 would be shifted off to the side with no magnets overlapping producing a force of zero. Thus, the total from both substructures 502 and 3902 would be zero. As the complementary structure is continued to be shifted to the right, substructure 502 would generate alternately zero and −1. The resulting graph would look like FIG. 6 except that the peak would be 14 instead of 7. It can be further appreciated that similar results would be obtained for vertical shifts due to the symmetry of the structure 3900. Diagonal movements where the complementary structure for 3902 overlaps 502 can only intersect one magnet at a time. Thus, the peak two dimensional nonaligned force is 1 or −1. Adding rotational freedom can possibly line up 3902 with 502 for a force of 7, so the code of FIG. 39*a* performs best where rotation is limited.

FIG. 39B depicts a two dimensional coded magnet structure comprising two codes with a common end point component. Referring to FIG. 39B, the structure 3903 comprises structure 502 based on a Barker 7 code running horizontally and structure 3904 comprising six magnets that together with magnet 3906 form a Barker 7 code running vertically. Magnet 3906 being common to both Barker sequences. Performance can be appreciated to be similar to FIG. 39A except the peak is 13.

FIG. 39C depicts a two dimensional coded magnet structure comprising two one dimensional magnet structures with a common interior point component. The structure of FIG. 39C comprises structure 502 based on a Barker 7 code running horizontally and structure 3908 comprising six magnets that together with magnet 3910 form a Barker 7 code running vertically. Magnet 3910 being common to both Barker sequences. Performance can be appreciated to be similar to FIG. 39A except the peak is 13. In the case of FIG. 39C diagonal shifts can overlap two magnet pairs.

FIG. 39D depicts an exemplary two dimensional coded magnet structure based on a one dimensional code. Referring to FIG. 502, a square is formed with structure 502 on one side, structure 3904 on another side. The remaining sides 3912 and 3914 are completed using negative Barker 7 codes with common corner components. When paired with an attraction complementary structure, the maximum attraction is 24 when aligned and 2 when not aligned for lateral translations in any direction including diagonal. Further, the maximum repelling force is −7 when shifted laterally by the width of the square. Because the maximum magnitude non-aligned force is opposite to the maximum attraction, many applications can easily tolerate the relatively high value (compared with most non-aligned values of 0, ±1, or ±2) without confusion. For example, an object being placed in position using the magnet structure would not stick to the −7 location. The object would only stick to the +1, +2 or +24 positions, very weakly to the +1 or +2 positions and very strongly to the +24 position, which could easily be distinguished by the installer.

FIG. 39E illustrates a two dimensional code derived by using multiple magnet substructures based on a single dimension code placed at positions spaced according to a Golomb Ruler code. Referring to FIG. 39E, five magnet substructures 3920-3928 with polarities determined according to a Barker 7 code are spaced according to an order 5 Golomb ruler code at positions 0, 1, 4, 9, and 11 on scale 1930. The total force in full alignment is 35 magnet pairs. The maximum non-aligned force is seven when one of the Barker substructures lines up with another Barker 7 substructure due to a horizontal shift of the complementary code. A vertical shift can result in −5 magnet pairs. Diagonal shifts are a maximum of −1.

The exemplary structures of FIGS. 39A through 39E are shown using Barker 7 codes, the structures may instead use any one dimension code, for example, but not limited to random, pseudo random, LFSR, Kasami, Gold, or others and may mix codes for different legs. The codes may be run in either direction and may be used in the negative version (multiplied by −1.) Further, several structures are shown with legs at an angle of 90 degrees. Other angles may be used if desired, for example, but not limited to 60 degrees, 45 degrees, 30 degrees or other angles. Other configurations may be easily formed by one of ordinary skill in the art by replication, extension, substitution and other teachings herein.

Figure 39G:
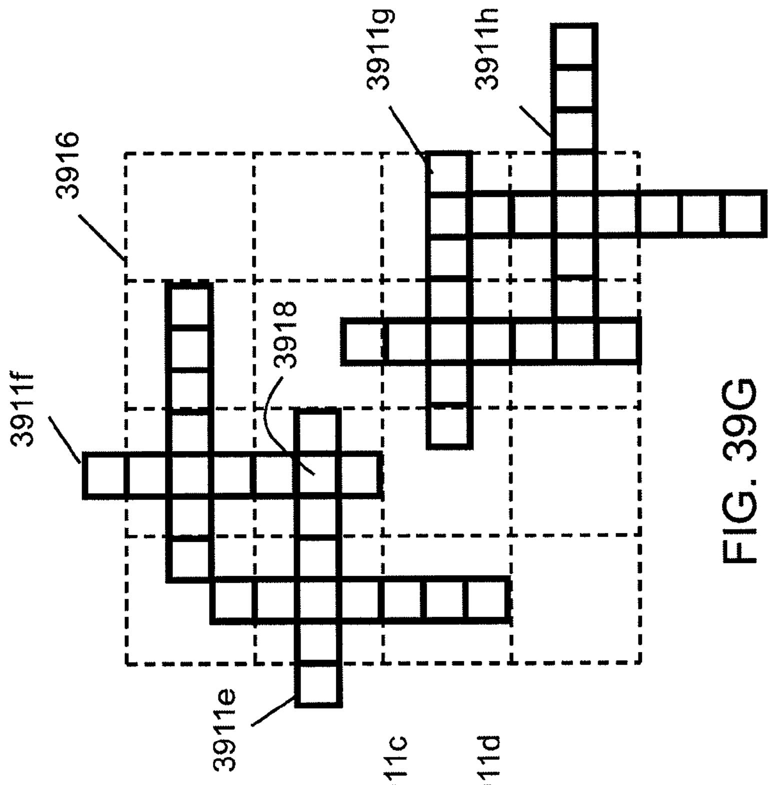
Figure 39F:
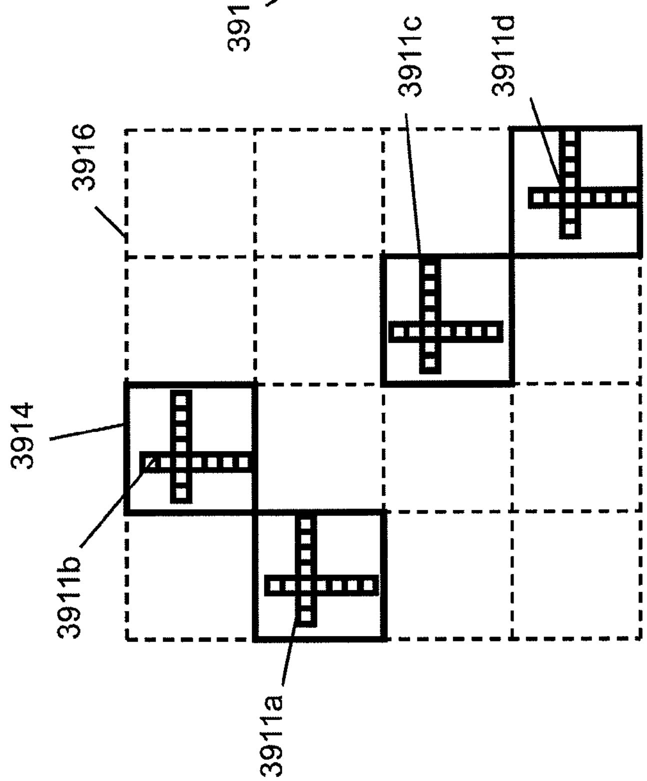

FIGS. 39F and 39G illustrate two dimensional magnet structures based on the two dimensional structures of FIGS. 39A through 39E combined with Costas arrays. Referring to FIG. 39F, the structure of FIG. 39F is derived from the structure 3911 of FIG. 39C replicated 3911*a*-3911*d* and placed at code locations 3914 based on a coordinate grid 3916 in accordance with exemplary Costas array of FIG. 37C. The structure of FIG. 39G is derived using FIG. 39C and FIG. 37C as described for FIG. 39F except that the scale (relative size) is changed. The structure 3911 of FIG. 39C is enlarged to generate 3911*e*-3911*h*, which have been enlarged sufficiently to overlap at component 3918. Thus, the relative scale can be adjusted to trade the benefits of density (resulting in more force per area) with the potential for increased misaligned force.

Figures 40A, 40B, 40C, 40D, 40E:
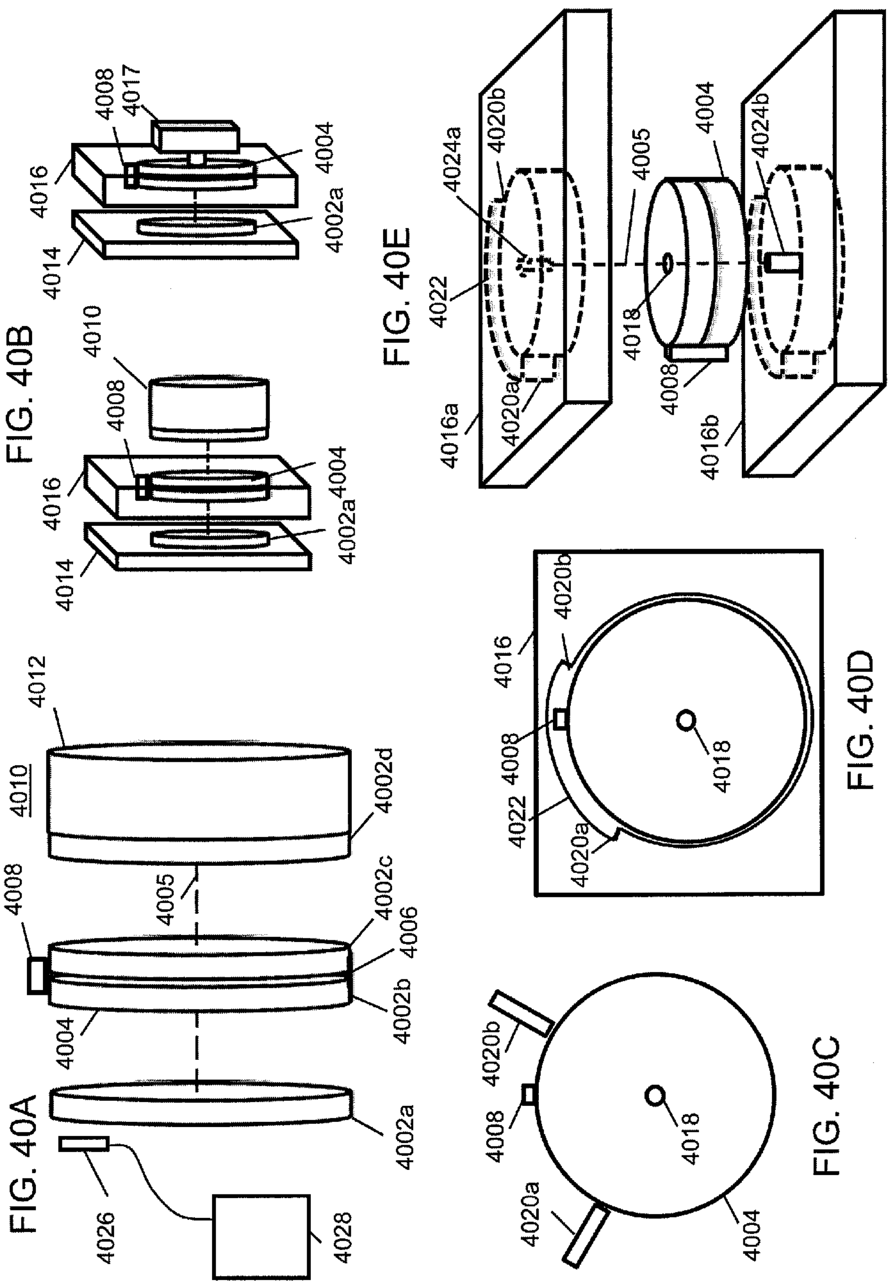
FIGS. 40A and 40B depict the use of multiple magnetic structures to enable attachment and detachment of two objects using another object functioning as a key.
FIGS. 40C and 40D depict the general concept of using a tab so as to limit the movement of the dual coded attachment mechanism between two travel limiters.
FIG. 40E depicts exemplary assembly of the dual coded attachment mechanism of FIGS. 40C and 40D.

FIGS. 40A and 40B depict the use of multiple magnetic structures to enable attachment and detachment of two objects using another object functioning as a key. It is noted that attachment of the two objects does not necessarily require another object functioning as a key. Referring to FIG. 40A, a first magnetic field structure 4002*a* is coded using a first code. A two-sided attachment mechanism 4004 has a second magnetic field structure 4002*b* also coded using the first code such that it corresponds to the mirror image of the second magnetic field structure 4002*a*, and has a third magnetic field structure 4002*c* coded using a second code. The dual coded attachment mechanism 4004 is configured so that it can turn about axis 4005 allowing it to be moved so as to allow attachment to and detachment from the first magnetic field structure. The dual coded attachment mechanism 4004 may include a separation layer 4006 consisting of a high permeability material that keeps the magnetic fields of the second magnetic field structure 4002*b* from interacting with the magnetic fields of the third magnetic field structure 4002*c*. The dual coded attachment mechanism 4004 also includes at least tab 4008 used to stop the movement of the dual coded attachment mechanism. A key mechanism 4010 includes a fourth magnetic field structure 4002*d* also coded using the second code such that it corresponds to the mirror image of the third magnetic field structure 4002*c*, and includes a gripping mechanism 4012 that would typically be turned by hand. The gripping mechanism 4012 could however be attached to or replaced by an automation device. As shown, the key mechanism 4010 can be attached to the dual coded attachment mechanism 4004 by aligning substantially the fourth magnetic field structure 4002*d* with the third magnetic field structure 4002*c*. The gripping mechanism can then be turned about axis 4005 to turn the dual coded attachment mechanism 4004 so as to align the second magnetic field structure 4002*b* with the first magnetic field structure 4002*a*, thereby attaching the dual coded attachment mechanism 4004 to the first magnetic field structure 4002*a*. Typically, the first magnetic field structure would be associated with a first object 4014, for example, a window frame, and the dual coded attachment mechanism 4004 would be associated with a second object 4016, for example, a storm shutter, as shown in FIG. 40B. For the example depicted in FIG. 40B, the dual coded attachment mechanism 4004 is shown residing inside the second object 4016 thereby allowing the key mechanism to be used to attach and/or detach the two objects 4014, 4016 and then be removed and stored separately. Once the two objects are attached, the means for attachment would not need to be visible to someone looking at the second object.

FIGS. 40C and 40D depict the general concept of using a tab 4008 so as to limit the movement of the dual coded attachment mechanism 4004 between two travel limiters 4020*a* and 4020*b*. Dual coded attachment mechanism is shown having a hole through its middle that enables is to turn about the axis 4005. Referring to FIG. 40C, the two travel limiters 4020*a* and 4020*b* might be any fixed object placed at desired locations that limit the turning radius of the dual coded attachment mechanism 4004. FIG. 40D depicts an alternative approach where object 4016 includes a travel channel 4022 that is configured to enable the dual coded attachment mechanism 4004 to turn about the axis 4005 using hole 4018 and has travel limiters 4020*a* and 4020*b* that limit the turning radius. One skilled in the art would recognize that the tab 4008 and at least one travel limiter is provided to simplify the detachment of key mechanism 4012 from the dual coded attachment mechanism 4004.

FIG. 40E depicts exemplary assembly of the second object 4016 which is separated into a top part 4016*a* and a bottom part 4016*b*, with each part having a travel channel 4022*a* (or 4022*b*) and a spindle portion 4024*a* (or 4024*b*). The dual coded attachment mechanism 4004 is placed over the spindle portion 4022*b* of the bottom part 4016*b* and then the spindle portion 4024*a* of the top part 4016 is placed into the spindle portion 4022*b* of the bottom part 4016*b* and the top and bottom parts 4016*a*, 4016*b* are then attached in some manner, for example, glued together. As such, once assembled, the dual coded attachment mechanism is effectively hidden inside object 4016. One skilled in the art would recognize that many different designs and assembly approaches could be used to achieve the same result.

In one embodiment, the attachment device may be fitted with a sensor, e.g., a switch or magnetic sensor 4026 to indicate attachment or detachment. The sensor may be connected to a security alarm 4028 to indicate tampering or intrusion or other unsafe condition. An intrusion condition may arise from someone prying the attachment device apart, or another unsafe condition may arise that could be recognized by the sensor. The sensor may operate when the top part 4016*a* and bottom part 4016*b* are separated by a predetermined amount, e.g., 2 mm or 1 cm, essentially enough to operate the switch. In a further alternative, the switch may be configured to disregard normal separations and report only forced separations. For this, a second switch may be provided to indicate the rotation position of the top part 4016*a*. If there is a separation without rotating the top part, an intrusion condition would be reported. The separation switch and rotation switch may be connected together for combined reporting or may be separately wired for separate reporting. The switches may be connected to a controller which may operate a local alarm or call the owner or authorities using a silent alarm in accordance with the appropriate algorithm for the location.

In one embodiment, the sensor may be a hall effect sensor or other magnetic sensor. The magnetic sensor may be placed behind one of the magnets of magnet structure 4002*a* or in a position not occupied by a magnet of 4002*a* but near a magnet of 4002*b*. The magnetic sensor would detect the presence of a complementary magnet in 4002*b* by measuring an increase in field from the field of the proximal magnet of 4002*a* and thus be able to also detect loss of magnet structure 4002*b* by a decrease of magnetic field. The magnetic sensor would also be able to detect rotation of 4002*b* to a release configuration by measuring a double decrease in magnetic field strength due to covering the proximal magnet of 4002*a* with an opposite polarity magnet from magnet structure 4002*b*. When in an attached configuration, the magnetic field strength would then increase to the nominal level. Since about half of the magnets are paired with same polarity and half with opposite polarity magnets when in the release configuration, the sensor position would preferably be selected to be a position seeing a reversal in polarity of magnet structure 4002*b*.

In operation using mechanical switches, when the key mechanism 4012 is used to rotate the dual coded attachment mechanism 4004, the stop tab 4008 operates the rotation switch indicating proper entry so that when the attachment device is separated and the separation switch is operated, no alarm is sounded In an intrusion situation, the separation switch may be operated without operating the rotation switch. The operation of the rotation switch may be latched in the controller because in some embodiments, separation may release the rotation switch. For switch operation, the stop tab 4008 or another switch operating tab may extend from the dual coded magnet assembly to the base where the first coded magnet assembly 4002*a* resides so that the switch may be located elsewhere.

In operation using the magnetic sensor, normal detachment will first be observed by a double decrease (for example 20%) in magnetic field strength due to the rotation of the magnet structure 4004*b* followed by a single increase (for example 10%) due to the removal of the panel. Abnormal detachment would be observed by a single decrease (for example 10%) in the measured magnetic field strength. Thus, a single decrease of the expected amount, especially without a subsequent increase would be detected as an alarm condition.

Alternatively, a magnetic sensor may be placed in an empty position (not having a magnet) in the pattern of 4002*a*. Upon rotation of 4002*b* to the release position, the previously empty position would see the full force of a magnet of 4002*b* to detect rotation.

Figure 41A:
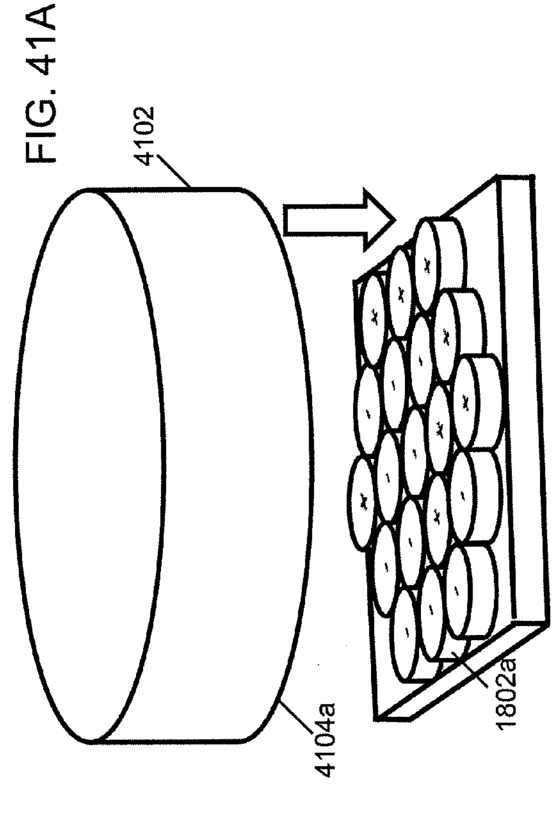
FIGS. 41A-41D depict manufacturing of a dual coded attachment mechanism using a ferromagnetic, ferrimagnetic, or antiferromagnetic material.
Figure 41B:
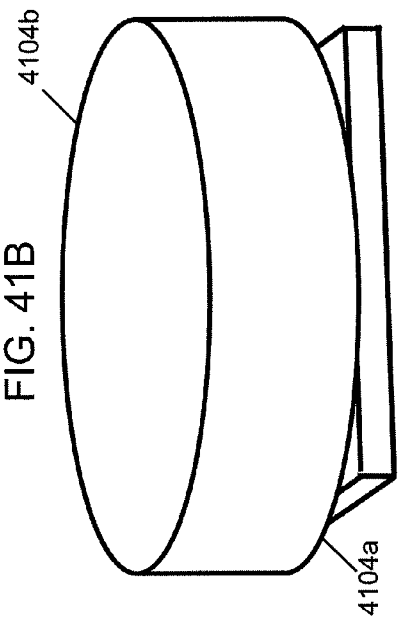
Figure 41C:
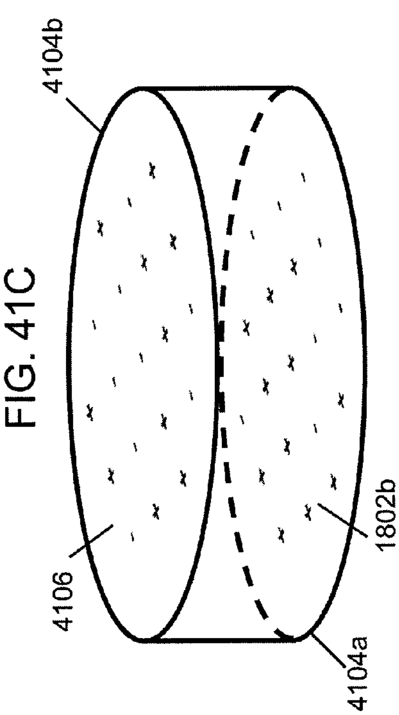
Figure 41D:
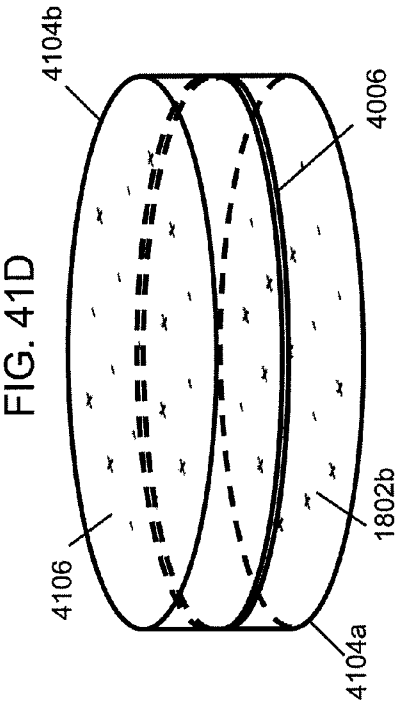

FIGS. 41A through 41D depict manufacturing of a dual coded attachment mechanism using a ferromagnetic, ferrimagnetic, or antiferromagnetic material. As previously described, such materials can be heated to their Curie (or Neel) temperatures and then will take on the magnetic properties of another material when brought into proximity with that material and cooled below the Curie (or Neel) temperature. Referring to FIGS. 41*a* and 41*b*, a ferromagnetic, ferrimagnetic, or antiferromagnetic material 4102 is heated to its Curie (or Neel) temperature and one side 4104*a* is brought into proximity with a first magnetic field structure 1802*a* having desired magnetic field properties. Once cooled, as shown in FIG. 41C, the side 4104*a* comprises a second magnetic field structure 1802*b* having magnetic field properties that mirror those of the first magnetic field structure 1802*a*. A similar process can be performed to place a third magnetic field structure 4106 onto the second side 4104*b*, which may be done concurrently with the placement of the second magnetic field structure 1802*a* onto the first side 4104*a*. Depending on the thickness and properties of the ferromagnetic, ferrimagnetic, or antiferromagnetic material employed, it may be necessary or desirable to use two portions separated by a separation layer 4106 in which case the two portions and the separation layer would typically be attached together, for example, using an adhesive. Not shown in FIGS. 41A through 41D is a hole 4118, which can be drilled or otherwise placed in the ferromagnetic, ferrimagnetic, or antiferromagnetic material before or after it has received its magnetic field structures.

Figure 42A:
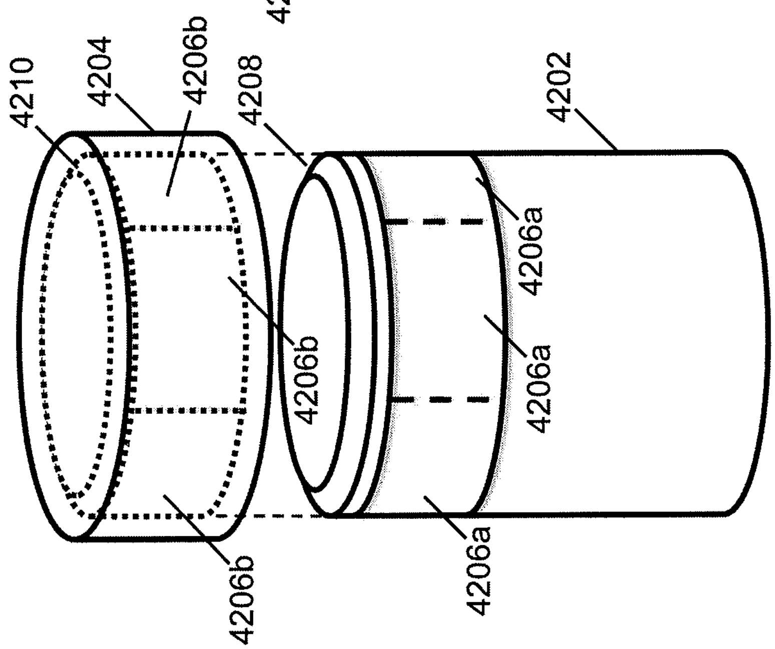
FIGS. 42A and 42B depict two views of an exemplary sealable container in accordance with the present invention.
Figure 42B:
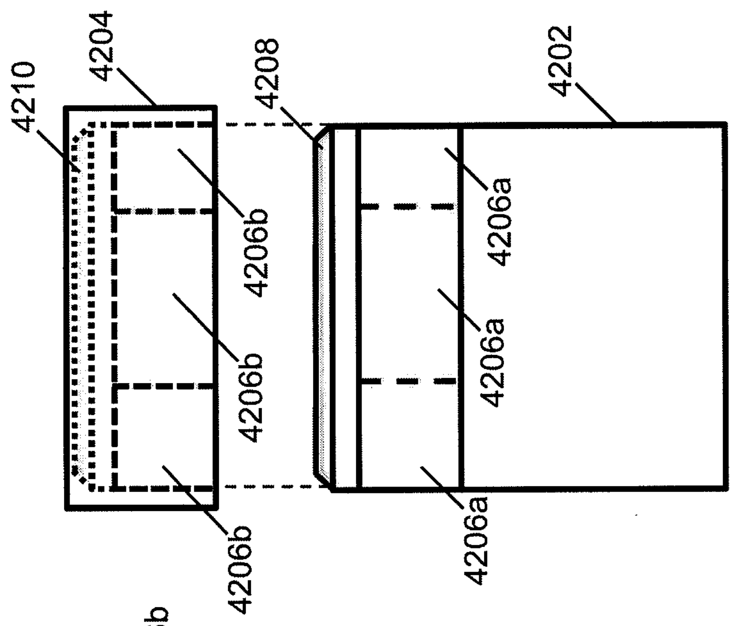

FIGS. 42A and 42B depict two views of an exemplary sealable container 4200 in accordance with the present invention. As shown in FIGS. 42A and 42B, sealable container 4200 includes a main body 4202 and a top 4204. On the outside of the upper portion of the main body 4202 is a magnetic field structure 4206*a*. As shown, a repeating magnetic field structure 4206*a* is used which repeats, for example, five times. On the inside of the top 4204 is a second magnetic field structure 4206*b* that also repeats, for example, five times. The second magnetic field structure 4206*b* is the mirror image of the first magnetic field structure 4206*a* and can be brought into substantial alignment at any one of five different alignment points due to the repeating of the structures. When the top 4204 is placed over the main body 4202 and substantial alignment is achieved, a sloping face 4208 of the main body 4202 achieves a compressive seal with a complementary sloping face 4210 of the top 4202 as a result of the spatial force function corresponding to the first and second magnetic field structures.

Figure 42I:
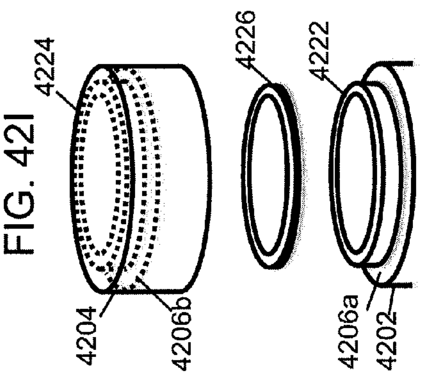
FIG. 42I depicts an alternative arrangement for a sealable container where a gasket is used.
Figure 42E:
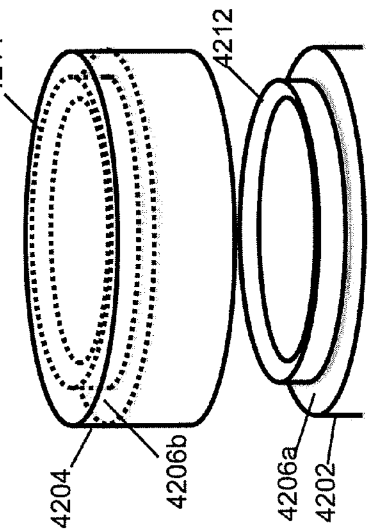
FIG. 42E is intended to depict an alternative arrangement for complementary sloping faces.
Figure 42D:
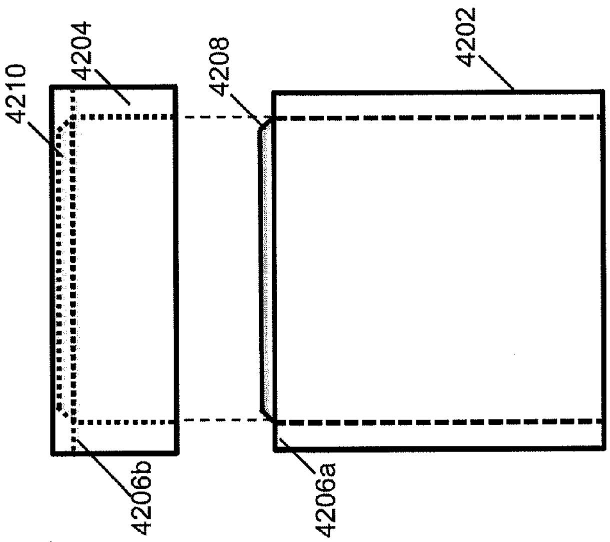
FIGS. 42C and 42D depict an alternative sealable container in accordance with the present invention.
Figure 42C:
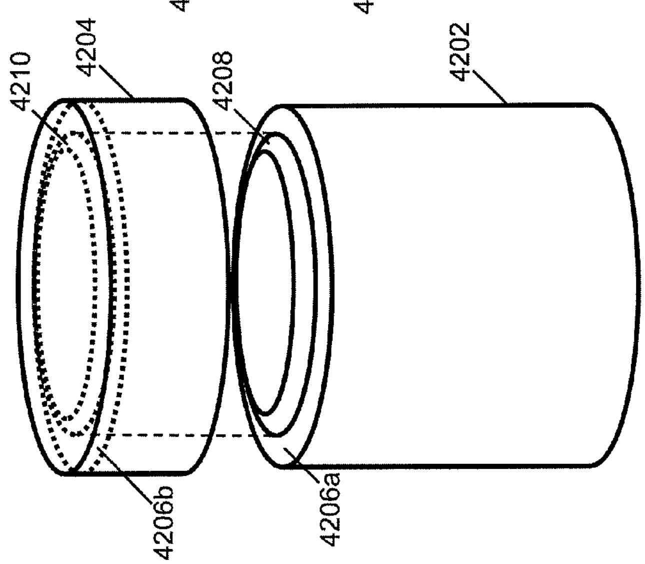

FIGS. 42C and 42D depict an alternative sealable container 4200 in accordance with the present invention. As shown in FIGS. 42C and 42D, the alternative sealable container 4200 is the same as the container 4200 of FIGS. 42*a* and 42*b* except the first magnetic field structure 4206*a* of the main body 4202 is located on a top surface of the main body and does not repeat. Similarly, the second magnetic field structure 4206*b* of the top 4204 is located on an inner surface near the upper part of top 4204. As such, the magnetic field structures interact in a plane perpendicular to that of FIGS. 42A and 42B. Moreover, since the magnetic fields do not repeat, there is only one alignment position whereby the top 4204 will attach to main body 4202 to achieve a compressive seal.

Figure 42H:
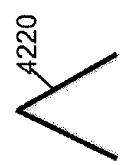
FIGS. 42F-42H depict additional alternative shapes that could marry up with a complementary shape to form a compressive seal.
Figure 42G:
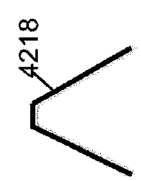
Figure 42F:
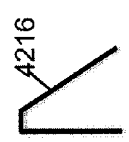

FIG. 42E is intended to depict an alternative arrangement for the complementary sloping faces 4208, 4210, where the peak of the slopes is on the outside of the seal as opposed to the inside. FIGS. 42F through 42H depict additional alternative shapes that could marry up with a complementary shape to form a compressive seal. One skilled in the art would recognize that many different such shapes can be used with the present invention. FIG. 42I depicts an alternative arrangement where a gasket 4226 is used, which might reside inside the top 4204 of the sealable container 4200. Various other sealing methods could also be employed such as use of Teflon tape, joint compound, or the like.

One skilled in the art will recognize that many different kinds of sealable container can be designed in accordance with the present invention. Such containers can be used for paint buckets, pharmaceutical containers, food containers, etc. Such containers can be designed to release at a specific pressure. Generally, the invention can be employed for many different types of tube in tube applications from umbrellas, to tent poles, waterproof flashlights to scaffolding, etc. The invention can also include a safety catch mechanism or a push button release mechanism.

As previously described, electromagnets can be used to produce magnetic field emission structures whereby the states of the electromagnets can be varied to change a spatial force function as defined by a code. As described below, electro-permanent magnets can also be used to produce such magnetic field emission structures. Generally, a magnetic field emission structure may include an array of magnetic field emission sources (e.g., electromagnets and/or electro-permanent magnets) each having positions and polarities relating to a spatial force function where at least one current source associated with at least one of the magnetic field emission sources can be used to generate an electric current to change the spatial force function.

Figures 43A, 43B, 43C, 43D, 43E:
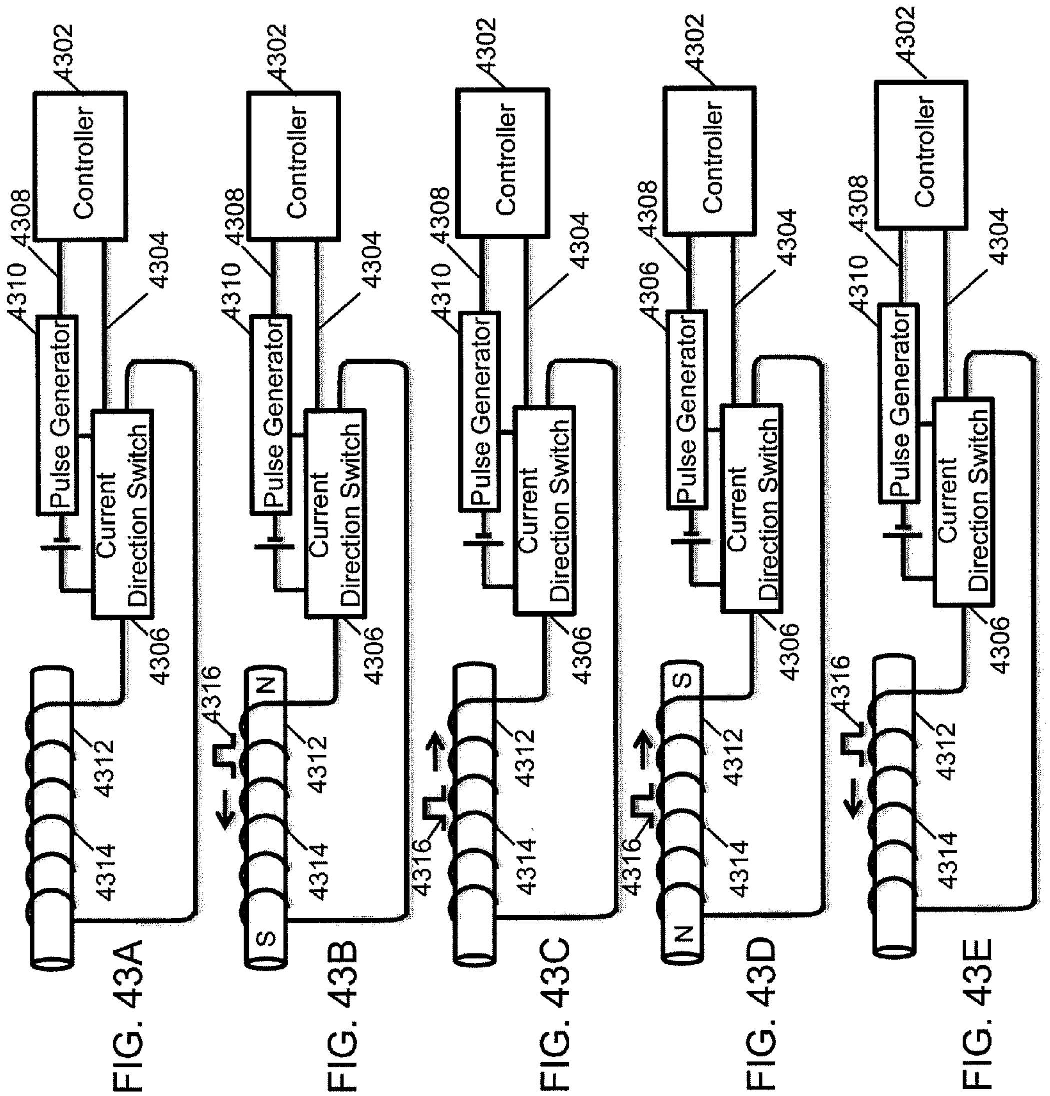
FIGS. 43A-43E depict five states of an electro-permanent magnet apparatus in accordance with the present invention.

FIGS. 43A through 43E depict five states of an electro-permanent magnet apparatus in accordance with the present invention. Referring to FIG. 43A, the electro-permanent magnet apparatus includes a controller 4302 that outputs a current direction control signal 4304 to current direction switch 4306, and a pulse trigger signal 4308 to pulse generator 4310. When it receives a pulse trigger signal 4308, pulse generator 4310 produces a pulse 4316 that travels about a permanent magnet material 4312 via at least one coil 4314 in a direction determined by current direction control signal 4304. Permanent magnet material 4312 can have three states: non-magnetized, magnetized with South-North polarity, or magnetized with North-South polarity. Permanent magnet material 4312 is referred to as such since it will retain its magnetic properties until they are changed by receiving a pulse 4316. In FIG. 43A, the permanent magnetic material is in its non-magnetized state. In FIG. 43B, a pulse 4316 is generated in a first direction that causes the permanent magnet material 4312 to attain its South-North polarity state (a notation selected based on viewing the figure). In FIG. 43C, a second pulse 4316 is generated in the opposite direction that causes the permanent magnet to again attain its non-magnetized state. In FIG. 43D, a third pulse 4316 is generated in the same direction as the second pulse causing the permanent magnet material 4312 to become to attains its North-South polarity state. In FIG. 43E, a fourth pulse 4316 is generated in the same direction as the first pulse 4316 causing the permanent magnet material 4312 to once again become non-magnetized. As such, one skilled in the art will recognized that the controller 4302 can control the timing and direction of pulses to control the state of the permanent magnetic material 4312 between the three states, where directed pulses either magnetize the permanent magnetic material 4312 with a desired polarity or cause the permanent magnetic material 4312 to be demagnetized.

Figure 44A:
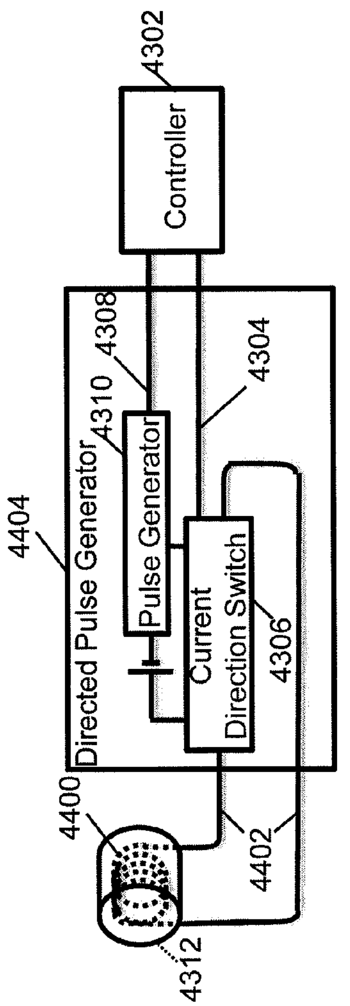
FIG. 44A depicts an alternative electro-permanent magnet apparatus in accordance with the present invention.

FIG. 44A depicts an alternative electro-permanent magnet apparatus in accordance with the present invention. Referring to FIG. 44A, the alternative electro-permanent magnet apparatus is the same as that shown in FIGS. 43A-43E except the permanent magnetic material includes an embedded coil 4400. As shown in the figure, the embedded coil is attached to two leads 4402 that connect to the current direction switch 4306. The pulse generator 4310 and current direction switch 4306 are grouped together as a directed pulse generator 4404 that received current direction control signal 4304 and pulse trigger signal 4308 from controller 4302.

Figure 44B:
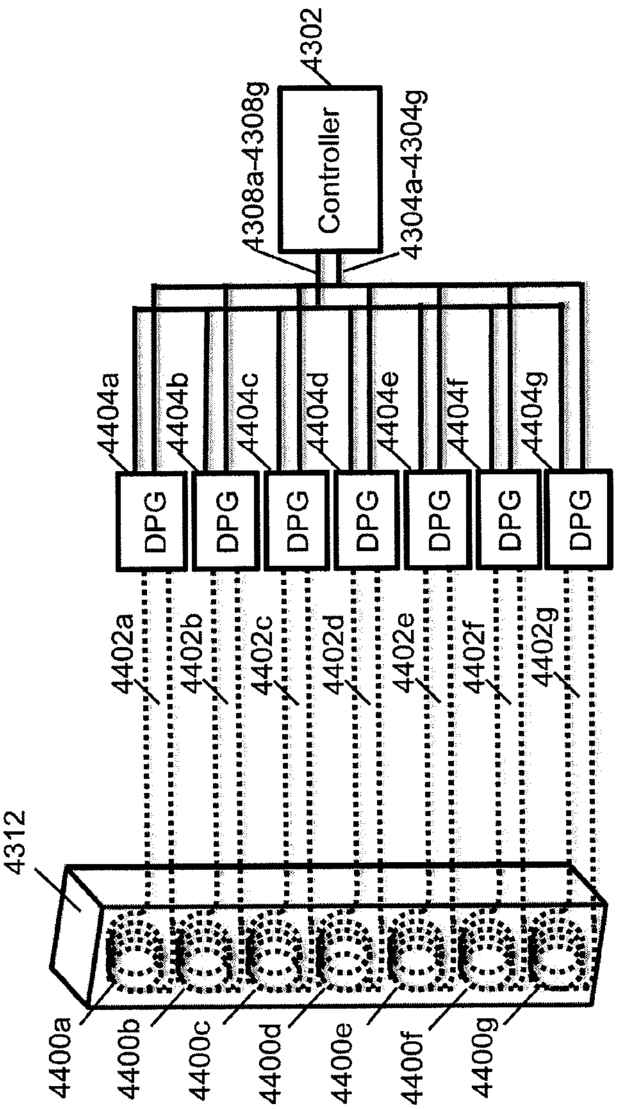
FIG. 44B depicts a permanent magnetic material having seven embedded coils arranged linearly.

FIG. 44B depicts and permanent magnetic material 4312 having seven embedded coils 4400*a*-4400*g* arranged linearly. The embedded coils 4400*a*-4400*g* have corresponding leads 4402*a*-4402*g* connected to seven directed pulse generators 4404*a*-4404*g* that are controlled by controller 4302 via seven current direction control signals 4304*a*-4304*g* and seven pulse trigger signals 4308*a*-4308*g*. One skilled in the art will recognize that various arrangements of such embedded coils can be employed including two-dimensional arrangements and three-dimensional arrangements. One exemplary two-dimensional arrangement could be employed with a table like the table depicted in FIG. 22.

Figure 45D:
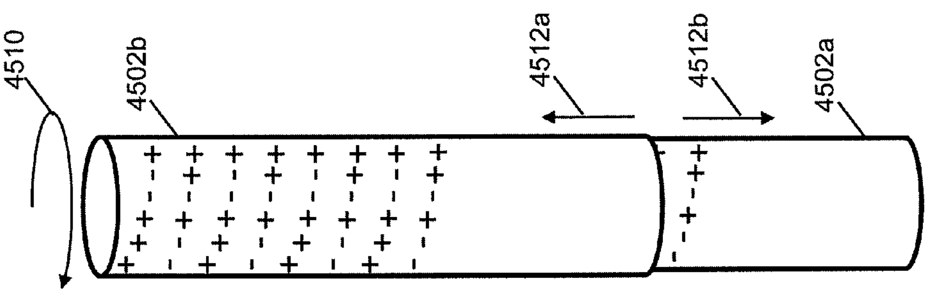
FIGS. 45A-45E depict exemplary use of helically coded magnetic field structures.
Figure 45C:
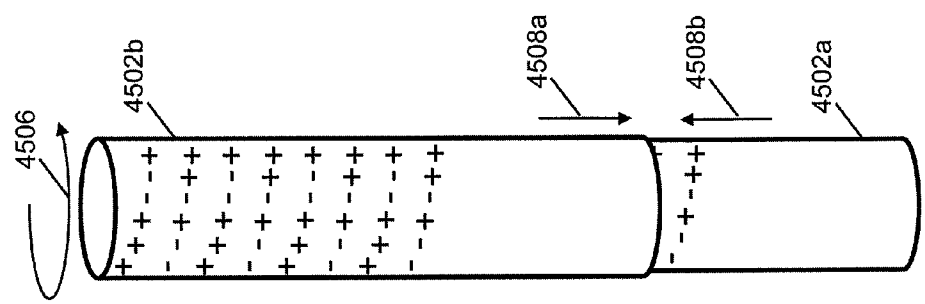
Figure 45B:
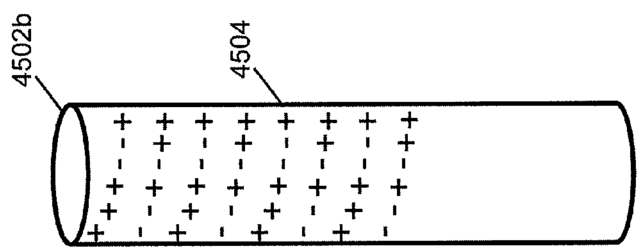
Figure 45A:
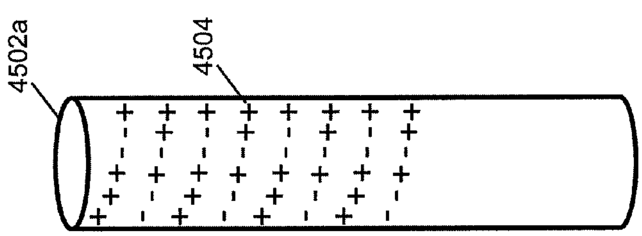
Figure 45E:
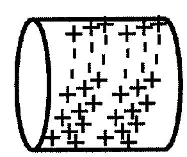

FIGS. 45A through 45E depict exemplary use of helically coded magnetic field structures. Referring to FIG. 45*a* a first tube 4502*a* has a magnetic field structure 4504 having positions in accordance with a code 4504 that defines a helix shape that wraps around the tube 4502*a* much like threads on a screw. Referring to FIG. 45B, a second tube 4502*b* having a slightly greater diameter than the first tube 4502*a* is coded with the same code 4504. As such the magnetic field structure inside the second tube 4502*b* would mirror that of the magnetic field structure on the outside of the first tube 4502*a*. As shown in FIG. 45C, the second tube 4502*b* can be placed over the first tube 4502*a* and by turning (holding the top) the second tube 4502*b* counter clockwise, the second tube 4502*b* will achieve a lock with the first tube 4502*a* causing the first tube 4502*a* to be pulled 4508*a* 4508*b* into the second tube 4502*b* as the second tube is turned while the first tube is held in place (at the bottom). Alternatively, the first tube 4502*a* can be turned counter clockwise while holding the second tube to produce the same relative movement between the two tubes. As depicted in FIG. 45D, by reversing the direction which the tubes are turned from that shown in FIG. 45C, the first tube will be drawn outside 4512*a* 4512*b* the second tube. FIG. 45E depicts an alternative helical coding approach where multiple instances of the same code are used to define the magnetic field structure. Similar arrangement can be employed where multiple such codes are used. The use of helically coded magnetic field structures enables a variably sized tubular structure much like certain shower curtain rods, etc. Helically coded magnetic field structures can also support worm drives, screw drive systems, X-Y devices, screw pressing mechanisms, vices, etc.

FIGS. 46A through 46H depict exemplary male and female connector components. FIGS. 46A, 46B, and 46C, provide a top view, front view, and back view of an exemplary male connector component 4600, respectively. Male connector component 4600 has sides 4601, a top 4602, and a hole 4603. Sides 4601 and top 4602 are magnetized in accordance with a code 4604. FIGS. 46D, 46E, and 46F, provide a top view, front view, and back view of an exemplary female connector component 4606*a*, respectively. At least a portion 4608 of the female connector component 4606*a* is magnetized in accordance with code 4604. As depicted, the bottom portion 4608 can be magnetized so that the inside edge of a hole 4610 within the female connector component 4606*a* has the mirror image field structure as the sides 4601 of the male connector component 4600. The diameter 4612 of the female connector component 4606*a* determines where the female connector component 4606*a* will connect with the male connector component 4600 when the male connector component 4606*a* is placed into the female connector component 4606*a*. The connector components can then be turned relative to each other to achieve alignment of their respective magnetic field structures and therefore achieve a holding force (and seal). FIG. 46G depicts a front view of the male connector component 4600 placed inside the female connector component 4606*a* such that they couple near the bottom of male connector component 4606*a* where the outside diameter of the male connector component is the same as the diameter 4612 of the inside edge of the hole 4610 inside the female connector component 4606*a*. FIG. 46H depicts an alternative arrangement where the hole of the female connector component 4606*b* has a diameter that tapers comparably to that of the outside diameter of the male connector component 4600. As shown, the hole 4610 varies from a first diameter 4614 to a second diameter 4616. Although not depicted, the inside sides of the female connector component 4606*b* could be magnetized much like the sides of the male connector component 4600 thereby providing more holding force (and sealing force) when their corresponding magnetic field structures are aligned.

Figure 47A:
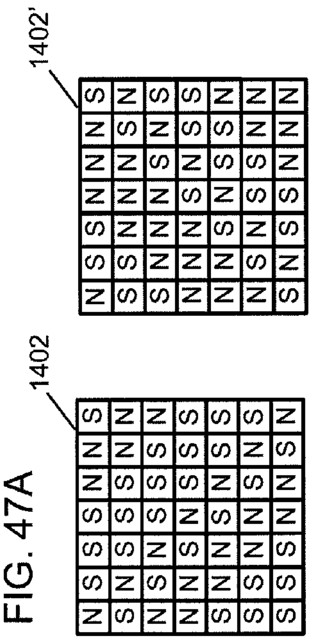
FIGS. 47A-47C depict exemplary multi-level coding.
Figure 47B:
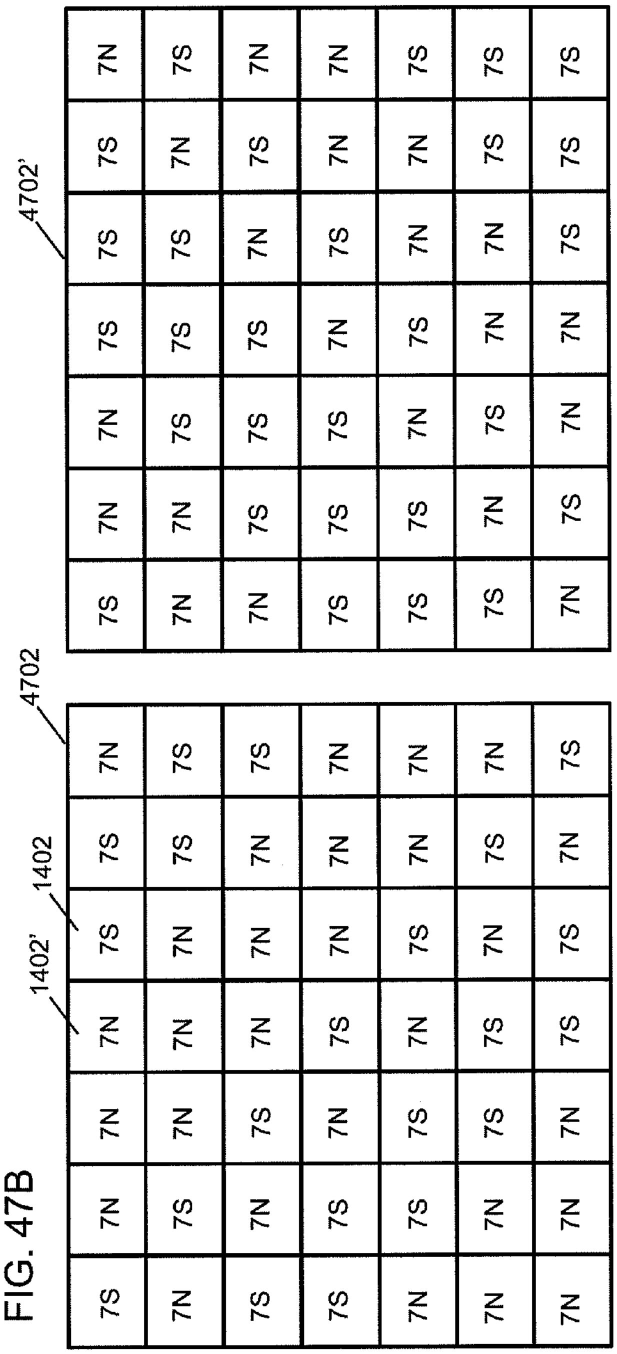
Figure 47C:
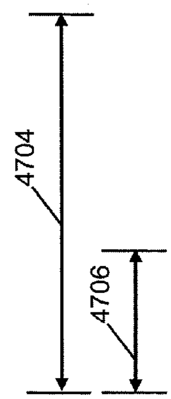

One skilled in the art will recognize that in a manner opposite that depicted in FIGS. 46A through 46G, the male component could have straight sides while the female connector component could have tapered sides. With this arrangement, the diameter of the outside of the male connector component determines where the male and female connector components would connect. This alternative connector arrangement and the connectors depicted in FIGS. 46A through 46H lend themselves to all sorts of connection devices including those for connecting hoses, for example, for carrying water, air, fuel, etc. Such connectors can also be used with various well known conventional sealing mechanisms, for example, 0-rings or such seals as described in relation to FIGS. 42A through 42H. Moreover, similar connectors could FIGS. 47A through 47C depict exemplary multi-level coding. Referring to FIG. 47A, a first magnetic field structure 1402 is the mirror image of a second magnetic field structure 1402'. Referring to FIG. 47B, two much larger magnetic field structures 4700, 4702' have cells that correspond to either the first magnetic field structure 1402 or the second magnetic field structure 1402'. As shown in FIG. 47B, the first magnetic field structures 1402 appear as being a 7S force since the magnetic field structure 1402 has seven more South poles showing on its surface as it does North poles. Similarly, the second magnetic field structures 1402' appear as being a 7N force since the magnetic field structure 1402' has seven more North poles showing on its surface as it does South poles. Thus, as depicted in FIG. 47C, as two larger magnetic field structures are held apart by a first distance 4704, their individual cells will appear as combined magnetic field forces of 7S or 7N. But, at a second closer distance 4706, the cells will appear as individual magnetic field sources as shown in FIG.

47A. It should be noted that the distances shown in FIG. 47C are arbitrarily selected to describe the general concept of multi-level coding. It should be further noted that cells of the larger magnetic field structures 4702 4702' are coded the same as the individual magnetic field sources of the first and second magnetic field structures 1402 1402'.

Figure 48A:
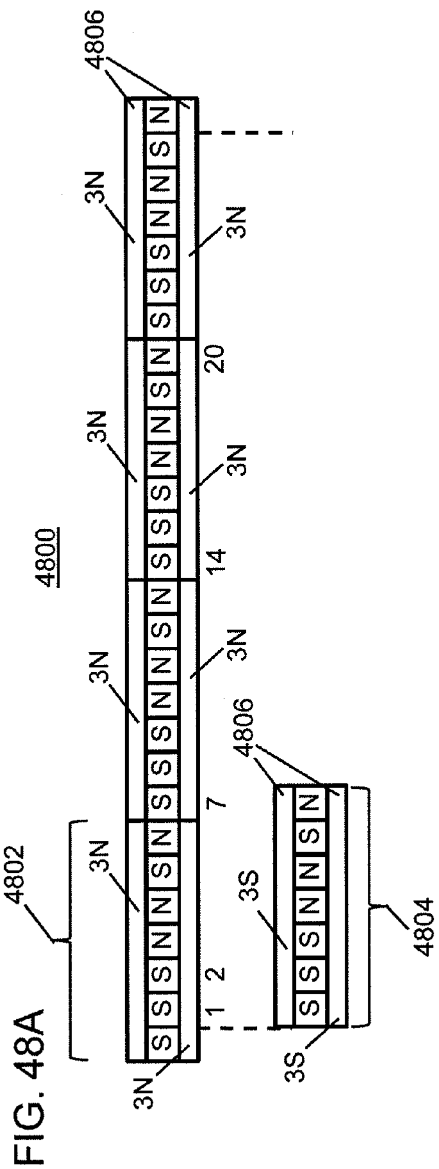
FIG. 48A depicts an exemplary use of biasing magnet sources to affect spatial forces of magnetic field structures.
Figure 48B:
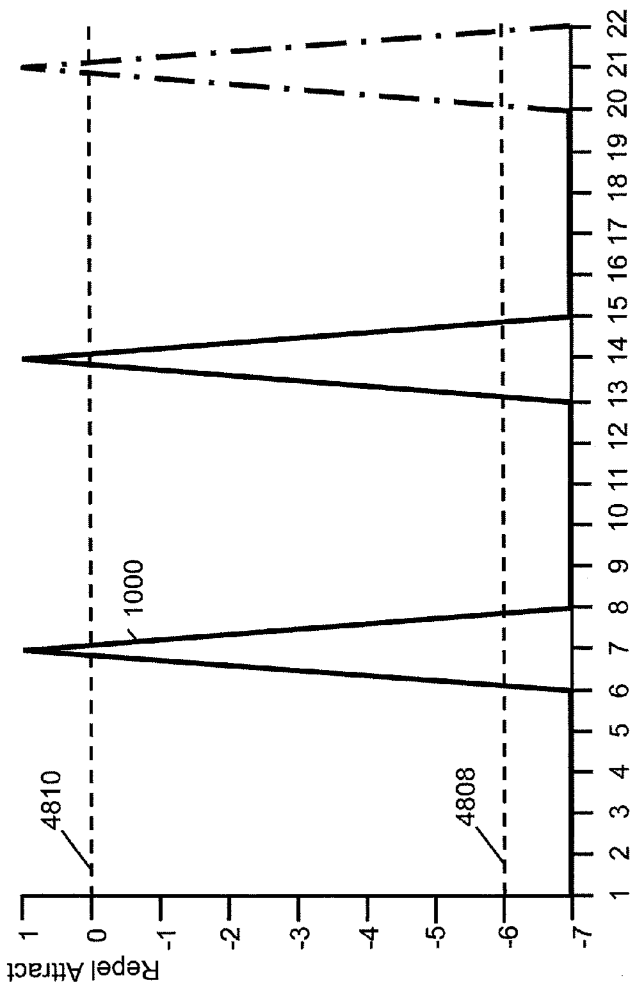
FIG. 48B depicts an exemplary spatial force function corresponding to magnetic field structures of FIG. 48A.

FIG. 48*a* depicts an exemplary use of biasing magnet sources to affect spatial forces of magnetic field structures. Referring to FIG. 48A, a top down view of two magnetic field structures is depicted. A first magnetic field structure 4800 comprises magnetic field sources arranged in accordance with four repeating code modulos 4802 of a Barker Length 7 code and also having on either side magnetic field sources having North polarity and a strength of 3. The individual sources have a strength of 1, as was the case in the example depicted in FIGS. 9A through 9P. A second magnetic field structure 4804 is also coded in accordance with the Barker Length 7 code such that the bottom side of the second magnetic field structure has the mirror image coding of the top side of the first magnetic field structure. Both magnetic field structures have biasing magnets 4806 configured to always provide a repel strength of 6 (or −6) whenever the second magnetic field structure 4804 is placed on top of the first magnetic field structure 4800. When the second magnetic field structure 4804 is moved across the top of the first magnetic field structure 4800 the spatial forces produced will be as depicted in FIG. 48B. When FIG. 48B is compared to FIG. 10, one skilled in the art will recognize that zero attraction line has moved from a first position 4808 to a second position 4810 as a result of the biasing magnets 4806 and that many different arrangements of biasing magnets can be used to vary spatial force functions by adding constant repelling or attracting forces alongside those forces that vary based on relative positioning of magnetic field structures.

The repeating magnetic field structures of FIG. 48A provide a spatial force function (depicted in FIG. 48B) that is useful for various applications where one desires there to be ranges of free movement of a first object relative to another object yet locations where the second object is attracted to the first object such that it will become stationary at any of those locations. Such locations can be describes as detents. An example application could be a window, which might be closed when the second magnetic field structure 4804 of FIG. 48A is at position 0 and move freely when being lifted yet have detents (i.e., stopping points) at positions 7, 14, 21, etc. where the window would remain stationary. Such detents can be used with all sorts of different magnetic field structures including, for example, helically code magnetic field structures like those depicted in FIGS. 45A through 45E.

Figure 49A:
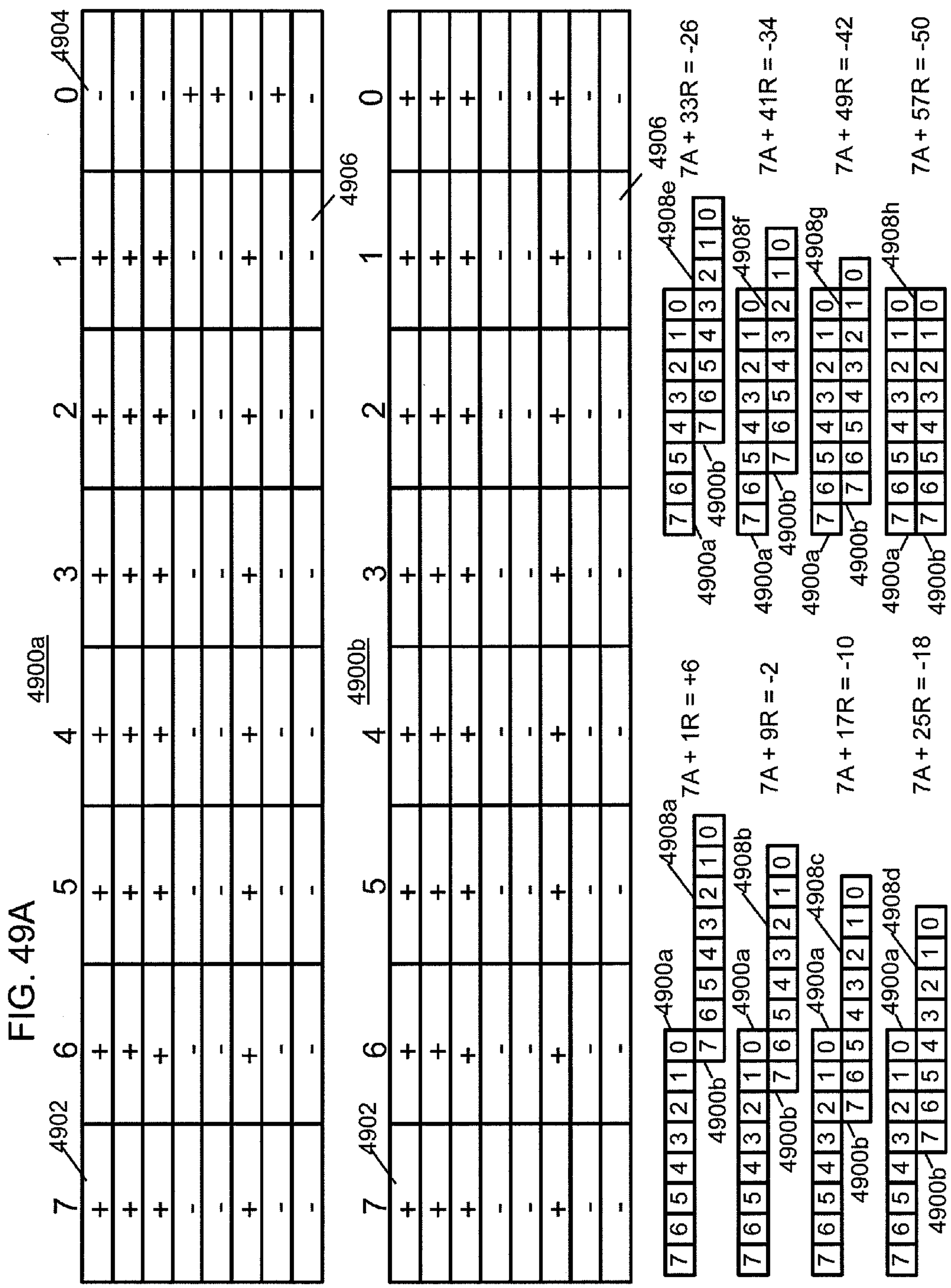
FIG. 49A depicts exemplary magnetic field structures designed to enable automatically closing drawers.

FIG. 49A depicts exemplary magnetic field structures designed to enable automatically closing drawers. The poles (+, −) depicted for the magnetic field sources of the first magnetic field structure 4900*a* represent the values on the top of the structure as viewed from the top. The poles depicted for the magnetic field sources of the second magnetic field structure 4900*b* represent the values on the bottom of the structure as viewed from the top. Each of the structures consists of eight columns numbered left to right 0 to 7. The first seven rows of the structures are coded in accordance with a Barker Length 7 code 4902 or the mirror image of the code 4094. The eighth row of each structure is a biasing magnet 4906. At the bottom of FIG. 49A, eight different alignments 4908*a* through 4908*h* of the two magnetic field structures 4900*a* 4900*b* are shown with the magnetic force calculated to the right of each depicted alignment. One skilled in the art will recognize that if the first structure 4900*a* was attached to a cabinet and the second structure 4900*b* was attached to a drawer, that a first alignment position 4908*a* having a +6 magnetic force might be the closed position for the drawer and each of the other seven positions 4908*b* through 4908*h* represent open positions having a successively increasing repelling force. With this arrangement, a person could open the drawer and release it at any open position and the drawer would automatically close.

Figure 49B:
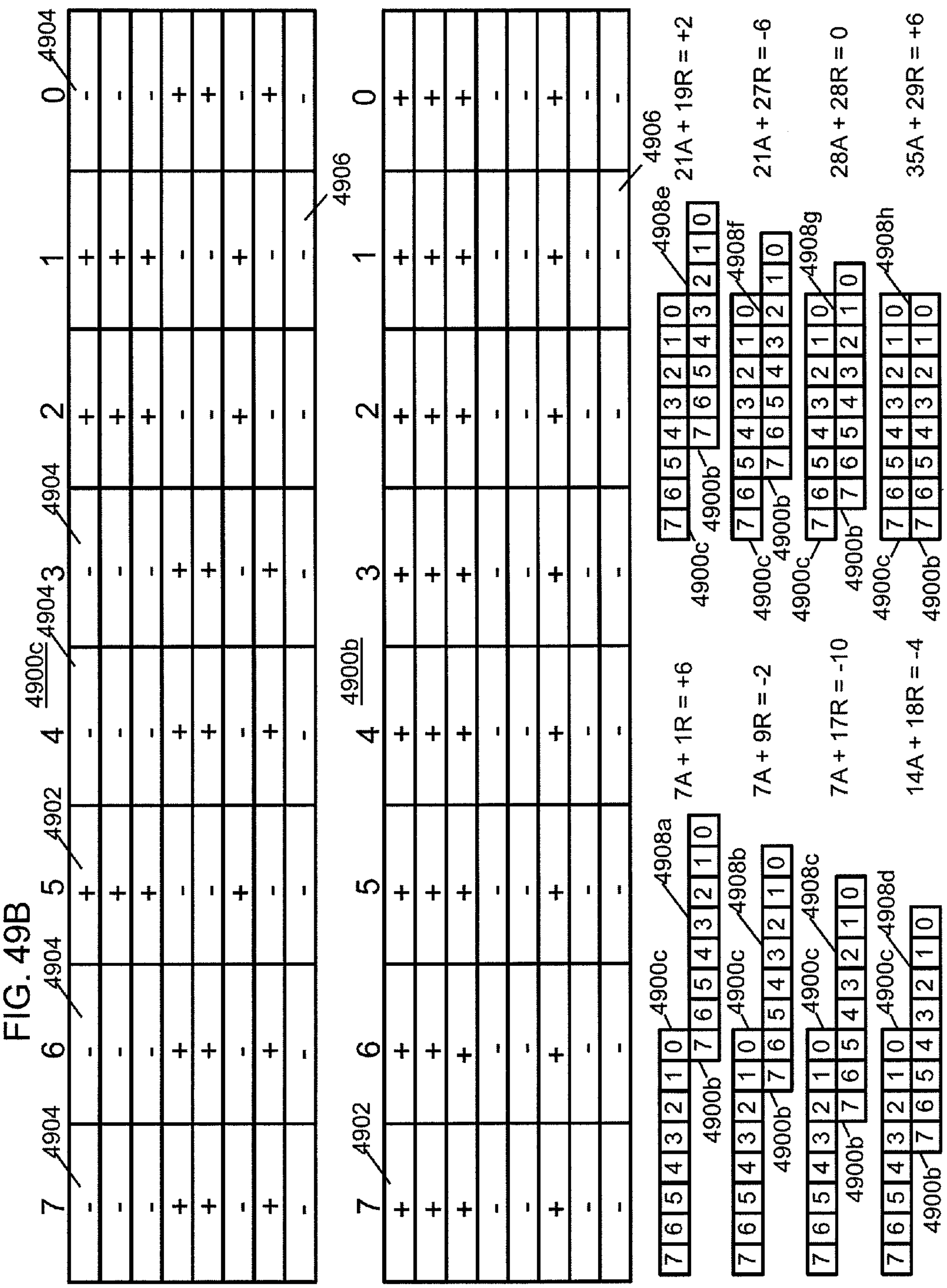
FIG. 49B depicts an alternative example of magnetic field structures enabling automatically closing drawers.

FIG. 49B depicts an alternative example of magnetic field structures enabling automatically closing drawers. Referring to FIG. 49B, a third magnetic field structure 4900*c* is shown in place of the first magnetic field structure 4900*a* of FIG. 49A, where the magnet sources of columns 3, 4, 6, and 7 are changed from the being coded in accordance with the Barker Length 7 code 4902 to being coded to be the mirror image of the code 4904. With this arrangement, the drawer has a closed position 4908*a*, a half open position 4908*e* and fully open position 4908*h* where the drawer will remain stationary. As such, the half open position can be described as being a detent position. Generally, one skilled in the art will recognize that magnetic field structures can be designed such as in FIGS. 49A and 49B so as to cause a first object to move relative to a second object due to spatial forces produced by the magnetic field structures.

Figure 50:
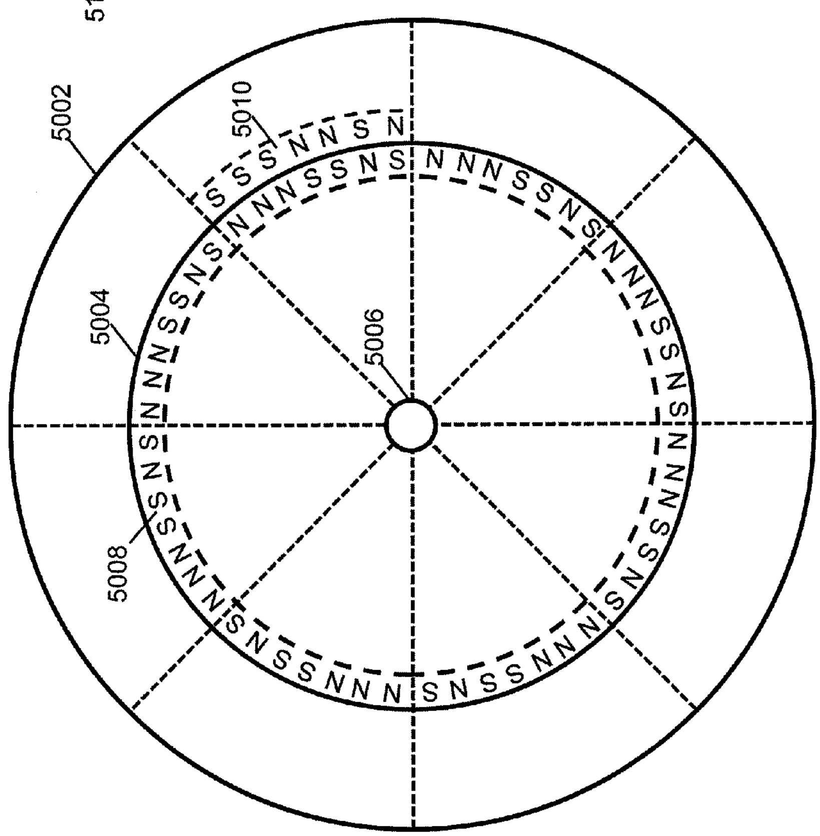
FIG. 50 depicts exemplary circular magnetic field structures.

FIG. 50 depicts an exemplary circular magnetic field structure. Referring to FIG. 50, a first circular object 5002 is attached to a second circular object 5004 such that at least one of the first circular object 5002 or the second circular object can move about an axis 5006. As shown, a first magnetic field structure 5008 comprises eight code modulos of a Barker Length 7 code oriented in a circle such that they form a continuous structure. A second magnetic field structure 5010 is also coded in accordance with the Barker Length 7 code such that it is the mirror image of any one of the eight code modulos of the first magnetic field structure 5008. The second magnetic field structure is shown being alongside the first magnetic field structure but can be above or below it depending on how the two objects are oriented. The second magnetic field structure could alternatively span multiple code modulos of the first magnetic field structure to include all eight code modulos. Additional magnetic field structures like 5010 could also be employed. Other alternatives include multiple rings such as the first magnetic field structure 5008 having different radiuses. The arrangement depicted in FIG. 50 is useful for applications such as a Lazy Susan, a roulette wheel, or a game wheel such as that used in the "Wheel of Fortune" or "The Price is Right" game shows.

Figure 51A:
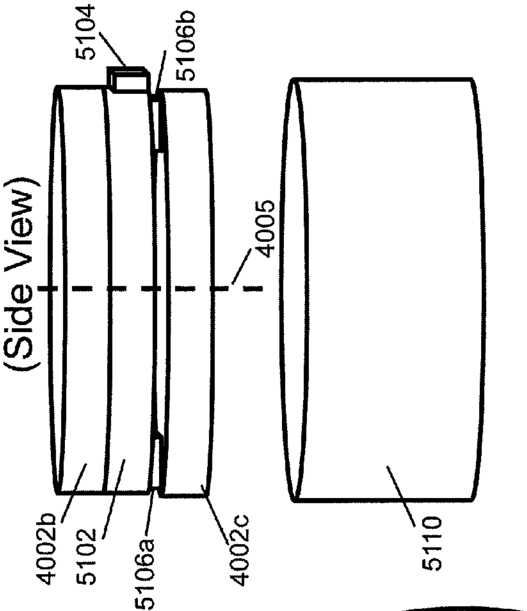
FIGS. 51A and 51B depict side and top down views of a mono-field defense mechanism.
Figure 51B:
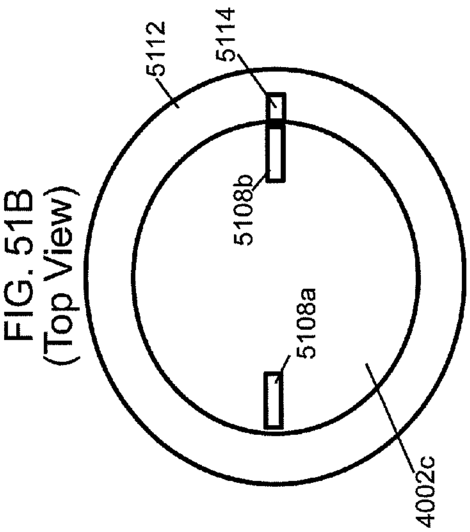

FIGS. 51A and 51B depict a side view and a top view of an exemplary mono-field defense mechanism, respectively, which can be added to the two-sided attachment mechanism depicted in FIGS. 40A and 40B. Referring to FIGS. 51A and 51B, the two-sided attachment mechanism includes first and second magnetic field structures 4002*b* and 4002*c* that turn together about an axis 4005. A key (not shown) having a magnetic field structure having the same code as the second magnetic field structure 4002*c* is used to turn the two-sided attachment mechanism such that the first magnetic field structure 4002*b* having a different code will release from a similarly coded magnetic field structure attached to an object, for example a window. One approach that might be used to defeat the unique key is to use a large magnet capable of producing a large mono-field. If the mono-field were large enough then it could potentially attach to the second magnetic field structure 4002*c* in order to turn the two-sided mechanism. Shown in FIGS. 51A and 51B is a defense mechanism 5102 consists of a piece of ferromagnetic material 5102 having a first tab 5104 and two second tabs 5106*a* and 5106*b*. The two attachment tabs 5106*a* and 5106*b* normally reside just above two first slots 5108*a* and 5108*b* that are in the top of the side of the two-sided attachment mechanism that includes the second magnetic field structure 4002*c*. The defense mechanism 5102 normally is situated alongside or even attached to the bottom of the side of the two-side attachment mechanism that includes the first magnetic field structure 4002*b*. It is configured to move downward when a large mono-field is applied to the second magnetic field structure 4002*c*. As such, when defense mechanism 5102 moves downward, the two second tabs 5106*a* and 5106*b* move into two first slots 5108*a* and 5108*b* and the first tab moves into a second slot 5114 associated with an object 5112 within which the two-sided attachment mechanism is installed thereby preventing the two-sided attachment mechanism from turning. When the large mono-field is removed, the defense mechanism moves back up to its normal position thereby allowing the two-sided attachment mechanism to turn when attached to an authentic key (or gripping) mechanism 4012. One skilled in the art will recognize that the arrangement of tabs and slots used in this exemplary embodiment can be modified within the scope of the invention. Furthermore, such defense mechanisms can be designed to be included in the region about the two-sided attachment mechanism instead of within it so as to perform the same purpose, which is to prevent the two-sided attachment mechanism from turning when in the presence of a large mono-field.

More generally, a defense mechanism can be used with magnetic field structures to produce a tension latch rather than a twist one. A tension latch can be unlocked when a key mechanism is brought near it and is properly aligned. Various arrangements can be used, for example, the key mechanism could be attached (magnetically) to the latch in order to move it towards or away from a door jamb so as to latch or unlatch it. With this arrangement, the defense mechanism would come forward when a mono-field is present, for example to cause a tab to go into a slot, to prevent the latch from being slid either way while the mono-field is present. One skilled in the art will recognize that the sheer force produced by two correlated magnetic structures can be used to move a latch mechanism from side-to-side, up-and-down, back-and-forth, or along any path (e.g., a curved path) within a plane that is parallel to the surface between the two structures.

Another approach for defending against a mono-field is to design the latch/lock such that it requires a repel force produced by the alignment of two magnetic field structures in order to function. Moreover, latches and locks that require movement of parts due to both repel and attract forces would be even more difficult to defeat with a large mono-field.

Figures 52A, 52B, 52C:
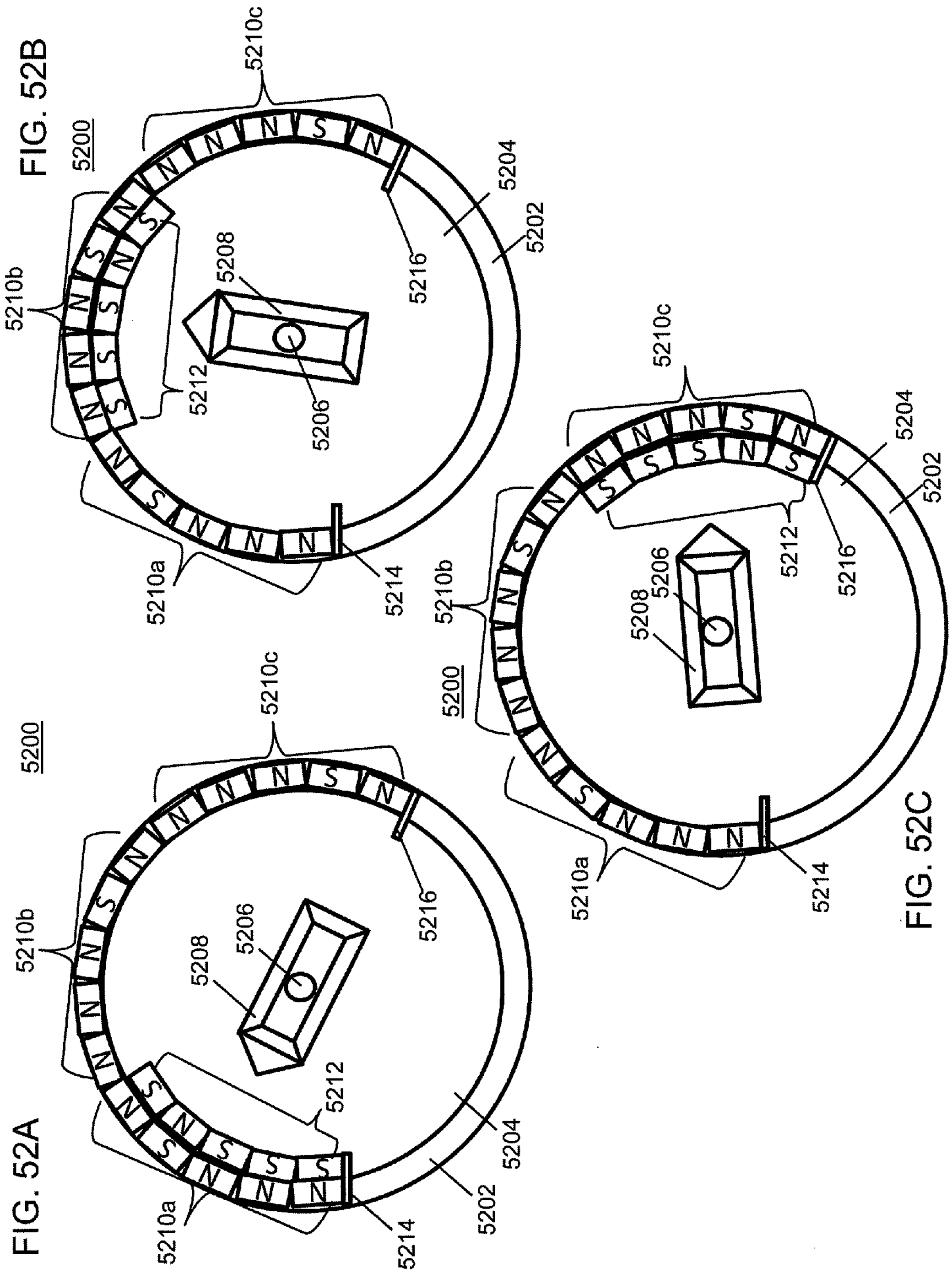
FIGS. 52A-52C depict an exemplary switch mechanism.

FIGS. 52A-52C depict an exemplary switch mechanism 5200 in accordance with the present invention. Referring to FIG. 52A, the exemplary switch mechanism 5200 comprises a first object 5202 and a second object 5204 where the second object is able to rotate about an axle 5206 by someone turning a knob 5208 that points at a desired switch location. The first object 5202 has associated with it three first magnetic field structures 5210*a*-5210*c* corresponding to three code modulos of a Barker 5 code. By turning the knob 5208, a single second magnetic field structure 5212 corresponding to the mirror image of the each of the three first magnetic field structures 5210*a*-5210*c* can be moved from any one of three alignments where the second magnetic field structure 5212 will magnetically attach to a corresponding one of the three first magnetic field structures 5210*a*-5210*c*. Turning movement is constrained by a first stop 5214 and a second stop 5216. As such, the three switch positions might correspond to three electrical switch settings such as speed settings of Low, Medium, and High. The switch might have associated with it any of various mechanical or electrical mechanisms controllable by a switch. Moreover, the three first magnetic field structures might have different field strengths such that by turning the knob 5208 the strength of a hold force can be selected. Furthermore, different types of switches can be employed using linear arrangements of magnetic field structures where a first structure can be aligned with any one of multiple second structures, or vice versa. As depicted, the first object 5202 and the second object 5204 are round but other non-round shapes for the two objects can be used. Additionally, the three first magnetic field structures can be associated with the second object and the second magnetic field structure associated with the first object. The first and second object can also be configured such that the first and second magnetic field structures overlap (i.e., one on top of the other) instead of being side by side. Generally, one skilled in the art will recognize that various types of switches can be produced in accordance with the present invention and used for all sorts of electrical and mechanical purposes.

Figures 53A, 53B, 53D, 53E, 54A, 54B, 54C, 54D:
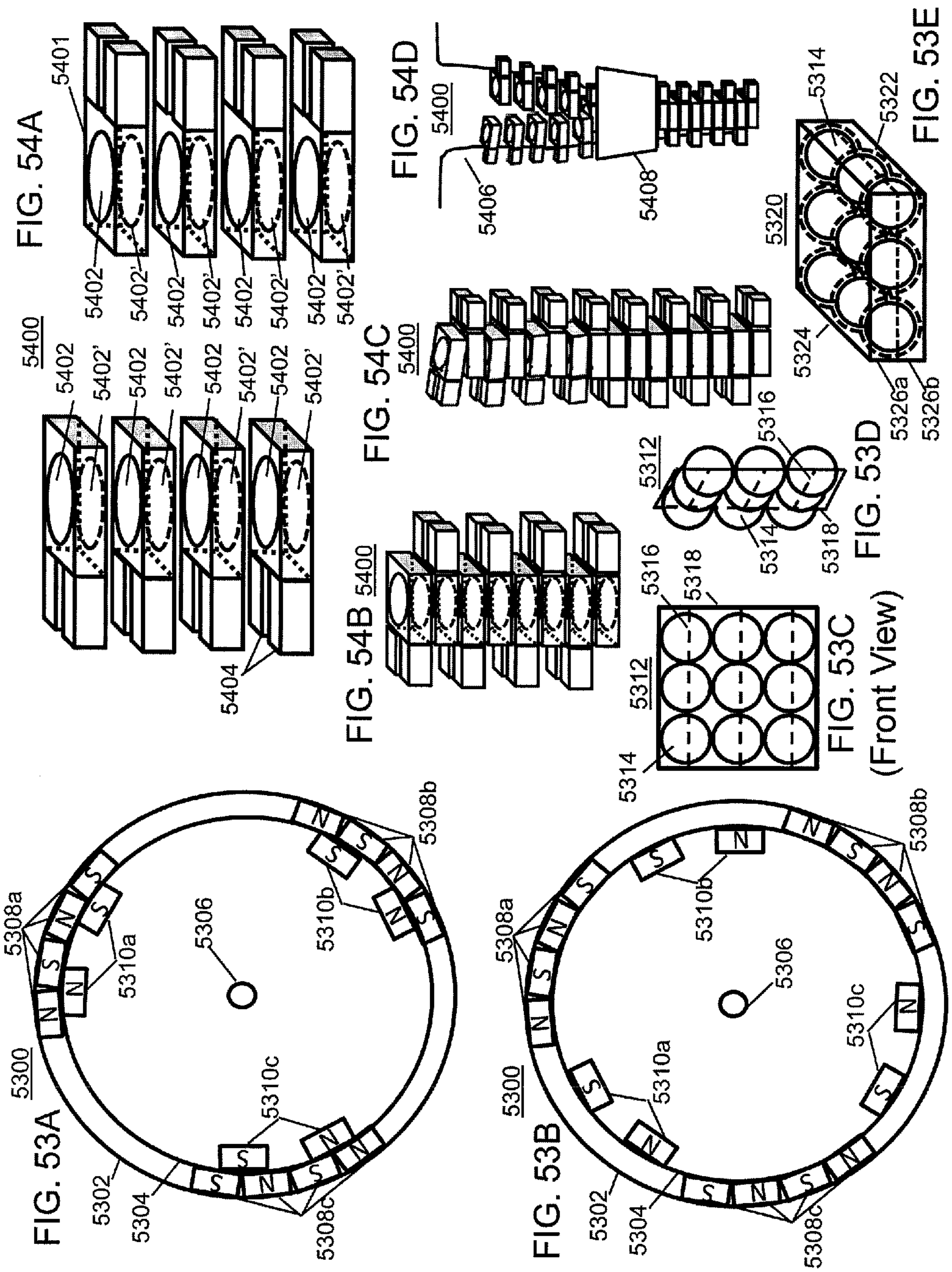

FIGS. 53A and 53B depict an exemplary configurable device 5300 comprising configurable magnetic field structures. Referring to FIG. 53A, the exemplary configurable device 5300 comprises a first object 5302 and a second object 5304 where at least one of the first object 5304 or the second object 5306 is able to rotate about an axle 5306. The first object 5302 has associated with it three groups of four magnetic field sources 5308*a*-5308*c*. The second object 5304 has associated with it three pairs of magnetic field sources 5310*a*-5310*c*. By turning the first object 5302 and/or the second object 5304, different combinations of the groups of four magnetic field sources 5308*a*-5308*c* and the pairs of magnetic field sources 5310*a*-5310*c* produce different magnetic field structures. As such, the magnetic field emission structures are configurable. For example, the second object 5304 can be turned such that the first pair of magnetic field sources 5310*a* becomes aligned with the third group of four magnetic field sources 5308*c* or with the second group of four magnetic field sources 5308*b*. The first object 5302 and/or the second object 5304 of the configurable device 5300 can be moved to produce different magnetic field structures corresponding to different combinations of groups and pairs of magnets sources. The configurable device 5300 can then be brought into contact with one or more other configurable devices 5300 and/or with one or more objects having fixed magnetic field structures in which case the correlation interaction between the structures will vary depending on the configuration of the configurable device 5300, the configuration(s) of the one or more other configurable devices, etc. As such, the basic teachings of the configurable device 5300 enable one skilled in the art to produce various products such as puzzles, combinations locks, and the like that involve one or movable objects that enable configurable magnetic field structures in relation to other configurable magnetic field structures and/or fixed magnetic field structures. Moreover, different types of products can be produced whereby the way that objects will attach to each other can be varied by configuring their magnetic field structures. A configurable device can have various mechanical or electrical mechanisms associated with it and can involve magnetic field sources of varying strengths. As depicted, the first object 5302 and the second object 5304 are round but other non-round shapes for the two objects can be used. Additionally, the three groups of four magnetic field sources can be associated with the second object and the three pairs of magnetic field sources associated with the first object. The first and second object can also be configured such that the groups and pairs of magnetic field sources overlap (i.e., one on top of the other) instead of being side by side. Generally, one skilled in the art will recognize that various types of configurable devices can be produced in accordance with the present invention and used for all sorts of purposes and that the number, size, field strengths, coding, etc. of the magnetic field sources associated with two or more objects making up a configurable device having one or more configurable magnetic field structures.

The depicted configurable device 5300 is also configured such that the groups of four magnetic field sources 5308*a*-5308*c* can be separated from the pairs of magnetic field sources 5310*a*-5310*c*. Depending on the coding of the various magnetic field sources when a group of four magnetic field sources 5308*a*, 5308*b*, or 5308*c* is combined with a pair of magnetic field sources 5310*a*, 5310*b*, or 5310*c*, the combined magnetic field sources will substantially cancel each other to some extent causing the overall field strength of the magnetic field sources to be substantially dampened, which can be useful for certain safety purposes or other purposes such as for simpler detachment of two objects. When separated from each other the various magnetic field sources in the groups and pairs of magnetic field sources will not cancel each other thus providing a different attractive or repelling behavior with another object. As such, one skilled in the art will recognize that configurable devices can be developed that are intended to enable someone to control the extent to which such a device will attract to or repel from an object.

FIGS. 53C and 53D depict front and isometric views of an exemplary configurable magnetic field structure 5312. Referring to FIGS. 53C and 53D, a configurable magnetic field structure 5312 comprises a plurality of magnetized spheres 5314 configured to rotate about axes 5316 within a frame 5318. Three magnetized spheres 5314 are shown configured to rotate about each of three axes 5316 thereby producing a 3×3 matrix of magnetic sources. In accordance with the invention, the magnetized spheres 5314 can each be rotated as necessary such that the polarities of the spheres facing the front of the configurable magnetic structure 5312 are in accordance with a code corresponding to a desired spatial force function. The magnetized spheres can be held in their desired rotations so as to maintain their coding using a holding mechanism as previously described. Under one arrangement, the magnetized spheres 5314 are coded by bringing an already configured magnetic field structure into substantial alignment with the configurable magnetic field structure to cause the magnetized spheres 5314 of the configurable magnetic field structure 5312 to rotate such that their polarities are complementary to those of the already configured magnetic field structure.

FIG. 53E depicts an isometric view of still another exemplary configurable magnetic field structure 5320. Referring to FIG. 53E, the configurable magnetic field structure 5320 comprises magnetized spheres 5314 that are free to rotate within spherically shaped recesses 5322 within an enclosure 5324. As depicted, the enclosure 5324 comprise two parts 5326*a*, 5326*b*. Under one arrangement, an adhesive is applied within the enclosure and the two parts 5326*a*, 5326*b* closed together prior to the configurable magnetic field structure 5320 being coded (or programmed) by an already configured magnetic field structure. While in substantial alignment with the configured magnetic field structure, the adhesive bonds between the magnetized spheres 5314 and the enclosure 5324 to hold them in their respective coded rotations.

Configurable magnetic field structures can be useful for certain applications where it is desirable for a first magnetic field structure to dynamically configure itself to a second magnetic field structure in order to achieve attachment of a first object to a second object without requiring a specific relative alignment of the objects. For example, the sole of an astronaut's shoe can be configured with a configurable magnetic field structure enabling that shoe to be placed on a surface having a magnetic field emission structure whereby the magnetized spheres associated with the configurable magnetic structure would dynamically rotate as necessary to correlate with the surface thereby achieving a magnetic attachment (or grip). The shoe could be released from the surface by turning the foot (i.e., the heel of the foot) enabling the shoe to be lifted off the surface, and placed again onto the surface whereby the configurable magnetic structure would again dynamically configure itself so as to achieve attachment between the shoe and the surface.

FIGS. 54A-54D depict an exemplary correlated magnetic zipper 5400 in accordance with the invention. Referring to FIG. 54A, the correlated magnetic zipper comprises a plurality of zipper teeth 5401 each having a correlated magnetic structure that is coded in accordance with a desired code. As shown, the top surface 5402 of the teeth are all coded the same and the bottom surface 5402' of the teeth would have the mirror image of the code as seen from the top of the teeth. Each of the teeth also has a garment attachment mechanism 5404 that enables each of the teeth 5401 to be attached to a garment 5406. FIG. 54B depicts the zipper when the teeth have been aligned such that the teeth correlate and attach to each other. FIG. 54C depicts the detachment process whereby the garment can be twisted on at least one side of the zipper and pulled apart to cause the teeth to turn one by one so as to cause the zipper to open. FIG. 54D depicts an exemplary zipper slider 5408 that can be used to bring the two sides of the zipper together or to separate them. A mechanism can also be used to prevent the teeth from detaching accidentally. One skilled in the art will recognize the top and bottom surfaces of the zipper teeth can be coded differently then described above, for example, the top and bottom of zipper teeth can have the same code whereby a intermediate layer may be required depending on the thickness of the zipper teeth.

Figures 55A, 55B:
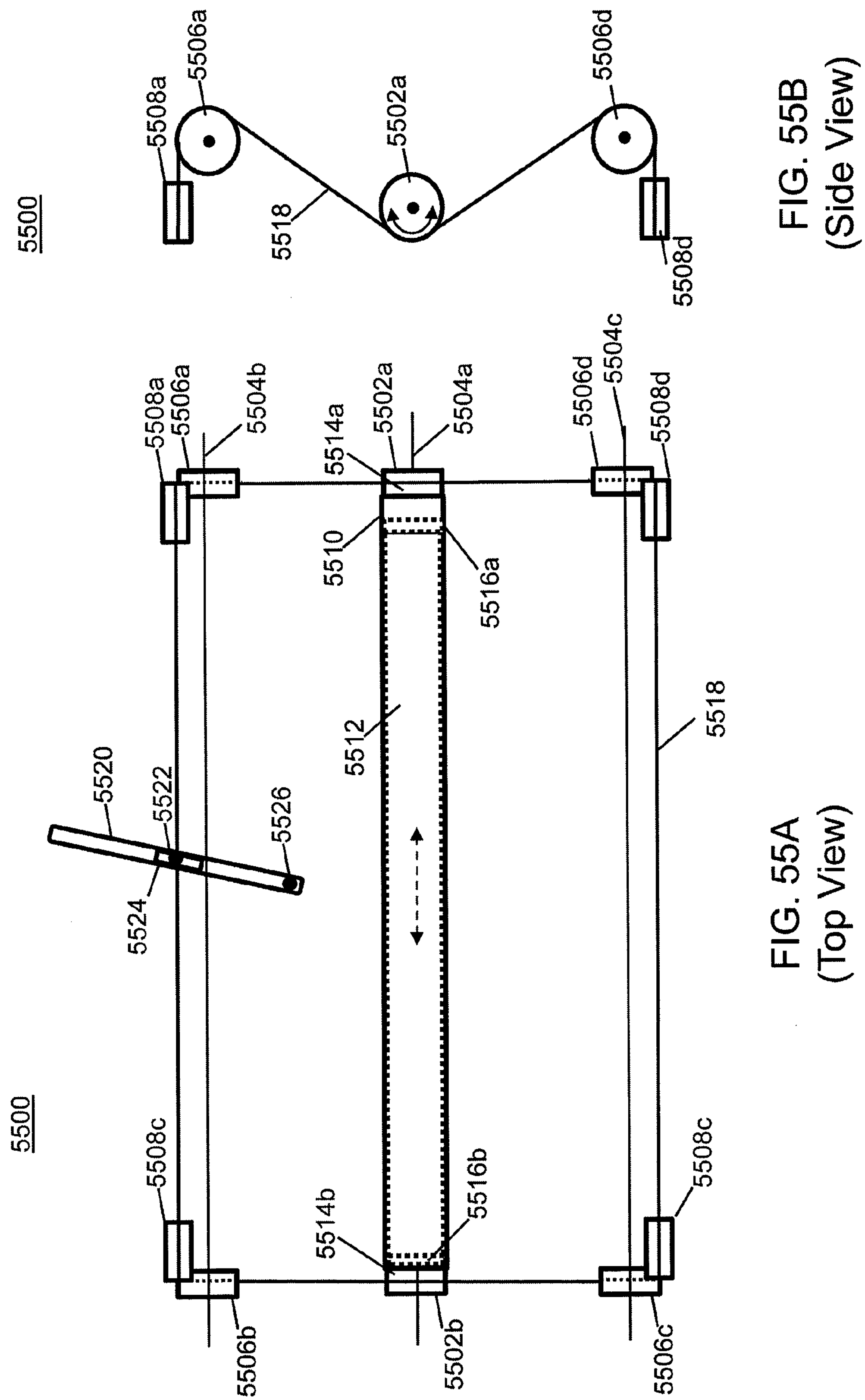
FIGS. 55A and 55B depict a top and a side view of an exemplary pulley-based apparatus.

FIGS. 55A and 55B depict a top and a side view of an exemplary pulley-based apparatus 5500 in accordance with the invention. Referring to FIG. 55A, the exemplary pulley-based apparatus 5500 comprises a first side pulley 5502*a* and a second side pulley 5502*b* that rotate about a first axis 5504*a*, two vertical corner pulleys 5506*a*, 5506*b* that rotate about a second axis 5504*b*, and two vertical corner pulleys 5506*c*, 5506*d* that rotate about a third axis 5504*c*. The apparatus 5500 also comprises four horizontal corner pulleys 5508*a*-5508*d*. A first cylinder 5510 extends between the first and second side pulleys 5502*a*, 5502*b* and has inside it a second cylinder 5512. Associated on the inside (i.e., towards the cylinders) of each of the first and second side pulleys 5502*a*, 5502*b* are first and second magnetic field structures 5514*a*, 5514*b*. Attached to each end of the second cylinder 5512 are third and fourth magnetic field structure 5516*a*, 5516*b*. A wire 5518 passes through all the pulleys and is attached to a handle 5520 at an attachment point 5522 that is able to slide within a slot 5524. The handle pivots at a pivot point 5526. When the handle is moved back and forth it causes the pulleys to turn back and forth. The first, second, third, and fourth magnetic field structures are coded and configured such that when the handle is moved to a first position, the first and third magnetic field structures will become substantially aligned and produce an attractive force while the second and fourth magnetic field structures will produce a negligible or repellant force thereby causing the second cylinder to move such that the first and third magnetic field structures substantially attach. When the handle is moved to a second position, the roles of the four structures reverse, whereby the second and fourth magnetic field structures will become substantially aligned and produce an attractive force while the first and third magnetic field structures will produce a negligible or repellant force thereby causing the second cylinder to move such that the second and fourth magnetic field structures substantially attach. Generally, one skilled in the art will recognize that pulleys can be used to turn magnetic field structures and to vary the direction of a force.

FIGS. 56A-56Q depict exemplary striped magnetic field structures. In a manner similar to that depicted in FIG. 36A, many different types of striped magnetic field structures can be produced having coded stripes of magnetic field sources. Referring to FIG. 56A a first magnetic field structure 5602 comprises a stack of seven stripes of magnetic field sources that are coded in accordance with a Barker 7 code. The first magnetic field structure can be attached to a second magnetic field structure 5604 having seven smaller magnetic field sources coded to complement (or mirror) the code of the first magnetic field structure 5602. The second magnetic field structure 5604 can be placed anywhere along the stripes of the first magnetic field structure 5602 and will correlate and attach when perpendicular to the first structure where the field sources of the second structure 5604 are aligned with the corresponding stripes of magnetic field sources of the first structure 5602. Multiple instances of the second magnetic field structure can be attached along the first magnetic field structure 5602. As such, the configurations of the first and second magnetic field structures enable applications where multiple items can be easily attached such as tools to a wall or items displayed for sale in a store. FIG. 56C depicts a third magnetic field structure 5606 that resembles the second magnetic field structure 5604 but has striped magnetic field sources sufficiently wide that the second magnetic field structure 5604 depicted in FIG. 56B could be attached at various locations along the third structure. FIG. 56D depicts a top view of the second magnetic field structure 5608, which is the mirror image of the bottom view of the second magnetic field structure 5604 shown in FIG. 56B. As such, FIGS. 56A-56D illustrate how magnetic field structures having complementary coding and stripes of magnetic field sources of different widths can be configured so that they can be stacked, attached, or otherwise assembled in various ways to support many different applications such as games, toys, puzzles, construction kits, object hanging systems, object display systems, etc.

FIGS. 56E-56G depict bottom views of exemplary letters and numbers having magnetic field emission structures having stripes and stripe portions coded to be complementary to the first magnetic field structure 5602 of FIG. 56A. FIG. 56E depicts the bottom of a letter 'O' or number '0' 5610, FIG. 56F depicts the bottom of a number '6' 5612, and FIG. 56G depicts the bottom of a letter 'E' 5614. Such exemplary letters and numbers and other similar letters and numbers having magnetic field structures complementary to the first magnetic field structure 5602 can be attached at various locations along the first magnetic field structure to convey information, which can be used in various applications such as signs, for example numbers used for gasoline pricing in gasoline station signage or other magnetic signage. Other applications include children's games having various objects having the same magnetic coding (see FIG. 56P) or children's learning tools where outlines of letters can be used where letters have the same magnetic coding (see FIG. 56Q).

FIG. 56H depicts a side view of an alternative exemplary striped field emission structure 5616 having a first portion having striped field sources 5618*a* and a second portion having striped field source 5618*b* that each slant towards a third portion 5608 having stronger magnetic field strength as indicated by the bolded '+' and '−' values. As such, the alternative structure 5616 can be placed onto a vertical surface such as a wall and a complementary magnetic field structure such as the structure 5604 shown in FIG. 56B can be placed anywhere along either of the first or second portions such that it will align and correlate such that it will attach. Depending on the weight of the object to which the complementary structure 5604 is attached, the object may remain stationary or it may slide (due to gravity) toward the third portion 5608 until the complementary structure aligns with and correlates with the third portion 5608 of the alternative structure 5616. As such, applications of such structures can be employed that enable an object to be attached quickly onto the alternative structure and then gravity will result in the ultimate desired alignment with the third portion of the alternative structure. Such an arrangement supports various assembly line operations and other such operations involving rapid placement of an object, particularly objects that may vary in size or shape yet are intended to be placed onto the same alternative structure.

FIG. 56I depicts an exemplary wavy striped magnetic field structure 5620 that is coded the same as the first magnetic field structure of FIG. 56A that is intended to show that such striped magnetic field sources can be used with many different shapes. If placed on a vertical surface such as a wall, the structure 5620 will behave similar to the structure 5616 of FIG. 56H where depending on the weight of the object to which the complementary structure 5604 is attached, the object may remain stationary or it may slide (due to gravity) toward the lowest parts of the structure (i.e., either of the two ends or towards the middle of the structure depending on where the object is initially attached).

Figures 56J, 56K, 56L:
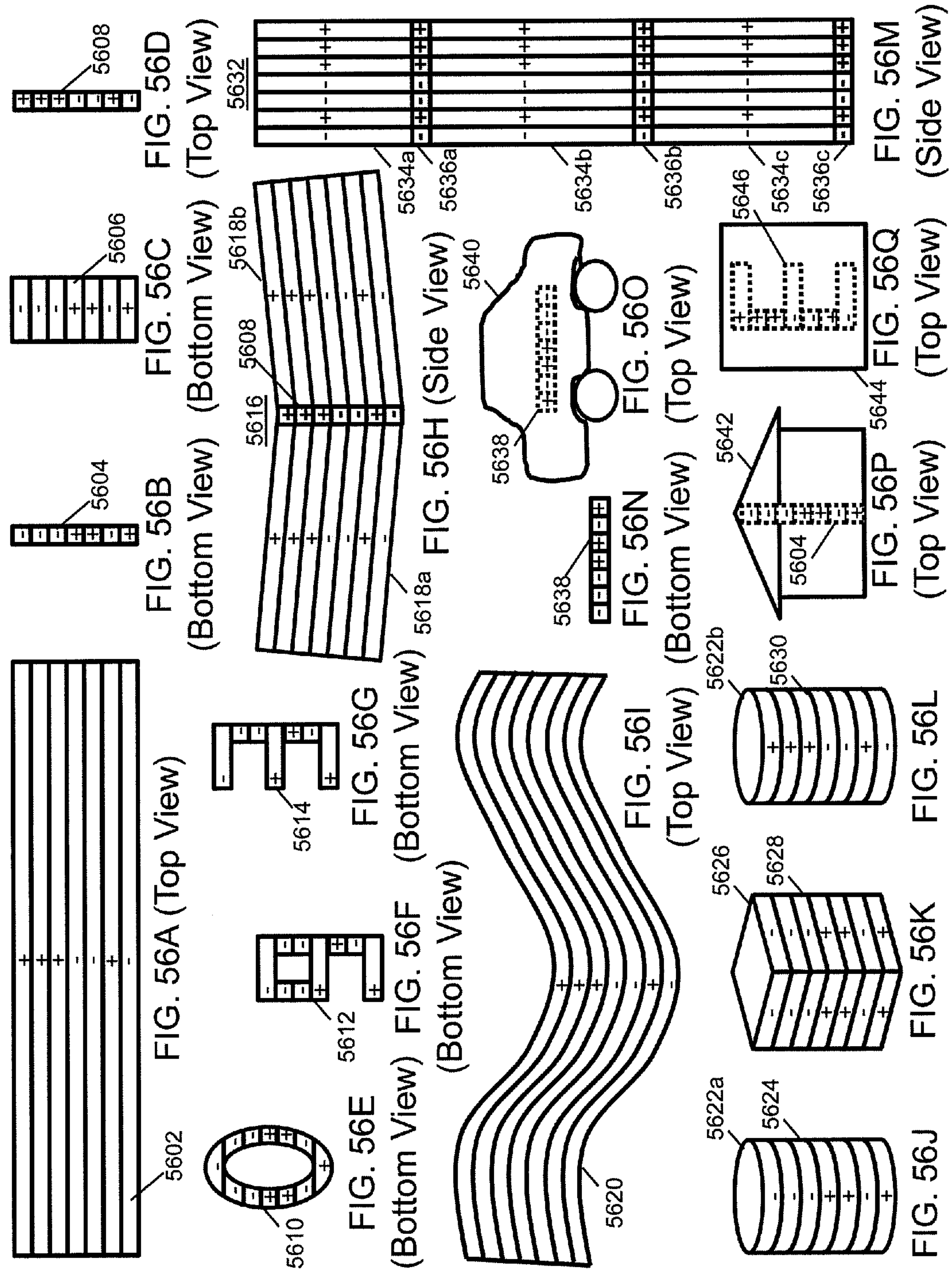
FIGS. 56A-56Q depict exemplary striped magnetic field structures.

FIGS. 56J and 56K depict two additional shapes (i.e., a cylinder 5622*a* and a block 5626) having magnetic field structures 5624, 5628 with stripes of magnetic field sources having coding that is complementary to that of the magnetic field structures 5602, 5618, and 5620 depicted in FIG. 56A, FIG. 56H, and FIG. 56I.

FIG. 56L depicts and exemplary cylinder 5622*b* comprising a striped magnetic field structure 5630 having coding that is also complementary to the cylinder 5622*a* of FIG. 56J and the block 5626 of FIG. 56K. Such cylinders and blocks demonstrate that various combinations of objects having the same or differently shaped complementary magnetic field structures having stripes of magnetic field sources can be used in various applications such as toys, tools, etc.

FIG. 56M depicts a side view of an exemplary magnetic field structure 5632 having three portions 5634*a*, 5634*b*, and 5634*c* of vertical stripes of magnetic field sources where each of the three portions 5634*a*, 5634*b*, and 5634*c* has a corresponding row of magnetic field emission sources 5636*a*, 5636*b*, and 5636*c* having stronger strengths. As such, an object having a complementary magnetic field structure such as the structure 5638 depicted in FIG. 56N can be placed onto any one of the three portions 5634*a*, 5634*b*, and 5634*c*. [Note that the structure 5638 of FIG. 56N is the same as the structure 5604 of FIG. 56B rotated 90° to the left]. Depending on the weight of the object and the field strengths of the field sources of the three portions 5634*a*, 5634*b*, and 5634*c*, the object will either remain where attached or, due to gravity, will slide to the corresponding row of magnetic field emission sources 5636*a*, 5636*b*, and 5636*c* having stronger strength. As with the structure 5616 of FIG. 56H, the structure of 5632 of FIG. 56M supports various assembly line operations and other such operations involving rapid placement of an object, particularly objects that may vary in size or shape but are intended to be placed onto the same alternative structure. FIG.

56O depicts an exemplary object 5640 having the magnetic field structure 5638 of FIG. 56N that might be placed onto the magnetic field structure 5632 of FIG. 56M where the code is shown from the top view but having polarity values of the bottom surface of the magnetic field structure 5638.

FIG. 56P depicts a top view of an exemplary object 5642 having the magnetic field structure of FIG. 56B where the code is shown from the top view but having polarity values of the bottom surface of the magnetic field structure 5604. The object can be aligned and attached to the complementary magnetic field structures 5602, 5608, 5616, 5620, 5630, 5632, and 5646 shown in FIGS. 56A, 56D, 56H, 56I, 56L, 56M and 56Q. Similarly, FIG. 56Q depicts a top view of an exemplary object 5644 having the magnetic field structure of FIG. 56A where the code is shown from the top view but having polarity values of the bottom surface of the magnetic field structure 5646. Although, the structure 5644 is intended to attach to the 'E' letter 5614 of FIG. 56G, it will also attach to the complementary structures 5604, 5604, 5610, 5612, 5624, 5628 of FIGS. 56B, 56C, 56E, 56F, 56J, 56K, and 56P.

FIGS. 57A-57F depict an exemplary torque-radial force conversion device 5700. FIG. 57A depicts a top view of a first portion 5702 of the torque-radial force conversion device 5700. The first portion 5702 comprises a first circular frame 5704, a first crossbar 5706 having two slots 5708 and a second crossbar 5710 having two slots 5712, where the first crossbar 5706 is perpendicular to the second crossbar 5710. The torque-radial force conversion device 5700 can pivot about an axis corresponding to a pivot point 5714 located in the center of the device where the two crossbars 5706, 5708 intersect. Four circular magnetic field structures 5716 each have sliding pivot points 5716 about which the circular magnetic field structures 5716 can turn and which can slide back and forth in the slots 5708, 5712.

FIG. 57B depicts a bottom view of a second portion 5720 of the torque-radial force conversion device 5700. The second portion 5720 comprises a second circular frame 5722, a third crossbar 5724, and a fourth crossbar 5726 perpendicular to the third crossbar where the two crossbars are configured to pivot about an axis corresponding to a pivot point 5714 located at the intersection point of the two crossbars, which will align with the pivot point 5714 of the first portion 5702 when the first and second portions are combined. The second portion 5720 also includes four curved armature magnetic field structures 5728 that are coded to be complementary to the circular magnetic field structures 5716 of the first portion 5702. The four semi-circular armature magnetic field structures are each attached to the second circular frame 5722 at one end such that their other ends converge near the pivot point. FIGS. 57C and 57D depict top views of the second portion 5720 by itself and also when placed on top of the first portion and rotated until the four circular magnetic field structures 5716 of the first portion 5702 align with and substantially correlate with the four corresponding four curved armature magnetic field structures. After the first and second portions 5702, 5720 are aligned and attached, the second portion 5720 can be rotated relative to the first portion 5702 and the four circular magnetic field structures 5716 will themselves rotate about their sliding pivot points 5718 as they move (or slide) inward towards the pivot point 5714, where the reverse location cause the four circular magnetic field structures 5716 to move outward. The movement of the four circular magnetic field structures relative to the turning of the second portion 5720 relative to the first portion 5702 can be seen by comparing FIGS. 57D, 57E, and 57F. Generally, many different variations of a torque-radial force conversion device 5700 are possible in accordance with the present invention to enable one or more circular magnetic field structures to be moved in a radial motion in response to a torque motion. Similarly, a torque-radial force conversion device 5700 can be configured where a radial force applied to one or more circular magnetic field structures 5716 will cause the relative turning of the first portion to the second portion, or in other words, a torque motion in response to a radial motion. Such devices 5700 can be useful for latches in a doorknob, can be useful as a clutch that might keep a cylinder from spinning, and can be useful for many other types of applications, for example where the size of an opening can be adjusted with a radial motion or the 'grip' of a clamping device can be adjusted using a torque motion.

FIG. 58A depicts an exemplary swivel mechanism 5800 comprising a magnetic field emission structure having circularly striped magnetic field sources that are configured such that there is a notch for removal of an attached complementary magnetic field emission structure. Referring to FIG. 58A, a swivel mechanism 5800 has a first magnetic field emission structure 5802 having striped magnetic field sources coded in accordance with a Barker 7 code. A notch 5804 is provided between the striped magnetic field sources enabling an attached complementary magnetic field emission structure 5604 to swivel to the notch whereby it can be removed.

Figure 58C:
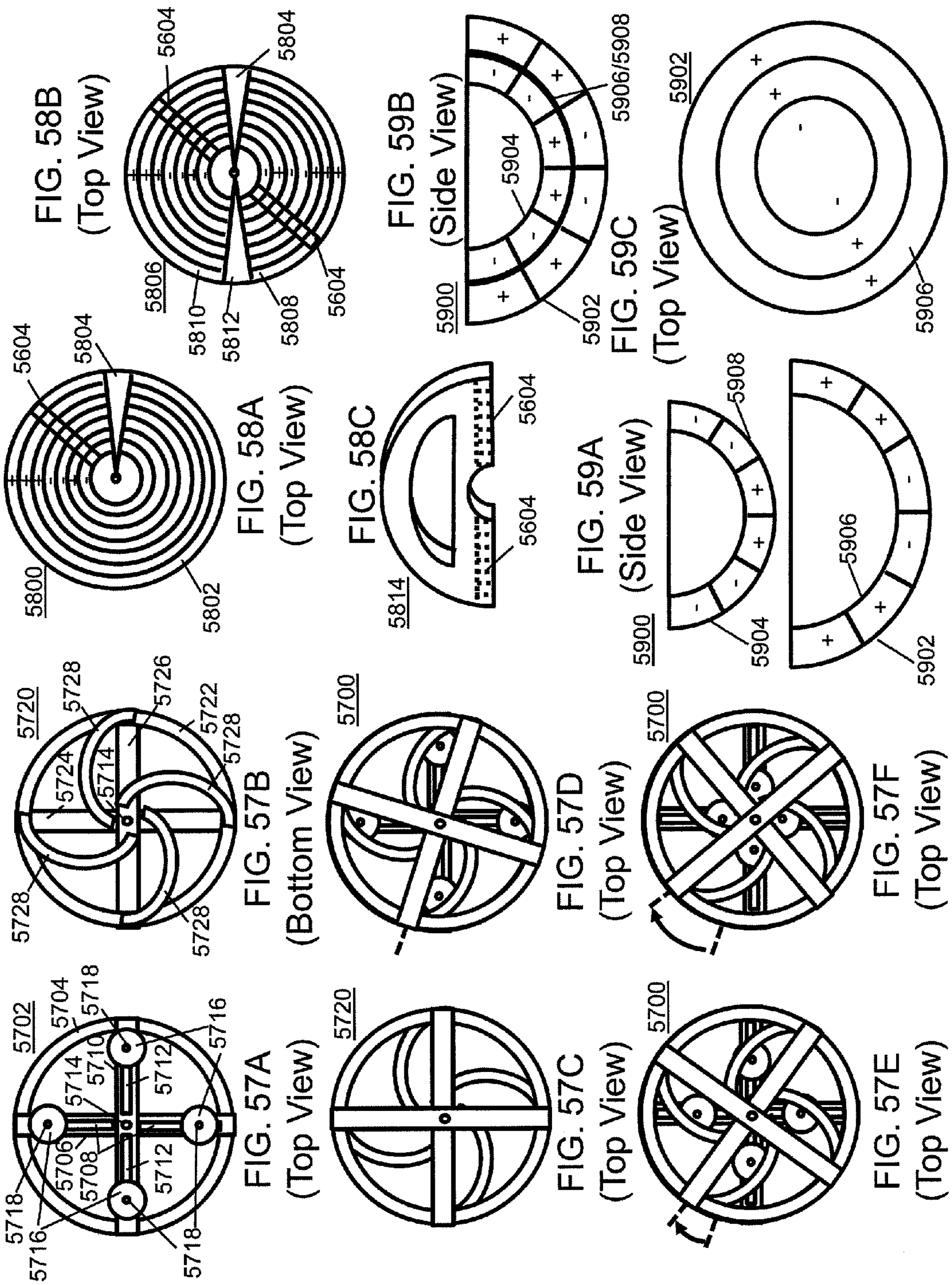

FIG. 58B depicts an alternative swivel mechanism 5806 having two slots. Referring to FIG. 5B, the alternative swivel mechanism 5806 includes a first magnetic field structure 5808 having striped magnetic field sources coded in accordance with a Barker 7 code and a second magnetic field structure 5810 also having striped magnetic field sources coded in accordance with a Barker 7 code. The first and second magnetic field structures 5808, 5810 are separated by two slots 5804, 5812. Shown are two complementary magnetic field structures 5604 attached to the two magnetic field structures 5808, 5810. FIG. 58C depicts and exemplary handle 5814 having two magnetic field structures 5604 that are complementary to the first and second magnetic field structures 5808, 5810 of FIG. 58B. As such, the handle 5814 can be placed onto the swivel mechanism 5806 to attach to another object associated with the swivel mechanism 5806 and can be used, for example, to carry that object or to otherwise move the object. When desired, the handle can be turned such that its magnetic structures 5604 align with the notches 5804, 5812 of the swivel mechanism 5806 to release the handle from the swivel mechanism/object. Depending on the strength of the magnetic field sources used, the handle 5064 can also be detached from the swivel mechanism 5800 of FIG. 58A by aligning one of its magnetic structures 5604 with the notch 5804 since doing so would allow the handle to be pulled away from the notch so the handle provides leverage required to detach the other magnetic field structure 5604 from the structure 5802 associated with the swivel mechanism 5800. Various forms of swivel mechanisms can be produced using such circularly striped magnetic field sources and notches. Although a single code is shown, multiple codes can be used. Moreover, different spacing can be employed between notches so that the notch pattern acts as a part of a 'key' required to remove (or unlock) an attached object such as a handle. Additionally, the ability of the object to turn into the notch can be prevented by a mechanical device (not shown) to prevent accidental detachment.

FIGS. 59A and 59B depict cross-sections of an exemplary snap mechanism 5900 in accordance with the invention. Referring to FIG. 59A, the exemplary snap mechanism 5900 includes an outer bowl-like part 5902 and an inner bowl-like part 5904 intended to be placed into the outer bowl-like part 5902. A first magnetic field structure 5906 is on the inside surface of the outer bowl-like part 5902. As shown, the first magnetic field structure 5906 is coded with a Barker 3 code. A second magnetic field structure 5908 is on the outside surface of the inner bowl-like part 5904 and is coded to be complementary to the first magnetic field structure 5906. As such, the inner bowl-like part 5904 can be placed into the outer bowl-like part 5902 such that the first and second magnetic field structures will align and the two parts of the snap mechanism will attach. FIG. 59C provides a top view of the inside surface of the outer bowl-like part 5902. Because of the way the magnetic field sources are configured in the snap mechanism 5900, turning either bowl-like part relative to the other will not result in cancellation of magnetic forces, which corresponds to zero torque removal. Had the coding of the bowl-like surfaces been segmented (see FIG. 59D) so that individual magnetic field sources were not fully circular, then applying a torque motion to either of the bowl-like surface could result in a release force as with other magnetic field structures described herein.

Snap mechanisms can be produced that are less than 180° around, for example, a quarter of the snap mechanism 5900. Additionally, snap mechanisms can be constructed using non-circular bowl-like shapes such as partial ellipsoid shapes, partial hyperboloid shapes, partial paraboloid shapes, and many other shapes that have curved surfaces including combinations of such shapes. Such snaps are useful for various applications including electrical connectors such as a connector for battery attachment, clothing fasteners, and the like.

Figures 60A, 60B, 60C, 61, 62A, 62B, 62C:
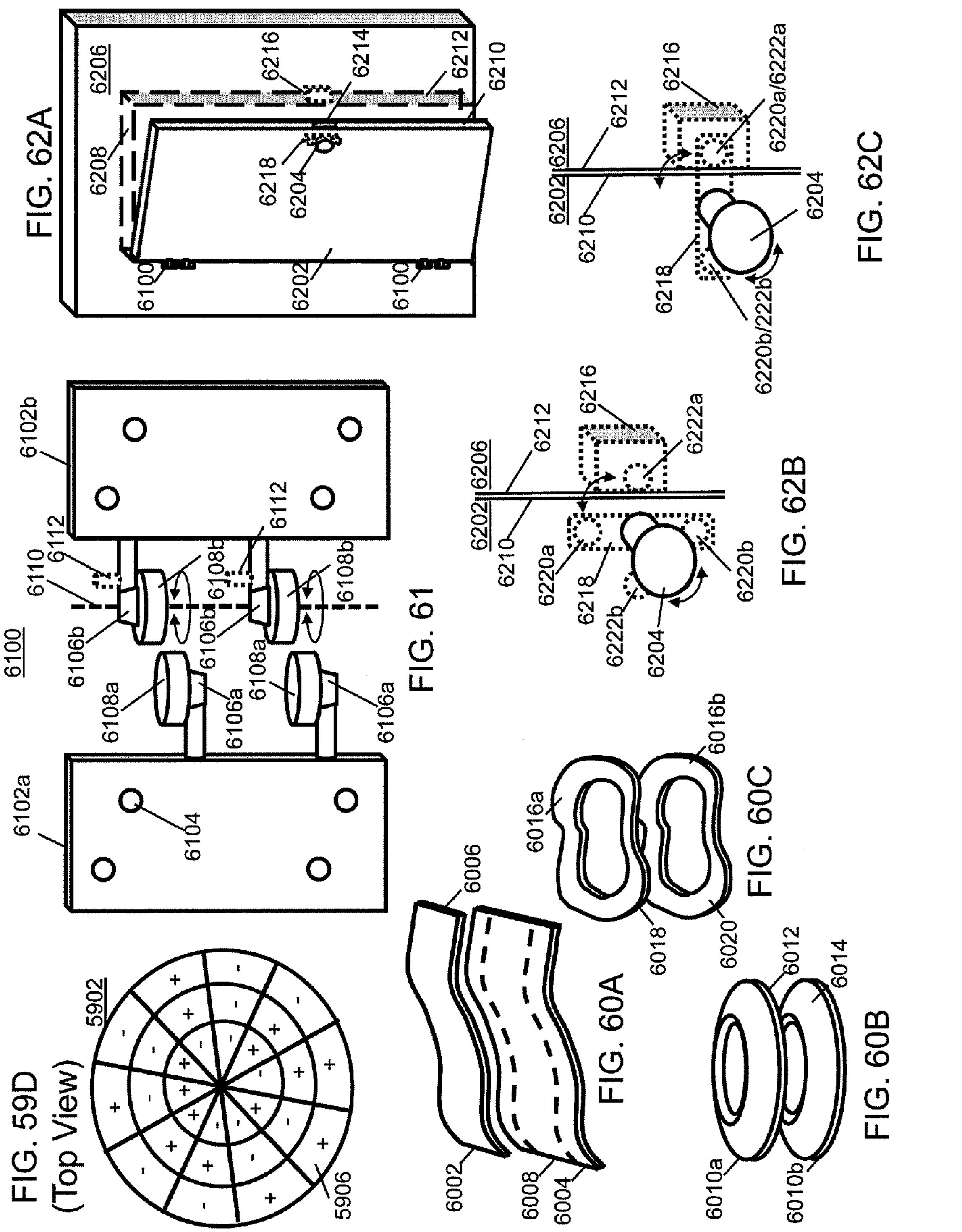
FIGS. 60A-60C depict exemplary magnetic field structures on irregular or deformed surfaces.
FIG. 61 depicts a breakaway hinge.
FIGS. 62A-62C depicts an exemplary door hinged to a door opening and associated door lock mechanisms.

FIGS. 60A-60C depict exemplary magnetic field structures on irregular or deformed surfaces. FIG. 60A depicts a first irregular shape 6002 and a second irregular shape 6004. Associated with a bottom surface of the first irregular shape 6002 is a first magnetic field structure 6006. Associated with a top surface of the second irregular shape 6004 is a second magnetic field structure 6008 that is complementary to the first magnetic field structure 6006. As such, the first and second magnetic field structures 6006, 6008 of the first and second irregular shapes 6002, 6004 can be aligned such that become attached (or repel). FIG. 60B depicts two disc-like shapes 6010*a*, 6010*b* where a bottom surface of one of the two disc-like shapes 6010*a* has a first magnetic field structure 6012 that can align with and attach to a second magnetic field structure 6014 on the top surface of the other one of the two disc-like shapes 6010*b*, where the two structures are coded to be complementary to each other. Multiple irregular or deformed structures having the same code on their top surface and the complementary code on their bottom surface can be stacked very precisely. FIG. 60C depicts another example of deformed surfaces being attached with magnetic field structures. Specifically, a first and second deformed object 6016*a*, 6016*b* have first and second magnetic field structures 6018, 6020 associated with a bottom surface of one of the deformed objects and a top surface of the other one of the deformed objects, respectively. The two magnetic field structures are coded to be complementary such that the deformed pieces can be aligned and attached. Generally, any two surfaces can be attached with complementary magnetic field structures including surfaces that have little resemblance.

FIG. 61 depicts a breakaway hinge 6100 having a first hinge piece 6102*a* and a second hinge piece 6102*b*. The first and second hinge pieces each have holes 6104 for conventional attachment of the hinges to a door and door frame using wood screws. The first hinge piece 6102*a* has two arms 6106*a* having first magnetic field emission structures 6108*a* that are fixed (i.e., unable to rotate relative to the arms 6106*a*). The second hinge piece 6102*b* has two arms 6106*b* having second magnetic field emission structures 6108*b* that are configured to rotate about an axis 6110. The top sides of the first magnetic field emission structures 6108*a* are coded such that they are the mirror images of the bottom sides of the second magnetic field emission structures 6108*b*. As such, the second magnetic field emission structure 6108*b* can be rotated until they correlate and therefore attach to the first magnetic field emission structures. Thereafter both the first and second field emission structures will remain attached as the hinge rotates. The strength of the magnet sources used in the first and second magnetic field emission structures can therefore be selected to breakaway with a desired sheer force (e.g., 40 lbs of force). Under one arrangement, depressible pins 6112 can be used to prevent the second magnetic field emission structures from rotating about the axis 6110 causing the first and second hinge pieces to disengage when the door is opened. One skilled in the art will recognize that various approaches can be employed such as use of a swivel mechanism to allow the second magnetic field emission structures to rotate about the axis. Similarly, various approaches can be employed to disable rotation of the second magnetic field emission structures so as to disengage the first and second hinge pieces. Moreover, one skilled in the art will recognize that the second magnetic field emission structures could be turned using a tool (e.g., pliers) while the hinges were held in fixed relative positions in order to release them from the first magnetic field emission structures. Under still another arrangement, the first magnetic field emission structures 6108*a* could be configured to rotate relative to the two arms 6106*a*.

FIG. 62A depicts uses of two breakaway hinges 6100 with an exemplary door 6202 having a door knob 6204 where the two breakaway hinges 6100 connect the door 6202 to a door frame 6208 within an opening in a wall 6206 such that the two breakaway hinges 6100 are on the left side of the door as shown. The door knob 6204 is nearest a right side 6210 of the door 6202. When the door 6202 is closed the right side 6210 is substantially close to an alongside a right inside surface 6212 of the door frame 6208. A first open area 6214 is located in the right side 6210 of the door 6202. A second open area 6216 is located inside right inside surface 6212 of the wall 6206 such that, when the door 6202 is closed, the first and second open areas 6214, 6216 are substantially co-located thereby allowing an exemplary door locking mechanism 6218 that is located inside the first open area 6214 in the door 6202 and is attached to the door knob 6204 to rotate with the door knob 6204. As the door knob 6204 is turned clockwise or counter clockwise, the door locking mechanism 6218 can rotate to its locked (attached) and unlocked (detached) positions, respectively.

FIG. 62B depicts the door locking mechanism 6218 shown in FIG. 62A in an unlocked position. The door locking mechanism 6218 includes first field emission structures 6220*a*, 6220*b* each having field sources, for example magnetic field sources, having positions, polarities, and field strengths in accordance with a desired spatial force function(s). Shown mounted inside the first open area 6214 of the door 6202 and inside the second open area 6216 inside the wall 6206 are second field emission structure 6222*a*, 6222*b* also having field sources, for example magnetic field sources, having positions, polarities, and field strengths in accordance with a desired spatial force function(s). Specifically, the first field emission structures 6220*a*, 6220*b* are complementary to (i.e., mirror images of) the second field emission structures such that when they are substantially aligned a peak attractive force will be produced causing them to attach to each other. Such attachment of the first field emission structures 6220*a*, 6220*b* with the second field emission structures 6222*a*, 6222*b* is depicted in FIG. 62C, which depicts the exemplary locking mechanism in a locked position. The use of two sets of complementary first and second field emission structures is exemplary and one skilled in the art will recognize that only one set of complementary first and second field emission structures is required for attachment purposes. Furthermore, many different designs could be employed for the locking mechanism 6218 and for the field emission structures themselves. Additionally, a magnetic locking mechanism can be used with a door having hinges other than breakaway hinges 6100.

Figures 63A, 63B, 63C, 63D, 63E:
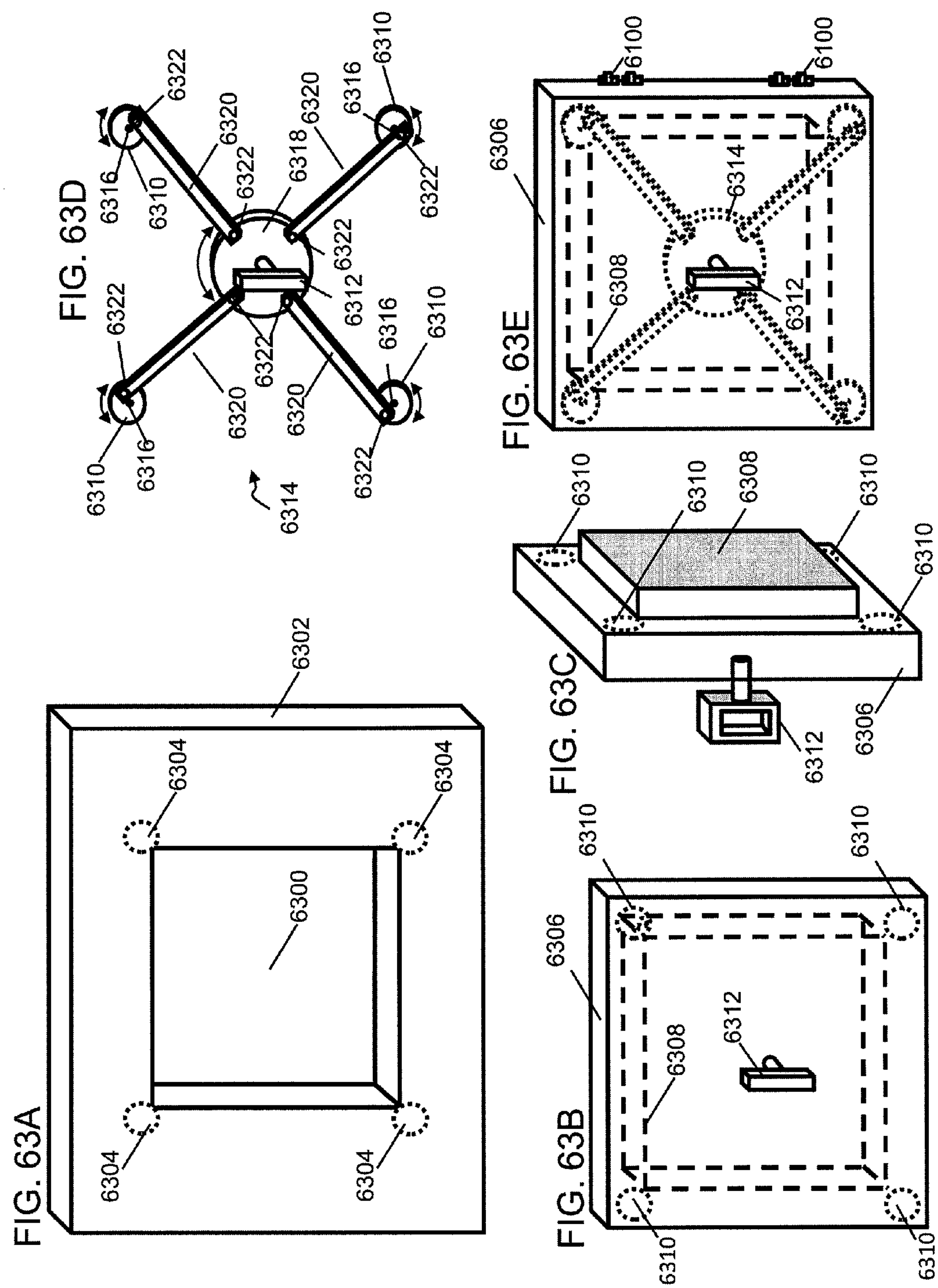
FIGS. 63A-63E depicts an exemplary hatch, exemplary hatch doors, and hatch latching mechanisms.

FIG. 63A depicts an exemplary hatch 6300 (or opening) in an object 6302, for example a hatch in a hull of a boat, a ship, a plane, a submarine, a tank, a spacecraft, etc. About the hatch 6300 are four first field emission structures 6304, for example permanent magnetic field emission structures. The first field emission structures may be installed on the outside or inside of the object 6302 such that they are not visible.

FIGS. 63B and 63C depict front and side views, respectively, of an exemplary hatch cover 6306 having four second field emission structures 6310 that are complementary to (i.e., the mirror images of) the first field emission structures 6304 about the hatch 6300 of FIG. 63A. The second field emission structures may be installed on the outside or inside of the hatch cover 6306 such that they are not visible. When the first and second field emission structures 6304, 6310 are brought into proximity and substantially aligned a peak attractive force in accordance with a desired spatial force function is produced resulting in the attachment between the object 6302 and the hatch cover 6306. Various techniques such as those previously described can be employed to provide a seal, for example a watertight seal. An optional hatch cover portion 6308 may be included that would insert inside the hatch 6300 to provide an additional seal between the object 6302 and the hatch cover 6306. The optional hatch cover portion 6308 can also be useful for aligning the first field emission structures with the second field emission structures. A handle 6312 is shown that can be used to control movement of the hatch cover 6306. It can be pulled on to detach the hatch cover 6306 from the object 6302. The hatch cover can also be hinged to the object.

FIG. 63D depicts and exemplary mechanical latching mechanism 6314 that can be employed with a hatch cover 6306. The mechanical latching mechanism 6314 includes four second field emission structures 6310 that are like those shown in FIGS. 63B and 63C except they are configured to rotate about their respective axes 6316. Attached to a handle 6312 is a bracket 6318. Attached to the bracket 6318 and to the four second field emission structures 6310 are four rods 6320. Each end of the four rods 6320 is attached to the bracket 6318 and to a respective second field emission structure 6310 by pivot points 6322. As such, when the handle 6312 is turned clockwise or counterclockwise, the bracket 6314 also turns causing the four rods 6320 to move and rotate the second magnetic field emission structures 6310. By using the mechanical latching mechanism 6314, much stronger field emission sources can be used to achieve a stronger seal whereby the mechanical latching mechanism 6314 can be used to align the first and second field emission structures to achieve a peak attractive force and resulting attachment, and also can be used to misalign the first and second field emission structures 6304, 6310 to release the hatch cover 6306 from the object 6302.

FIG. 63E depicts the mechanical latching mechanism 6314 installed inside the hatch cover 6306. Also shown in FIG. 63E are breakaway hinges 6100. One skilled in the art will recognize that different hatch and hatch cover sizes and shapes (e.g., round, octagonal, rectangular), different numbers, shapes, and sizes of field emission structures, different numbers and shapes of handles, different mechanical latching mechanisms, different hinges, etc. can be employed as well as conventional hinges and sealing mechanisms such as rubber gaskets.

Figure 64B:
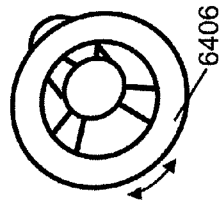
FIG. 64B depicts an exemplary hand wheel that can replace the knob depicted in FIG. 64A.
Figure 64A:
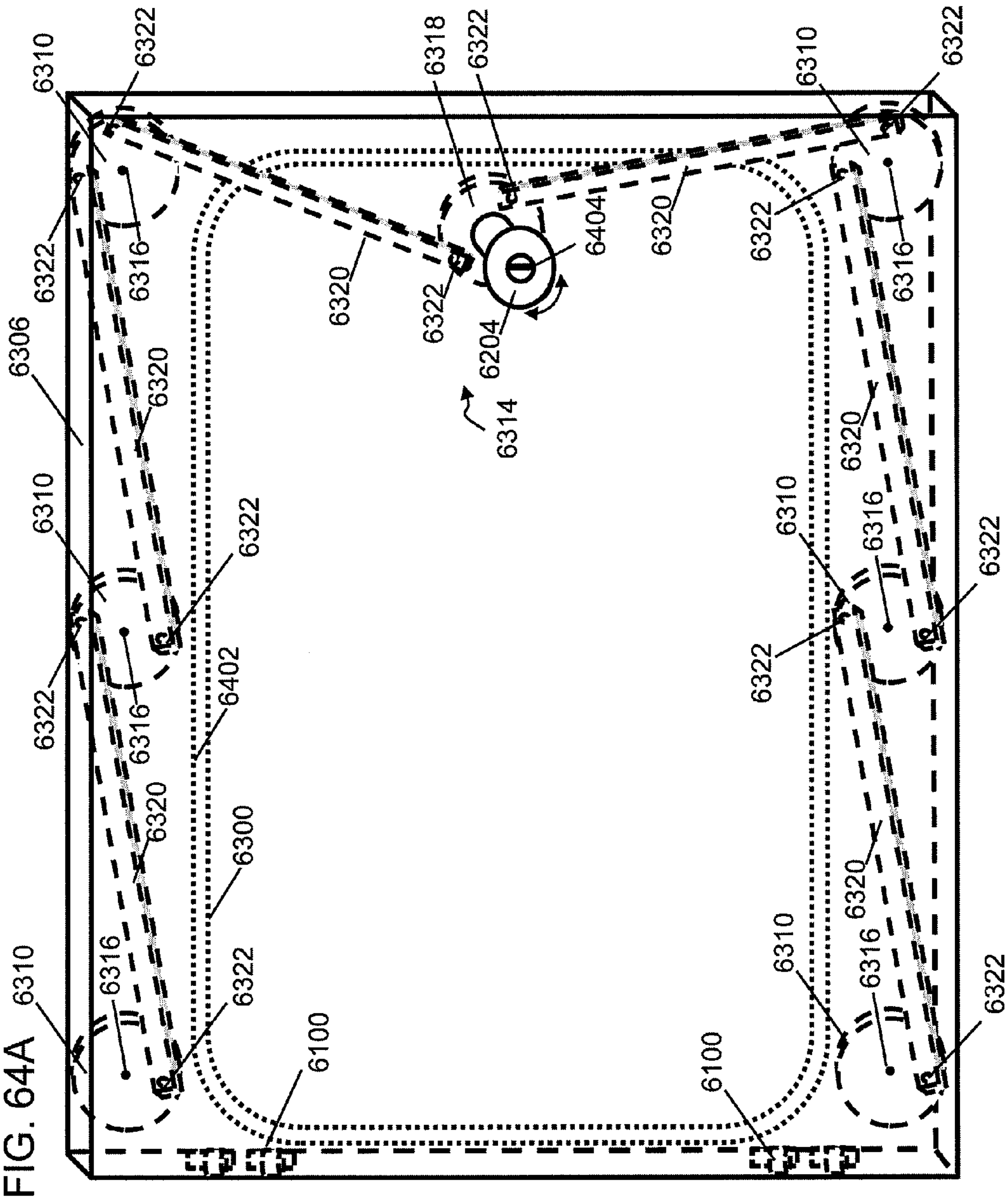
FIG. 64A depicts an alternative hatch door and latching mechanism.

FIG. 64A depicts another exemplary mechanical latching mechanism 6314 installed inside another exemplary hatch cover 6306. The mechanical latching mechanism 6314 of FIG. 64A shows daisy-chained rotatable field emission structures 6310 that rotate about their respective axes 6316. When the door knob 6204 is turned, an attached bracket 6318 also turns causing the attached chain of rotatable field emission structures 6310 to turn due to their daisy-chained linkage by a sequence of rods 6320 that pivot about pivot points 6322. As such, the mechanical latching mechanism 6314 can be used to turn the rotatable field emission structures 6310 relative to fixed complementary field emission structures 6304 (not shown) surrounding a hatch 6300 so as to align (attach) or un-align (detach) them. FIG. 64A also depicts hinges 6100 and a gasket 6402 that can be installed around the opening of the hatch 6300 and/or on the inside surface of the hatch cover 6306. It also shows a keyhole 6404 in the door knob 6204 that would receive a key used as part of locking mechanism (not shown). Daisy-chained rotatable field emission structures are useful for applications where multiple attachment locations are desired along a long surface. For example, a truck bed cover might having hinges located near the cab of a truck and a key mechanism near the tailgate of the truck whereby a truck bed cover could be fastened to the top of the sides of the truck and could also fasten to the top of the tailgate (when in the closed position). FIG. 64B depicts a hand wheel 6406 that could be used in place of the door knob 6204.

FIG. 65A depicts a top view of an exemplary door handle assembly 6500 in accordance with the present invention. Referring to FIG. 65A, a door 6202 is shown in a closed position relative to a door frame 6208. The door handle assembly 6500 includes a first doorknob 6204*a* located on the inside of a door 6202 and a second doorknob 6204*b* located on the outside of the door 6202. The two doorknobs 6204*a*, 6204*b* are attached to the door 6202 by attachment plates 6502*a*, 6502*b* such that they rotate about a first axis 6110*a*. A door locking mechanism including a push button 6504 and a recessed area 6506 can be used to prevent the first doorknob from rotating thereby locking the door. Also depicted in FIG. 65A is a keyhole 6404 in which a key can be used to unlock a locking mechanism.

The doorknobs 6204*a*, 6204*b* are attached by three magnetic field emission structures 6310*a*, 6310*b*, and 6310*c*. The first magnetic field emission structure 6310*a* is connected to the first doorknob 6204*a* and the second magnetic field emission structure 6310*b* is connected to the second doorknob 6204*b* such that they also rotate about the first axis 6110*a*. As the first and second magnetic field emission structures 6310*a*, 6310*b* rotate about the first axis 6110*a*, they correlate with and attach to the third magnetic field emission structure 6310*c* causing it to rotate about a second axis 6110*b*. As such, the first, second, and third magnetic field emission structures 6310*a*, 6310*b*, and 6310*c* are configured to function as bevel gears, whereby the third magnetic field emission structure 6310*c* can be turned from a first position where it is aligned with a fourth magnetic field emission structure 6310*d* to a second position where it is not-aligned with the fourth magnetic field emission structure 6310*d*. When aligned, the third and fourth magnetic field emission structures 6310*c*, 6310*d* achieve a peak attractive force that locks the door. When the third and fourth magnetic field emission structures 6310*c*, 6310*d* are non-aligned, they achieve a minimal or zero force thereby allowing the door to open. Also depicted in FIG. 65A are fifth and sixth magnetic field emission structures 6508_a_, 6508_b_ configured to produce a repelling force that prevents the door 6202 from hitting the door jamb 6510. Under one arrangement, the fifth and sixth magnetic field emission structures are multi-level structures whereby stronger and weaker magnetic field sources are used to achieve equilibrium at some distance apart. One skilled in the art will recognize that the bevel angle 6512 of such structures can be varied to achieve different configurations and that conventional gears can be used in place of the first and second magnetic field emission structures 6310_a_, 6310_b_ and used to turn the third magnetic field emission structure 6310_c_ relative to the fourth magnetic field emission structure 6310_d_. Under such an arrangement, the third magnetic field emission structure 6310_c_ would not need to be beveled and could instead be shaped like the fourth magnetic field emission structure 6310_d_.

FIG. 65B depicts the third magnetic field emission structure 6310_c_ of FIG. 65A as seen from inside the door 6202 facing towards the door frame 6208.

Magnetic field emission structures can be configured to function as other types of conventional gears including spur gears, helical gears, double helical gears, hypoid gears, worm gears, rack and pinion gears, sun and planet gears, non-circular gears, harmonic drive gears, herringbone gears, angle gears, crown gears, face gears, screw gears, epicycling gears, etc. Generally, various types of gears produced using magnetic field emission structures can be used to produce various types of door handle assemblies and locking mechanisms and can be used for many other useful purposes. Such magnetic gears would have magnetic field emission sources that engage (attract) when correlated in place of teeth or cogs. As such, the basic geometries employed in conventional gears can be employed using wheels (or cylinders) or other shapes having smooth services where the orientations of the magnetic field emission sources on the cylinders (or other shapes) have essentially the same orientations as the teeth on conventional gears. FIGS. 65C-65I depict several additional examples of such magnetic gears and should serve to teach one skilled in the art the basic principles of how magnetic gears can be configured to replace conventional gears.

Figures 65C, 65D, 65E, 65F:
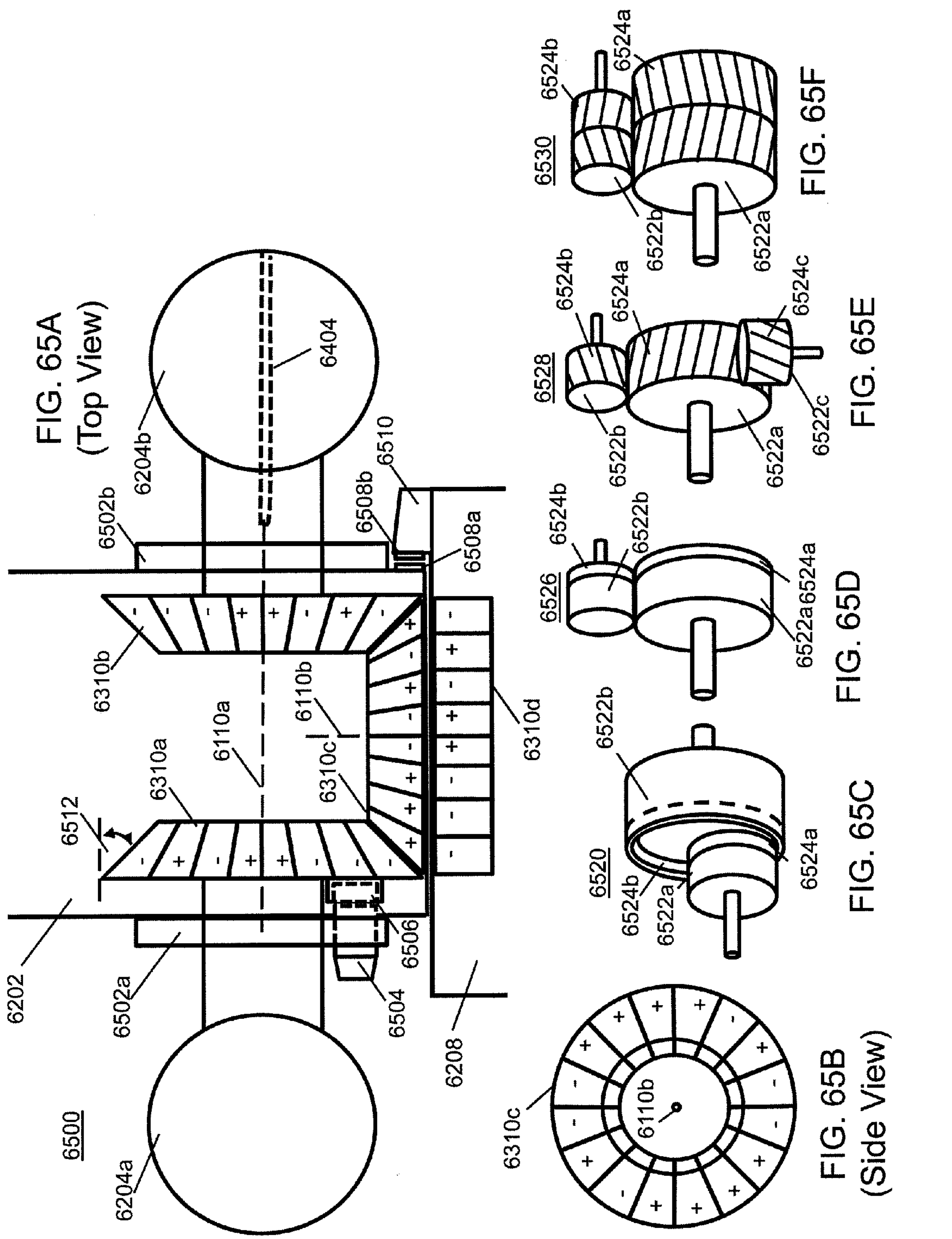

FIG. 65C depicts an exemplary external-internal gear apparatus 6520 including a first cylinder 6522_a_ having a first circular magnetic field emission structure 6524_a_ on an outside surface and a second cylinder 6522_b_ having a second circular magnetic field emission structure 6524_b_ on an inner surface. The first and second cylinders 6522_a_, 6522_b_ can be brought together such that the first cylinder 6522_a_ resides partially inside the second cylinder 6522_b_ such that the first and second magnetic field emission structures can correlate to achieve a magnetic attachment. The first and second magnetic field emission structures would typically have an appropriate ratio of the diameter of the outside surface of the first cylinder 6522_a_ to the diameter of the inside surface of the second cylinder 6522_b_, where some number of code modulos must match between the first and second magnetic field emission structures 6524_a_, 6524_b_. For example, the second magnetic field emission structure 6524_b_ might comprise two code modulos of a code that defines the first magnetic field emission structure 6524_a_ (although they are coded to be mirror images of each other). As such, the first cylinder 6522_a_ would rotate twice for each revolution of the second cylinder 6522_b_. Additionally, the first and second cylinders rotate together in the same direction.

FIG. 65D depicts an exemplary spur gear apparatus 6526 where a first cylinder 6522_a_ and a second cylinder 6522_b_ have complementary circular magnetic field emission structures 6524_a_, 6524_b_ on their outside surfaces such that they can correlate. One would typically need to achieve an appropriate ratio of the diameters of the outside diameters of the two cylinders. In the example depicted in FIG. 65D, the second cylinder 6522_b_ rotates four times for each rotation of the first cylinder. Additionally, the first and second cylinders rotate in opposite directions.

FIG. 65E depicts an exemplary helical gear apparatus 6528 including a first cylinder 6522_a_ having first magnetic field emission structures 6524_a_ at right-handed helix angles, a second cylinder 6522_b_ having second magnetic field emission structures 6524_b_ at left-handed helix angles that are the negative of the right-handed helix angles of the first magnetic field emission structures 6524. As such, the first and second cylinders are shown meshed in a parallel mode. The first and second magnetic field emission structures are coded such that they are mirror images of each other and the first and second cylinders rotate in opposite directions. The helical gear apparatus 6528 also includes a third cylinder 6522_c_ also having third magnetic field emission structures 6526 at right-handed helix angles, where the first and third cylinders are shown meshed in a crossed mode. The first and third magnetic field emission structures are coded such that they are mirror images of each other and the first and third cylinders rotate in opposite directions.

FIG. 65F depicts an exemplary double helical gear apparatus 6530 including two cylinders 6522_a_, 6522_b_. The first cylinder 6522_a_ has first magnetic field emission structures 6524_a_ configured at right-handed helix angles and then left-handed helix angles whereas the second cylinder 6522_b_ has second magnetic field emission structures configured at left-handed helix angles and then right-handed helix angles. The magnetic field emission structures are coded to be mirror images of each other and the first and second cylinders rotate in opposite directions.

FIG. 65G depicts an exemplary worm gear apparatus 6532 including two cylinders 6522_a_, 6522_b_. The first cylinder 6522_a_ has a first magnetic field emission structure 6524_a_ that spirals around the first cylinder from one end to the other end. A second cylinder has a second magnetic field emission structure 6524_b_ that is circular. The first magnetic field emission structure is coded to have multiple code modulos of code used to define the second magnetic field emission structure. As such, as the first magnetic field emission structure turns, the second field emission structure will slowly move across it, where turning the first magnetic field emission structure clockwise causes the second magnetic field emission structure to move to the right and turning the first magnetic field emission structure counterclockwise cause the second magnetic field emission structure to move to the left.

FIG. 65H depicts an exemplary non-circular gear apparatus 6534 including two non-circular shapes 6536_a_, 6536_b_. The first non-circular shape 6536_a_ has a first magnetic field emission structure 6524_a_ around its outer surface and the second non-circular shape 6536_b_ has a second magnetic field emission structure 6524_b_ around its outer surface. The first and second magnetic field emission structures are designed to be complementary such that they remain correlated as the two non-circular shapes 6536_a_, 6536_b_ turn relative to one another.

FIG. 65H depicts a second exemplary non-circular gear apparatus 6538 including two non-circular shapes 6540_a_, 6540_b_. The first non-circular shape 6540_a_ has a first magnetic field emission structure 6524_a_ around its outer surface and the second non-circular shape 6540_b_ has a second magnetic field emission structure 6524_b_ around its outer surface. The first and second magnetic field emission structures are designed to be complementary such that they remain correlated as the two non-circular shapes 6540*a*, 6540*b* turn relative to one another. One skilled in the art will understand that many different types of magnetic non-circular gears can be designed such that their complementary magnetic field structures remain correlated.

FIG. 66A depicts a top view of another exemplary door handle assembly 6600 in accordance with the present invention. The door handle assembly 6600 of FIG. 66A is similar to the door handle assembly 6500 of FIG. 65A except that it uses an unlocking mechanism 6606 in place of a second doorknob 6204*b*. The second magnetic field emission structure has associated with it a seventh magnetic field emission structure 6602*a* that is attached to an intermediate layer 6604 that is attached to the second magnetic field emission structure. The intermediate layer 6604 serves to isolate the magnetic field emissions of the second magnetic field emission structure 6310*b* from those of the seventh magnetic field emission structure 6602*a*. The seventh magnetic field emission structure can be coded in accordance with a unique code that would correspond to a form of key or combination for a given lock (or locks). An unlocking mechanism 6606 having an eighth magnetic field emission structure 6602*b* also coded in accordance with the unique code used to code the seventh magnetic field emission structure 6602*a* but being the mirror image of the seventh magnetic field emission structure 6602*a* can be aligned with it to produce a peak attractive force that would cause the seventh and eighth magnetic field emission structures 6602*a*, 6602*b* to magnetically attach. Thus, turning the unlocking mechanism 6606 will turn the second magnetic field emission structure 6310*b* thereby causing the third magnetic field emission structure 6310*c* to align with (i.e., attach to) or not align with (i.e., detach from) the fourth magnetic field emission structure 6310*d*.

FIG. 66B depicts a side view of the second magnetic field emission structure 6310*b* as seen from the outside of the door 6202. Also shown are the intermediate layer 6604, the seventh magnetic field structure 6602*a*, and the first axis 6110*a*.

FIG. 67A depicts a top view of an exemplary replaceable door handle assembly 6700 in accordance with the present invention. Referring to FIG. 67A, a door 6202 is shown in a closed position relative to a door frame 6208. The door handle assembly 6700 includes a first doorknob 6204*a* located on the inside of a door 6202 and a second doorknob 6204*b* located on the outside of the door 6202. The two doorknobs 6204*a*, 6204*b* are attached to the door 6202 using attachment plates 6502*a*, 6502*b* such that they rotate about a first axis 6110*a*. The first attachment plate 6502*a* is configured to include a first magnetic field emission structure 6310*a* that is complementary to a second magnetic field emission structure 6310*b* that is integrated with a the door 6202. As depicted the first attachment plate 6502*a* includes an inner portion 6701 that is attached to the door using a first attachment device 6702*a* (e.g., a wood screw). The inner portion 6701 is also attached to the second attachment plate 6502*b* by a second attachment device 6702*b* (e.g., a threaded bolt). The second attachment plate 6502*b* is also attached to the door 6202 via a third attachment device 6702*c* (e.g., an angular part). One skilled in the art will recognize that many different attachment approaches can be used to attach the first and second doorknobs 6204*a*, 6204*b* to the door 6202. The first magnetic field emission structure 6310*a* can be rotated until it correlates with (and therefore attaches to) the second magnetic field emission structure 6310*b*, which is coded to be complementary to the first magnetic field emission structure 6310*a*. Optionally associated with the first attachment plate 6502*a* is a first and second latching mechanism 6704*a*, 6704*b* that can be latched into recesses 6706*a*, 6706*b* in order to prevent the first magnetic field emission structure 6310*a* from being turned so as to detach from the second magnetic field emission structure 6310*b*. The latching mechanisms 6704*a*, 6704*b* can be unlatched from the recesses 706*a*, 706*b* to allow removal of the first doorknob 6204*a* from the door 6202. The first attachment plate 6502*a* includes a hole 6708 that allows a first shaft portion 6710*a* of the first doorknob 6204*a* to be placed into the door. A second shaft portion 6710*b* associated with the second doorknob can be placed through a similar hole 6708 in the second attachment plate 6502*b*. A first conventional bevel gear 6712*a* is attached to the first shaft portion 6710*a* and turns with the first doorknob 6204*a*. A second conventional bevel gear 6712*b* is attached by an attachment portion 6714 to a third magnetic field emission structure 6310*c*. As the first conventional bevel gear 6712*a* turns, it turns the second conventional bevel gear 6712*b* about a second axis 6110*b*. As such, the third magnetic field emission structure 6310*c* will rotate when the first doorknob 6204*a* is turned in a first direction (e.g., clockwise) so that it will correlate and therefore attach to a complementary fourth magnetic field emission structure integrated into the door frame 6208. Similarly, the third magnetic field emission structure 6310*c* will rotate when the first doorknob 6204*a* is turned in a second direction (e.g., counterclockwise) so that it will de-correlate and therefore detach from the fourth magnetic field emission structure. The first beveled gear 6712*a* is also attached to the second doorknob 6204*b* by an attachment rod 6716. Also depicted in FIG. 67A is a locking mechanism 6718 in which a key can be used to unlock or lock the door 6202. Under one arrangement, the first doorknob 6204*a*, the first shaft portion 6710*a*, the first beveled gear 6712*a*, the attachment rod 6716, and the locking mechanism 6718 can be easily removed by rotating the first magnetic field emission structure 6310*a* relative to the second magnetic field emission structure 6310*b* so that it decorrelates. As such, exemplary replaceable door handle assembly 6700 enables a homeowner to replace portions of the assembly 6700 quickly and easily such as the first doorknob 6204*a* or the locking mechanism 6718.

FIG. 67B depicts the first attachment plate 6502*a* as seen from the inside of the first attachment plate. Inside the lip of the first attachment plate 6502*a* is the first magnetic field emission structure 6310*a*, which is circular in shape. Also shown are the first and second latching mechanisms 6704*a*, 6704*b* and the hole 6708.

FIG. 67C depicts the third magnetic field emission structure 6310*c* of FIG. 67A as seen from inside the door 6202 facing towards the door frame 6208 such that it rotates about a second axis 6110*b*.

One skilled in the art will recognize that a seller of doorknob assemblies could produce a variety of doorknobs having different shapes, styles, etc. that could all have a magnetic field emission structure that is the same as the first magnetic field emission structure 6310*a* depicted in FIGS. 67A and 67B. Manufacturers of doors could integrate into doors the remainder of the doorknob apparatus including the second magnetic field emission structure 6310*b*. As such, doorknob assembly by homeowners could be greatly simplified thereby incentivizing homeowners to upgrade (or change) their doorknobs and associated lock mechanisms more often. Such standardization of doorknob assemblies also enables recycling. Similar replaceable knob assemblies can be used to allow different knobs to attach to drawers, cabinet doors, etc. where the knob itself is not intended to turn. In other words, knobs having a first magnetic field emission structure could attach to drawers, cabinet doors, etc. having a second magnetic field emission structure integrated into them. So, as with the doorknob assembly described previously, homeowners could more easily install and replace various types of knobs in a home.

Figures 68C, 68D, 68E, 68F, 68G:
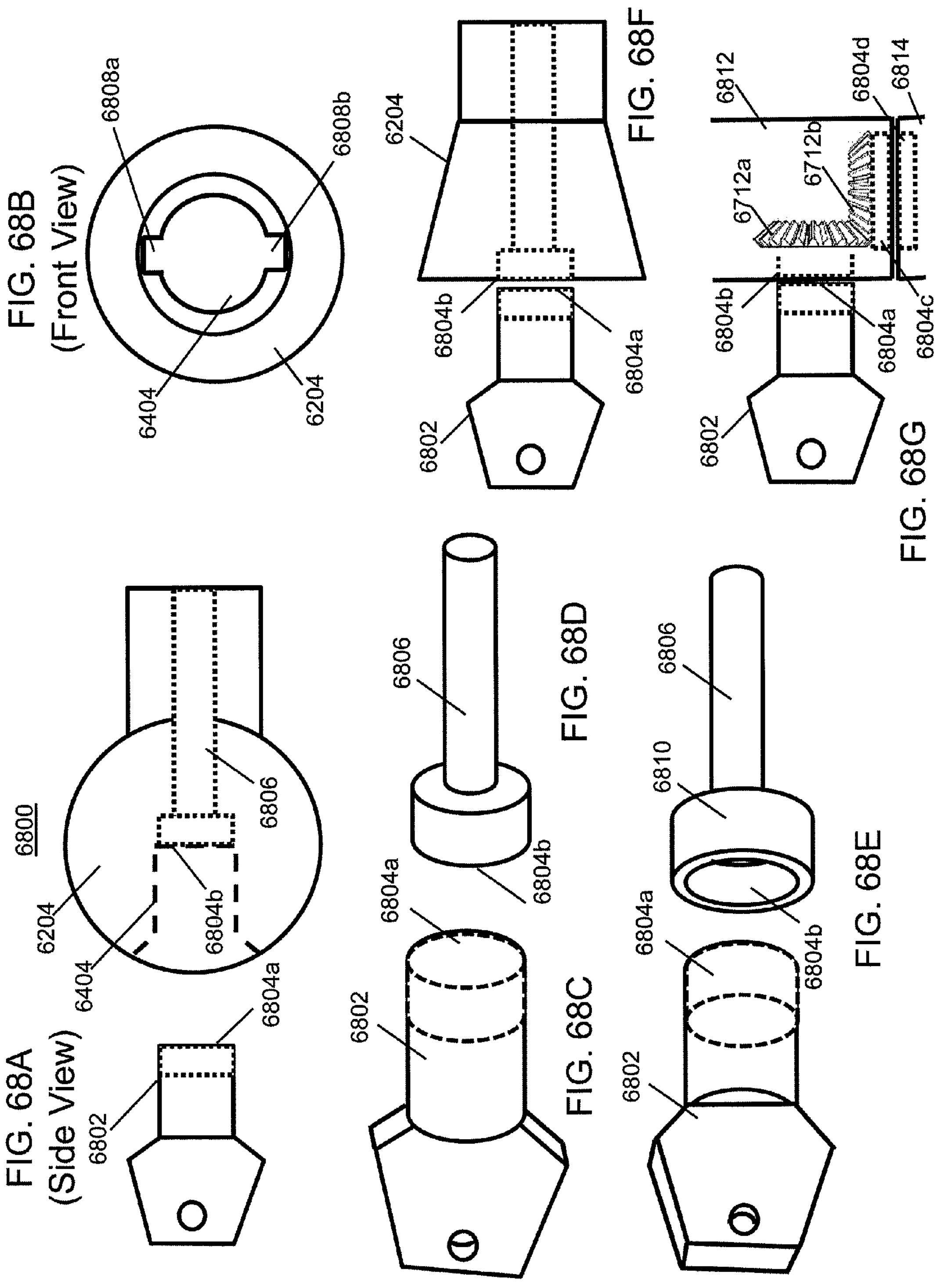

FIG. 68A depicts a side view of another exemplary doorknob apparatus 6800 including a doorknob 6204 and a key 6802 having a cylindrical portion and a holding portion resembling a pentagon. A front view of the doorknob 6204 is provided in FIG. 68B, where a keyhole 6404 includes guide slots 6808*a*, 6808*b* intended to enable easy alignment of the key 6802 into the keyhole 6404. The doorknob 6204 can receive through the keyhole 6404 a key 6802 having associated with its front face a first magnetic field emission structure 6804*a*. If properly coded, the first magnetic field emission structure will properly correlate and therefore attach to a second magnetic field emission structure 6804*b* associated with a lock mechanism inside the doorknob 6204. As depicted, the lock mechanism includes a shaft 6806 that can turn when the key 6802 is inserted into the keyhole 6404, the two magnetic field emission structures 6804*a*, 6804*b* correlate, and the key is turned. At some point, the shaft 6806 would be prevented from turning, whereby the continued turning of the key would cause the first and second magnetic field emission structures 6804*a*, 6804*b* to decorrelate thereby releasing the key 6802 from the keyhole 6404. FIG. 68C provides another view of the key 6802 where the first magnetic field emission structure 6804*a* is on the front face of the key 6802. FIG. 68D depicts another view of the second magnetic field emission structure 6804*b* attached to shaft 6806.

One skilled in the art will recognize that the shaft 6806 is merely representative and can be replaced by one or more other mechanisms that could be used as part of a locking mechanism. Under one alternative arrangement, the placement of the key 6802 into the keyhole 6404 causes the second magnetic field emission structure to move towards the first magnetic field emission structure to affect a locking mechanism. In another alternative arrangement, the first and second magnetic field emission structures are anti-complementary structures such that when the key 6802 is fully inserted into the keyhole 6404, the second magnetic field emission structure 6804*b* will be repelled by the first magnetic field emission structure and thereby affect a locking mechanism. Under still another arrangement, whether or not the placement of the key causes the second magnetic field emission structure to be attracted to or repelled by the first magnetic field emission structure depends on the orientation of the key. Specifically, placing the key in the keyhole with a first side up causes an attraction force between the first and second magnetic field emission structures and placing the key in the keyhole with a second (opposite) side up causes a repelling force between the first and second magnetic field emission structures, where the attraction and repelling forces are used to lock and unlock the doorknob apparatus, or vice versa.

Under yet another arrangement depicted in FIG. 68E, the first magnetic field emission structure 6804*a* is on the outside surface of the key 6802 in a manner like that of the external gear of FIG. 65C and the second magnetic field emission structure is on the inside of a cylinder 6810 like an internal gear of FIG. 65C such that the first and second magnetic field emission structures can correlate if properly coded and the key is placed inside the cylinder 6810 such that the first and second magnetic field emission structures align. Furthermore, the keyhole 6404 does not necessarily have to have much depth within a doorknob, if any, for certain arrangements where the key is used to turn a locking mechanism through correlated magnetic attachment. Such an arrangement is shown in FIG. 68F where there is no keyhole. Additionally, a key such as in FIG. 68A can be placed against a surface where there isn't a doorknob to magnetically engage an effect a locking mechanism. For example, one could lock or unlock a medicine cabinet via placement of a key against a surface so as to attach to a locking mechanism and to thereafter turn the locking mechanism to lock or unlock the medicine cabinet.

FIG. 68G depicts a top down view of a cabinet door 6812 next to a cabinet frame 6814. A key 6802 having a first magnetic field emission structure 6804*a* can be magnetically attached to a second magnetic field emission structure 6804*b* integrated into the cabinet door 6812. When the key 6802 is turned it causes a first bevel gear 6712*a* associated with the second magnetic field emission structure 6804*b* to turn thereby turning a second bevel gear 6712*b* which causes a third magnetic field emission structure 6804*c* to turn so as to attach or detach from a fourth magnetic field emission structure 6804*d*. The first and second magnetic field emission structures are coded to be complementary and the third and fourth magnetic field emission structures are also coded to be complementary. The front surface of the cabinet door 6812 may have markings indicating where to place the key.

Figures 69A, 69B, 69C, 69D, 69E, 69F:
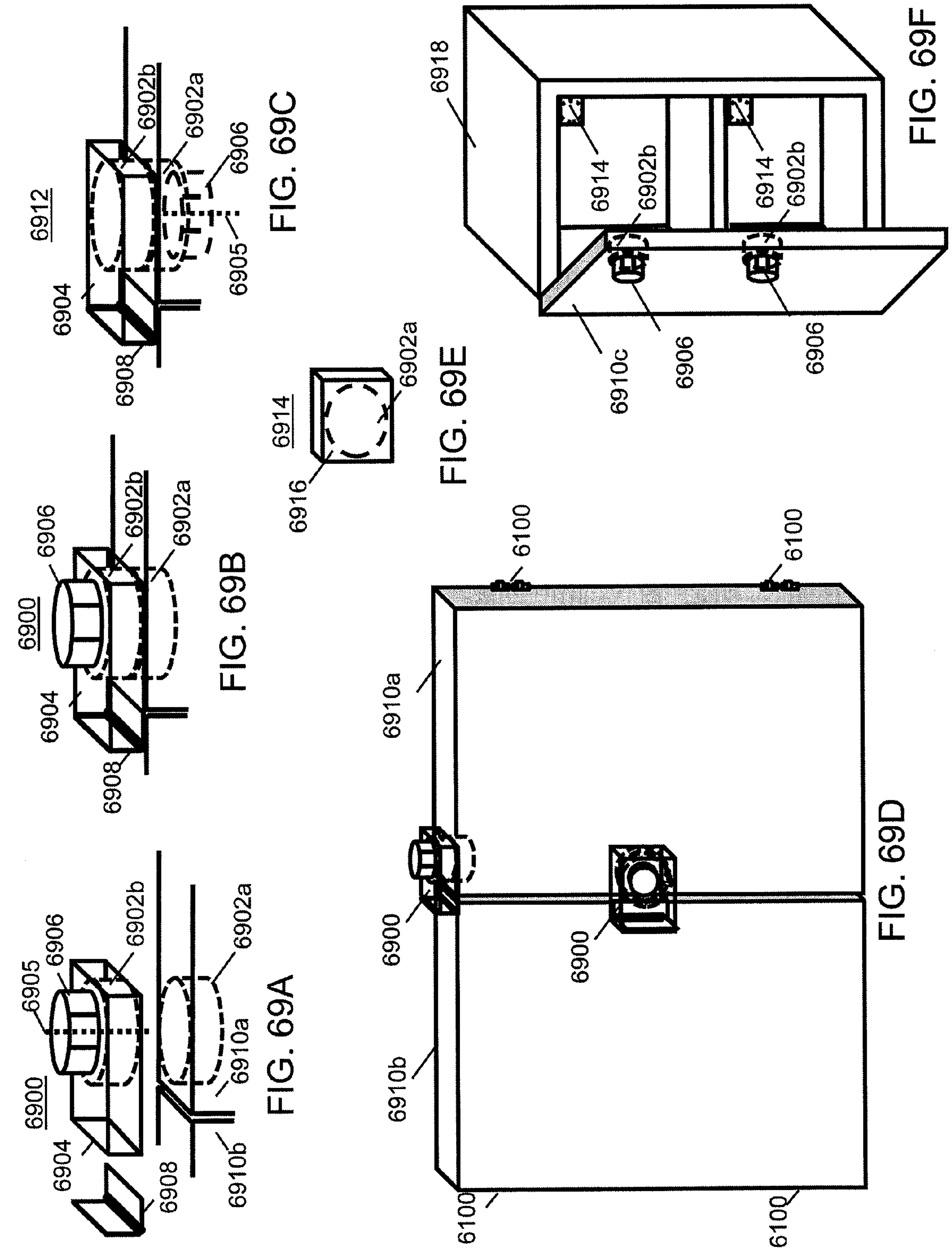

FIGS. 69A-69F depict exemplary door latch mechanisms in accordance with the invention. Referring to FIG. 69A, an exemplary door latch mechanism 6900 includes a first magnetic field structure 6902*a* and a second magnetic field structure 6902*b* that is complementary to the first magnetic field structure 6902*a*. The second magnetic field structure 6902*b* is associated with a latch body 6904 and is configured to rotate about an axis 6905. As depicted, the second magnetic field emission structure 6902*b* is integrated into the latch body 6904 and a turning mechanism 6906 is provided outside the latch body for turning the structure 6902*b*. As further depicted, the first magnetic field structure 6902*a* is associated with a first object 6910*a*, such as a first door. A hinge 6908 is used to attach the latch body 6904 to a second object 6910*b*, for example a second door. When fully assembled (see FIG. 69B), the first magnetic field structure 6902*a* associated with the first object 6910*a* can be aligned with the second magnetic field structure 6902*b* associated with the latch body 6904 (and thus the second object 6910*b*) such that the structures 6902*a*, 6902*b* produce an attractive force that secures the door latch mechanism 6900 thereby securing the two objects 6910*a*, 6910*b* to each other. The turning mechanism can thereafter be turned to decorrelate the two structures enabling the latch body to be lifted to unlatch the door latch mechanism. Although a hinge is depicted, one skilled in the art will recognize that various other mechanisms other than a hinge can be used such as a sliding mechanism, which would allow the latch body to move back and forth instead of being lifted/closed or a pivot mechanism whereby the latch body would pivot about a point that is located on the second object. Alternatively, the second magnetic field structure 6902*b* might reside on the outside of the latch body 6904.

Under one arrangement, depicted in FIG. 69C, the turning mechanism is associated with the first magnetic field structure 6902*a* in which case the second magnetic field structure 6902*b* would be fixed and the first magnetic field structure 6902*a* would be configured to turn about an axis 6905. Under another arrangement, the turning mechanism is integrated with a magnetic field structure and requires a tool for turning. Under such an arrangement, the turning mechanism and magnetic field structure may not be visible. Generally, all sorts of configurations are possible for latch mechanisms comprising a first and second magnetic field structures that are complementary to each other where the first structure is associated with a first object and the second structure is associated with a second object.

FIG. 69D depicts the use of the latch mechanism 6900 on top of two doors, which is useful for applications such as fence gates, baby gates, etc. The latch mechanism can similarly be used on the bottom of two doors. FIG. 69D also depicts use of the latch mechanism 6900 on the front of two doors, which is useful for storage cabinet doors, safes, etc. The latch mechanism can similarly be used on the back side of two doors (or a door and a door frame), which is useful for security purposes.

FIG. 69E depicts an alternative latch body 6914 consisting of a material 6916 (e.g., wood) having associated with it a magnetic field structure 6902*a* that is fixed to or integrated within the material 6916. The alternative latch body 6914 can be installed in a cabinet, closet opening, etc. 6918 and will become attached to a second magnetic field structure 6902*b* associated with a cabinet door, closet door, etc. 6910*c* when aligned with the first magnetic field structure 6902*a* so as to lock the door/cabinet. A turning mechanism 6906 can be used to turn the second structure in order to detach the two structures 6902*a*, 6902*b*. Generally, latch mechanisms in accordance with the invention can be used for all sorts of applications such as for securing cabinets (e.g., kitchen, bathroom, medicine cabinets), drawers, appliances (i.e., oven, dishwasher, clothes washer, dryer, microwave, etc.). Such latch mechanisms are ideal for child safety applications and applications it is desirable that animals (e.g., pets, raccoons, etc.) be unable to unlatch a latch mechanism.

As previously described in relation to FIGS. 5A-5P, FIG. 6, FIGS. 7A-7P and FIG. 8, the field strengths of individual field emission sources making up a field emission structure, for example a magnetic field structure, can be varied to change the spatial force function (or correlation function) between two field emission structures. As shown in FIGS. 7A-7P, the varying of field strengths can be done such that the strengths of the field sources of each of two complementary structures are varied in the same manner. Alternatively, the field sources of two complementary structures can be varied such that the strengths of the field sources of two structures are different from each other even though the field source polarities of the two structures remain complementary. Varying of such field strengths can be described as a form of amplitude modulation, which supports information storage and conveyance applications and generally provides another dimension for providing field emission structures uniqueness (i.e., unique identities). Furthermore, field strengths (or amplitudes) can be varied in accordance with well known coding techniques to achieve zero or substantially zero side lobes. Examples of such zero side lobe coding techniques include biphase and polyphase complementary coding techniques, periodic binary coding techniques, complementary Golay coding techniques, complementary Welti coding techniques, and the like.

Varying the amplitudes of the field strengths of field emission structures can also be useful for multi-level coding purposes. Multi-level coding, as described in relation to FIGS. 47A-C, takes into account the distance between two field emission structures and the combining of forces that occurs as two such structures are moved further apart. As depicted in FIGS. 47A, each of the field sources has the same strength but they vary in polarity. Instead, had the field strengths of each of the south polarity field sources in the first field emission structure 1402 had 3 times the strength of the north polarity field sources and had the north polarity field sources in the second field emission structure 1402' had 3 times the strength of the south polarity field sources, then the 7N and 7S values shown in FIG. 47B would change to 21N and 21S, respectively. Alternatively, had the field strengths of each of the south polarity field sources in the first field emission structure 1402 had ¾ths the strength of the north polarity field sources and had the north polarity field sources in the second field emission structure 1402' had ¾ths the strength of the south polarity field sources, then the 7N and 7S values shown in FIG. 47B would all change to 0.

Another alternative method of manufacturing a magnetic field emission structure from a magnetizable material such as a ferromagnetic material involves generating one or more magnetic fields and exposing locations of the material to one or more magnetic fields to create field emission sources at those locations, where the field emission sources have polarities in accordance with elements of a code corresponding to a desired force function. The force function can correspond to at least one of a spatial force function or an electro-motive force function. The code can be a complementary code or an anti-complementary code. Under one arrangement the code defines only the polarities of the field emission sources. Under another arrangement the code defines both the polarities and field strengths of the field emission sources in which case the strengths of the magnetic field emission sources can be varied to produce zero or substantially zero sidelobes such as described previously in relation to zero sidelobe coding techniques.

To generate one or more magnetic fields a current can be applied to a inductive element that may include a coil or a discontinuity on a conductive sheet or conductive plate. Under one arrangement a coil is coupled to a core that may be a material having a high permeability such as Mu-metal, permalloy, electrical steel, or Metglas Magnetic Alloy.

Figures 70A, 70B, 70E, 70F, 70G, 70H, 70I:
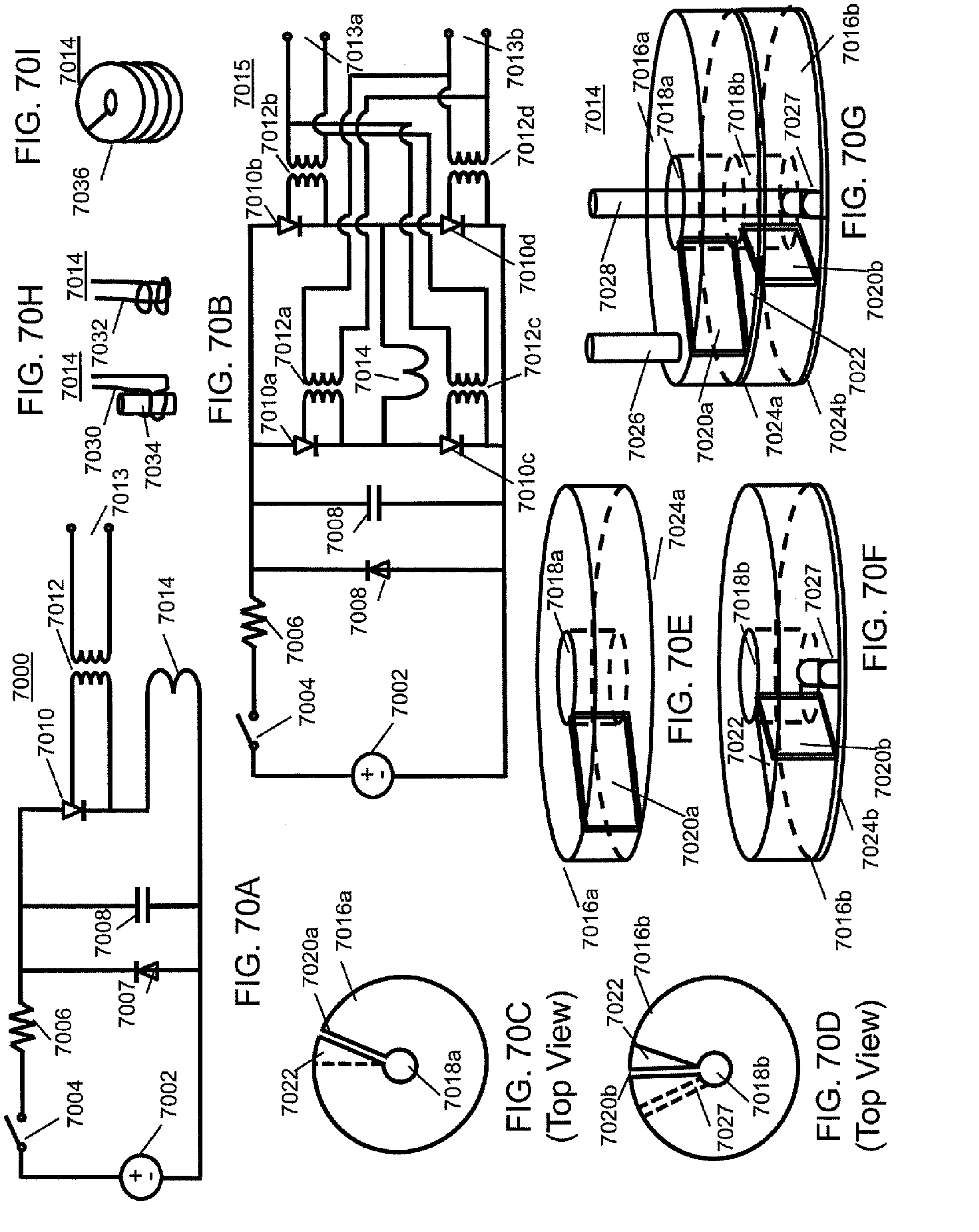

FIG. 70A depicts an exemplary monopolar magnetizing circuit 7000 in accordance with the invention. Referring to FIG. 70A, the monopolar magnetizing circuit 7000 includes a high voltage DC source 7002, a charging switch 7004, a charging resistance 7006, one or more back diodes 7007, one or more energy storage capacitors 7008, a silicon controlled rectifier (SCR) 7010, a pulse transformer 7012, and a magnetizing inductor 7014. The magnetizing inductor 7014 is also referred to herein as a magnetizing coil, an inductor coil, and an inductive element. The pulse transformer 7012 receives a trigger pulse to trigger the SCR 7010. The trigger pulse can be provided by a computerized control system or a switch. To use the monopolar magnetizing circuit 7000 to magnetize a location on a magnetizable material, for example a ferromagnetic material, the charging switch is closed thereby causing energy from the high voltage DC source to be stored in the energy storage capacitors 7008. At a desired voltage level (and therefore stored energy level), the pulse transformer 7012 can be triggered by a trigger pulse received at leads 7013 to trigger the SCR 7010 causing a high current to be conducted into the magnetizing inductor 7014, which magnetizes the location on the material. The polarity of the magnetized location (or magnetic field source) depends on how the magnetized inductor 7014 (or magnetizing coil or inductive element) is configured. The field strength (or amplitude) of the magnetic field source largely depends on the voltage level achieved when the SCR is triggered as well as characteristics of the magnetizing inductor. The size and sharpness of the magnetic field source largely depends on characteristics of the magnetizing inductor.

FIG. 70B depicts an exemplary bipolar magnetizing circuit 7015 in accordance with the invention. The bipolar magnetizing circuit 7015 is similar to the monopolar magnetizing circuit 7000 except it includes four SCRs 7010*a*-7010*d*, four pulse transformers 7012*a*-7012*d*, and two sets of leads 7013*a*, 7013*b* instead of one of each. The four SCRs and four pulse transformers are configured as a bridge circuit such that one of the two sets of leads 7013*a*, 7013*b* can be triggered to produce a magnetic field source having a first polarity and the other one of the two sets of leads 7013*a*, 7013*b* can be triggered to produce a field source having a second polarity that is opposite of the first polarity, where the first polarity and the second polarity are either North and South or South and North depending on how the magnetizing inductor 7014 is configured.

FIGS. 70C and 70D depict top views of exemplary circular conductors 7016*a*, 7016*b* used to produce a high voltage inductor coil 7014 in accordance with the invention.

FIGS. 70E and 70F depict three dimensional views of the circular conductors of FIGS. 70C and 70D, and FIG. 70G depicts an assembled high voltage inductor coil 7014 in accordance with the invention. Referring to FIGS. 70-70G, a first circular conductor 7016*a* having a desired thickness has a hole 7018*a* through it and a slotted opening 7020*a* extending from the hole and across the circular conductor to produce a discontinuity in the first circular conductor 7016*a*. The second circular conductor 7016*b* also has a hole 7018*b* and a slotted opening 7020*b* extending from the hole and across the circular conductor to produce a discontinuity in the second circular conductor 7016*b*. The first and second circular conductors are designed such that they can be soldered together at a solder joint 7022 that is beneath the first circular conductor 7016*a* and on top of the second circular conductor 7016*b*. Other attachment techniques other than soldering can also be used. Prior to being soldered together, insulation layers 7024*a*, 7024*b* are placed beneath each of the circular conductors 7016*a*, 7016*b*, where the insulation layer 7024*a* placed beneath the first circular conductor 7016*a* does not cover the solder region 7022 but otherwise insulates the remaining portion of the bottom of the first circular conductor 7016*a*. When the two circular conductors 7016*a*, 7016*b* are soldered together the insulation layer 7024 between them prevents current from conducting between them except at the solder joint 7022. The second insulation layer 7016*b* beneath the second circular conductor 7016*b* prevents current from conducting to the magnetizable material. So, if the magnetizable material is non-metallic, for example a ceramic material, the second insulation layer 7016*b* is not needed. Moreover, even if the magnetizable material has conductive properties that are generally insignificant so the use of the second insulation layer 7016*b* is optional. A first wire conductor 7026 is soldered to the top of the first circular conductor 7016*a* at a location next to the opening but opposite the solder joint. The second circular conductor 7016*b* has a grove (or notch) 7027 in the bottom of it that can receive a second wire conductor 7028 that can be soldered such that the bottom of the second circular conductor 7016*b* remains substantially flat. Other alternative methods can also be employed to connect the second wire conductor 7028 to the second circular conductor 7016*b* including placing the second wire conductor 7028 into a hole drilled through the side of the second circular conductor 7016*b* and soldering it. As depicted in FIG. 70G, the second wire conductor 7028 is fed through the holes 7018 in the two circular conductors 7016*a*, 7016*b*. As such, when the two wire conductors 7076, 7028 and the two circular conductors 7016*a*, 7016*b* are soldered together with the insulation layer 7024 in between the two circular conductors 7016*a*, 7016*b* they form two turns of a coil whereby current can enter the first circular conductor 7026, travel clockwise around the first circular conductor, travel through the solder joint to the second circular conductor and travel clockwise around the second circular conductor and out the second wire conductor, or current can travel the opposite path. As such, depending on the connectivity of the first and second wire conductors to the magnetizing circuit and the direction of the current received from the magnetizer circuit (7000 or 7015), a South polarity magnetic field source or a North polarity magnetic field source are produced.

Generally, a magnetic field structure can be produced by varying the location of a magnetic material relative to the inductor coil as the magnetizable material is magnetized in accordance with a desired code. With one approach the magnetizable material is held in a fixed position and the location of the inductor coil is varied. With another approach the inductor coil is held in a fixed position and the location of the magnetizable material is varied, for example, using an XYZ table.

One skilled in the art will recognize that shapes other than circular shapes can also be employed for the circular conductors such as square shapes, elliptical shapes, hexagonal shapes, etc. As such, the circular conductor can be referred to generally as a conductive plate having a discontinuity. One skilled in the art will also recognize that different conductive materials can be used for the circular conductors and wire conductors, for example, copper, silver, gold, brass, aluminum, etc. Furthermore, more than two circular conductors can be stacked in the same manner as the first and second conductors by adding additional circular conductors on top of the stack. As such, one can produce three turns, four turns, or more turns by adding circular conductors to the stack.

FIG. 70H depicts two exemplary magnetizing inductors 7014 based on round wire inductor coils 7030, 7032 in accordance with the invention. The first round wire inductor coil 7030 comprises two turns of wire about an inductor core 7034. The inductor core 7034 can be material having high permeability and is also optional in that the round wire inductor coil can be used without the inductor core 7034. The second round wire inductor coil 7032 may comprise two turns of wire where the wire is then turned up in the middle of the two coils. For both inductor coils, additional turns can be used.

FIG. 70I depicts an exemplary magnetizing inductor 7014 based on a flat metal inductor coil 7036 in accordance with the invention. The flat metal inductor coil 7036 can be used in place of one or more of the circular conductors 7016*a*, 7016*b*. The flat metal inductor coil 7036 is similar in structure as a Slinky toy except it has much wider flat coils and a much smaller hole through the center. The number of turns can be varied as desired.

The magnetic field needed to create saturated magnetization (B field) in a neodymium (NIB) magnet material is substantial so the magnetizing coil needs to conduct very high currents to produce the required H field. A second requirement needed to support correlated magnetics technology is that this field be concentrated in a very small spot and its field be not only reversible but also variable. Fortunately, the response time of magnetic materials is in the sub-microsecond range so the duration of this intense field can be brief.

Pulsed magnetic field generation systems were produced consistent with the magnetization circuits 7000, 7015 described above (see FIGS. 70A-70G) that is based on a current pulse generator. Low inductance, high voltage capacitors were used as the electrical energy source and SCRs were used to switch the stored charge into a magnetizing coil. The resistance of the current circuit is fixed so the current varies linearly with the voltage at which the capacitors are charged. The total loop resistance of the wiring and other conductors is in the range of 0.001 Ohm and the capacitors may be charged as high as 2500 Volts. Therefore, if the SCR switch and capacitors had zero resistance and inductance, then the instantaneous current when the switch is closed would be 2.5 million amperes. However, as a practical matter, the instantaneous current as measured by a series shunt is in the neighborhood of 100,000 amperes.

The SCRs used were in the style of the industrial "hockey puck" and an IR S77R series device was found to suffice. A bridge arrangement was used (see FIG. 70B) in order to permit the reversal of the polarity of the current pulse as seen by the magnetizing coil. The high voltage was decoupled to the trigger source by a pulse transformer made by Pulse Corp., PE-65835. It was found that the inductance in the circuit was sufficient to cause a voltage reversal at the end of the pulse sufficient to turn off the SCRs. DC-DC converters were used to produce the high voltage needed to charge the capacitors and the desired charging level was set by a computer to the level needed for a particular spot, and the polarity was controlled by the choice of which trigger transformer pair was fed a trigger pulse.

It is desirable to provide as high a repetition rate as possible in order to create the complex magnet patterns needed in as short a time as possible. Therefore, to keep the energy storage requirements as low as possible, the current pulse is also kept short. That leads to the need to use a very low inductance coil of very few turns. The desire to keep the field concentrated in a very small area also requires the use of a physically small coil. Two small circular conductors were used to produce the magnetizing coil. Each were both made of copper and had a diameter of ⅜ inches, a thickness of 0.0625 inches, a ⅛" diameter hole, and a slotted opening 0.016 inches wide. The wire conductors were #8 copper wire. The insulating layers were $1000^{th}$ inch thick layers of Kapton.

When a voltage of approximately 800 volts is used to charge the capacitors, the monopolar and bipolar pulsed magnetic field generation systems will each create a magnetic pulse of about 20 uS in duration that produces on a NIB magnetizable material a magnetic field source that is approximately 0.1 inches in radius and which has a field strength of about 4000 Gauss.

Several examples of the use of correlated field emission structures with objects having motion mechanically constrained have been described herein. One skilled in the art will recognize that many other well known mechanisms can be used to constrain or define the allowable motion of an object having one or more field emission structures associated with the object and that knowledge of the allowable motion can be used to design or apply codes used to define force functions, whether spatial force functions and/or electromotive force functions. Such mechanisms can be controlled using all sorts of control systems that may involve various types of sensors that provide feedback to the control systems. Moreover, one skilled in the art will recognize that any of many well known communications methods such as RF communications can be used to activate, manage, and/or deactivate such control systems and thus control the behavior of objects having associated field emission structures. In the case of electromagnets and electropermanent magnets, such control systems can be used to change the coding used to control the interaction of corresponding field emission structures.

Figure 71B:
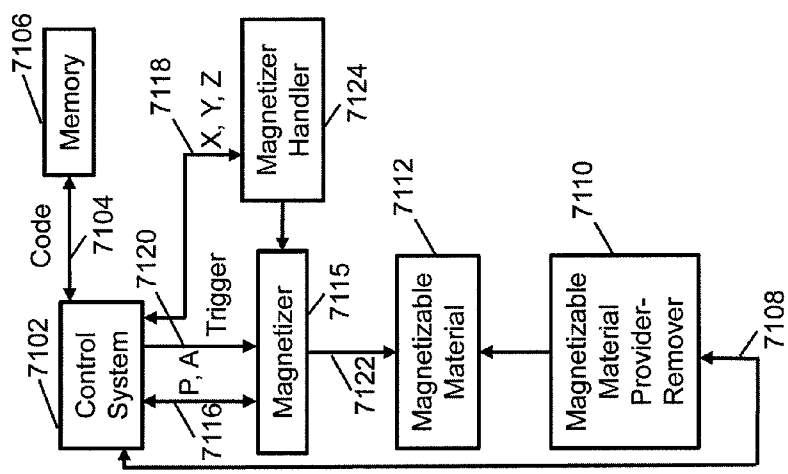
Figure 71A:
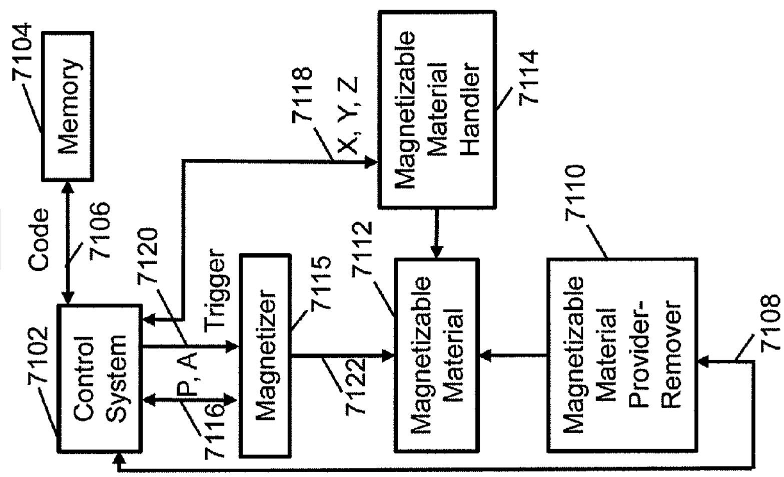

FIG. 71A depicts an exemplary coded magnetic structure manufacturing apparatus 7100 in accordance with the invention. Referring to FIG. 71A, coded magnetic structure manufacturing apparatus 7100 includes a control system 7102 that selects a code from a memory 7104 via a first interface 7106. The control system 7102 sends a provide material control signal via a second interface 7108 to a magnetizable material provider-remover 7110 that provides a magnetizable material 7112 for magnetizing according to the code. As depicted in FIG. 71A, the magnetizable material is provided to a magnetizable material handler 7114 that is capable of moving the magnetizable material 7112. For each magnetic source to be magnetized in the magnetizable material, the control system sends a define polarity and magnetic field amplitude (or strength) control signal to a magnetizer 7115 via a third interface 7116. The magnetizer 7115 charges up its capacitor(s) per the define polarity and magnetic field amplitude control signal. A define X,Y,Z coordinate control signal is sent to the magnetizable material handler via a fourth interface 7118. The magnetizable material handler moves the magnetizable material relative to the magnetizer (specifically, the magnetizing inductor 7014, not shown) such that the appropriate location on the material will be magnetized. After the magnetizable material 7112 has been moved to the appropriate location relative to the magnetizer the control system 7102 sends a trigger signal to the magnetizer 7115 via a fifth interface 7120. Note that the third and fifth interfaces 7116, 7120 can alternatively be combined. Upon being triggered by the trigger signal, the magnetizer 7115 causes a high current to be conducted into the magnetizing inductor 7014, which produces a magnetic field 7122 that magnetizes the location on the magnetizable material 7112. After all sources have been magnetized in accordance with the code, the control system 7102 sends a signal to the magnetizable material provider-remover to remove the magnetizable material from the manufacturing apparatus 7100 thereby allowing the manufacturing process to be repeated with another magnetizable material. One skilled in the art will recognize that if a monopolar magnetizing circuit 7000 is used in the magnetizer 7115 then the magnetizer 7115 can only magnetize sources with a single polarity (i.e., North up or South up) depending on how it is configured unless it is reconfigured manually between magnetizations. If a bipolar magnetizing circuit 7015 is used in the magnetizer 7115 then the magnetizer can produce sources having either polarity (i.e., North up and South up). One skilled in the art will also recognize that two different magnetizers 7115 having monopolar magnetizing circuits 7000 could be employed where one is configured to produce North up polarity sources and the other is configured to produce South up polarity sources.

FIG. 71B depicts an alternative exemplary coded magnetic structure manufacturing apparatus 7100. It is the same as the coded magnetic structure manufacturing apparatus 7100 of FIG. 71A except the magnetizable material handler 7114 is replaced by a magnetizer handler 7124. As such, the difference between the two apparatuses 7100 is that with the one depicted in FIG. 71A, the magnetizable material is moved while the magnetizer stays in a fixed position, while with the one depicted in FIG. 71B, the magnetizer is moved while the magnetizable material stays in a fixed position. One skilled in the art will recognize that both the magnetizable material and magnetizer could be configured to move, for example, the magnetizer might move in only the Z dimension while the magnetizable material might move in the X,Y dimensions, or vice versa. Generally, various well known methods can be used to provide and/or to remove a magnetizable material from the apparatus and to move the material relative to the magnetizer so as to control the location of magnetization for a given source.

Figure 72:
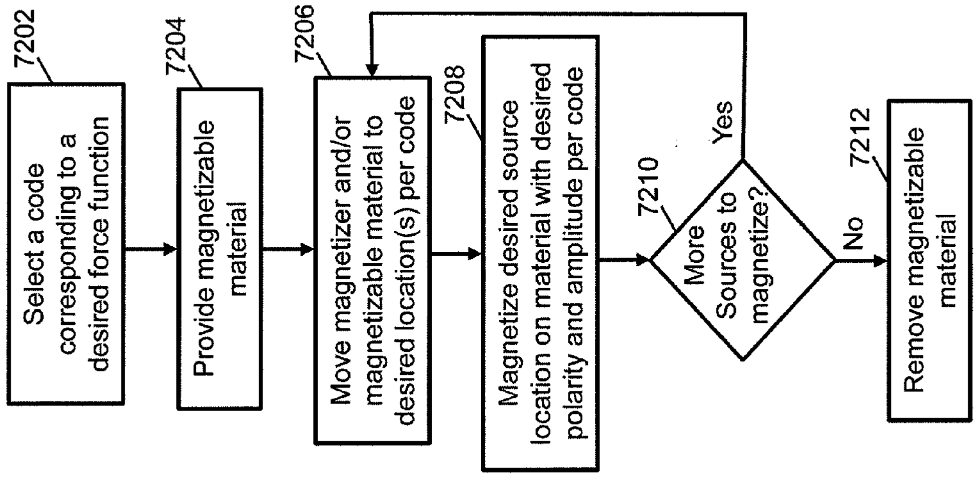

FIG. 72 depicts an exemplary coded magnetic structure manufacturing method 7200. Referring to FIG. 72, coded magnetic structure manufacturing method 7200 includes a first step 7202, which is to select a code corresponding to a desired force function where a desired force function may be a spatial force function or an electromotive force function. A second step 7204 is to provide the magnetizable material to a magnetizing apparatus. A third step 7206 is to move the magnetizer of the magnetizing apparatus and/or the magnetizable material to be magnetized so that a desired location on the magnetizable material can be magnetized in accordance with the selected code. A fourth step 7208 is to magnetize the desired source location on the magnetizable material such that the source has the desired polarity and field amplitude (or strength) as defined by the code. A fifth step 7210 determines whether additional sources remain to be magnetized. If there are additional sources to be magnetized, then the method returns to the third step 7206. Otherwise, a sixth step is performed, which is to remove the magnetizable material (now magnetized in accordance with the code) from the magnetizing apparatus.

Figure 73A:
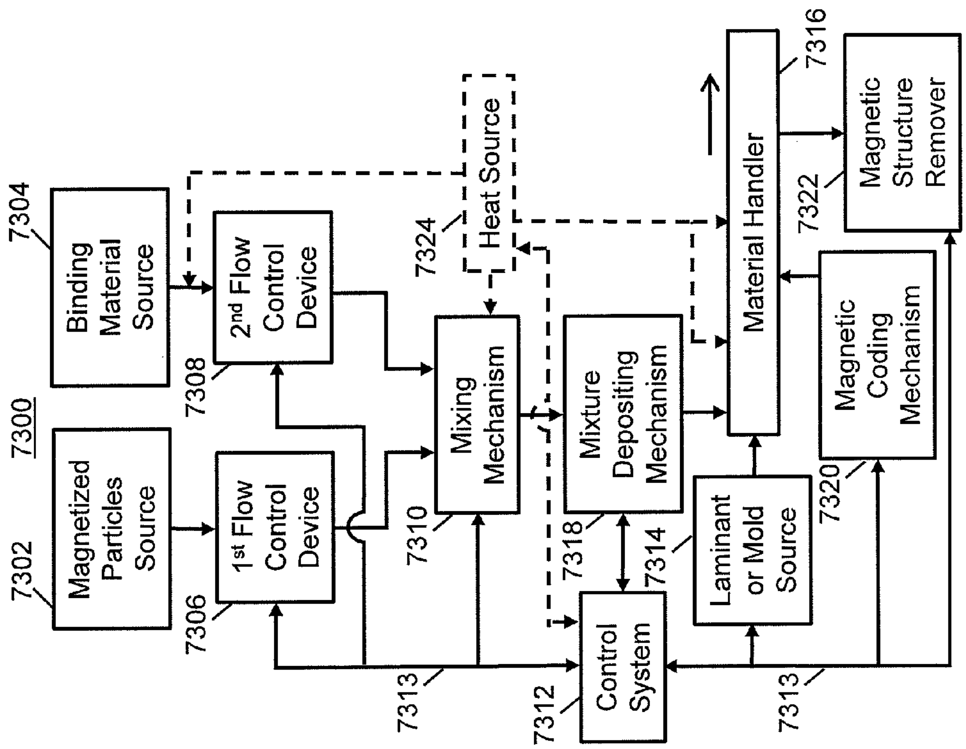

FIG. 73A depicts an exemplary system for manufacturing magnetic field emission structures from magnetized particles. Referring to FIG. 73A, the system 7300 comprises a magnetized particles source 7302 and a binding material source 7304. A first flow control device 7306 and a second flow control device 7308 control the rates at which the magnetized particles and binding material are introduced into a mixing mechanism 7310. A control system 7312 controls each of the components of the system 7300 via a communications backbone 7313, which can be a wired backbone, wireless backbone, or some combination thereof. A laminant or mold source 7314 provides a laminant or a mold to a material handler 7316. A mixture depositing mechanism 7318 deposits the mixture of magnetized particles and binding material onto the laminant (or into the mold) on the material handler. The mixture depositing mechanism and material handler (and optionally the mold) are configured to control the shape and size of the mixture of the deposited mixture of magnetized particles and binding material. A magnetic coding mechanism that is located in close proximity to the deposited mixture of magnetized particles and binding material causes the magnetized particles to orient their polarities corresponding to the coded magnetic sources of the magnetic coding mechanism. The binder material thereafter hardens thereby maintaining the orientations of the magnetized particles such that a magnetic field structure is produced that is then removed from the manufacturing system 2300 by a magnetic structure remover. One skilled in the art will recognize that many different types of magnetized particles can be employed. For example, magnetized spheres or magnet shavings can be used for the magnetized particles. One skilled in the art will recognize that many different types of binding materials can be employed such as a thermal plastic spherical pellets or powder, solder, glue, solvent, etc. and many different shapes of molds can also be used. Generally, one skilled in the art will recognize that the binding material can be liquefied prior to, after, and/or at the same time as the magnetized particles are being coded by the magnetic coding mechanism where the binding material must at least partially harden as required to maintain the coded orientation of the magnetized particles prior to their separation from the magnetic coding mechanism. Moreover, various types of magnetic coding mechanisms can be employed. With one approach, a cylinder having magnetic field structure comprising multiple code modulos of a code such as depicted in FIG. 23 might be used whereby the cylinder turns next to the material handler so as to code the magnetized particles as they move past on the laminant or in the mold. With another approach, a magnetic field structure can be moved into close proximity of the mixture of particles and binding material that is in a fixed location for an amount of time while the material handler has stopped the laminant or mold from moving for that amount of time. With yet another approach, a magnetic field structure can be moved into close proximity of the mixture of particles and binding material where the magnetic field structure moves with the mixture as it moves on the material handler for an amount of time such that the binder has sufficiently hardened to maintain the orientation of the magnetized particles. With still another approach, an array of electromagnets next to the material handler can be controlled so as to code the magnetic particles. Such an array may be at one point along the path of the material handler or may span the material handler path for some distance whereby the code of the magnetic coding mechanism can electronically move with the mixture as it moves along the material handler path.

With each magnetic coding mechanism, a plurality of magnetic field sources has positions and polarities in accordance with a desired code corresponding to a desired force function. The magnetized particles will form groups about respective magnetic field sources and orient themselves based on the polarities of those magnetic field sources. For example, multiple (e.g., dozens, hundreds, etc.) magnetized spherical particles may group about one magnetic field source having a 'South Up' polarity and will rotate themselves so that their North polarities are attracted to and aligned with the South polarity of the magnetic field source. As such, the group of small magnetized particles, once oriented (coded) and having their orientations maintained by a hardened binder, will thereafter function together as a single magnetic field source that complements that of their respective magnetic field source of the magnetic coding mechanism used to code them. Given a plurality of magnetic field sources, a corresponding plurality of groups of magnetized particles will be produced where the groups are complementary to the magnetic field sources of the magnetic coding mechanism.

For certain binding materials, an optional heat source 7324 can be employed with the system 7300 to at least partially liquefy the binding material. As shown, heat from such a heat source 7324 may be applied as the binding material leaves the binding material source 7304, while the binding material is being mixed with the magnetized particles, and/or after the mixture of magnetized particles and binding material have been deposited onto the laminant but prior to them being exposed to the magnetic coding mechanism. Alternatively (or additionally), heat may be applied after the magnetized particles have oriented themselves within the binder material. Heat may also be applied to an already liquefied binding material so as to cause evaporation, for example, of a solvent thereby causing the binding material to solidify.

FIG. 73B depicts an alternative exemplary system 7326 for manufacturing magnetic field emission structures from magnetized particles. As shown in FIG. 73B, the alternative system 7326 is similar to the system 7300 of FIG. 73A but instead of mixing the magnetized particles and the binding material and depositing the mixture onto the laminant or mold, a particle depositing mechanism 7328 deposits only the magnetized particles onto the laminant or mold and a separate binder applicator mechanism applies the binder material onto the laminant or mold so that it can thereafter harden to maintain the code orientation of the magnetized particles. As shown, the binder material can be applied to the laminant or mold prior to the depositing of the magnetic particles, after the depositing of the magnetic particles but before coding by the magnetic coding mechanism, and/or after the coding by the magnetic coding mechanism. Alternatively, the binder material can be applied by the binder applicator mechanism 7330 over any amount of time during a time period beginning prior to the magnetic particles being deposited on the laminant or mold and ending after the magnetic particles have been coded.

As with the previous system 7300, for certain binding materials, an optional heat source 7324 can be employed with the alternative system 7326 to at least partially liquefy the binding material. As shown, heat from such a heat source 7324 may be applied as the binding material leaves the binding material source 7304, while the binding material is being added to the binder applicator mechanism 7330, and/or while it is being applied to the laminant and/or the deposited magnetized particles. As with the previous system, heat may also be applied to an already liquefied binding material so as to cause evaporation, for example, of a solvent thereby causing the binding material to solidify.

FIG. 74A depicts an exemplary method 7400 for manufacturing magnetic field emission structures from magnetized particles. Referring to FIG. 74A, the method 7400 includes three steps. A first step 7402 is to mix magnetized particles and a binder material. A second step 7404 is to deposit the mixture of the magnetized particles and the binder material onto a laminant or mold. A third step 7406 is to align a magnetic coding mechanism with the mixture of particles and binder to cause the particles to orient their polarities to produce a magnetic field structure.

FIG. 74B depicts another exemplary method 7410 for manufacturing magnetic field emission structures from magnetized particles. Referring to FIG. 74B, the method 7410 includes four steps. A first step 7412 is to deposit magnetized particles onto a laminant or mold and a second step 7414 is to apply a binder material onto to the laminant or mold. It should be noted that, as described in relation to FIG. 73B, the step of applying a binder material onto the laminant or mold can occur prior to, concurrent with, or after the step of depositing magnetized particles onto the laminant or mold. A third step 7416 is to align a magnetic coding mechanism with the particles on the laminant or mold to cause the particles to orient their polarities to produce a magnetic field structure.

Exemplary applications of correlated field emission structures in accordance with the invention include:

Position based function control.
Gyroscope, Linear motor, Fan motor.
Precision measurement, precision timing.
Computer numerical control machines.
Linear actuators, linear stages, rotation stages, goniometers, mirror mounts.
Cylinders, turbines, engines (no heat allows lightweight materials).
Seals for food storage.
Scaffolding.
Structural beams, trusses, cross-bracing.
Bridge construction materials (trusses).
Wall structures (studs, panels, etc.), floors, ceilings, roofs.
Magnetic shingles for roofs.
Furniture (assembly and positioning).
Picture frames, picture hangers.
Child safety seats.
Seat belts, harnesses, trapping.
Wheelchairs, hospital beds.
Toys—self assembling toys, puzzles, construction sets (e.g., Legos, magnetic logs).
Hand tools—cutting, nail driving, drilling, sawing, etc.
Precision machine tools—drill press, lathes, mills, machine press.
Robotic movement control.
Assembly lines—object movement control, automated parts assembly.
Packaging machinery.
Wall hangers—for tools, brooms, ladders, etc.
Pressure control systems, Precision hydraulics.
Traction devices (e.g., window cleaner that climbs building).
Gas/Liquid flow rate control systems, ductwork, ventilation control systems.
Door/window seal, boat/ship/submarine/space craft hatch seal.
Hurricane/storm shutters, quick assembly home tornado shelters/snow window covers/vacant building covers for windows and doors (e.g., cabins).
Gate Latch—outdoor gate (dog proof), Child safety gate latch (child proof).
Clothing buttons, Shoe/boot clasps.
Drawer/cabinet door fasteners.
Child safety devices—lock mechanisms for appliances, toilets, etc.
Safes, safe prescription drug storage.
Quick capture/release commercial fishing nets, crab cages.
Energy conversion—wind, falling water, wave movement.
Energy scavenging—from wheels, etc.
Microphone, speaker.
Applications in space (e.g., seals, gripping places for astronauts to hold/stand).
Analog-to-digital (and vice versa) conversion via magnetic field control.
Use of correlation codes to affect circuit characteristics in silicon chips.
Use of correlation codes to effect attributes of nanomachines (force, torque, rotation, and translations).
Ball joints for prosthetic knees, shoulders, hips, ankles, wrists, etc.
Ball joints for robotic arms.
Robots that move along correlated magnetic field tracks.
Correlated gloves, shoes.
Correlated robotic "hands" (all sorts of mechanisms used to move, place, lift, direct, etc. objects could use invention).
Communications/symbology.
Snow skis/skateboards/cycling shoes/ski board/water ski/boots
Keys, locking mechanisms.
Cargo containers (how they are made and how they are moved).
Credit, debit, and ATM cards.
Magnetic data storage, floppy disks, hard drives, CDs, DVDs.
Scanners, printers, plotters.
Televisions and computer monitors.
Electric motors, generators, transformers.
Chucks, fastening devices, clamps.
Secure Identification Tags.
Door hinges.
Jewelry, watches.
Vehicle braking systems.
Maglev trains and other vehicles.
Magnetic Resonance Imaging and Nuclear Magnetic Resonance Spectroscopy.
Bearings (wheels), axles.
Particle accelerators.
Mounts between a measurement device and a subject (xyz controller and a magnetic probe)/mounts for tribrachs and associated devices (e.g., survey instruments, cameras, telescopes, detachable sensors, TV cameras, antennas, etc.)

Mounts for lighting, sound systems, props, walls, objects, etc.—e.g., for a movie set, plays, concerts, etc. whereby objects are aligned once, detached, and reattached where they have prior alignment.

Equipment used in crime scene investigation having standardized look angles, lighting, etc.—enables reproducibility, authentication, etc. for evidentiary purposes.

Detachable nozzles such as paint gun nozzle, cake frosting nozzle, welding heads, plasma cutters, acetylene cutters, laser cutters, and the like where rapid removable/replacement having desired alignment provides for time savings.

Lamp shades attachment device including decorative figurines having correlated magnets on bottom that would hold lamp shade in place as well as the decoration.

Tow chain/rope.

Parachute harness.

Web belt for soldiers, handyman, maintenance, telephone repairman, scuba divers, etc.

Attachment for extremely sharp objects moving at high rate of speed to include lawnmower blades, edgers, propellers for boats, fans, propellers for aircraft, table saw blades, circular saw blades, etc.

Seal for body part transfer system, blood transfer, etc.

Light globes, jars, wood, plastic, ceramic, glass or metal containers.

Bottle seal for wine bottle, carbonated drinks etc. allowing one to reseal a bottle to include putting a vacuum or a pressure on the liquid.

Seals for cooking instruments.

Musical instruments.

Attach points for objects in cars, for beer cans, GPS device, phone, etc.

Restraint devices, hand cuffs, leg cuffs.

Leashes, collars for animals.

Elevator, escalators.

Large storage containers used on railroads, ships, planes.

Floor mat clasps.

Luggage rack/bicycle rack/canoe rack/cargo rack.

Trailer hitch cargo rack for bicycles, wheelchairs.

Trailer hitch.

Trailer with easily deployable ramp/lockable ramp for cargo trailers, car haulers, etc.

Devices for holding lawnmowers, other equipment on trailers.

18 wheeler applications for speeding up cargo handling for transport.

Attachment device for battery compartment covers.

Connectors for attachment of ear buds to iPod or iPhone.

Use of magnetic field emission structures in accordance with a desired electromotive force function is described in pending Non-provisional application Ser. No. 12/322,561, filed Feb. 4, 2009, titled "System and Method for Producing an Electric Pulse", which is incorporated herein by reference. One skilled in the art will recognize that the disclosure provided herein regarding field emission structures can be leveraged for correlated inductance purposes.

Based on the teachings herein, one skilled in the art will recognize that coding techniques applicable to RF signals are generally applicable to field emission sources of field emission structures by translating time domain characteristics to spatial domain characteristics. In accordance with the invention, a coded plurality of field emission sources each having a spatial location, polarity, and field strength will have correlation or other characteristics like those of a similarly coded plurality of RF signals each having a time location, polarity, and signal strength. As such, one skilled in the art will recognize that many coding techniques developed for time domain signals are generally applicable to designing field emission structures in the spatial domain in accordance with the present invention. Examples of such time domain coding techniques that are generally applicable to the spatial domain are provided below.

U.S. Pat. No. 6,636,566, issued Oct. 21, 2003 to Roberts et al. titled "Method and apparatus for specifying pulse characteristics using a code that satisfies predefined criteria", which is incorporated by reference herein in its entirety, can be translated to a coding method and system for defining field emission structures in the spatial domain that specifies spatial and/or non-spatial field emission source characteristics according to spatial and/or non-spatial characteristic value layouts having one or more allowable and non-allowable regions. The method generates codes having predefined properties. The method generates a field emission structure by mapping codes to the characteristic value layouts, where the codes satisfy predefined criteria. In addition, the predefined criteria can limit the number of field emission source characteristic values within a non-allowable region. The predefined criteria can be based on relative field emission source characteristic values. The predefined criteria can also pertain to spatial frequency and to correlation properties. The predefined criteria may pertain to code length and to the number of members of a code family.

U.S. Pat. No. 6,636,567, issued Oct. 21, 2003 to Roberts et al. titled "Method of specifying non-allowable pulse characteristics", which is incorporated by reference herein in its entirety, can be translated to describe coding methods for defining field emission structures in the spatial domain where a code specifies characteristics of field emission sources. The translated methods define non-allowable regions within field emission source characteristic value range layouts enabling non-allowable regions to be considered when generating a code. Various approaches are used to define non-allowable regions based either on the field emission source characteristic value range layout or on characteristic values of one or more other field emission sources. Various permutations accommodate differences between spatial and non-spatial field emission source characteristics. Approaches address characteristic value layouts specifying fixed values and characteristic value layouts specifying non-fixed values. When generating codes to describe field emission sources, defined non-allowable regions within field emission source characteristic value layouts are considered so that code element values do not map to non-allowable field emission source characteristic values.

U.S. Pat. No. 6,778,603, issued Aug. 17, 2004 to Fullerton et al. titled "Method and apparatus for generating a pulse train with specifiable spectral response characteristics", which is incorporated by reference herein in its entirety, can be translated to describe a coding method and apparatus for generating field emission structures with specifiable spatial frequency characteristics. The translated system and method shape the spatial frequency characteristics of a field emission structure. The initial spatial and non-spatial characteristics of field emission sources comprising the field emission structure are established using a designed code or a pseudorandom code and the spatial frequency properties of the field emission structure are determined. At least one characteristic of at least field emission source of the plurality of field emission sources that make up the field emission structure are modified or at least one field emission source is added or deleted to the field emission structure and the spatial frequency characteristics of the modified field emission source structure are determined. Whether or not the modification to the field emission structure improved the spatial frequency characteristics relative to acceptance criteria is determined. The field emission structure having the most desirable spatial frequency characteristics is selected. The optimization process can also iterate and may employ a variety of search algorithms.

U.S. Pat. No. 6,788,730, issued Sep. 7, 2004 to Richards et al. titled "Method and apparatus for applying codes having pre-defined properties", which is incorporated by reference herein in its entirety, can be translated to describe a coding method and apparatus for defining properties of field emission sources in the spatial domain. The translated method for specifying field emission source characteristics applies codes having pre-defined characteristics to a layout. The layout can be sequentially subdivided into at least first and second components that have the same or different sizes. The method applies a first code having first pre-defined properties to the first component and a second code having second pre-defined properties to the second component. The pre-defined properties may relate to the auto-correlation property, the cross-correlation property, and spatial frequency properties, as examples. The codes can be used to specify subcomponents within a frame, and characteristic values (range-based, or discrete) within the subcomponents.

U.S. Pat. No. 6,959,032, issued Oct. 25, 2005 to Richards et al. titled "Method and apparatus for positioning pulses in time", which is incorporated by reference herein in its entirety, can be translated to describe a coding method and apparatus for defining positioning field emission sources in the spatial domain. The translated method specifies positioning field emission source in the spatial domain according to a spatial layout about a spatial reference where a field emission source can be placed at any location within the spatial layout. The spatial layout and spatial reference may have one, two, or three dimensions. The method generates codes having predefined properties, and a field emission structure based on the codes and the spatial layout. The spatial reference may be fixed or non-fixed and can be a position of a preceding or a succeeding field emission source in any dimension. In addition, the predefined properties can be autocorrelation, cross-correlation, or spatial frequency properties.

U.S. Pat. No. 7,145,954, issued Dec. 5, 2006 to Pendergrass et al. titled "Method and apparatus for mapping pulses to a non-fixed layout", which is incorporated by reference herein in its entirety, can be translated to describe a coding method for mapping field emission sources to a non-fixed the spatial layout. The translated method specifies spatial and/or non-spatial field emission source characteristics, where field emission source characteristic values are relative to one or more non-fixed reference characteristic values within at least one delta value range or discrete delta value layout. The method allocates allowable and non-allowable regions relative to the one or more non-fixed references. The method applies a delta code relative to the allowable and non-allowable regions. The allowable and non-allowable regions are relative to one or more definable characteristic values within a characteristic value layout. The one or more definable characteristic values are relative to one or more characteristic value references. In addition, the one or more characteristic value references can be a characteristic value of a given field emission source such as a preceding field emission source or a succeeding field emission source in any dimension.

One skilled in the art will recognize based on the teachings herein that methods used to determine acquisition of a time domain signal by a time coherent receiver (i.e., a receiver that mixes a template signal with a received signal in a correlator) are generally applicable for determining alignment of two objects having associated corresponding field emission structures, a field emission structure and corresponding coded coils, or coded primary coils and corresponding coded secondary coils. As such, methods and systems for searching the time domain for acquiring a signal such as those found in U.S. Pat. No. 6,925,109, issued Aug. 2, 2006 to Richards et al. titled "Method and apparatus for fast acquisition of ultra-wideband signals", which is incorporated by reference herein in its entirety, can be translated into methods and systems where a location of a field emission structure within the spatial domain can be located (or tracked) by shifting another field emission structure or coded coils in close proximity by a spatial offset in accordance with an algorithm. Furthermore, determined alignment of two objects can be used in guidance control systems, to trigger a condition, such as an alert condition, to assimilate information about one object to another object (or location), to control a function, etc.

The correlated field emission structures and/or coded coil structures of the invention can be controlled by wired or wireless control systems such as wireless door lock controls, garage door openers, etc. For example, a mechanical device associated with a first magnetic field structure might be caused to turn relative to a second magnetic field structure based upon a signal received from a remote control device whereby when the first magnetic field structure turns it causes one object to attach or detach from another object. Similarly, the state of electromagnets in an array may be varied based upon a RF signal received from a remote transmitter.

Various types of sensors (e.g., motion sensors, temperature sensors, flow meters, etc.) can be used in conjunction with a control system to control field emission structures and/or coded coil structures in accordance with the invention. In particular, field strength and force strength sensors can be used to determine the orientation of an object based on a known spatial force function and/or electromotive force function and sensor measurements. Moreover, correlated field emission structure and/or coded coil structures may be controlled based upon their position determined by a position determining system such as a global positioning system (GPS), ultra wideband (UWB), or other radio frequency identification (RFID) or real time location system (RTLS) position determining system or by their position or other characteristics as determined by a radar (e.g., a UWB radar), or by other such systems including optical, infrared, sound, etc. Such sensor information, orientation information, and/or position information can be used as part of a control system to control one or more field emission structures, one or more coded coil structures, and/or one or more objects, can be used to trigger a condition (e.g., an alarm condition), to control a function, and/or to assimilate such information to information about an object, person, animal, or place for some useful purpose.

While particular embodiments of the invention have been described, it will be understood, however, that the invention is not limited thereto, since modifications may be made by those skilled in the art, particularly in light of the foregoing teachings.

The invention claimed is:

1. A magnetic attachment system, comprising:

a first magnetic field structure comprising three or more stripes of magnetic field sources having a first pattern of different widths and different polarities; and a second magnetic field structure comprising three or more stripes of magnetic field sources having a second pattern of different widths and different polarities, said first magnetic field structure being complementary to said second magnetic field structure, said first magnetic structure being moveable relative to said second magnetic structure across an interface boundary and producing a peak attractive force when in an alignment position relative to said second magnetic field structure and producing a plurality of off-peak attractive forces when in a plurality of misalignment positions relative to said second magnetic structure, where each of said plurality of off-peak attractive forces is the result of cancellation of an attract force by a repel force.

2. The magnetic attachment system of claim 1, wherein said first pattern comprises the polarity pattern '+−+'.

3. The magnetic attachment system of claim 2, wherein said first magnetic field structure produces a magnetic field substantially in accordance with a Barker 4 sequence.

4. The magnetic attachment system of claim 1, wherein said second pattern comprises the polarity pattern '−+−'.

5. The magnetic attachment system of claim 4, wherein said second magnetic field structure produces a magnetic field substantially in accordance with a Barker 4 sequence.

6. The magnetic attachment system of claim 1, wherein said first magnetic structure produces a plurality of off-peak repulsive forces when in a plurality of misalignment positions relative to said second magnetic structure, where each of said plurality of off-peak repulsive forces is the result of partial cancellation of attract and repel forces.

7. The magnetic attachment system of claim 1, further comprising:

a magnetically saturable layer on a first side of said magnetic structure, said first side being opposite a second side of said magnetic structure corresponding to said interface boundary.

8. The magnetic attachment system of claim 1, further comprising:

a magnetically inactive layer that provides a minimum separation distance across said interface boundary between said first magnetic field structure and said second magnetic field structure.

9. The magnetic attachment system of claim 1, wherein said first magnetic structure is associated with a first object and said second magnetic structure is associated with a second object, said peak attractive force providing magnetic attachment of said first object to said second object.

10. The magnetic attachment system of claim 9, wherein said first object is a cover and wherein said second object comprises a glass surface.

11. The magnetic attachment system of claim 10, wherein said first object is capable of covering said glass surface.

12. The magnetic attachment system of claim 10, further comprising:

a hinge that enables said first object to rotate relative to said second object.

13. The magnetic attachment system of claim 1, further comprising:

a movement constraining mechanism, wherein said movement constraining mechanism restricts movement of said first magnetic structure to a single degree of freedom.

14. The magnetic attachment system of claim 13, wherein said first magnetic structure can move perpendicular to said interface boundary.

15. The magnetic attachment system of claim 13, wherein said movement constraining mechanism comprises one or more walls of a container.

16. The magnetic attachment system of claim 13, further comprising:

a spring for controlling movement of said first magnetic structure.

17. The magnetic attachment system of claim 16, wherein said first magnetic structure is associated with a first object and said second magnetic structure is associated with a second object thereby enabling attachment of said first object to said second object and detachment of said first object from said second object.

18. The magnetic attachment system of claim 17, wherein said first object comprises a third magnetic field structure and said second object comprises a fourth magnetic field structure, wherein said when said first and second magnetic field sources are aligned said third and fourth magnetic field structures generate an attract force.

19. The magnetic attachment system of claim 18, wherein said attract force generated by said third and fourth magnetic field structures is capable of enabling attachment of a portion of said first object to said second object.

20. The magnetic attachment system of claim 18, wherein said first and third magnetic field structures are in a first straight line and are separated by a first spacing and said second and fourth magnetic field structures are in a second straight line and are separated by a second spacing.

* * * * *